United States Patent [19]
Denniston

[11] Patent Number: 6,092,375
[45] Date of Patent: Jul. 25, 2000

[54] DESICCANT BASED HUMIDIFICATION/ DEHUMIDIFICATION SYSTEM

[76] Inventor: James G. T. Denniston, 5425 Mainsail La., Hermitage, Tenn. 37076

[21] Appl. No.: 08/976,275

[22] Filed: Nov. 21, 1997

Related U.S. Application Data

[62] Division of application No. 08/771,892, Dec. 23, 1996, Pat. No. 5,873,256, which is a continuation of application No. 08/388,140, Feb. 13, 1995, abandoned, which is a continuation-in-part of application No. 08/271,517, Jul. 7, 1994, Pat. No. 5,514,035.

[51] Int. Cl.[7] ..................................................... F25D 17/06
[52] U.S. Cl. ................................................. 62/94; 62/271
[58] Field of Search ................................. 62/91, 94, 244, 62/271; 454/121

[56] References Cited

U.S. PATENT DOCUMENTS

| | | | |
|---|---|---|---|
| 2,075,036 | 3/1937 | Hollis ........................................... | 62/94 |
| 3,774,374 | 11/1973 | Dufour et al. .............................. | 55/316 |
| 3,844,737 | 10/1974 | Macriss et al. ............................. | 55/34 |
| 4,093,435 | 6/1978 | Marron et al. .............................. | 55/269 |
| 4,113,004 | 9/1978 | Rush et al. .................................... | 165/3 |
| 4,171,624 | 10/1979 | Meckler et al. ........................... | 62/271 |
| 4,180,985 | 1/1980 | Northrup, Jr. .............................. | 62/271 |
| 4,228,847 | 10/1980 | Lindahl ....................................... | 165/10 |
| 4,255,171 | 3/1981 | Dravnieks .................................. | 55/269 |
| 4,408,660 | 10/1983 | Sutoh et al. ................................ | 165/21 |

(List continued on next page.)

OTHER PUBLICATIONS

The Air Conditioning, Heating and Refrigeration News, "Tapping the Sun for Cooling Power," Business News Publishing Co., Aug. 24, 1992.

Air Conditioning, Heating, Ventilation & Refrigeration Service Reporter, "Solar Air Conditioning Trial at Florida KFC Restaurant," Jul. 1992.

Consumer Reports, "Breathing on a Jet Plane," vol. 59, No. 8, Consumer Union, New York (Aug. 1994), pp. 501–506.

Miller et al., "Integrated Thermal Desiccant Cooling to Address High Humidity Interiors," Paper for the National Solar Energy Conference, Jun. 13–18, 1992.

Schuchardt et al., "An Air Induction System for a Four–Cylinder Engine: Design, Noise Control and Engine Efficiency," SAE Technical Paper Series, No. 931317, Warrendale, PA 15096–0001 (1993), pp. 1–6.

The Tampa Tribune, "Utility, Firm to Test New Air–Conditioner Design," Tampa, Florida, May 8, 1992.

Psychometric chart, showing statistics prepared by the American Society of Heating, Refrigerating and Air–Conditioning Engineers Standard 55–1961.

*Primary Examiner*—William E. Tapolcai
*Attorney, Agent, or Firm*—Lucian Wayne Beavers

[57] ABSTRACT

An apparatus and method for automatically regulating the environmental system of a motorized vehicle and other articles having storage compartments. As impinging air flow is directed through the cabin or compartment subject to environmental control it comes in contact with a desiccant filler contained within a desiccant wheel or canister. The desiccant material absorbs moisture out of the air stream. The resultant air stream, or the extracted moisture released into another air stream, may then be directed to the interior of the motorized vehicle or used in other parts of the system. The net effect is a decrease or increase in the relative humidity level of the air mass contained in the cabin or compartment of a motorized vehicle or refrigeration unit. As one portion or element of the desiccant filler becomes saturated, the other portion or element of the desiccant filler completes it's regeneration cycle. The air streams are altered so that the designated air stream remains in either the hydrous or anhydrous desiccant, thus producing a constant air flow containing either an increased relative humidity or an air stream with a reduced relative humidity to achieve the desired result. The apparatus includes, at least one moisture collection device having an inlet and an outlet, and a system of flow conduits or paths into and out of the compartment or cabin. The air streams may be directed to at least one heat exchanger, a pre-cooler, a compressor, or an evaporator.

13 Claims, 110 Drawing Sheets

U.S. PATENT DOCUMENTS

| | | | |
|---|---|---|---|
| 4,424,933 | 1/1984 | Sutoh et al. | 236/44 A |
| 4,594,860 | 6/1986 | Coellner et al. | 62/271 |
| 4,700,550 | 10/1987 | Rhodes | 62/271 |
| 4,709,751 | 12/1987 | Ichimaru et al. | 454/121 |
| 4,729,774 | 3/1988 | Cohen et al. | 55/181 |
| 4,887,438 | 12/1989 | Meckler | 62/271 |
| 5,014,816 | 5/1991 | Dear et al. | 181/229 |
| 5,042,266 | 8/1991 | Yamashita et al. | 62/271 |
| 5,170,633 | 12/1992 | Kaplan | 62/94 |
| 5,224,373 | 7/1993 | Williams et al. | 73/29.02 |
| 5,276,166 | 1/1994 | Swarup et al. | 548/952 |
| 5,296,541 | 3/1994 | Swarup et al. | 524/556 |
| 5,297,398 | 3/1994 | Meckler | 62/271 |
| 5,335,719 | 8/1994 | Khelifa et al. | 62/271 X |
| 5,351,497 | 10/1994 | Lowenstein | 62/271 X |
| 5,386,952 | 2/1995 | Nordstrom et al. | 244/118.1 |
| 5,388,423 | 2/1995 | Khelifa | 62/271 |
| 5,435,150 | 7/1995 | Khelifa et al. | 62/94 X |
| 5,509,275 | 4/1996 | Bhatti et al. | 62/271 |
| 5,512,083 | 4/1996 | Dunne | 95/113 |
| 5,514,035 | 5/1996 | Denniston | 454/121 |
| 5,873,256 | 2/1999 | Denniston | 62/271 |

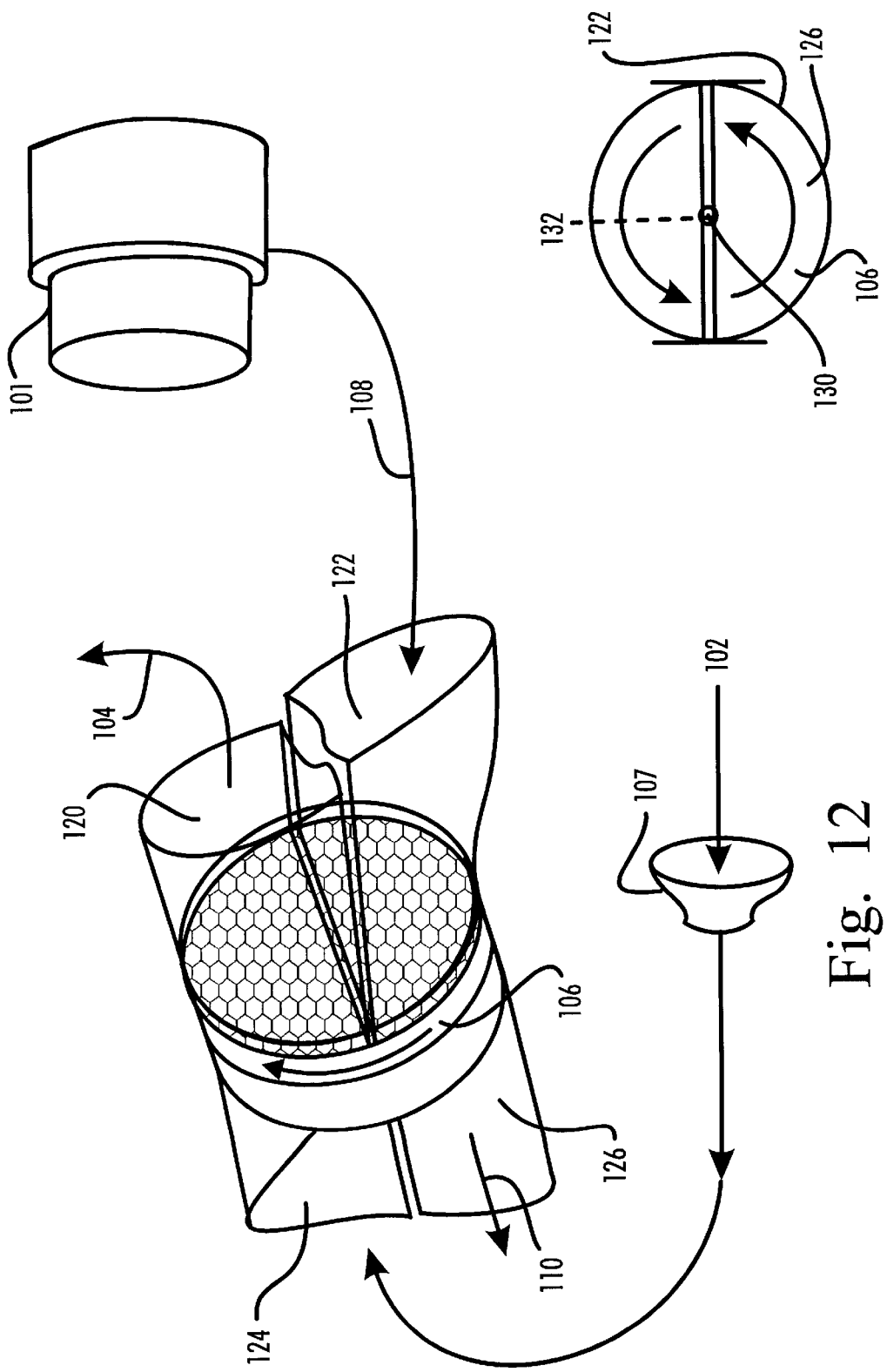

DESICCANT BASED HUMIDIFICATION & DEHUMIDIFICATION

SOURCES OF MOISTURE FOR ADSORPTION
1. VEHICLE CABIN AIR
2. OUTSIDE AIR

SOURCES OF HEAT FOR EVAPORATION
1. ENGINE
2. AIR-CONDITIONER
3. TURBINE COMPRESSOR

INVENTIVE METHODS
1. FRESH OUTSIDE AIR HEATED & HUMIDITY INCREASED FOR CABIN
2. RECIRCULATED CABIN AIR - HEATED & HUMIDITY INCREASED FOR CABIN
3. RECIRCULATED CABIN AIR - DEHUMIDIFIED
4. FRESH AIR TO CABIN - DEHUMIDIFIED
5. RECIRCULATED CABIN AIR - DEHUMIDIFIED TO INCREASE A/C EFFICIENCY
6. FRESH AIR TO CABIN - DEHUMIDIFIED TO INCREASE A/C EFFICIENCY
7. RECIRCULATED CABIN AIR - DEHUMIDIFIED TO DEFOG WINDSHIELD
8. FRESH AIR TO CABIN - DEHUMIDIFIED TO DEFOG WINDSHIELD

Fig. 14

The Following Summary Chart Generally Describes the Functions and Benefits of the Inventive Methods:

| | Moisture Adsorbed FROM | Moisture Released INTO | = | Resulting BENEFITS |
|---|---|---|---|---|
| 1 | Stale Cabin Air | Fresh Heated Air for Cabin | = | Humidification |
| 2 | Outside Ambient Air | Fresh Heated Air for Cabin | = | Humidification |
| 3 | Recirculating Cabin Air | Outside Air Heated by Excess Engine Heat | = | Dehumidification |
| 4 | Recirculating Cabin Air | Outside Air Heated by Excess Engine Heat | = | Defog Windshield |
| 5 | Recirculating Cabin Air | Outside Air Heated by Excess Engine Heat | = | Air-Conditioner Efficiency |

Fig. 23

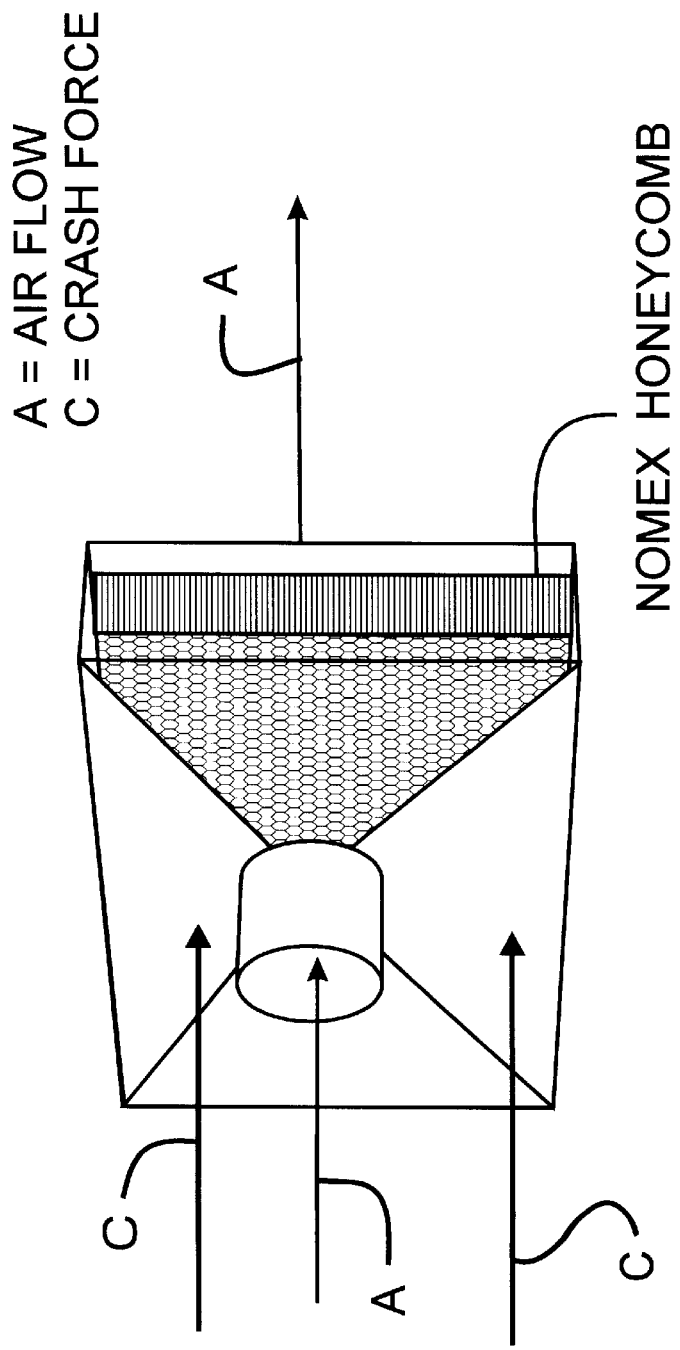

AIR FLOW THROUGH NOMEX (WITH DESICCANT) HONEYCOMB WITH A SHAPE TO FIT THE CONTAINER

FUNCTION ELEMENTS OF FULL FEATURE AUTOMATIC DIGITAL CONTROL UNIT

1. TEMPERATURE

2. HUMIDITY

3. DEFROST

4. FAN SPEED

5. VENT SELECTION (FEET, MID-LEVEL, HEAD, ETC.)

6. FRESH / RECIRCULATE AIR SUPPLY

Fig. 91

DESICCANT BASED HUMIDIFICATION/DEHUMIDIFICATION SYSTEM

This application is a divisional of U.S. application Ser. No. 08/771,892, filed Dec. 23, 1996, now U.S. Pat. No. 5,873,256, which was a continuation of application Ser. No. 08/388,140, filed Feb. 13, 1995, now abandoned, which was a continuation-in-part of application Ser. No. 08/271,517, filed Jul. 7, 1994, now U.S. Pat. No. 5,514,035.

BACKGROUND OF THE INVENTION

1. Field of the Invention

The present invention relates generally to a method and apparatus for both humidification and dehumidification through the use of desiccant materials, as well as the automatic regulation of the relative humidity of the air contained in motor powered vehicles (hereinafter "motorized vehicles"), and the efficient automatic elimination and prevention of frost, fog, or condensation on the inside of the window glass of vehicles, and the elimination and prevention of frost in refrigeration units.

2. Description of the Related Art

The invention provides features and benefits by controlling relative humidity in a way not previously available. Automobiles, trucks, vans, trains, boats, ships, military vehicles, aircraft, tractors, motorized recreation vehicles, and various other types of motorized vehicles have previously lacked a successful and economical method or apparatus to automatically monitor and control the relative humidity within the cabin of the vehicle.

Previously produced motorized vehicle environmental systems have been developed to increase or decrease the cabin air temperature, regulate the rate of air flow, filter dust or pollen particles out of the air, defrost/defog the windshield, or reduce cabin noise, but none of the environmental systems have attempted to economically and effectively regulate the relative humidity level of the cabin air. Although the environmental systems in some over the road trucks have utilized water humidification and various dehumidification methods in the past, the systems were either inefficient, unhealthy, or expensive due to their initial installation cost, maintenance requirements, or their high level of energy consumption. There are currently desiccant based dehumidification systems for commercial buildings, however, they do not use the same processes or methods to provide a heat source for regeneration or the same configuration of desiccant wheel that is used as an element of this inventive method and apparatus, and none employ a canister like that shown and claimed.

Traditional refrigeration and freezer units produce frost or condensation within the box or on the evaporator coils when the humidity of the air reaches the saturation point as the air is cooled in the unit. The inherent frost problem restricts the air flow over the coils, creates a frost buildup on the inside of the box, and limits the efficiency of the coils. The current methods of defrosting these types of units use additional energy and utilize expensive apparatus to remove the frost.

In previously manufactured motorized vehicles the relative humidity of the cabin has essentially been unmonitored, unregulated and uncontrolled except through the use of traditional air-conditioner evaporator units. The lack of humidity control of the cabin air in motorized vehicle can have a negative effect on safety, comfort, health, and operating efficiency.

In motorized vehicles the need for an efficient and effective way to increase the relative humidity in the cabin to improve the comfort for the occupants has existed for many years. If the motorized vehicle is operating in cold weather without the addition of humidity into the cabin air, the continued use of the heater in combination with the introduction of cool dry fresh air from outside will cause the relative humidity in the cabin to decrease to a point where the occupants may become uncomfortable. Traditional humidification units have experienced many problems due to the need to haul water and health hazards are present from the growth of bacteria, mold and mildew in the system.

In aircraft the problem is compounded because of the long duration of the flight and the extremely low levels of humidity that occurs in aircraft. In most long range commercial aircraft the cabin environmental system is heated by compressed air taken from the compressor section of the turbine engine. Outside air enters the engine air intake, is compressed and thus heated by the compressor section of the engine. Some of the hot compressed air going through the engine is vented off from the engine prior to the air entering the burner section of the engine. The hot air is then forced into the cabin environmental system.

During most flights, the outside air has a low relative humidity before it is heated, and the result of heating the air produces an extremely low relative humidity when the air enters the cabin. Even the moisture given off by evaporation from the occupant's perspiration and from evaporation of moisture out of the occupants lungs is not sufficient to keep the cabin at a high enough relative humidity for it to be comfortable to the occupants. The moisture given off by the occupants and generated from other sources escapes out of the cabin as the stale cabin air is expelled from the cabin. Although the cabin of a commercial aircraft may have the temperature regulated very close to 70° F., the relative humidity can drop to well below 20%.

The $CO_2$ in the cabin can cause discomfort for the occupants when the $CO_2$ reaches levels greater than 1000 ppm (parts per million). This high level of $CO_2$ exist because of the low percentage of new fresh air brought into the cabin as compared to the ratio of old stale air recirculated. The ratio of the fresh air is inadequate to replace enough of the unwanted $CO_2$. If the environmental system circulates in more fresh air from outside to reduce the ratio of $CO_2$ and increase the ratio of Oxygen, the resultant air mass would have an even lower relative humidity. This would produce a relative humidity level even lower than the current uncomfortable levels of less than 20%.

These extreme conditions cause the passengers to experience substantial discomfort caused by two factors: 1.) stuffy feeling from poor ventilation of fresh air; and 2.) dryness from extremely low relative humidity. The effects of these two factors manifest in the physiological conditions for the occupants as respiratory irritation, headaches, and fatigue. These same factors also effect the fight crew and impact the safe operation of the aircraft due to the crew member's distraction from the effects of high $CO_2$ and low relative humidity.

In aircraft design, there has always been strong economic pressure to reduce the operational cost by reducing the cost of fuel. The weight of the aircraft has a direct relationship to the consumption of fuel. For each pound of cargo which must be reduced to off set an additional pound of aircraft weight there is a penalty due to the loss of revenue for the pound of cargo and the additional cost of fuel to transport the extra weight added to the aircraft. If an inventive apparatus is installed in the aircraft, the weight of the apparatus is added to the total air frame weight. Of course, the additional weight of the apparatus will have a long term operational cost disadvantage simply due to the weight of the apparatus installed in the aircraft. The benefits of passenger comfort must offset the cost penalty of initial unit cost and long term operational fuel cost. The cost benefit of lower aircraft weight due to the conditioning of the air in the cabin is a respectable trade-off.

It is commonly understood that water is heavier than air. What is not commonly understood is that water vapor is lighter than air. Since the inventive apparatus adds water vapor to the air contained in the cabin the apparatus is actually reducing the weight of the aircraft by reducing the weight of the cabin air. Air is made up of: NITROGEN 78% (NI) with 14.0067 AMU (Atomic Mass Units); OXYGEN 21% (O) with 15.9994 AMU and OTHER GASES 1% which consist of: ARGON 0.9%, CARBON DIOXIDE 0.03% and varying amounts of WATER VAPOR, Since CARBON has an AMU of 12.011 the combined molecule of CARBON DIOXIDE with CARBON: 12.011 and OXYGEN: 15.9994 is actually lighter than OXYGEN alone with 15.9994. This would provide the designer with a marginal incentive to increase the CARBON DIOXIDE content in the air mass of the cabin to reduce the aircraft weight. When OXYGEN 15.9994 is combined with two (2) HYDROGEN 1.00794 AMU atoms the result is a molecule with a much lower weight. Much lighter than NITROGEN, OXYGEN, or CARBON DIOXIDE.

When water vapor is added to the cabin air mass unlike CARBON DIOXIDE the passengers experience more healthful and comfortable breathing and a significantly greater reduction in air mass weight. The evaluation of the apparatus must consider not only to the comfort and safety of the occupants, but also the off set in weight reduction from the water vapor displacement of the heavier cabin air gasses. Many people working with desiccants will refer to removing a given amount of water from an air mass, and the values given may be pounds of water or gallons of water, what they fail to mention is the water vapor removed is replaced by a heavier air mass.

It is not practical for the aircraft designers to simply modify the aircraft environmental systems by adding a conventional liquid humidification apparatus which would increase relative humidity in the cabin air with an atomized spray of water into the vent system to perform the needed humidification. The addition of a water based humidification system would only create a new set of problems. These problems include the added cost of transporting the liquid water, the additional maintenance expense to keep the system clean and operating properly, and health concerns related to bacteria growing in the wet area of the system.

The cabin environmental systems for today's commercial aircraft were designed to use a minimum amount of energy from the engines by simply recirculating more old stale cabin air and adding less fresh air from outside the aircraft. The fresh air from outside is brought into the aircraft by bleeding off heated compressed air from the compressor section of the engine (bleed air). In today's large long haul aircraft cabins, the manufactures have traded off passenger comfort and health for fuel efficiency which has created unhappy passenger with a strong desire for better comfort and a more healthful environmental system.

There is a significant need to develop a method to economically and safely humidify the fresh outside air which is forced into the cabin. If aircraft cabin environmental systems had the capability to increase the humidity in the cabin, this would not only solve the current problem with the existing low level of relative humidity, this would also enable the system designers to increase the ratio of fresh air introduced into the cabin without causing a severely negative impact on the relative humidity level of the cabin air.

For the environmental system to bring more fresh air into the cabin, the designers must consider the following factors, including, but not limited to:

1.) the need to compensate for additional heat from the added fresh air to maintain the cabin temperature of 70°.
2.) the effects from a larger volume of fresh air on maintaining the correct level of cabin pressure.
3.) the requirement for additional humidification of the additional fresh air to correct for the lower relative humidity.

Since the aircraft engine compressor system has the capability to provide larger volumes of fresh air that is both heated and compressed the modification to these elements of the existing environmental systems would be minimal. The remaining system deficiency, which is the lack of relative humidity control, would require the incorporation of a new humidification system.

Although aircraft experience the most severe cabin environmental problems related to low relative humidity, all other closed cabin motorized vehicles including but not limited to cars, trucks, busses, boats, military vehicles, trains, etc. experience similar low humidity problems of varying degrees. Many occupants of land motorized vehicles experience discomfort from low relative humidity in the cabin. The operators of overland trucks, individuals spending long duration's of time in automobiles, busses or other motorized vehicles experience discomfort from extremely low relative humidity due to the effect of operating the cabin heater for extended periods.

Just as most motorized vehicles have the need to regulate the temperature for passenger comfort by either increasing or decreasing the environmental air temperature and rate of air flow in the cabin, there is also a need to control the percent of relative humidity of the cabin air to provide an acceptable level of comfort.

Existing motorized vehicles lack an effective dehumidification system, they have three significant reasons why this improvement is needed: 1.) Safety could be enhanced by eliminating windshield fog/frost; 2.) Comfort for the occupants could be improved by controlling the maximum level of relative humidity; and 3.) Efficiency in the operation of the motorized vehicle from a reduction of fuel consumption could be attained due to the reduction of energy consumption of the existing air-conditioning system since the current method of dehumidification expends additional compressor energy on the condensation of moisture on the evaporator coils of the traditional air-conditioner.

Motorized vehicle operation safety is believed to be significantly enhanced by this invention due to the automatic prevention or rapid elimination of visual impairment or obstruction from condensation, fog, or frost on the inside of cabin windows of motorized vehicles (e.g. cars, trucks, boats, helicopters, tractors, trains, military equipment, airplanes, etc.)

Motorized vehicles have for years experienced window/windshield condensation under certain environmental conditions. The closed area of the cabin, along with the occupants breathing out moist air, and in some cases rain soaked clothing tends to rapidly produce condensation on the inside of the glass of the windows. Condensation has been known to accumulate during the operation of a motorized vehicle when the inside cabin air temperature and high relative humidity of the cabin combines with the cold window glass to produce windshield fog/frost.

Traditional cabin defrost/defog systems provide the operator with the option to switch to outside air and/or increase the inside cabin temperature to remove the condensation. This method of defrost/defog attempts to eliminate the condensation by introducing outside air with a lower level of humidity and/or change the inside air temperature, or the temperature of the window glass, to avoid having the inside air reach the due point. Another traditional approach, that consumes additional fuel, is using the air-conditioner evaporator to defrost the windshield while the heater is operating to warm the cabin.

The net result of these systems is the occupants must take the necessary actions to attempt to eliminate the condensation, and the comfort of the occupants may also be sacrificed so as to eliminate the condensation. In these situations, safe operation of the motorized vehicle could be jeopardized because the corrective action to eliminate the condensation does not usually begin until the occupant can see the condensation, which is often after the operator's vision is already impaired. The operator must then adjust the environmental controls by attempting to set the climate controls to a setting which will eliminate the condensation. If the operator makes the adjustment incorrectly the window may actually accumulate more condensation and create a more serious unsafe condition, such as when the operators vision through the windshield or other windows is completely blocked by condensation.

There are times when the introduction of outside air is undesirable to the occupants of the cabin, such as when the motorized vehicle is passing through smog, exhaust filled environments, or in the presents of other anxious gases or fumes. Most of the current methods attempting to eliminate condensation are only adaptations to the conventional heating and cooling units and neither of these systems have the distinct capability to effectively control both the cabin relative humidity and temperature. For example, on high humidity days with rain soaked occupants entering the motorized vehicle the systems must rapidly eliminate the condensation from the windshield. As the cabin air mass warms up the moisture from the clothing begins to evaporate into the air as the warmer air mass increases it's capability to hold moisture. The warm moisture saturated air is cooled when it comes in contact with the inside surface of the windshield glass which causes the moisture to form condensation on the surface of the glass. Many environmental control systems of motorized vehicles do not have the capability to immediately eliminate or prevent the formation of condensation on the windshield under these conditions.

Since the definition of environmental air-conditioning is not limited to just cooling when considering occupant comfort, the definition also encompass temperature, air motion, moisture levels, radiant heat levels, dust, various pollutants, sound, and microorganisms when considering the total cabin environment air conditioning. Relative humidity control should be a major element of the overall system design. Although many of the cabin environmental systems in today's motorized vehicles have been improved to include automatic temperature and air volume movement (CFM) control settings, manufactures have not incorporated into climatic control systems the capability to automatically and efficiently increase or decrease the relative humidity level in the cabin.

The human body regulates it's temperature of 98.6° F. during different levels of physical activity. The metabolic rate of an individual is based on the activity level of the individual. The human body tends to be comfortable in a temperature range of 67° F. -to- 72° F. in Winter and 73° F. -to- 79° F. Summer. With the body continuously giving off heat @98.6° F. to the surrounding air mass with 70° F., the body regulates the rate of heat emission to maintain a constant 98.6° F. The body metabolic rate while sleeping is 0.7, while driving a car 1.5, while walking 2.6, and during competitive sports 8.7. The higher the metabolic rate, the more heat the body needs to give off to maintain 98.6° F. The body controls it's temperature by controlling the emission of energy from the body by radiation, by convection to air currents that impinging on the skin or clothing, by conduction of clothing and objects that are contacted, and by evaporation of moisture in the lungs and of sweat from the skin.

Evaporation and convection heat loss are functions of air temperature and velocity. Evaporation is a function, in addition, of relative humidity. Air-conditioning (A/C) cooling units for traditional motorized vehicles primarily use convection heat loss to maintain the comfort for the occupants of the cabin. These A/C cooling units do not have the capability to lower the relative humidity much below the saturation level to enhance the human body's natural cooling effect from evaporation. In the existing motorized vehicles equipped with environmental cooling units, when the occupants wants faster cooling, they must lower the unit's temperature setting, increase the air flow volume to maximum, and set the unit's air flow to recirculate. These settings may increase the body's cooling rate, but they also create an uncomfortable cold clammy feeling for the occupants if the cabin has a high relative humidity. If the relative humidity exceeds 60% the occupants feel wet.

For example, when the temperature is below 70° F. and the relative humidity is in excess of 60% the occupant feels clammy-cold, and with a high relative humidity and the temperature above 77° F. they feel sticky-hot. There are many times when the occupants may be operating the A/C cooling unit because they feel uncomfortable even when the cabin temperature is below 70° F. due to a relative humidity above 60%.

If the environmental control unit had the capability to independently control the relative humidity the occupant would feel comfortable using a smaller volume of cool air and would actually operate the compressor cooling unit less often.

The air-conditioning cooling units in today's motorized vehicles are both mechanical (belt) driven and electrical powered from the engine. The air-conditioner system places an additional load on the engine that decreases the motorized vehicle's acceleration performance and increases the engine's fuel consumption. The lack of efficiency in the air-conditioner equates into higher fuel cost of operating the motorized vehicle and lower performance.

Since today's motorized vehicle's environmental systems lack the capability to lower the relative humidity before the air passes over the cooling coils, the air-conditioner must use additional energy to condense out the moisture when the air has a high relative humidity. The condensing out of the moisture on a high temperature, high humidity day causes the unit to expends approximately 20% to 30% of it energy performing this conversion of water vapor to a liquid. As the air temperature is lowered with a high relative humidity it passes over the cooling coils and the moisture will condense out as the air approaches the dew point. The condensation produced from this cooling can create wet areas within the air-conditioner unit where dangerous bacteria can grow and then spread into other areas of the system or cause the inside of the motorized vehicle to smell like mildew. If the cooling coils are below 32° F. the condensation will form frost on the coils.

Most available units are designed to maintain the cooling coil temperature at about 35° F. to eliminate the build up of ice on the coils. The air-conditioning unit's air cooling output is limited by it's ability to lower the air's temperature because of this minimum temperature limit on the coils of 35° F. If the relative humidity in the air passing over the coils could be lowered, the dew point of the moisture in the air would be lower and the condensation would not form until the air reached a much lower temperature, or if the relative humidity is low enough it may never form frost when the air passes over these cold coils.

Since the units are limited by the 35° F. coil temperature the cold air output of the unit cannot be lower than the temperature of the coils without a frost build up, therefore, the systems are designed to put out larger volumes of air (Cubic Feet/Minute) to accomplish the necessary cabin air cooling. Moving larger volumes (CFM) of air requires greater energy consumption.

The currents systems are noisy and the blast of cold air on the occupants produce an unpleasant cabin environment. Since these systems produce cold moist air the occupants will set the temperature lower because the occupant's own body is not benefiting by the potential cooling effect from the body's natural evaporation that could be gained with a lower relative humidity of the air stream entering the cabin. Since the air-conditioners lack the capability to lower the relative humidity without operating the compressor the occupants will turn on the air-conditioner more often because they feel uncomfortable. The occupants could be perfectly comfortable with a higher cabin temperature if the relative humidity were lower.

In summary, high fuel consumption in the current environmental systems is believed to be largely the result of: 1.) having to move more CFM of air to accomplish the necessary cooling; 2.) minimum cooling coil temperature of 35° F.; 3.) the occupants will set the desired temperature lower than necessary for comfort due to high relative humidity; 4.) the occupants will use the unit more often for comfort; and, 5.) cooling moist air requires more energy than cooling dry air;.

Substantial savings in fuel consumption of motorized vehicles could be obtained if cabin environmental units could efficiently lower the relative humidity to a comfortable level in the cabin air.

Conventional systems do not have the capability to perform both the humidification and dehumidification function utilizing the same elements of their apparatus. Many times the environmental system is operating the heater while the air-conditioning cooling is operating to eliminate windshield condensation; and few if any, vehicles have the capability to effectively dehumidify the cabin air.

Many motorized vehicles and trailers pulled by motorized vehicles have refrigeration or freezer units to keep the contents of the trailer or truck cold or below freezing. Most freezer equipment has been designed to go through a defrost cycle to eliminate the frost. The defrost cycles consist of a heating cycle in most cases to melt the frost that has formed on the coils. These defrost cycles are inefficient due to the heating and re-cooling required to perform the defrosting. Some units have duel coils to allow one to defrost while the other coil is cooling. None of these units has the capability to regulate the relative humidity other than through the current methods of using the cold evaporator coils to condense out moisture, or allow the build up of frost and then melt the frost thereby allowing the water to drained to the outside of the unit. A large amount of energy is expended by these units to remove frost and moisture.

SUMMARY OF THE PRESENT INVENTION

The invention automatically regulates the environmental system's impinging air flow through a desiccant coated materials and in this way the moisture is adsorbed out of the air stream into the desiccant or moisture is released out of the desiccant material into another air stream to produce either a decrease or increase in the relative humidity level of the air mass contained in a motorized vehicle or refrigeration unit. The designated air stream passing through the desiccant material is periodically altered by the process to continually direct the air stream into either a hydrous or anhydrous desiccant material.

The process and apparatus preferably achieve a system balanced so as one element of desiccant becomes saturated, the other element of desiccant completes it's regeneration cycle, the air stream is altered so that the designated air stream remains in either the hydrous or anhydrous desiccant, thus producing a constant air flow containing either an increased relative humidity or an air stream with a reduced relative humidity to achieve the desired result. The cycling of the air flow over the desiccant is automatically controlled to alternate between different sections of a desiccant wheel or between different desiccant canisters to achieve a continuous adsorption and regeneration process.

An important element of the desiccant wheel or desiccant canister filler is the desiccant coated on a honeycomb or similar structured material creating the air flow passages providing the even distribution of the air stream over the surface of the desiccant. The surface of the air flow passages are coated with a desiccant material so as to expose the air stream to the maximum available surface as it passes through the structure with a coating of hygroscopic material such as lithium chloride, titanium silicate, or other desiccant material capable of adsorbing moisture out of a cool air stream and which is also capable of releasing the moisture through evaporation when a hot air stream passes through the passages.

The titanium silicate desiccant which is produced by Engelhard Corporation has the capability to effectively adsorb moisture at room temperature and release moisture to regenerate the desiccant through evaporation at 140° F. The process of alternating cycles of air sources over the desiccant material enables the system to reuse the desiccant and continuously function over an indefinite period of time. One of the unique features of this process is that it utilizes as a source of regeneration energy (in most embodiments of the apparatus and under most environmental conditions) the available heat energy from the heating system, and/or excess heat energy from the engine, and/or excess heat from the air-conditioner compressor and coils to perform the desiccant regeneration.

The inventive process efficiently utilizes desiccants to counteract the inherent environmental conditions of low relative humidity when an air mass is heated and a high relative humidity when the environmental air-conditioning cooling unit is operating. The invention also automatically removes/prevents fog, frost, or condensation from the windshield of a motorized vehicle, and prevents the build up of frost in refrigeration unit through desiccant dehumidification. In addition the apparatus automatically regulates the desired relative humidity of the air mass to a level set either automatically or manually on the digital automatic control unit of the apparatus while the environmental air-conditioning cooling, heating, or refrigeration unit is on or off and with the airflow selector set to recirculate or fresh air.

The intended functions are performed automatically through variations in air flow over desiccant materials and/or the mechanical relocation of desiccant materials as various air streams flows through the apparatus. The inventive method and apparatus removes or adds humidity to an air stream. When cool air passes over the desiccant surface, moisture from the cool air is adsorbed into a desiccant material. After the air stream is altered and/or the desiccant is repositioned automatically by the system, a hot air stream is employed to release the moisture from the desiccant into the hot air stream by evaporation as the hot air stream passes over or through the desiccant material.

The desiccant regeneration occurs when a hot air stream changes the desiccant from hydrous to anhydrous by evaporation as a hot air stream passes through a desiccant material that is either adhered to the surface of a honeycomb structure of NOMEX; or the desiccant is adhered to a material similar in shape to the honeycomb, such as rolled corrugated card board; or a combination of desiccant and structural materials making up the structure of a canister filler or desiccant wheel; all of which are here after referred to as honeycomb.

The air streams is alternately passed through either a desiccant coated honeycomb canister filler or a portion of a desiccant coated honeycomb wheel. After the moisture is adsorbed into the desiccant during the cool air cycle, the desiccant on the honeycomb structure is repositioned or the air stream is altered to cause a hot air stream to pass through the structure resulting in the evaporation of the moisture into the hot air stream thus causing the desiccant to release the moisture into the hot air stream which increases the relative humidity. Through this method the moisture can be removed from one air mass and then transferred into another air mass by a process of adsorption of moisture into the desiccant material and then followed by the evaporation of the moisture out of the desiccant material into another air stream.

The inventive method and apparatus has the ability to automatically regulate the environmental conditions including the level of relative humidity of the cabin air of a motorized vehicle, or the air contained in a refrigeration unit. The automatic control unit, which is an essential component, monitors internal and external environmental factors and when necessary activates the appropriate process where the air is conditions by controlling the apparatus and process to provide comfort for the occupants, automatic defrosting/defogging, and operational efficiency. The sequence of process steps, mechanical actions, and airflow is automatically regulated by the automatic control unit of the apparatus.

When dehumidification is required the process of adsorption of moisture out of the cabin air stream is activated by directing a cool air stream through the desiccant material which causes the moisture to transfer to the desiccant. The cool air stream enters the cabin as dehumidified air. After dehumidification has been accomplished the air temperature may be further conditioned by either raising or lowering the temperature before the air goes into the cabin.

The second phase of the process of dehumidification is the removal of the moisture from the desiccant to regenerate the desiccant and prepare the desiccant for another adsorption cycle. The removal of the moisture from the desiccant is accomplished by evaporation when a hot air stream passes through the hydrous desiccant causing the moisture to transfer into the hot air stream by evaporation which is then expelled from the apparatus.

Humidification of the cabin air is accomplished in a similar process which is simply reversed, with the hot air stream going to the cabin as opposed the cold air stream. The hot humid air stream may also be further conditioned to regulate the air temperature before the air enters the cabin. The process is automatically controlled and performed efficiently since the heat required for regeneration is supplied from excess engine heat or excess heat from the air-conditioner cooling unit. The process provides a benefit when humidity is added to a heated air mass and moisture is removed from a cooled air mass. The apparatus may also independently alter the relative humidity of the air stream when the cabin heating and air-conditioning cooling unit is not activated.

The inventive apparatus size, air flow sequence, desiccant element size and shape, case type, and specific functions may vary to meet the specified needs of the motorized vehicle. Although the different alternatives, methods, apparatus, and configurations describe herein as best suited for preferred applications this in no way limits the invention from using variations of the alternative processes, described methods, apparatus and variations of configurations of the apparatus which are described herein.

In the large commercial aircraft the embodiment may consist of a unit containing a desiccant wheel or an adaptive canister case system consisting of various shapes and quantities of canisters depending on the requirements of the current cabin environmental system, availability of compartment space and cabin layout. The apparatus may be designed into a new motorized vehicle or adapted to an existing design vehicle already produced where the apparatus is an after market unit adapted to an operating motorized vehicle.

While an aircraft is loaded with people on the ground in hot humid climate before take off the cabin may need dehumidification to maintain passenger comfort. When an aircraft is on the ground the inventive apparatus may perform dehumidification from a ground unit connected to the aircraft by flexible duct hoses. While the aircraft is in flight a variation on the apparatus may provide humidification for the cabin fresh air supply by increasing the relative humidity of the hot compressed air provided by the engine to the cabin.

Some smaller aircraft may use only an apparatus with the automatic dehumidification function to defog/defrost the inside of the cockpit windshield glass. In each case the apparatus is using variations on the basic inventive methods to perform the intended function described herein and a particular embodiment may include one or more of the features described.

The automatic control of relative humidity provides comfortable and healthful air for the occupants, safety for the operator of the motorized vehicle by automatically eliminating or preventing fog/frost (condensation) on the inside of the windshield, and efficiency to the air-conditioning unit both in size and energy consumption. Efficiency in operating the apparatus is attained through the inventive methods that utilize, in most cases, excess heat normally expelled into the atmosphere or through redirection of the conventional heating or recirculating air sources through the apparatus. The invention does not requires an external (liquid) water source to humidify, nor does it produce a (liquid) out put of water within the apparatus while it is dehumidifying.

The humidification of the aircraft cabin air is accomplished by the inventive method of passing the stale cabin air containing moisture, through the desiccant coated honeycomb material where the moisture in the cool air is adsorbed into the desiccant material before the stale air is ejected from the aircraft. During the circulation of fresh outside air into the cabin and before the release of stale cabin air, the moisture in the stale air is extracted by a desiccant material as the stale air is allowed to flow out through the desiccant wheel or canister and the moisture is adsorbed into the desiccant material, then the air flow to the moist portion of the desiccant is altered to allow the fresh hot air to pass over the moist desiccant material to receive the moisture contained in the desiccant when the heat in the hot air causes the moisture to evaporate out of the desiccant.

The alternation of the desiccant cycle is accomplished when the desiccant material collecting moisture from the stale moist cabin air approaches the saturation point, the apparatus alters the air flow so as to position the desiccant where a stream of hot fresh air, from the compressor section of the engine, used for heating the cabin will pass over the surface of the desiccant material.

The fresh hot dry air from the compressor section of the engine or any other heated air source will cause the moisture in the desiccant to evaporate into the hot air stream. The resulting moist fresh hot air is directed into the cabin to provide the passengers with a comfortable environment thus eliminating the problem of dry cabin air without the need to transport water and utilize conventional humidification methods.

In summary, on long high altitude flights, the desiccant material removes the moisture from the stale cabin air before the air is ejected from the aircraft. The desiccant is repositioned into a hot air stream and then releases the moisture back into the fresh hot air from the engine compressor before the air goes into the cabin. A heat exchanger may be used to regulate the temperature of the hot moist air before it enters the cabin.

The inventive apparatus may consist of two different types of desiccant assemblies: a desiccant wheel or a desiccant canister.

A desiccant wheel is preferably constructed of NOMEX honeycomb, rolled corrugated cardboard, or similar structure wheel consisting of a light weight structure allowing air to freely pass through the wheel with a coating of desiccant on the surface of the structure to provide the maximum surface area exposed to the air flow or a material with desiccant integral to the structure or a combination of both coated and integral desiccant. The smaller wheels may have a center torque drive and the larger wheels may have either a center torque drive or a perimeter belt and pulley drive system to slowly rotate the wheel.

A desiccant canister is preferably constructed of NOMEX honeycomb or similar structured material contained in a case of metal, plastic, or other structural material. The honeycomb is positioned in the case to allow the air to flow into the case through an input opening in the case where the air passes through the tubular structure of the honeycomb then out of the output opening of the case. The input and output openings are connected to a rotary air valve, slide air valves or damper type valves to alternate the airflow's between a pair of canisters. As one canister completed the adsorption cycle and the other canister completes the evaporation cycle the valve changes the air flow between the canisters. Additional pairs of canisters may be provided to level the air pressure in the line during cycle changes and offer greater system capacity.

The process is automatically controlled by the electronic control unit through sensors measuring temperature and relative humidity within the apparatus and also external to the apparatus, and then automatically regulating the desired relative humidity level in the cabin by activating the humidification process to add moisture. The control unit may stop the process by either turning off the power to the desiccant wheel rotary torque motor or by not recycling the crossover valve and allowing the air stream to continue to flow through the same desiccant canister after it is saturated or regenerated. The apparatus has air filters to prevent a build up of dust, dirt, or foreign matter on the surface of the desiccant material.

In addition to the invention's standard method of aircraft cabin air humidification by removing moisture from stale air before it is expelled, the method may be expanded to include another source of moisture from the ambient (outside) air. The outside air is used as an additional source from which moisture is also adsorbed by the desiccant as the outside air flows through the apparatus. After the desiccant adsorbs the moisture out of the ambient air source, the dry air is then expelled back to the outside atmosphere.

The automatic control unit of the apparatus determines when the cabin relative humidity needs to activate the duel air sources for humidification. This may only be necessary when the apparatus is unable to obtain enough moisture from it's primary source of moisture by reclaiming cabin moisture. Since the moisture will be adsorbed out of the outside air with a significantly lower pressure as compared to the inside cabin air which is at a higher pressure the apparatus must have a seal system to prevent the cabin air from escaping into the outside atmosphere. The canister type system has many advantages for this application.

In motorized vehicles where cabin air pressure is not a factor but the need for duel moisture sources exist the inventive apparatus can produce the desired results from a single unit utilizing two different stages or portions of a cycle of the same desiccant to perform both outside air moisture adsorption and stale air adsorption into the desiccant material that will be evaporated out of the desiccant for humidification of cabin air.

Humidification of the cabin air for land or water motorized vehicles is performed through a method of desiccant humidification where moisture is adsorbed out of stale cabin air before it is expelled from the motorized vehicle or the moisture is extracted from outside air and then evaporated into the air stream entering the cabin from the heater. The hot air source used to perform the evaporation may be either recirculated cabin air or fresh outside air. The humidification is accomplished without the need to transport water or spray a fine mist of water into the impinging air stream or the process of passing the air stream through a water saturated mat. If the temperature required to evaporate the moisture from the desiccant is higher than the desired cabin heat temperature, and the result of the evaporation of the moisture is also a temperature higher than is desired by the occupants of the cabin, then a heat exchanger (pre-cooler) is activated by the control unit to lower the temperature of the moist hot air before it enters the cabin. The automatic control unit senses the cabin's relative humidity and compares the sensor readings to the level set on the digital automatic control unit. The level may be automatically set by the control unit or manually set by the occupants of the motorized vehicle, if the control unit senses the need to increase the relative humidity to meet the desired relative humidity the control unit activates the apparatus to add humidity. If the control unit senses that the relative humidity has reached the desired level set on the control unit the system automatically deactivates the humidification function of the apparatus. When the automatic digital control unit senses that the relative humidity of the cabin is higher than desired level the system automatically activates the dehumidification functions of the unit. The automatic control unit which is also connected to the environmental heating and cooling system may further condition the air before it enters the cabin to regulate the temperature level and air flow volume (CFM).

Desiccant based dehumidification is a component of the inventive method used as an element of the cabin environmental system providing comfort for the passengers and is usually associated with the boarding of the aircraft and during the time from ground operations to shortly after take off, usually before the cabin heat system has started to lower the relative humidity in the cabin after takeoff.

Many times during boarding passengers experience discomfort from high humidity due to the physical exertion of boarding the aircraft in conjunction with a hot humid external atmosphere, where the relative humidity level of the cabin can exceed 80%. Dehumidification of the cabin air during these conditions can significantly improve the comfort of the crew and passengers. During passenger loading and unloading, ground operations (taxi & waiting for takeoff), and other times the when cabin environmental cooling is necessary, the cabin air dehumidification may either be supplied by an on-board units or ground units which lower the relative humidity on hot and muggy days to provide passenger comfort when conditions cause high relative humidity in the cabin. As passengers board the aircraft and exert the effort to store baggage, they often start to sweat and add to what may already be a high relative humidity for the air mass in the cabin. The addition of a safe and efficient environmental system with humidity control capability will greatly improve the comfort of the passengers during loading, ground operations, and early in the flight.

The dehumidification of the cabin air is also believed to significantly improve the efficiency of the air-conditioner cooling by removing the moisture before the evaporator coils experience the additional load required to condense out the moisture on a high relative humidity day.

Dehumidification of motorized land or water vehicle's cabin air is performed through a method of desiccant dehumidification where recirculated cabin air passes through NOMEX honeycomb or similar structure material coated with desiccant of either a wheel or canister type which adsorb the moisture out of the air as it passes over the desiccant material coated on the surface of the structural material.

The desiccant may also be part of the structural material and/or imbedded in the structure of the wheel or canister. The desiccant may also be placed or injected into a rounded, square, or rectangular shaped tube positioned within the center of a larger honeycomb tube structure. The apparatus is also capable of dehumidifying fresh outside air before it enters the cabin. The wheel or canister is regenerated and prepared for the next adsorption cycle when a hot air stream is directed through the desiccant material to evaporate off the moisture contained in the desiccant.

The excess heat of the engine provides the heat used to regenerate the desiccant and prepare the desiccant for the next adsorption cycle. Any one or combination of the engine's heat producing systems such as the engine coolant fluid, oil cooler, exhaust manifold, catalytic converter, exhaust pipe, air-conditioner coils or other heat sources may be use either individually or collectively as a heat source to evaporate the moisture contained in the desiccant.

The system is controlled by an automatic digital control unit where the occupant sets the desired relative humidity level or the automatic control unit establishes the desired relatively humidity and the unit automatically selects the necessary process configuration, activates the necessary components of the apparatus and continues to operate until the desired relative humidity level is reached after which the apparatus is turned off by the automatic control unit.

In some applications, the automatic control unit also continues to operate the regeneration side of the system after the engine is turned off to prepare the desiccant for the next time the motorized vehicle is started. In this case the residual excess engine heat remaining in the engine and exhaust system after the engine is turned off is used to regenerate the desiccant and then the desiccant is isolated from any outside moist air by doors or air valves that close to prevent unwanted moist air from coming in contact with the anhydrous desiccant while the vehicle in not in use. The residual regeneration feature provides for immediate windshield defog/defrost the next time the engine is started.

The visibility of the pilot and crew while operating a large commercial airliners, small private airplanes, or helicopters is extremely critical to the safety of the aircraft. Visual impairment of the flight crew or pilot distraction while attempting to clear windshield condensation can directly contribute to the aircraft safety. The lives on board the aircraft and others on the ground that could be injured by a crash are dependent on the pilot's ability to see clearly outside, especially during landing and take off.

The apparatus uses an automatic control unit that electronically monitors relative humidity sensors and windshield temperature sensors to automatically activate the desiccant dehumidification system prior to the formation of condensation on the windshield, thereby preventing condensation from ever forming on the windshield. The automatic functioning of the apparatus relieves the pilot of ever having to take any actions to clear windshield of fog, frost, or condensation. Operational safety is enhanced since the pilot is relieved of the possibility of distraction from windshield condensation or the need to make equipment adjustments to eliminate windshield fog or frost.

The operation of the aircraft apparatus is similar to that of the land and sea motorized vehicles apparatus with the exception that the source of heat in most cases will be transferred to the apparatus via a hot air stream as opposed to coolant fluid.

This invention, through the use of a desiccant dehumidification system, automatically lowers the relative humidity of the inside cabin air; thereby, preventing or eliminating windshield condensation.

The present invention provides an automatic cabin humidity control system which prevents condensation, frost, or fog from forming on the inside surface of the windshield. The invention may also include optional sensors to detect the exterior temperature and humidity. For example, when the temperature and humidity approach (the saturation point) a level where condensation may form on the windows an automatic controller activates the desiccant dehumidification system. The automatic control unit sends electrical current to the cabin chamber fan, the rotary motor, the hot chamber fan, and the engine coolant valve to move it to the open position for a desiccant wheel type of apparatus. For the canister type apparatus, a variation of the process where the desiccant wheel is replaces by a set of desiccant canister, the automatic control unit activates fan motors to move the air flow through the desiccant canisters and begins to alternate the air streams between the duel canisters by periodically activating the crossover valves to regulate the dehumidified air flow to the inside of the windshield glass. The air stream is dehumidified when it passes through the anhydrous desiccant material. As the desiccant material in the canister becomes saturated with moisture the control unit alternates the air flow by activating the input and output crossover valves to redirect the air flow through another canister that has completed the evaporation (regeneration) cycle. Heat exchangers are arranged to heat or cool the various air streams when necessary both before and after the air passes through the desiccant material.

The apparatus directs a stream of dehumidified air "dry air" toward the windows to evaporate existing condensation that may exist, or prevents the formation of new condensation. Additional heat may be applied to the air stream after dehumidification to accelerate the removal of condensation on the interior and melt ice or snow on the exterior of the glass. The apparatus is designed to reduce the humidity of the cabin air near the windows and continue to remove humidity (moisture) until the humidity level reaches a desired level within the cabin. Since the regeneration of the desiccant wheel or canister is preferably accomplished by using the excess heat from the engine, the only additional energy necessary to operate the apparatus is in the form of electrical energy to operate the controls, motors, and valves.

Although the desiccant system may use some of the existing air ducts and vents design for the heat and air-conditioning system to deliver dehumidified air, the inventive apparatus and method are designed to function independently, such as those times when the need to cool or heat the cabin does not coincide with the need to reduce the relative humidity.

The inventive apparatus and system can be summarized in a variety of ways, one of which is the following: an apparatus and method for defrosting or defogging the interior portion of a windshield with an impinging air stream, wherein the windshield surface to be defrosted or defogged is contained within the cabin compartment of a motorized vehicle, wherein the apparatus comprises: a rotary desiccant wheel, a driver to rotate the wheel, a heat exchanger (or other heat source), a case having an interior to house the desiccant wheel, a first fan for drawing air from the cabin compartment of the motorized vehicle and forcing the air through the desiccant wheel to the upper section of the cabin side chamber of the case and back to the cabin of the motorized vehicle, and a second fan for pulling an air stream through a heat exchanger into the lower chamber of the hot section of the case and then through the desiccant wheel to the upper chamber of the hot section of the case where the second fan ejects the hot moist air to atmosphere.

The desiccant wheel rotates within the cabin and hot chambers of the case to enable the desiccant material applied to the desiccant wheel to first collect moisture in the cabin chamber and then releases the moisture in the hot chamber. This is accomplished by the delivery of the moist cabin air to half of the desiccant wheel by the first fan where the moisture is adsorbed by the desiccant. As the dry air exits the wheel it is directed back into the cabin. The desiccant wheel slowly rotates into the hot chamber where the second fan pulls in air from atmosphere across the heating elements of the heat exchanger then the hot air enters the hot half of the desiccant wheel to evaporate off the moisture that was previously adsorbed by the desiccant in the cabin side of the apparatus. The hot chamber recharges (evaporates the moisture) the desiccant wheel to prepare it for it's next cycle through the cabin side of the apparatus. The now dry desiccant material on this portion of the wheel rotates back into the cabin chamber to continue the repetitive cycle.

To provide instant windshield defrost/defog action as soon as the engine is started, an after shut down regeneration feature may also be an element of the invention where the apparatus continues to regenerate the desiccant material after engine shut down to completely regenerate all or a portion of the desiccant material and then isolate this material until the engine is restarted. The residual engine heat would be transferred to the heat exchanger by the coolant fluid and used to evaporate the moisture as the hot side fan forces hot air through the desiccant to continue or start up the regeneration process for the desiccant after engine shut down while the desiccant wheel torque motor and the cabin side fan is off. When the regeneration is complete or the residual engine heat is depleted the automatic control unit deactivates all the fans and motors, and closes vent doors or air valves to the regenerated desiccant to isolate the desiccant material from any out side air that may contain moisture.

For the desiccant canister version of the apparatus the instant action is provided in a similar manner where the air flow through the evaporation side of the process continues to flow to regenerate the desiccant material after engine shut down while the fan for the adsorption side of the apparatus and the cross over valves are deactivated the hot coolant fluid continues to transfer the residual heat from the engine to perform the regeneration until the heat is depleted or the regeneration is complete after which the evaporation side fan motor is deactivated and the desiccant material is isolated from any source of moisture when doors are closed on both ends of the desiccant canister. The doors or air valves may either be separate doors from the crossover valve or one of the close positions of the crossover valve. When the vehicle is started the automatic control unit may senses the need for dehumidification to defog/defrost the inside of the windshield glass and there is a source of anhydrous desiccant completely regenerated which can instantly perform the dehumidification.

The invention may also include a cabin air baffle (valve) to direct the dehumidified cabin air from the invention into the air-conditioning system return air to reduce/eliminate the build up of frost on the cooling coils in the air-conditioner. The baffle would only be activated to direct air to the air-conditioner after the system sensors and control system determined that the need to lower the humidity for windshield defog/defrosting had been accomplished, the air-conditioner was on, and the humidity level was high enough to warrant the need for dehumidification to eliminate frost or improve the efficiency of the unit.

The preferred fan arrangement is configured to provide positive pressure on the cabin side and negative pressure on the hot side of the case. The fan configuration will force any air leakage from the cabin side to the hot side and the design further incorporates seals to prevent air flow from the hot side to the cabin.

The optional sensors are included in this alternative of the invention to provide information to the automatic electronic humidity control unit. The sensors transmit data used by the control device for determining when the windshield is approaching the dew point. This is accomplished by the sensors providing both cabin air and windshield internal and external temperature, and relative humidity information to the control device. The electronic control device uses the sensor data to determine when to turn on/off the apparatus and also displays temperature and relative humidity information so the occupant(s) may adjust the desired humidity to a lower level for comfort after the system has eliminated the possibility of fog/frost on the windshield.

The invention also includes a method of removing condensation from the interior cabin compartment of a motorized vehicle, which can be summarized as including the following steps: monitoring the temperature and humidity level of the cabin of a motorized vehicle, regulating the humidity level of the cabin by electronically controlling the apparatus to automatically turn the system on when condensation could form on the windshield of the cabin, dehumidifying the air extracted from the cabin by passing the air through rotating desiccant material or desiccant canister during a dehumidification cycle, recharging the desiccant with hot air then expelling the moist hot air from the apparatus outside the system, introducing a dehumidified air stream into the cabin compartment of a motor vehicle to lower the relative humidity in the cabin to prevent/remove fog/frost on the windows.

The desiccant canister type apparatus consisting of duel desiccant canisters containing honeycomb coated with desiccant material and connected to inflow and outflow crossover valves and work in conjunction with heat exchangers which are controlled by the automatic control unit to heat or cool the air stream. The automatic control unit for the canister type apparatus either opens or closes the coolant valves and/or activates the coolant pump to circulate the coolant through the heat exchangers. The automatic control unit either utilizes a timer to set the interval between cycles or sensors are utilized to measure the evaporation and adsorption rate of the desiccant within the canister to determine when to alternate the adsorption and evaporation canisters so that as one canister becomes saturated with moisture, it is replaced in the air stream by another canister that has just completed an evaporation cycle.

The apparatus can be summarized in a variety of ways one of which is the following: an automatic electronic humidity control device to receive data from the temperature and humidity sensors and determines if the relative humidity is approaching the dew point on the inside of the windshield, the electronic humidity control device controls the activation of the fans, motors, heat exchangers and valves to start or stop the dehumidification process, a fan first passes cabin air through a rotating desiccant wheel driven by a torque motor to remove the moisture from the cabin air then forces the dehumidified air back into the cabin, another fan pulls air from atmosphere to be heated by the heat exchanger then the hot air is used to recharge the desiccant material on the wheel as the wheel rotates into the hot chamber, the hot moist air is then expelled back into the atmosphere by the fan and the desiccant wheel continues it's rotation back into the cabin side chamber of the case to perform another cycle of dehumidification, the control device provides the occupants with an adjustment option to set the desired relative humidity for the unit so it will continue to lower the relative humidity below the point where the automatic control would turn the system off.

For both the desiccant wheel and desiccant canister type apparatus the dehumidified air stream passing through the anhydrous desiccant is cool. As the dehydrated cool air stream exits the honeycomb desiccant coated material the air may be passed through a heat exchanger to increase the temperature of the air stream which will increase the capacity of the air to defog/defrost the windshield glass.

The Automatic Digital Control Unit for land based vehicles consist of three different types of control. The first, is a full feature unit which automatically determines the desired settings for the unit based on sensor readings of temperature and humidity both inside and outside the vehicle. The occupant sets the unit on automatic and the unit will continue to control the environmental system by monitoring the outside air temperature and relative humidity and based on these readings the control unit will automatically set the preferred temperature, fan speed, and relative humidity.

Since the occupants are dressed with warmer clothing in the winter and they are comfortable in a cooler temperature the automatic control unit sets the thermostat mechanism lower than 72° F. As the temperature outside decreases the setting by the automatic controller is lowered. When it is very cold the setting may be 67° F., and as the outside air temperature increases the setting will be automatically increased up to 72° F. in cold weather.

The temperature settings are pre-established and make up an element of the environmental profile which over may adjust the cabin air temperature during the time of operation and may provide a higher temperature when heat is first provided to warn the occupants when they initially enter the vehicle and as the seats and occupants warm up the automatic control unit begins to lower the temperature to maintain perfect comfort without the occupant having to make any environmental control adjustments. When the control unit is set to the automatic feature the system is automatically activated when the occupant starts the vehicle. The automatic control unit will also maintain the relative humidity setting in the center of the relative humidity zone of comfort as the temperature setting is automatically adjusted by the unit. When the automatic control unit senses that the relative humidity is outside of the desired range the control unit will activate the dehumidification or humidification even with the heating or cooling deactivated.

During warm or hot climate conditions such as summer the automatic control unit senses the outside conditions an automatically adjust the temperature cooling settings and the relative humidity settings. Depending on the outside air temperature the control unit may set the temperature in a range of 73° F. to 79° F. for the cabin and also regulate the relative humidity as the control unit regulates the air stream to the selected predetermined temperature profile to control the apparatus as it cools down the occupants with a lower temperature when they first start the vehicle and then as the occupant's bodies are cooled the temperature is increased along the temperature profile to a static level above the cool down temperature.

The automatic control unit considers the readings of the outside air temperature and relative humidity when it selects the desired profile. The fan speed is also regulated by the automatic control unit to provide a higher volume of air when increased heating or cooling is determined to be necessary by the control unit where there is a large difference in the desired and actual cabin temperature or during the warm up or cool down phase of the profile. The automatic profile feature of the control unit would determine the temperature setting, relative humidity setting and fan speed for the system; and then activate the functions of the apparatus to deliver the desired conditions. The environmental profile established temperature and fan speed profile may be adjusted by the occupants to replace the factory established profiles.

If the occupants wish to return the settings to the factory profile there is a reset button available to quickly reset these adjustments to the factory settings. The second mode of the control unit is a manual setting unit, where the occupant sets the desired temperature, humidity, and air velocity and the automatic control unit controls the operation of the apparatus to meet the desired settings established by the occupant. The third, is a mode where the occupant turns the system on or off and manually sets the unit to operate at either high, medium, or low. A vehicle may have a control unit capable of utilizing one or more of the three modes listed above with a selector to allow the occupant to select which type is desired at any given time. All of the preferred embodiments of the units have an automatic defog, defrost feature where the windshield is automatically defrosted when the sensors relay the temperature and relative humidity information to the control and the control unit processor determines that defrosting is necessary to prevent the formation of condensation on the windshield and activates the apparatus to prevent or remove the condensation.

For the benefit of explanation the previous descriptions have generally been separated into either humidification or dehumidification descriptions. Although the inventive apparatus can take the form of a single function apparatus, the apparatus with the greatest benefit to the occupants is one in which the automatic control unit regulates the combined functions of humidification or dehumidification of the cabin air and defrost/defog of the windshield glass are provided in a single unit incorporating the environmental heating and cooling systems.

The apparatus is capable of total automation where the occupants may never activate or adjust the environmental control system and the apparatus delivers the highest level of environmental comfort. The present invention describes a method and apparatus for adding humidity to heated air for motorized vehicles utilizing a desiccant based system. The humidification is accomplished without using water as a spray (atomized) or dripping water on a mat material for evaporation. The apparatus does not require the motorized vehicle to transport a container of water since the moisture used for humidification is extracted out of another air source.

Another alternative to humidification is described in this inventive method and apparatus where humidity can also be removed from the cabin air before the air returns to the cabin. The automatic control unit automatically selects and activates the desired alternative after it determines if humidification or dehumidification is needed. In motorized vehicles, the defrost/defog, dehumidification and humidification function may be performed while the motorized vehicle's environmental system is using only recirculating air in the cabin and the cabin heating and cooling may be deactivated during humidity conditioning.

Depending on the space available and the environmental system requirements the configuration of desiccant honeycomb structure may vary between two alternative methods of passing the air over the desiccant material:

1.) A desiccant wheel is used to perform waterless humidification of heated air by adsorbing the humidity out of a cool air stream after which the air is expelled into atmosphere, following the adsorption cycle is the evaporation cycle where the moisture is released out of the desiccant wheel into a heated air stream which will be used to heat the cabin of a motorized vehicle.

The desiccant wheel slowly rotates through two separate chambers as the moisture is transferred from one air stream to the other. As the air passes through the first chamber where the cool air containing varying amounts of humidity is adsorbed into the desiccant material coated on the wheel. The desiccant wheel consist of a series of small cylindrical air passage ways, or tubes of a variety of shapes (hexagonal or round, or corrugated, honeycomb NOMEX, etc.) either coated with or consisting of material containing desiccant. As the air passes through the cylindrical tubes, the moisture is adsorbed out of the air stream into the desiccant material. The wheel slowly rotates out of the first chamber into the second chamber. In the second chamber the heat from the hot air passing through the wheel causes the moisture in the desiccant material to evaporate into the hot air stream.

In a variation to this embodiment, the first chamber, where the moisture is adsorbed into the desiccant wheel may be divided into two stages. With the two adsorption stage system, the air from which the moisture is adsorbed may be provided from two separate sources. In this configuration, the (dry) anhydrous desiccant wheel would enter the first stage of the cool chamber through which the lowest humidity air source is passing to adsorb the available moisture. The wheel would then rotate toward the second stage source of cool air with the highest available humidity. Then the desiccant wheel would rotate into the hot air stream chamber where the moisture previously adsorbed into the desiccant would evaporate into the hot air stream. The evaporation of moisture that takes place in the hot chamber would recharge the desiccant wheel to prepare the wheel for the next adsorption cycle.

This process would repeat itself until the humidity reaches the desired level. The automatic control unit would then turn off the fans, torque motors, and close the valves to the heat exchangers. This multi-stage alternative enables the system to extract moisture from internal air before it is expelled outside, and also extract moisture from an external air source that would also be expelled outside. The automatic control unit sensors indicate the air mass with the greatest moisture content and the automatic control unit would then activate the wheel torque motor to rotate in the desired direction.

2.) In the alternative, an adaptive canister containing NOMEX honeycomb coated with desiccant (or other corrugated shaped material coated with desiccant) may be positioned so as to allow the air to flow through the small passages formed by the structure of the honeycomb is used to perform the desired result of either humidification or dehumidification of the air going to the cabin. This method uses multiple canisters to sustain a constant air flow by switching from one canister to another so as to allow the desiccant filler to go through the adsorption cycle in one (or some) of the canisters while another (or others) are going through the regenerative cycle. The switching of the air into and out of the canisters is accomplished by either a rotary valve or a series of electronically controlled slide valves or gate valves.

The method of the present invention may be summarized in a variety of ways, one of which is the following: a method of altering the humidity level of a passenger cabin of a motorized vehicle having a windshield with an interior surface, comprising the steps of: providing a desiccant based moisture collection means or device for collecting moisture from air; positioning the moisture collection means or device in the path of an air stream; providing a heat source capable of emitting heat sufficient to evaporate moisture from an air stream; positioning the moisture collection means or device in communication with the heat source; evaporating the moisture removed by the moisture collection means or device into the atmosphere; and directing the air stream from which the moisture was evaporated into or out of the passenger cabin of a motorized vehicle.

Positioning the moisture collection means or device in the path of an air stream may further include the step of: providing communication with an air stream originating from a source external to the passenger cabin; providing communication with an air stream originating from a source internal to the passenger cabin; or, providing communication with an air stream originating from a combination of sources including at least one source internal to the passenger cabin and at least one source external to the passenger cabin.

Directing the air stream from which the moisture was recovered into the passenger cabin of a motorized vehicle may include: directing the air stream at the interior surface of the windshield; directing the air stream from which the moisture was recovered to an evaporator for lowering the temperature of the air stream from which the moisture was recovered enabling the evaporator to operate more efficiently, directing the air stream to a pre-cooler prior to delivery to the cabin.

The method may also include providing at least one heat exchanger means for adjusting the temperature of an air stream; selectively diverting the path of the air stream, in which moisture collection means is positioned, away from the moisture collection means to enable substantially complete evaporation of moisture by the heat source from the moisture collection means; or, providing a system of sensors capable of monitoring the environmental conditions to which the cabin of a motorized vehicle is subject, and selectively performing the steps associated with altering the humidity level.

The present invention may also be summarized as follows: a method of altering the humidity level of a device having a holding compartment subject to induced environmental conditions, the method comprising the steps of: providing a desiccant based moisture collection means for collecting moisture from air; positioning the moisture collection means in the path of an air stream; providing a heat source capable of emitting heat sufficient to evaporate moisture from an air stream; positioning the moisture collection means in communication with the heat source; evaporating the moisture removed by the moisture collection means into the atmosphere; and directing the air stream from which the moisture was evaporated into the holding compartment. The method may also include the step of providing a refrigerated holding compartment.

An apparatus of the present invention may be summarized as follows: an apparatus for regulating the humidity level of the cabin compartment of a motorized vehicle having a windshield, the apparatus comprising: dehumidification means for dehumidifying an air stream, wherein the dehumidification means partially comprises a filler component with a moisture absorbing desiccant substance applied to its surface, and a canister having an interior, an inlet and an outlet; means for drawing air from a source thereof and directing the drawn air to the inlet of the canister enabling the dehumidification means to extract moisture from drawn air; and a heat exchanger for extracting heat from the motorized vehicle and delivering it to the interior of the canister to dry the desiccant material after it has absorbed moisture.

The heat exchanger may be configured to extract heat from the engine compartment of the motorized vehicle. The apparatus may further comprise a system of baffles positioned within the canister to direct the flow of air through the dehumidification means, or an exhaust means for expelling dry air from the canister through the outlet of the housing. The filler may be a desiccant wheel, or have a system of corrugations comprising a plurality of cells having a substantially hexagonal perimeter and at least one divider for dividing the plurality of cells into subcells for increasing the available surface area and strength associated with each cell. The subcells may be filled with a solid material. The desiccant wheel may include a center drive means for operating the wheel.

It is an object of the present invention to provide an apparatus for and a method of desiccant humidification of the cabin air of a motorized vehicle to increase the relative humidity of the air contained in the cabin. The desiccant adsorbs moisture out of the stale cabin air before it is released from the cabin into the atmosphere after which the moisture contained in the desiccant material is then released into the fresh air stream to raise the relative humidity of the fresh air before entering the cabin.

It is an object of the present invention to provide a desiccant based apparatus which is capable of continuously humidifying a fresh air stream from the atmosphere which is forced into the cabin of a motorized vehicle. The apparatus adsorbs the moisture out of the stale cabin air as the stale cabin air passes through a desiccant material before the air exits the cabin into the atmosphere and the moisture in the desiccant material is later released into the fresh air stream entering the cabin through evaporation which increases the relative humidity of the fresh air stream.

It is an object of the present invention to provide an apparatus for and a method of environmental air conditioning where the air stream is continuously humidity conditioned by a process where the position of a desiccant material or the air stream which is entering a desiccant material is altered or alternated to provide continuous humidification or dehumidification of the intended air mass and the heat energy of regeneration is provided from excess engine heat.

It is an object of the present invention to provide an apparatus for and a method of desiccant humidification where the moisture contained in stale cabin air is reclaimed out of the stale air and reintroduced into the fresh air stream which then enters the cabin of a motorized aircraft in order to increase the relative humidity of the fresh air stream.

It is an object of the present invention to provide an apparatus for and a method of air craft cabin environmental humidity air conditioning through desiccant based humidification which reclaims moisture from stale cabin air which is then evaporated into fresh outside air entering the cabin to lower the level of carbon dioxide by increasing the ratio of fresh outside air as compared to the ratio of stale cabin air without lowering the cabin relative humidity below the human comfort level of 35% R.H.

It is an object of the present invention to provide an apparatus for and a method of desiccant relative humidity control air conditioning for the cabin air of a motorized vehicle where the excess vehicle engine heat or the heat created from the act of compressing the fresh air going to the cabin as it passes through or over the surface of the desiccant material cause the moisture in the desiccant to evaporate into the air stream.

It is an object of the present invention to provide an apparatus contained within a non pressurized aircraft cabin compartment or within any other area of the aircraft where two different air streams each passed through separate sections of a single or multiple rotating desiccant wheel to accomplish the adsorption and evaporation of moisture into and out of the desiccant material for cabin humidification. Where the source of moisture is cold fresh outside air passing through one side of the desiccant wheel and returning to the atmosphere, after which hot air performs the evaporation of the moisture out of the desiccant material into the air entering the cabin.

It is an object of the present invention to provide an apparatus contained within the cabin compartment of a motorized vehicle or any other area of the vehicle where two different air streams each passed through separate sections of a single or multiple rotating desiccant wheel to accomplish the adsorption and evaporation of moisture into and out of the desiccant material for cabin humidification. Where the source of moisture is cool stale air from the cabin passing through one side of the desiccant wheel and expelled into the atmosphere, after which hot air performs the evaporation of the moisture out of the desiccant material into the air entering the cabin.

It is an object of the present invention to provide an apparatus contained within the cabin compartment of a motorized vehicle or any other area of the vehicle where three different air streams each passed through separate sections of a single or multiple rotating desiccant wheel to accomplish the adsorption and evaporation of moisture into and out of the desiccant material for cabin humidification. Where the source of moisture is both cool stale cabin air and cold outside air passing through one side of the desiccant wheel and expelled into the atmosphere, after which hot air performs the evaporation of the moisture out of the desiccant material into the air entering the cabin.

It is an object of the present invention to provide an apparatus where the air flow and desiccant wheel rotation are controlled by an automatic control unit which monitors the process through temperature and relative humidity sensors and then activates the motors and valves to regulate the level of relative humidity within the cabin.

It is an object of the present invention to provide a process where the adsorption and evaporation of moisture into and out of a desiccant material for the purpose of raising the relative humidity of the cabin air is accomplished with excess heat present in the compressed air entering the cabin.

It is yet another object of the present invention to provide an apparatus where the expansion of the cabin air of a pressurized cabin as it escapes to atmosphere provides the cooling for a heat exchanger when the air passes through a regulator valve into an expansion chamber with a lower air pressure. The expansion chamber is vented to atmosphere through a regulator valve which allows the stale cabin air to escape into atmosphere. The cooling provided by the heat exchanger/expansion chamber serves to cool the stale air before it passes through the desiccant material during the adsorption phase and also cools the hot compressed air from the engine used to evaporate the moisture after the hot air passes through the desiccant during the evaporation phase to regulate the cabin temperature.

It is a further object of the present invention to provide a process of automatically regulating the relative humidity of the cabin air of a motorized vehicle through the use of a desiccant apparatus; automatically eliminating frost, fog or condensation on the surface of the windshield glass of a motorized vehicle; automatically preventing the formation of condensation, fog or frost on the surface of the windshield glass of a motorized vehicle.

It is a further object of the present invention to provide a process of automatically regulating the relative humidity of the cabin air of a motorized vehicle through the use of a desiccant apparatus. Where an Automatic Control Unit (ACU) consisting of temperature and relative humidity sensors, a display unit with display features and occupant control selection switches, an electronic control processor and electrical output switches to activate, deactivate and regulate the other components of the inventive apparatus. Although the capability of the ACU may vary from regulating one element of the relative humidity to a complete environmental control unit, the desiccant invention must have a control method to produce the desired results.

It is a further object of the present invention to provide a process of automatically eliminating frost, fog or condensation on the surface of the windshield glass of a motorized vehicle through the use of desiccants where the Automatic Control Unit (ACU) monitors a set of sensors to automatically detects the formation of fog, frost, or other condensation on the inside surface of the windshield glass and then automatically activates the components of the inventive apparatus to eliminates the condensation which may have formed on the inside of the windshield glass.

It is a further object of the present invention to provide a process of automatically preventing the formation of condensation, fog or frost on the surface of the windshield glass of a motorized vehicle through the use of desiccants where the Automatic Control Unit (ACU) monitors a set of sensors to detect the environmental conditions which may approach a point which could cause fog, frost or other condensation to form on the inside of the windshield glass. The ACU automatically activates the components of the inventive apparatus prior to the formation of any condensation to assure the occupants of the motorized vehicle never have their visibility impaired by the formation of condensation while the vehicle is in operation.

It is a further object of the present invention to provide an inventive apparatus which may utilize a center drive desiccant wheel consisting of a honeycomb NOMEX wheel which has a (metal &/or plastic) center spline drive to support the desiccant wheel and provide the transfer of torque from the torque motor to the wheel. A reduction gear box may provide the necessary RPM reduction from the motor to the slowly rotating desiccant wheel. A metal &/or plastic band may encase the perimeter of the wheel and attached to the wheel by a permanent bond with an adhesive to provide structural support and prevent abrasion of the NOMEX honeycomb where the wheel contacts the seals or case during rotation.

It is a further object of the present invention to provide an inventive apparatus which may utilize an adaptive desiccant canister case in place of the desiccant wheel, where the air flow through a set of desiccant canisters is alternated between the individual canisters to provide a continuous adsorption and evaporation process.

It is a further object of the present invention to provide an inventive apparatus which may have a set of vent doors (air valves) which may be utilized to configure the air flow through the apparatus in such a way as to allow the apparatus to continue to regenerate the desiccant material after the motor is shut down by utilizing the residual heat from the motor and then when regeneration is complete the vent doors are configured to isolate the desiccant from air exterior to the apparatus. The storage of regenerated desiccant allows the apparatus to deliver an instant dehumidified air stream immediately after the next engine start up. Dehumidified air may be delivered by the apparatus before the motor has heated up to a temperature capable of providing the necessary heat for evaporation.

It is a further object of the present invention to provide an inventive method and apparatus capable of delivering a humidified air stream to the cabin or a dehumidified air stream to the cabin; and/or a defog/defrost dehumidified ambient or heated air stream to the windshield from a recirculated air source originating from the cabin. The invention is unique due to it's ability to deliver humidification, dehumidification, and/or defog by using recirculated cabin air which allows the occupants to avoid the need to introduce smoke or other noxious gases into the vehicle from the exterior of the vehicle while conditioning the air in the event that the vehicle is passing through an undesirable air mass.

These and other objects, advantages and features of the present invention shall become apparent after consideration of the specification and drawings set forth herein, and all such objects, advantages and features are contemplated within the scope of the present invention whose only limitation is the scope of the appended claims.

BRIEF DESCRIPTION OF THE DRAWINGS

FIGS. 12 and 13 are detailed schematic views of the invention shown in FIG. 11;

FIG. 14 is a summary chart listing sources of moisture, sources of heat, and a summarized list of the inventive methods.

FIG. 23 is a summary chart showing the general functions and benefits of the inventive method.

FIG. 41A is a cut away of a desiccant canister which also serves as a crash adsorption panel with a center input and out flow opening.

FIG. 71 is a diagram of the air valves for a desiccant wheel vehicle humidification/dehumidification/defog system with the defog/defrost on.

FIG. 72 is a diagram of the air valves for a desiccant wheel vehicle humidification/dehumidification/defog system with the cabin dehumidification on.

FIG. 73 is a diagram of the air valves for a desiccant wheel vehicle humidification/dehumidification/defog system with the cabin dehumidification and windshield defrost on.

FIG. 75 is a diagram of the air valves for a desiccant wheel vehicle humidification/dehumidification/defog system with warm humid air on.

FIG. 91 is a chart listing some of the elements of the automatic control unit functions.

DETAILED DESCRIPTION OF THE PREFERRED EMBODIMENT(S)

Figure 1:
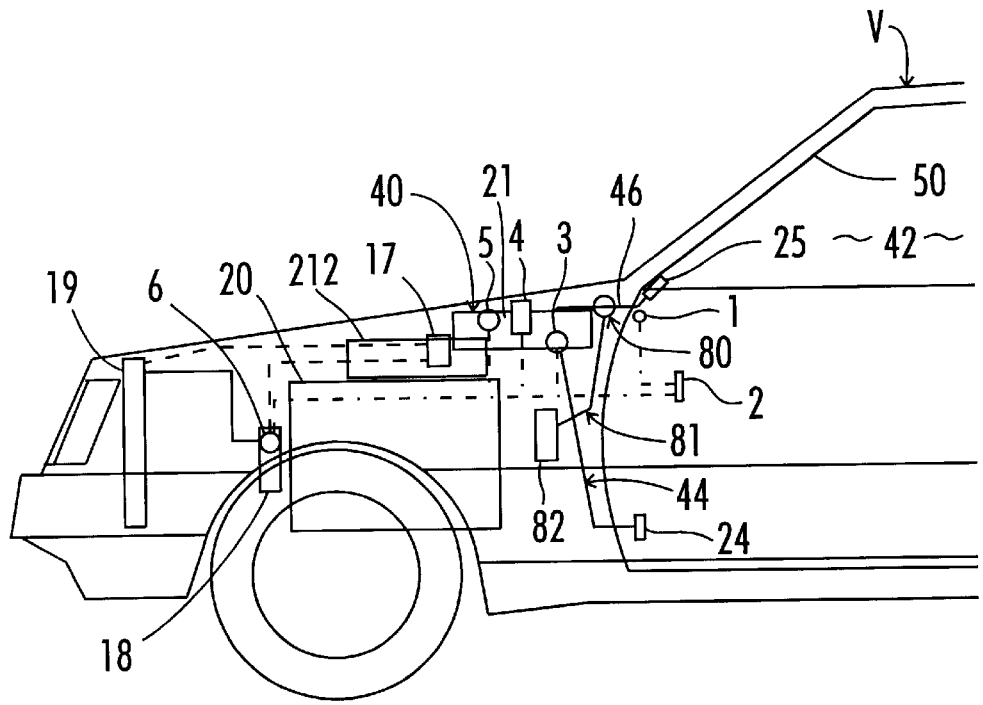
FIG. 1 is a schematic side view of an embodiment of the apparatus of the present invention in an automobile application.

FIG. 1 shows the relative position of the inventive apparatus in a motorized vehicle designated generally by the reference letter "V", but more particularly in an automobile application where the engine is designated as 20, engine carburetor and air filter as 212, the radiator as 19, and engine water (coolant) pump 18 which provides the heat system to the apparatus' heat exchanger 17.

The apparatus is supplied with hot water when the engine water (coolant) valve 6 opens and the hot water flows through hoses to the heat exchanger 17. The system incorporates a desiccant wheel designated generally by the numeral 21 (also shown as 11 & 12).

An alternate source of heat can be obtained by using the heat from the engine exhaust manifold and/or exhaust pipe (not shown). This alternative source provides quicker heat to the system, however special caution is required to prevent carbon monoxide from entering the cabin. Another alternate source of heat may be obtained by using bleed air from the compressor section of a turbine engine powered vehicle shown in FIGS. 11, 12, 13.

A hot chamber fan 5 pulls outside air through the hot section of the apparatus to regenerate the desiccant wheel 21. The outside air at atmospheric temperature is heated as it passes through the heat exchanger 17. As the hot air from the heat exchanger is delivered to the desiccant wheel 21 contained in the case 40, and passes through a portion of the desiccant wheel 21, moisture is adsorbed by the desiccant material (not readily seen in the drawings) applied to the wheel.

The system and apparatus are designed such that adsorbed moisture in the desiccant of the desiccant wheel 21 evaporates into the hot air and is expelled into the atmosphere. That is, after the air passes through the desiccant wheel 21, it passes through the fan 5 and is expelled outside. Humid air in the cabin 42 is pulled out of the vent 24 and the cabin side fan 3. The operation of the cabin side fan 3 functions in the system by pushing this cabin air to the desiccant wheel 21 where the humidity from the incoming cabin air is adsorbed into the desiccant material of the wheel. After the humidity is removed, the now dry cabin air is pushed further through an air duct 46 connecting the cabin side of the apparatus case 40 and directed through the windshield dash vent 25 back into the cabin 42.

The system may also include an air baffle (valve) 80 to direct the dehumidified cabin air from the invention into the air-conditioning system return air to reduce/eliminate the build up of frost on the cooling coils in the air-conditioner and increase the efficiency. The baffle 80 includes conduit 81 connected to the air conditioner 82, and preferably would only be activated to direct air to the air-conditioner 82 after the system sensors and control system determined that the need to lower the humidity for windshield defog/defrosting had been accomplished, the air-conditioner was on, and the humidity level was high enough to warrant the need for dehumidification.

Figure 2:
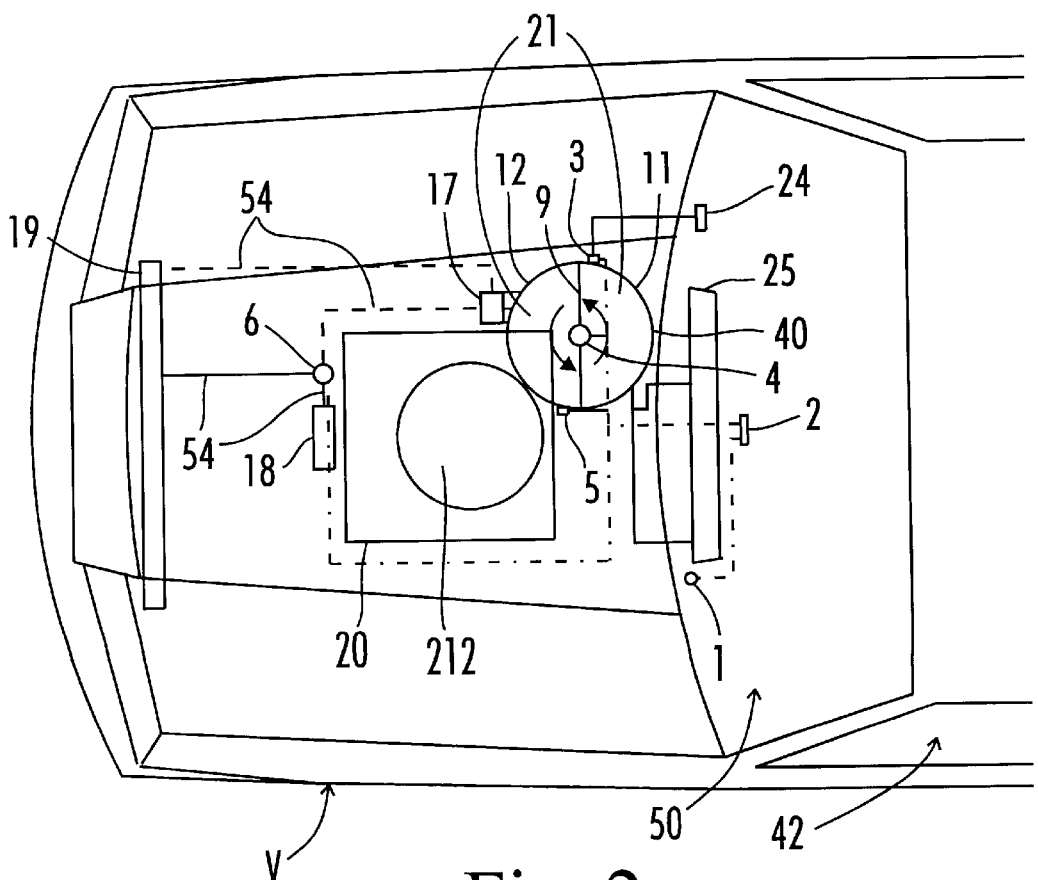
FIG. 2 is a schematic top view showing the rotation of the desiccant wheel of the apparatus of FIG. 1.
Figure 3:
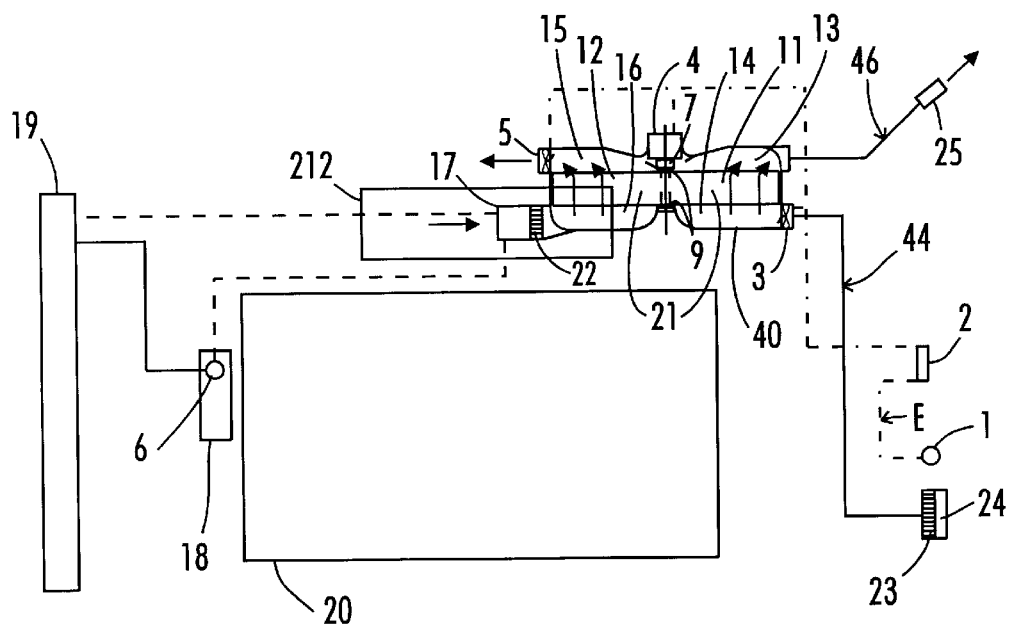
FIG. 3 is a schematic side view, with arrows to show the air flow direction, of the overall system of FIG. 1 including components of a representative motorized vehicle.
Figure 4:
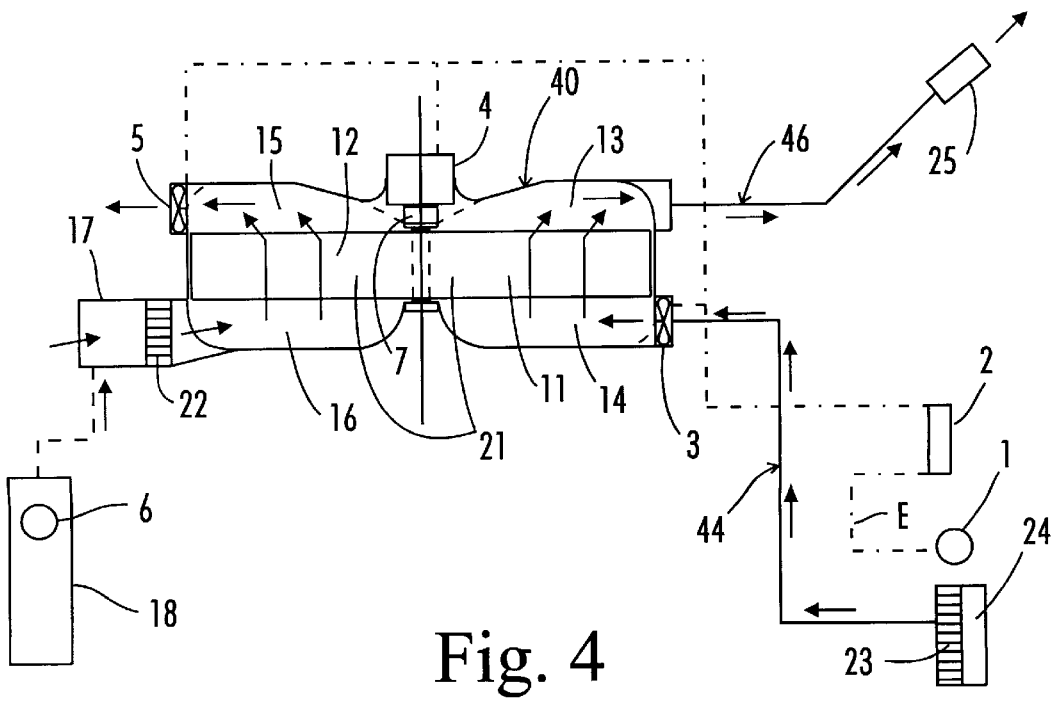
FIG. 4 is an enlarged schematic side view of some of the components shown in FIG. 3, with arrows showing air flow and hot water(coolant) flow direction, and electrical wiring.

With reference to FIGS. 2–4, the location of the apparatus is preferably offset from the center line (not shown) of the motorized vehicle V. The desiccant wheel 21 of the inventive apparatus can be divided with respect to it's position of rotation in to two sections: (i) the cabin side of the desiccant wheel 11 and (ii) the hot section of the desiccant wheel 12. The seal 9 that separates the two sections is on both the top and bottom of the wheel, and attached to the case 40 of the apparatus. The seal 9 prevents the cabin air from mixing between the cabin air chambers 13 and 14, and the hot air chambers 15 and 16.

The torque motor 4 rotates the wheel 21 (cabin section 11 to hot section 12) slowly within the case 40. The rotation of the wheel 21 moves the desiccant applied to the wheel 21 from the cabin chamber 11, where moisture is accumulated (adsorbed), to the hot chamber 12, where the moisture is removed (evaporated) and expelled outside through an exhaust conduit located at the hot chamber fan 5. The moist cabin air passes through vent 24, then through an air conduit 44 from vent 24 to fan 3. Fan 3 forces the moist air into the lower portion of the cabin chamber 14 and through the desiccant wheel 21 (the cabin side 11). The now dehumidified cabin air moves out of the top of the cabin chamber 13 through an air duct 46 to the dashboard vent 25. Vent 25 directs the dehumidified air toward the interior cabin side of the windshield 50 (FIG. 1) to perform the defrost function. Vent 24 and sensor 1 are preferably located under the dash near the occupants feet. The sensor 1 can be of virtually any suitable variety such as a standard ⅛ or ¼ DIN manufactured by Thermologic Corporation of Waltham, Mass. An electrical connection designated generally by the letter "E" is connected to the sensor and used to transmit information electronic humidity control device box 2. The control may also be of any suitable variety such as the PAC series manufactured by Thermologic Corporation. The humidity control box 2 is preferably located on the dash of the motorized vehicle (not shown) next to the convention heat and air-conditioning controls (not shown).

An alternative sensor system may include a second sensor for measuring the windshield glass temperature. Such a temperature sensor may be of any suitable variety such as a compact ⅛ DIN temperature sensor manufactured by Thermologic Corporation. This alternative glass temperature sensor would provide more accurate dew point data for the humidity control device. The humidity control device box 2 has an electrical connection shown in FIG. 4 connecting it to sensor 1, cabin chamber fan 3, hot chamber fan 5, and torque motor 4. The humidity control device box 2 has an electrical connection shown in FIG. 1 connecting it to the coolant regulator valve 6.

The apparatus is shown offset to the engine 20 and the engine carburetor (injector) and air filter 212. The engine water (coolant) pump 18 provides the pressure to move the hot water (coolant) through the regulator valve 6 directing the flow to the apparatus' heat exchanger 17 or directly to the radiator 19. The hot water (coolant) exits the apparatus heat exchanger 17 and moves to the radiator 19. In FIG. 2 the hot water passes through standard high temperature rubber radiator hoses 54 to and from the heat exchanger 17.

Figure 8A:
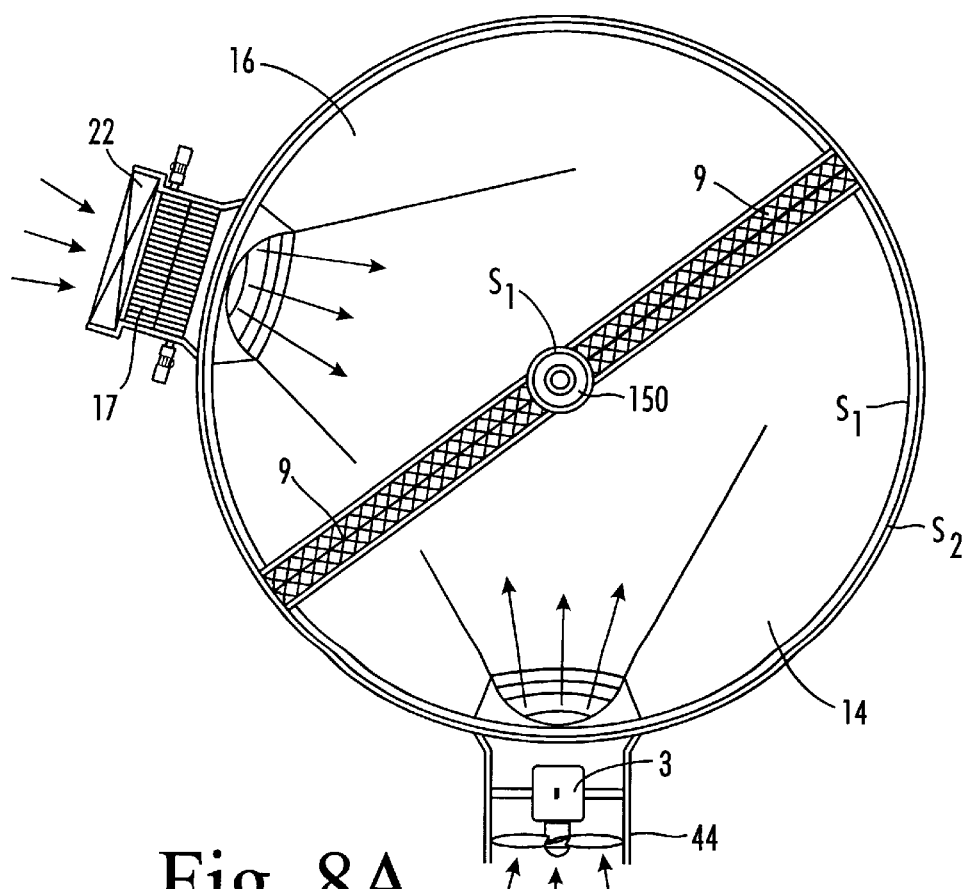
FIG. 8A is a perspective view of the lower case and components of the apparatus of FIG. 7 with the top cover and desiccant wheel removed therefrom.
Figure 9A:
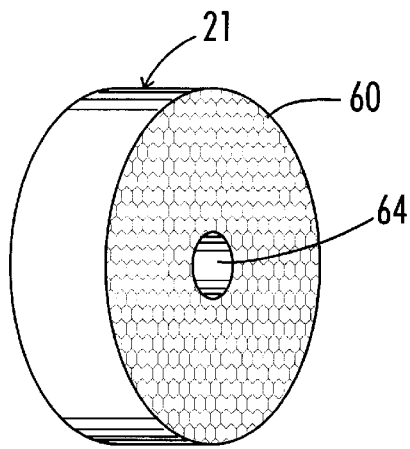
FIG. 9A is a perspective of the embodiment of the desiccant wheel of the present invention.

FIG. 3 shows a side view of the system with the filters 22 & 23. An alternative position for filter 22 is shown in FIG. 8A with the filter 22 located in front of the heat exchanger. The filters prevent dust and dirt from building up on the desiccant wheel 21. The cabin side of the apparatus, therefore, is made up of the dehumidified cabin air chamber 13 which is connected to the defrost vent 25 by air vent duct 46, and the cabin humid air chamber 14 which is connected to the system's cabin air intake vent 24 by air vent duct 44. The cabin side fan 3 forces the air through the half of the desiccant wheel 11 presently located in the cabin side chamber 13 and 14 (FIG. 4). The moisture is removed from the air as it passes through the small geometrically shaped holes 60 in the desiccant wheel 21 (FIGS. 9A, 9B, and 10), as the air moves from the humid chamber of the cabin side of the case 14 to the dry (dehumidified) side of the cabin chamber 13.

Figure 9B:
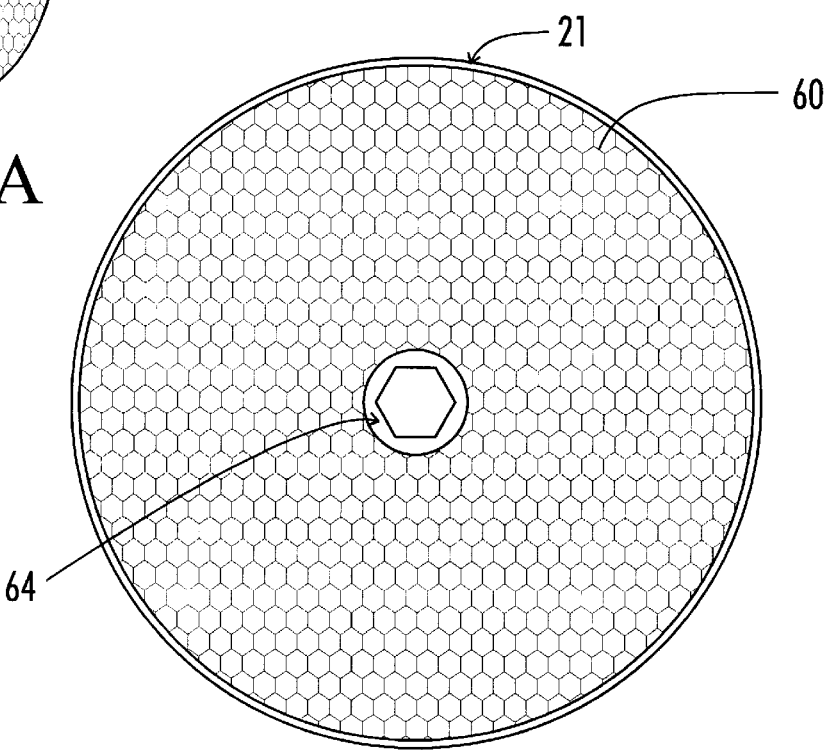
FIG. 9B is a front view of an alternate embodiment of the desiccant wheel shown in FIG. 9A.
Figure 10:
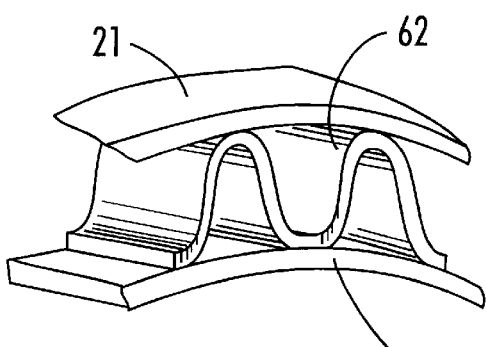
FIG. 10 is a partially fragmented perspective view of a portion of the wheel shown in FIG. 9A.

With reference to FIGS. 9 and 10, the desiccant material is preferably a coating or treatment applied to the surface of the wheel 21. The wheel 21 is comprised of rolled corrugated cardboard, paper, NOMEX or similar material with a plurality of pores or holes 60 corresponding to the corrugations 62 of cardboard treated with an adhesive hardening agent to provide strength and rigidity (with the consistency of cured fiberglass) for reliability and continuous operation in the changes of moisture and heat of the apparatus case 40. After the cabin air is dehumidified, it passes through the upper cabin chamber 13 into the air duct 46 and then to the defrost/defog vent 25. The dry air passes over the surface of the windshield glass to remove any condensation and continues to flow until the humidity level in the cabin can not support the formation of condensation on the surface of the interior glass. The occupants may use the alternative humidity control device (not shown) to set the relative humidity lower and in this case the system would continue to operate until the desired relative humidity is reached, then the automatic function of the control device would turn the system off: The humidity control device 2 continues to monitor and display the humidity level within the cabin after it has deactivated the apparatus, and if it senses the need to perform the dehumidification function it will automatically reactivate the dehumidification system to lower it to the desired level.

The arrows in FIG. 4 show the direction of air flow through the apparatus. Moist air is pulled from the cabin of the motorized vehicle and forced through the wheel 21 in the cabin chamber 13 and 14 of case 40. With regard to the hot side of the apparatus, air is pulled into the system from hot air feed (not shown) or the atmosphere (inside the engine compartment) where it is drawn through the heat exchanger 17, then into the lower hot chamber 16, then through the slowly rotating desiccant wheel during which time the desiccant is recharged, then the hot moist air is pulled into the upper hot chamber 15, then the hot section fan ejects the hot moist air back into the atmosphere.

Figure 8B:
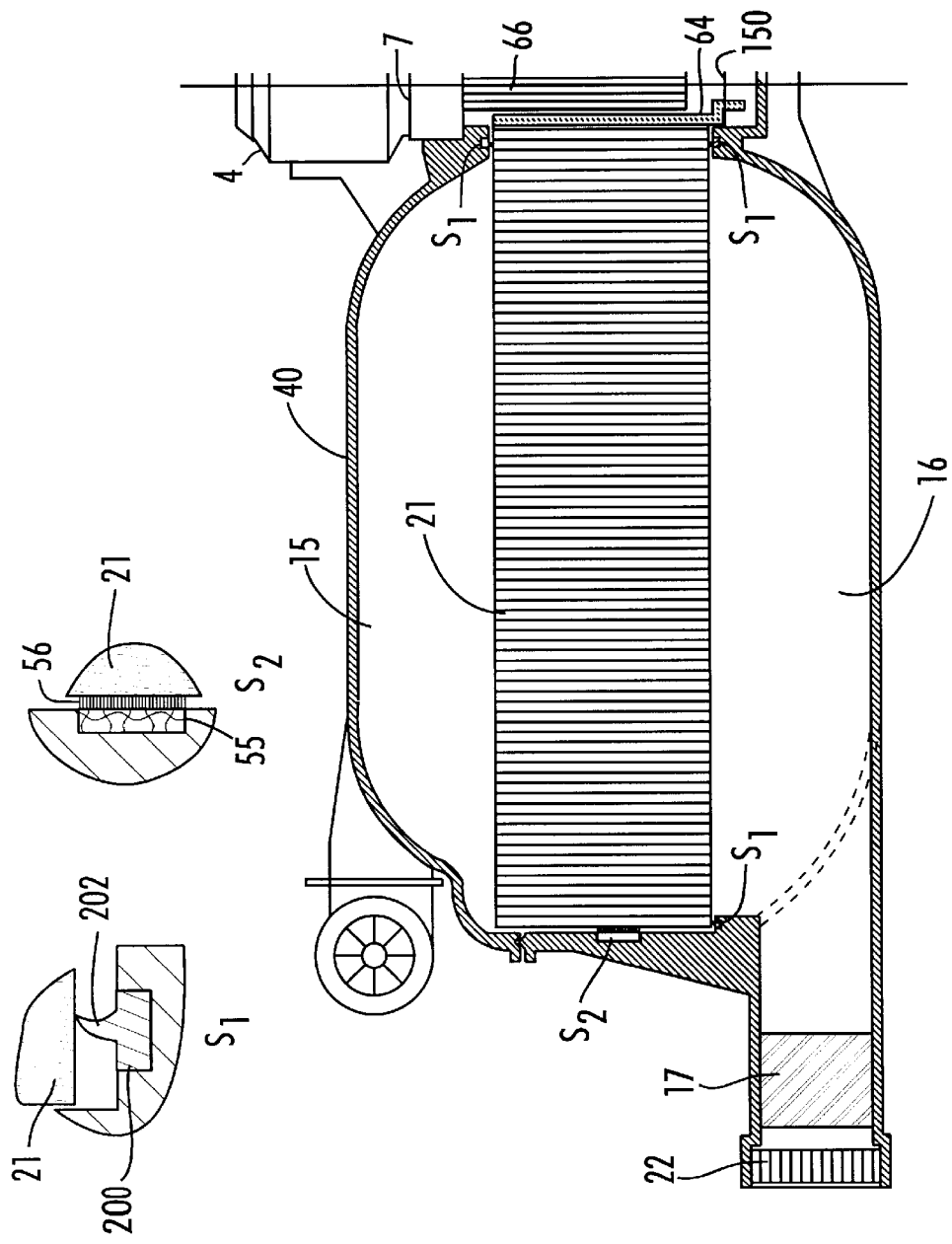
FIG. 8B is a partial cross-section of the hot chamber side of the case portion of the apparatus shown in FIG. 7.

In FIG. 8B and 4 the vertical line representing the center of rotation passing through the torque motor 4, the reduction gear box 7, and the vertical drive shaft 66 which is connected to the reduction gear box 7, and transmits torque to the desiccant wheel 21 through the spline hexagonal shape of both the drive shaft 66 and the center hexagonal spline female receptacle 64 (hereafter female spline). In FIG. 9B the female spline 64 is shown permanently bonded to the center of the center drive desiccant wheel 21. The base of the female spline 64 fits into the lower wheel bearing 150. The weight of the desiccant wheel assembly 21 rest on the lower wheel bearing 150. The lower wheel bearing 150 is fixed to the lower case 40. The design of the torque drive system and case allows easy assembly for both production or repair.

The case 40 which may be manufactured from plastic, NYLON, fiberglass, metal or other suitable materials splits into two sections:

(i) the upper section (top cover) with fan 5, torque motor 4, reduction gear box 7, and drive shaft 66 attached (the torque motor 4, reduction gear box 5, and drive shaft 66 are assembled together before they are attached to the top cover of the case 40);

(i) the lower case (base) with cabin fan 3, heat exchanger 17, hot filter 22, and lower wheel bearing 150 attached. To assemble the case, first the desiccant wheel assembly 21 is placed into the lower case, the lower female spline 64 fits into a center bore receptacle in the lower wheel bearing 150 (the center bore receptacle provides alignment for the bottom of the wheel 21 with the lower case), then the upper case is placed over the lower case, drive shaft 66 slides into the female spline 64 of the wheel (drive shaft 64 is long enough to allow the alignment of both sets of splines before the case is lowered into the final position of assembly)

In FIG. 4 the vertical line passing through the torque motor 4, reduction gear box 7, and the case 40 referred to as the center of rotation for the wheel 21 also represents the division of the apparatus into two sections: (i) cabin section 13 & 14, and (ii) hot section 15 & 16.

Figure 5:
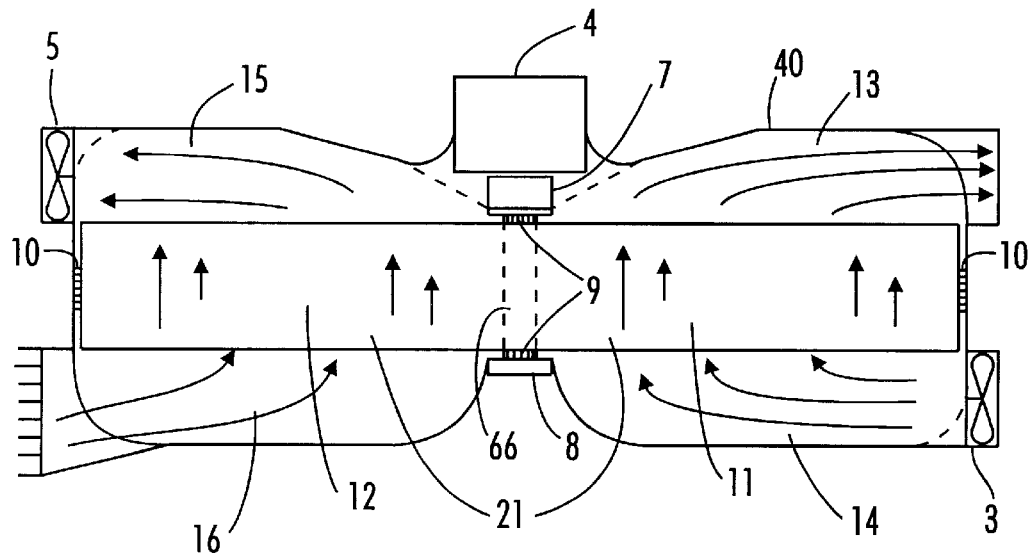
FIG. 5 is an enlarged schematic of the apparatus case and components shown in FIG. 4.
Figure 6:
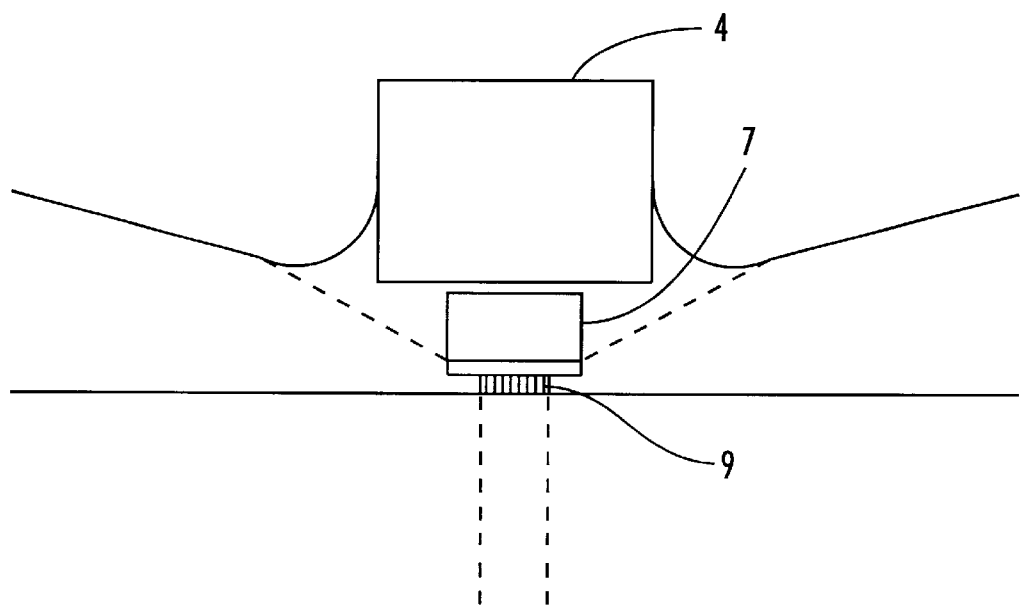
FIG. 6 is a detailed side view of the torque drive system and the seal component dividing the cabin and hot chamber shown in FIG. 5.
Figure 7:
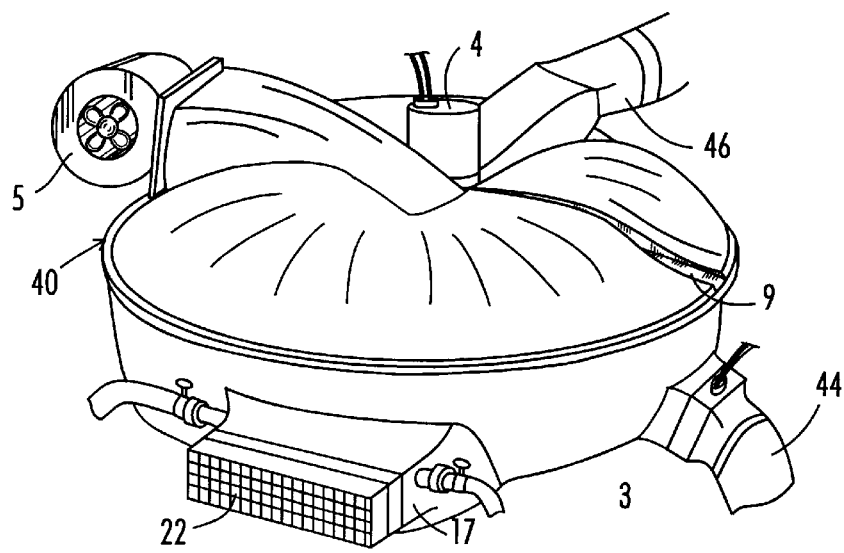
FIG. 7 is a perspective view of the apparatus of FIG. 4.

In FIG. 5 (with arrows indicating air flow), (i) the cabin section 13 & 14 has the cabin fan 3 forcing air from the motorized vehicle's cabin to form a positive pressure in the lower cabin chamber 14, the air flow is directed toward the cabin side 11 of the desiccant wheel 21, a brush seal 9 attached to the lower case 40 prevents the air from crossing over to the hot section 16.

In FIG. 8A the lower seal 9 is shown in another view dividing the case into two sections where the seal 9 starts from a point outside of the edge of the lower bearing 150 running to the edge of the case 40 and up the side wall to meet seal 10 in both directions and forms a seal between the desiccant wheel 21 and the cabin chamber 14. The seals 9 are attached to the top of a diagonal ridge in the lower case which is raised to form one of the side of the lower cabin chamber 14. The other side of the lower cabin chamber 14 is formed by half of the raised circumference wall of the case 40. The semicircular pocket of the lower cabin chamber provides for an even distribution of air to the cabin side of the desiccant wheel 11 as it rotates through the chamber. The top cabin chamber 13 is formed in a similar manner as the lower chamber 14. The seals 9 for the top cabin chamber 13 are attached in a similar manner as the lower chamber 14. The top cabin chamber 13 collects the dehumidified cabin air and directs this air to the air duct 46 which will contain the air flow to cabin vent 25. The seals 9 shown in FIG. 8B, Detail S1, consist of brushes that form a seal between the upper case and the desiccant wheel to prevent the crossover of air from one section to another and allows the wheel 21 to rotate freely. Seals shown in FIG. 8B, Detail S1 of the hot section are also used in the cabin chambers 13 & 14 in a similar configuration (not shown) in FIG. 5.

In FIG. 8B, (ii) the hot section consist of the following components: the air filter 22 is used to prevent dust and dirt from entering the system as the air enters from atmosphere, the air then enters the heat exchanger 17 where it is heated, the hot air is pulled into the lower hot chamber 16 formed in a similar manner as the cabin camber 14, The hot chambers 15 & 16 are sealed in a similar manner as the cabin chambers 13 & 14, FIG. 8B and Detail S1 & S2 show additional detail of the seals S1 & S2 used in both the cabin chambers and the hot chambers of the case 40 to prevent the crossover of air form one section to another, seal type S2 is used in location 9 and 10, the lower hot chamber 16 contains the hot air and provides an even distribution of hot air into the bottom of the hot section 12 of the desiccant wheel 21, the hot air is pulled into the desiccant wheel 12 to regenerate the desiccant material by evaporating off the moisture which was adsorbed during its previous cycle through the cabin chamber of the apparatus, the moist hot air exits the wheel 11 into the upper hot chamber 15, then the hot fan 5 pulls the hot moist air out of hot chamber 15 and ejects it out into the atmosphere.

The two sections are sealed to prevent air crossover and also to prevent the air from flowing around the sides of the desiccant wheel 21. The seals consist of two types: the first type, seals 9 & 10, shown in FIGS. 5, 8 A, 8B and 8B, Detail S2, a web fabric 55 with a dense mass of short bristles 56 extending away from the webbing to touch the surface of the rotating desiccant wheel 21, with reference to FIG. 5 seal 10 of the S2 type is used to prevent the air from bypassing the wheel; the second type of seal S1, shown in FIGS. 8A, 8B, and FIGS. 8B, Detail S1, has a seal element 200 with a raised annular fin 202, Seal S1 provides sealing engagement between the bottom of the wheel 21 and the case around the outer perimeter of the wheel 21.

In FIG. 8A, seal S1 is also used in the upper and lower case 40 around the center of the wheel 21, to provide the seal around the bearing 150 (lower) and drive shaft 66 (upper) and to complete the seal in the open area between the left seals 9 and the right seal 9 for a complete air separation of the hot and cabin sections of case 40.

Figure 11:
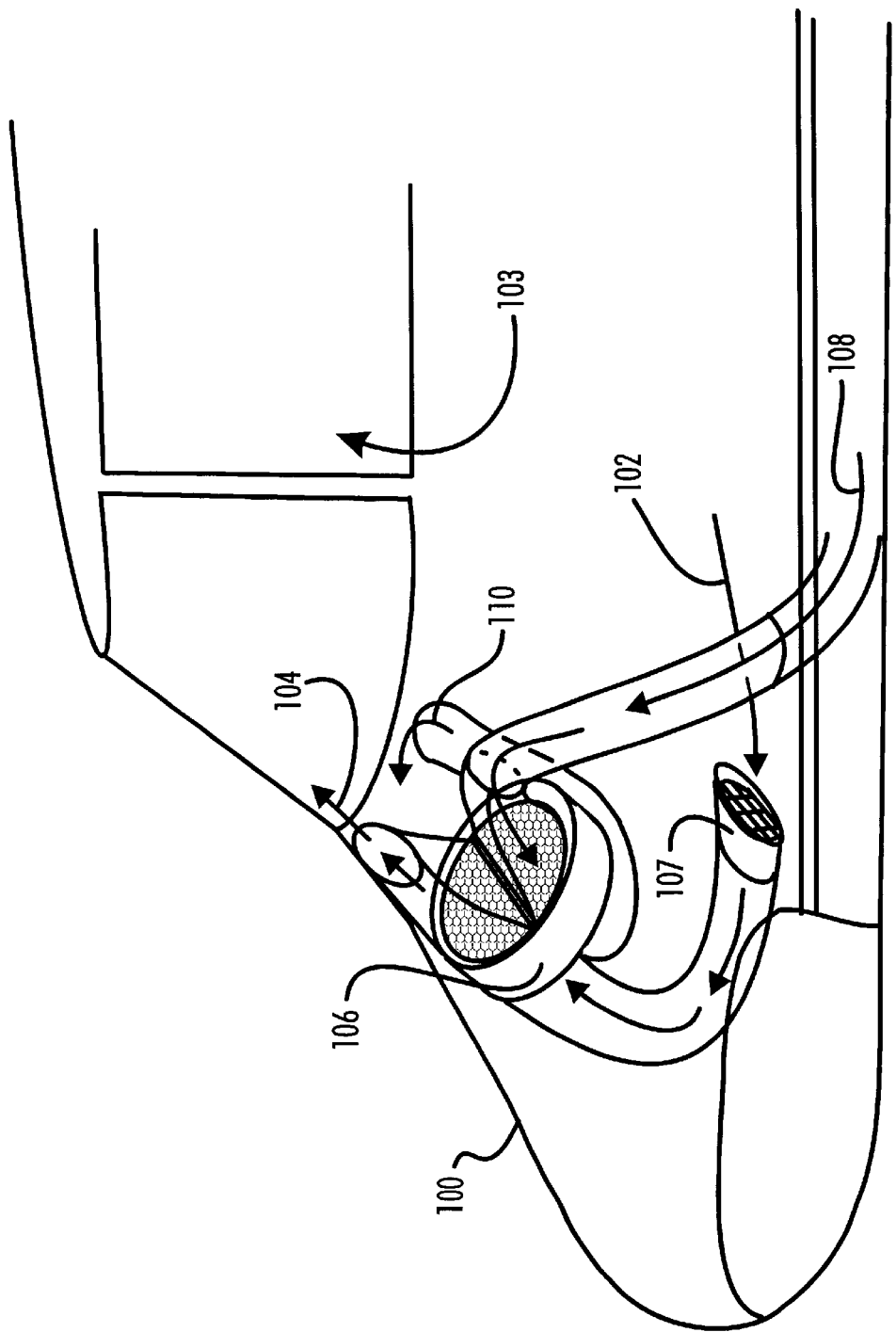
FIG. 11 is a schematic view of the air flow pattern of the invention shown in use in a helicopter embodiment of the system.

With reference to FIGS. 11–12, the invention is shown in use with a helicopter designated generally by the reference numeral 100 having a turbine engine 101 drawn in block diagram form on FIG. 12. Moist cabin air flow 102 is drawn from the interior of cabin 103 of helicopter 100. Dehumidified air 104 is reintroduced into the cabin. The system includes a desiccant wheel 106, a cabin air fan 107, compressor bleed air from the turbine engine 108 (to provide hot air to recharge the desiccant material on the wheel 106), an automatic electronic control device (not shown), and hot moist air exhaust 110 ejected from the aircraft.

With reference to FIGS. 12–13, the cabin air fan 107 pulls moist air into the system from the cabin, the air travels by air duct to the moist cabin chamber 124, the air is forced through the top half of the desiccant wheel 106, as the air passes through the wheel moisture is adsorbed out of the air, the dry air is forced into the dry cabin chamber 120, the dry air travels through an air duct to the air vent 104 where the dry air is directed toward the windshield to remove and/or prevent condensation from forming on the inside of the windshields 103. The apparatus uses excess hot air from the compressor section of the turbine engine 101. The bleed air from the compressor is released by the engine when the bleed band opens and allows the high temperature compressed air to escape. When the engine controls determines that the compressor pressure is higher than desired, it opens the bleed band to help prevent compressor stall. The bleed air has been used in many aircraft as a source of heat for cabin heating since the hot air is excess and there is little chance of carbon monoxide gas entering the compressor. The apparatus is similar to the automotive application with a few exceptions. Since the compressor is delivering high pressure hot air to the apparatus, there is no need for the invention to have a hot section fan or heat exchanger.

The hot bleed air recharges the desiccant material on wheel 106 as the wheel rotates into the hot section 122 & 126 by evaporating off the moisture adsorbed in the desiccant when that portion of the wheel was in the cabin section 120 & 124. Torque motor 130 rotates the wheel 106 slowly form the cabin chambers 124 & 120 to adsorb cabin moisture to the hot chambers 110 & 122 where the moisture is evaporated. The automatic electronic control device box and sensors (not shown) would operate in a similar way as the automotive application with few exceptions. The control device would not need to operate a hot fan or hot water valve (since they are not used in the aircraft application) but one of these outputs would control a valve to regulate the flow of bleed air to the apparatus. The electronic control device would also provide electrical current through the electrical connection 132 to the torque motor 130, and the cabin air fan 107 when the apparatus is activated to perform dehumidification. The system would continuously monitor the sensors to determine if the relative humidity has reached a point where dehumidification in the cabin is necessary. The automatic electronic control device (not shown) would turn on and turn off the system automatically. In FIG. 11, the apparatus us shown forward and below the windshield, the alternative location for the apparatus would be between the cabin floor and the outer skin of the aircraft with an extended air duct 104 to deliver the dehumidified air to the windshield.

FIG. 14 is a summary chart of the various process of an alternative of the inventive apparatus which may be identified as a multi-function apparatus listing sources of moisture, sources of heat, and a summarized list of the inventive methods for the desiccant based vehicle environmental control apparatus. The inventive methods utilized desiccants in conjunction with various air masses to adsorb moisture into the desiccant material from one air stream and then evaporate the moisture out of the desiccant into another air stream. For humidification of the cabin air mass, the source of moisture may either be stale cabin air from which the moisture is adsorbed before the stale air is allowed to escape from the cabin as fresh air outside air replaces the stale air for the cabin, or outside air may be utilized as the source of moisture adsorption into the desiccant for humidification. When the control unit determines that a duel air mass is necessary to provide adequate moisture it will switch to the duel source air from both the stale cabin air and outside air. If the control unit through the sensors determines that one air mass has a higher relative humidity the control unit will switch to the air flow of that air mass. The humidification of the air mass occurs when the hydrous desiccant is then repositioned into another air stream with a high temperature where the moisture is then evaporated out of the desiccant material into the air stream going to the cabin.

For dehumidification of the cabin air mass, the cabin air may be recirculated or fresh air may be utilized which passes through an anhydrous desiccant material resulting in the dehumidification of the air stream. After the moisture is adsorbed into the desiccant material the dehumidified air is directed into the cabin to lower the relative humidity. Dehumidification occurs as a cool air mass passes through the desiccant coated material where the moisture is adsorbed into the desiccant. Humidification occurs when the moisture contained in the desiccant is heated and evaporated into a hot air stream which is forced into the cabin. The sources of heat necessary for the evaporation of the moisture in the desiccant is supplied from various sources of excess heat supplied by the engine, heater, or air-conditioner. The excess engine heat is the heat source for most vehicle applications and the compressor and condenser of the air-conditioner unit provide additional sources of heat for vehicle or the heating system heat may also be used to evaporate the moisture out of the desiccant. In turbine engine powered vehicles the air from the compressor section of the engine is an additional source of heat. Any available heat energy may be utilized to provide the regeneration of the desiccant. In some applications the heat energy maybe augmented with non-excess heat.

There are at least eight (8) inventive methods performed by the process and apparatus of this invention. They are listed in the lower section of the chart and numbered 1 through 8.

1. Where fresh outside air enters the apparatus and the air is heated before it passes over the desiccant material, the hot air then passes over the desiccant causing the moisture in the desiccant to evaporate into the air stream, then the air stream enters the cabin as heated and humidified air to warm the cabin and increase the relative humidity. The source of the moisture previously adsorbed into the desiccant material may have either come from expelled stale cabin air or an outside air stream that entered the apparatus from atmosphere and then returned to atmosphere after the moisture was adsorbed.

2. Where recirculated cabin air is directed through the apparatus to both heat and humidify the air before it returns to the cabin. The air is first heated by a heat exchanger then passed through the desiccant to evaporate the moisture previously adsorbed into the desiccant material to increase the relative humidity of the air stream, then the hot humid air is passes into the cabin. In both #1. & #2. the temperature to effectively perform the evaporation may produce an air stream with a temperature higher than that desired by the occupants, therefore, another heat exchanger coil is provided after the air passes through the desiccant material to lower the temperature of the hot and humid air down to the desired temperature.

3. Where recirculated cabin air is dehumidified, as the cabin air is removed from the cabin and passes through the apparatus the desiccant adsorbs the moisture out of the air stream before the air is returned to the cabin to lower the relative humidity of the cabin air mass.

4. Where fresh air is dehumidified before it enters the cabin, the fresh outside air passes through the apparatus where the desiccant material adsorbs the moisture out of the air after which the air passes into the cabin.

5. Where recirculated cabin air is dehumidified before it enters the air-conditioner unit and passes over the cold evaporator coils, the recirculated cabin air enters the apparatus and is dehumidified as the moisture is adsorbed out of the air when it passes through the desiccant material after which the dehumidified air increases the efficiency of the air-conditioner unit due to the reduction of cooling required to cool dry air rather than moist air when the air enters the cold evaporator coils of the air-conditioner.

6. Where fresh outside air is dehumidified before it enters the air-conditioner unit and passes over the cold evaporator coils, the fresh outside air enters the apparatus and is dehumidified as the moisture is adsorbed out of the air when it passes through the desiccant material after which the dehumidified outside fresh air increases the efficiency of the air-conditioner unit due to the reduction of cooling required to cool dry air rather than moist air when the air enters the cold evaporator coils of the air-conditioner.

7. Where recirculated cabin air is dehumidified before it is directed toward the cabin windshield to defog the inside surface of the glass, the recirculated cabin air enters the apparatus and is dehumidified as the moisture is adsorbed out of the air stream when it passes through the desiccant material after which the dehumidified impinging air stream defrost/defog the inside surface the windshield glass by evaporating the condensation from the inside surface. The air may also pass through a heat exchanger after the moisture is removed by the desiccant to increase the air temperature to provide a hot dehumidified air stream to defog defrost both the inside and outside window glass.

8. Where fresh outside air is dehumidified before it is directed toward the cabin windshield to defrost/defog the inside surface of the glass, the fresh outside air enters the apparatus and is dehumidified as the moisture is adsorbed out of the air stream when it passes through the desiccant material after which the dehumidified impinging air stream defrost/defog the inside surface the windshield glass by evaporating the condensation from the inside surface. The air may also pass through a heat exchanger after the moisture is removed by the desiccant to increase the air temperature to provide a hot dehumidified air stream to defog/defrost both the inside and outside window glass.

Figure 15:
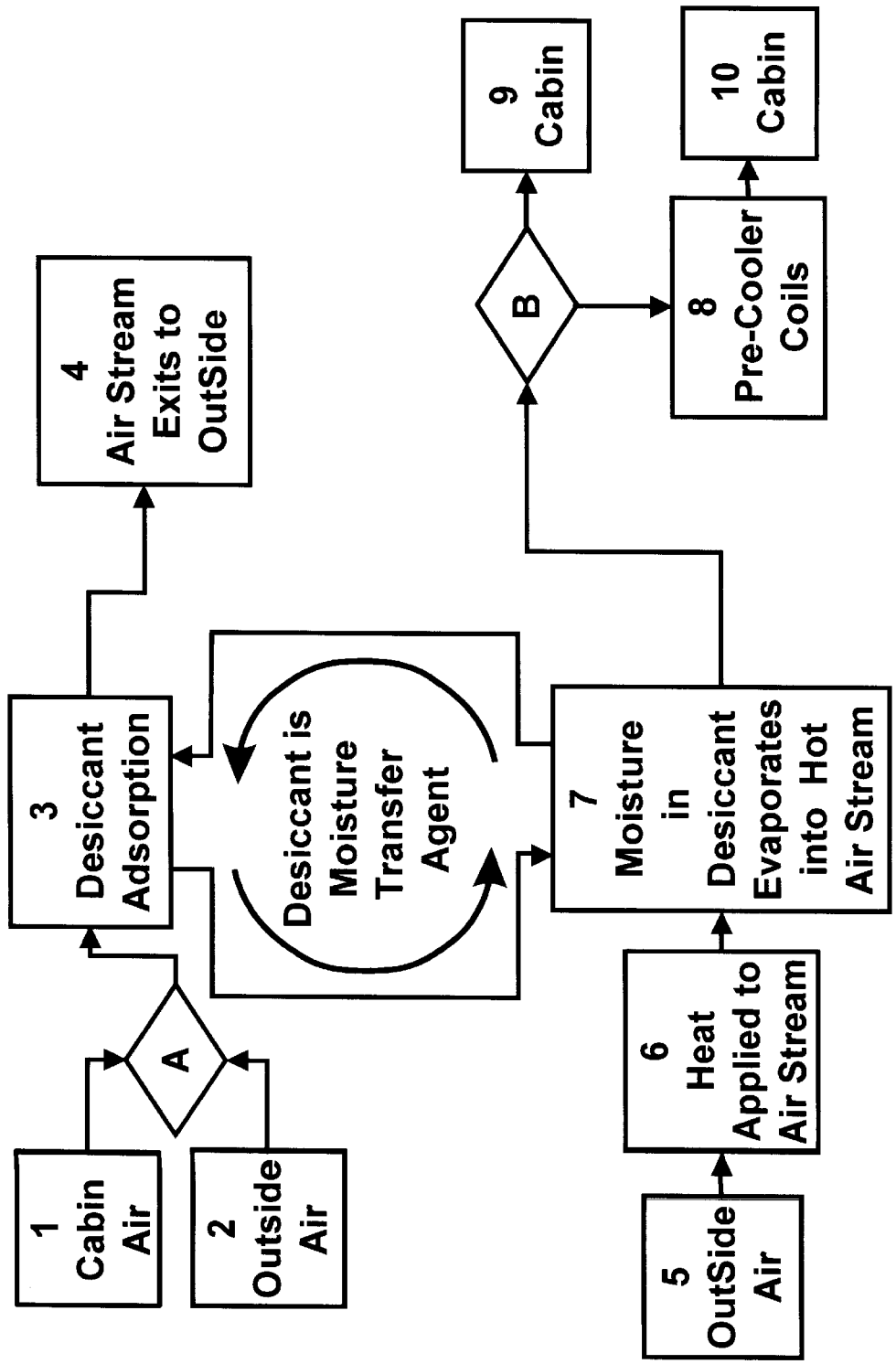
FIG. 15 is a method flow chart showing how fresh outside air is heated and humidified to increase the relative humidity of the cabin air.

FIG. 15 is a method flow chart showing how fresh outside air is heated and humidified to increase the relative humidity of the cabin air. Items 1. & 2. represent the two sources of moisture and "A" represents the decision by the control unit to utilize the highest relativity air mass either 1. the cabin air exiting the vehicle or 2. outside fresh air used to humidify 3. the desiccant material after the moisture is adsorbed into the desiccant the resulting dehumidified air exits the vehicle 4. to the atmosphere. The cabin air mass 9. & 10. receives the addition of 5. fresh outside air which is heated by 6. a heat exchanger or other heating device and humidified as this heated outside air passes through the apparatus where evaporation of the moisture contained in 7. the hydrous desiccant material raises the relative humidity of the air stream. The control unit determines if the air temperature is higher than the desired temperature setting and makes the decision "B" to direct the air stream into a pre-cooler unit 8. or directs the air into the cabin 9 at the higher temperature. The heater unit 6. heats the air to the necessary temperature to perform evaporation of the moisture in the desiccant 7. after which the air may be further conditioned to regulate the temperature of the air going to the cabin 10. The heat 6. source for the evaporation process may be provided by excess engine heat and the pre-cooler coils 8. source of coolant is another set of coils (not shown) positioned in the air flow of the adsorbent side of the apparatus or between block 5. & 6. of the evaporation side of the apparatus before the air passes over the heat 6. unit. The arrows between 3. the adsorption desiccant and 7. the evaporation desiccant represent the repositioning of the desiccant or the redirection of the air streams to cause the alternation of desiccant between each air stream as one portion of the desiccant material becomes saturated with moisture and the other completes its evaporation regeneration cycle. A slowly rotating desiccant wheel or alternating desiccant canister method may be used to perform the desiccant repositioning or airflow alternation.

Figure 16:
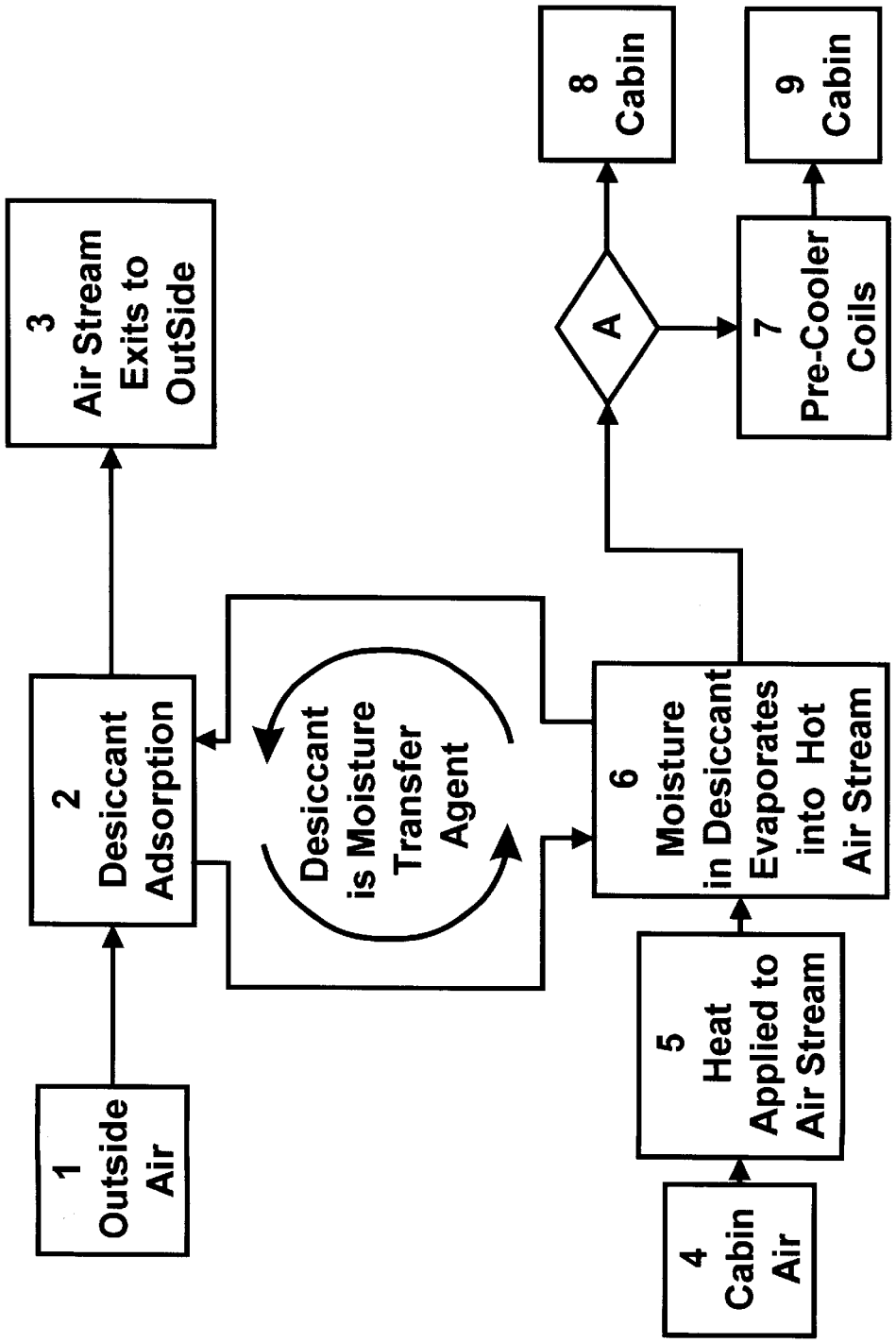
FIG. 16 is a method flow chart showing how recirculated cabin air is heated and humidified to increase the relative humidity of the cabin air.

FIG. 16 is a method flow chart showing how recirculated cabin air is heated and humidified to increase the relative humidity of the cabin air. Item 1. represents the outside air used to provide the source of moisture where 2. the desiccant material adsorbs the moisture from the outside air stream after which the dehumidified air is returned to 3. the atmosphere leaving the moisture in 2. the desiccant material. After the desiccant material 2. becomes saturated it is repositioned into the evaporation cycle represented by the arrows between 2. & 6. or the air stream is altered to cause 4. the cabin air to evaporate the moisture out of 6. the desiccant material. The evaporation occurs when 4. the cabin air is 5. heated to a temperature high enough to evaporate the moisture out of 6. the desiccant after which the control unit (not shown) determines if the temperature of the humidified air exceeds the desired temperature then "A" represents the decision by the control unit to either send the humid air stream directly to 8. the cabin or route the humid air through 7. a pre-cooler unit to lower the temperature. The source of the heat for the process may be provided by excess heat from the vehicle engine (not shown). The source of coolant may be provided by a set of coils on the adsorption side of the apparatus (not shown) or between 4. the cabin air return vent and 5. the heater.

Figure 17:
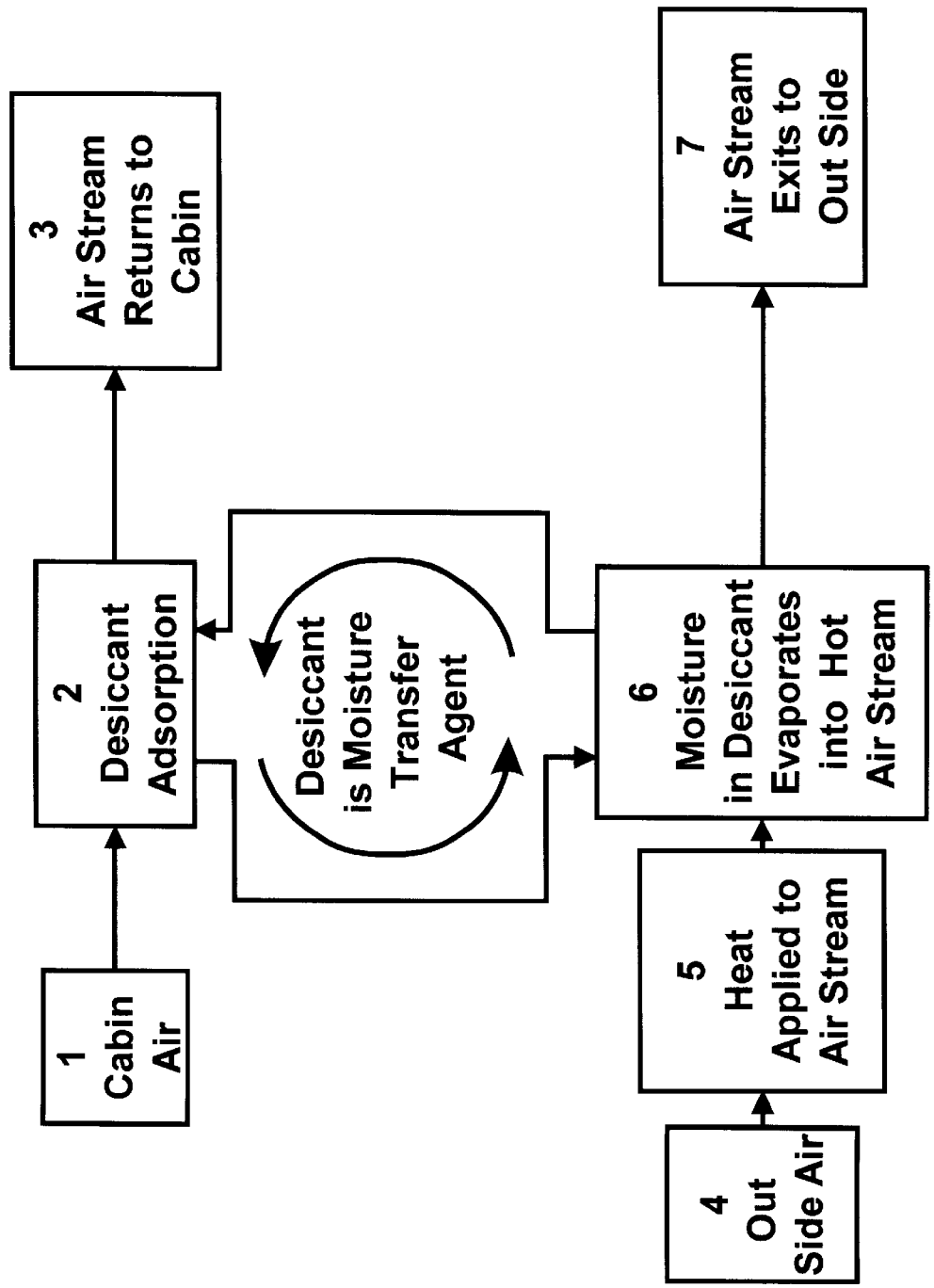
FIG. 17 is a method flow chart showing how recirculated cabin air is dehumidified to lower the relative humidity of the cabin air.

FIG. 17 is a method flow chart showing how recirculated cabin air is dehumidified to lower the relative humidity of the cabin air. Item 1. represents the cabin air entering the apparatus where it passes over 2. a desiccant material where the moisture is adsorbed out of the air stream before the air returns to 3. the cabin. After 2. the adsorption desiccant becomes saturated the arrows shown between 2. & 6. represent the alternating relocation of the sets of desiccant material where one area of desiccant is 6. regenerated by evaporation and prepared for a new cycle, while 2. the other desiccant is performing the adsorption of moisture. Regeneration of the desiccant is accomplished when 4. outside air is 5. heated and passes through 6. the evaporation section of desiccant after which the moisture exits the apparatus 7. along with the hot air stream. The heat 5. for the process is provides from excess heat given off by the engine (not shown) or other sources. After the air stream going toward the cabin has been dehumidified 3. further conditioning (not shown) may be necessary to increase or decrease the temperature of the air.

Figure 18:
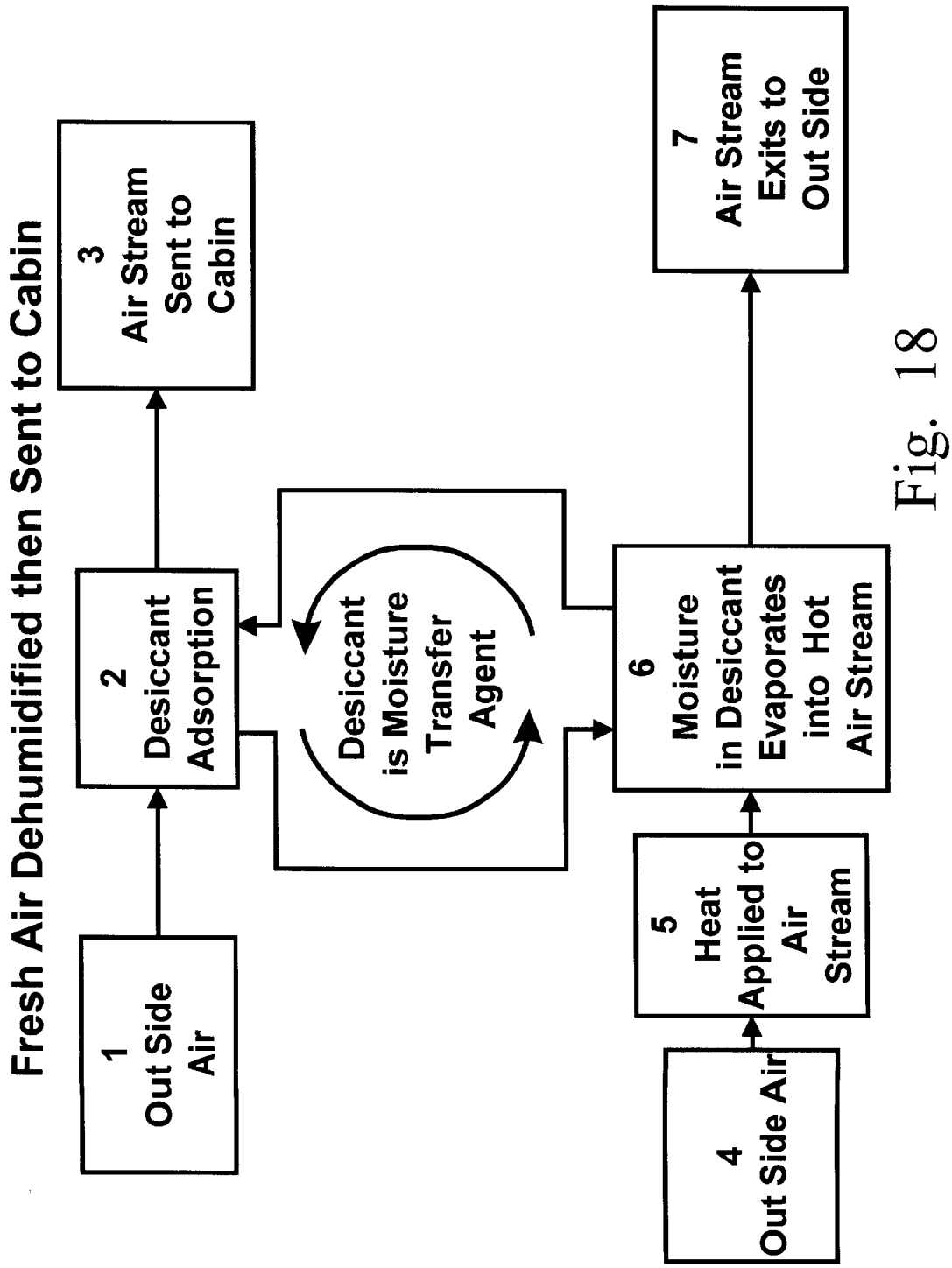
FIG. 18 is a method flow chart showing how fresh outside air is dehumidified to lower the relative humidity of the fresh air going into the cabin.

FIG. 18 is a method flow chart showing how fresh outside air is dehumidified to lower the relative humidity of the fresh air going into the cabin. Item 1. represents fresh out side air entering the apparatus and passing through 2. a desiccant material where the moisture in the air is adsorbed in to 2. the desiccant after which the dry air from the apparatus enters 3. the cabin to lower the relative humidity of the cabin. As 2. the desiccant becomes saturated it is either repositioned or the air flow is altered to place the saturated desiccant into the regeneration cycle represented by the arrows shown between 2. & 6. When the desiccant is placed in the regeneration cycle the moisture evaporates out of the desiccant to prepare it for the next cycle. When 4. the outside air passes through 5. the heater the temperature of the air stream is increased to a temperature necessary for evaporation of the moisture out of 6. the desiccant material. The hot air stream containing the evaporated moisture leaving 6. the desiccant material exits the vehicle and returns to 7. the atmosphere. As one set of desiccant material is in the adsorption cycle the other set of desiccant is in the evaporation cycle by utilizing either a slowly rotating desiccant wheel or alternating desiccant canister method to provide the repositioning and in this way provides a continuous process flow.

Figure 19:
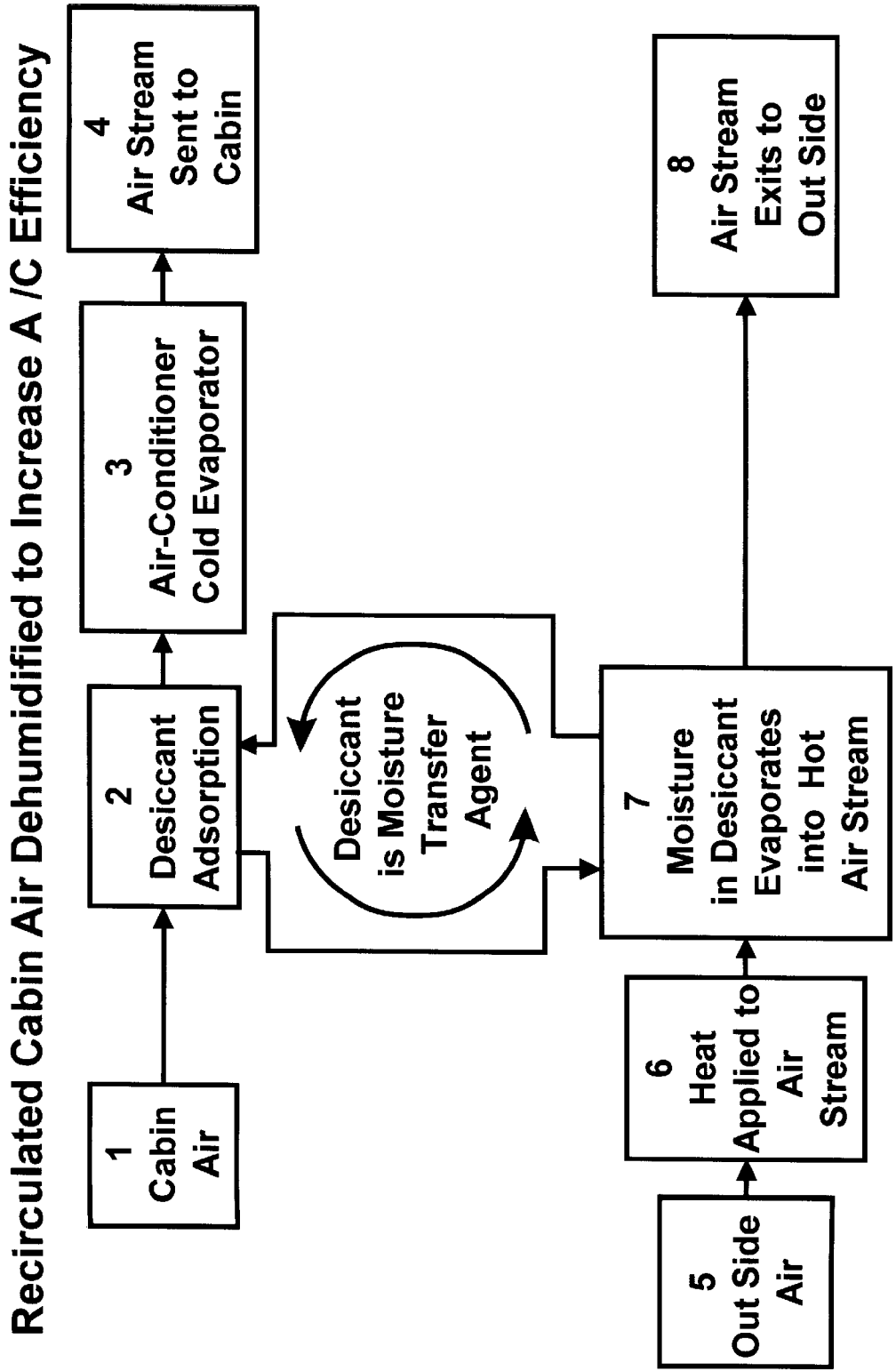
FIG. 19 is a method flow chart showing how the relative humidity of the cabin recirculated air is lowered before the dehumidified air goes through the air-conditioner evaporator cooling unit thus increasing the efficiency of the air-conditioner.

FIG. 19 is a method flow chart showing how the relative humidity of the cabin recirculated air is lowered before the air goes through the air-conditioner evaporator cooling unit to increase the efficiency of the air-conditioner. The process is similar to that shown in FIG. 17. with the addition of 3. the air-conditioner cold evaporator coils. Where the dehumidified cabin air leaving the desiccant has a lower relative humidity when it enters 3. the evaporator coils and the reduction of moisture decreases the energy required by the air-conditioner to cool the cabin air. Less energy is required to cool a hot air mass with a low relative humidity than a hot air mass with a high relative humidity.

Figure 20:
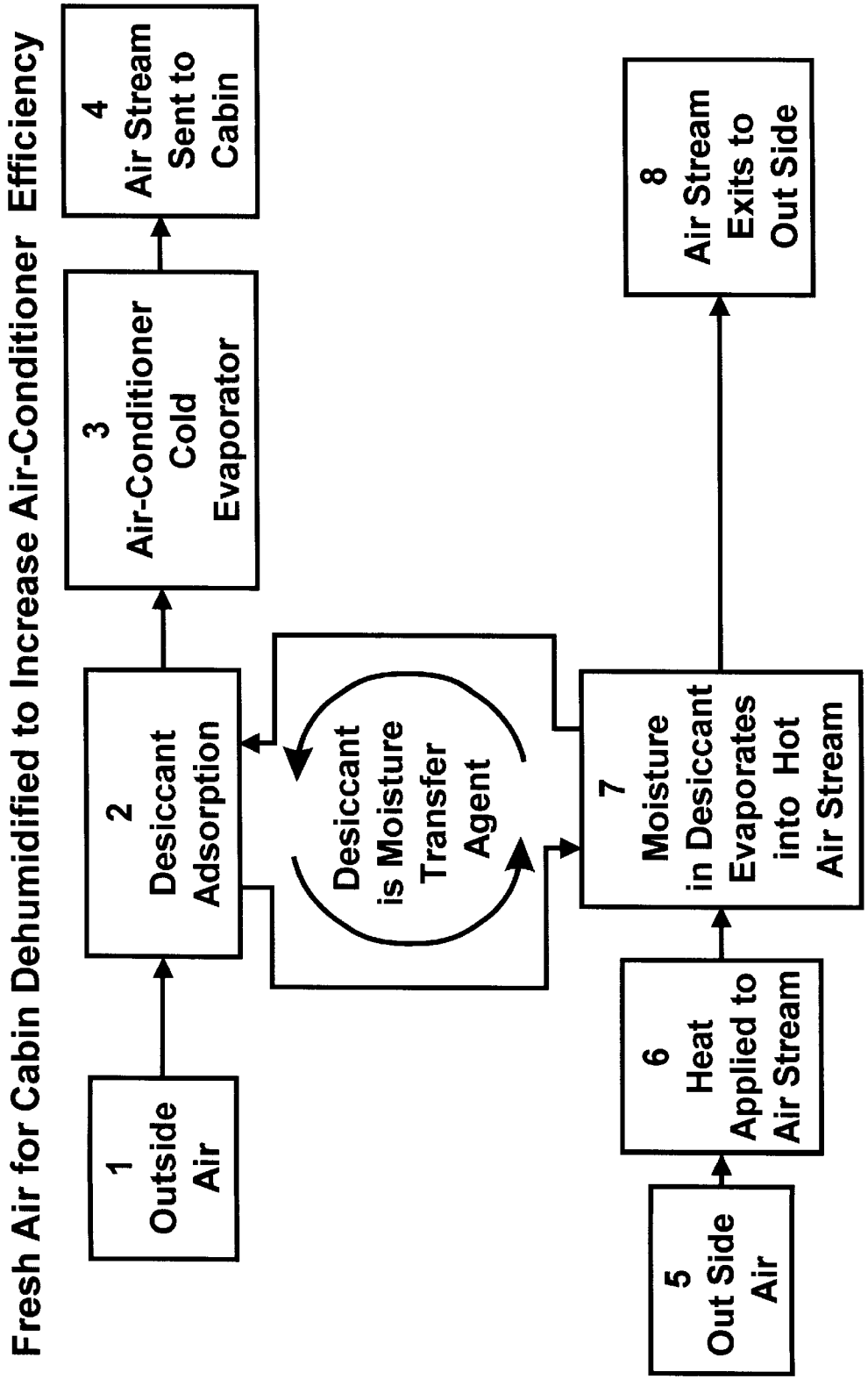
FIG. 20 is a method flow chart showing how the relative humidity of fresh air going into the cabin is lowered before the air goes through the air-conditioner evaporator cooling unit to increase the efficiency of the air-conditioner.

FIG. 20 is a method flow chart showing how the relative humidity of fresh air going into the cabin is lowered before the air goes through the air-conditioner evaporator cooling unit to increase the efficiency of the air-conditioner. The process is similar to that shown in FIG. 18 with the addition of 3. the air-conditioner cold evaporator coils. Where the dehumidified fresh outside air leaving the desiccant has a lower relative humidity when it enters 3. the evaporator coils and the reduction of moisture decreases the energy required by the air-conditioner to cool the cabin air. The process is similar to the process described in FIG. 19 with the exception that fresh outside air is introduced into the cabin in place of the recirculated cabin air.

Figure 21:
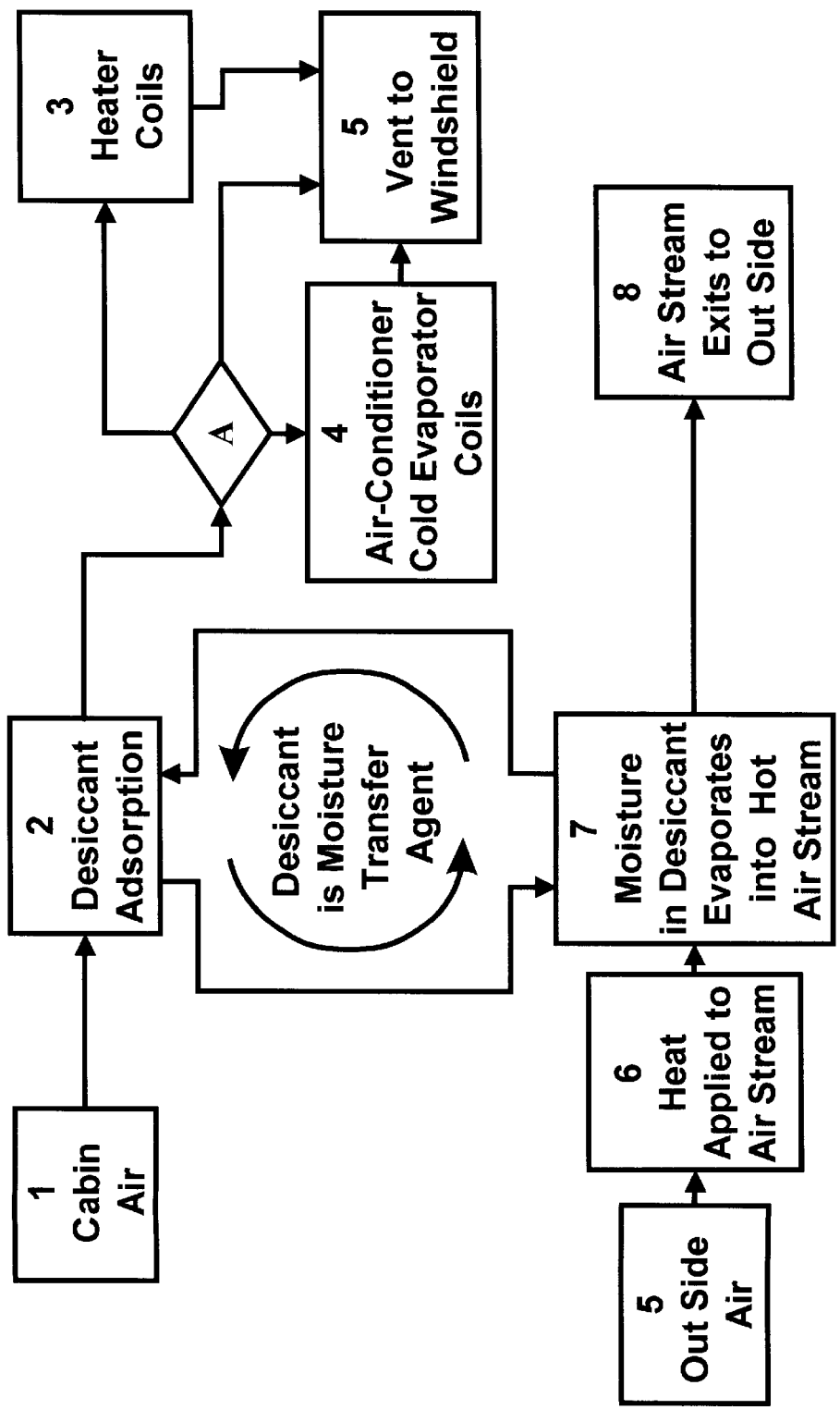
FIG. 21 is a method flow chart showing how recirculated cabin is dehumidified and then used to defog/defrost the inside surface of the windshield.

FIG. 21 is a method flow chart showing how recirculated cabin air is dehumidified and then used to defog/defrost the inside surface of the windshield. Item 1. the cabin air is recirculated through the apparatus where the moisture is adsorbed out of the air stream by 2. the desiccant material after which the control unit (not shown) "A" determines where to direct the dehumidified air as it leaves the apparatus. Based on windshield glass temperature and cabin temperature the control unit will direct the air flow to 3. the heater coils of a heat exchanger, or to 4. the air-conditioner evaporator coils, or directly to 5. the windshield vent where the impinging air stream will defog/defrost the inside surface of the windshield glass. If the air is directed through 3. the heater coils or 4. the air-conditioner cooling coils it then flows through to the windshield vent. These variations on the method allow for defrosting of the inside windshield glass with recirculated cabin air that is either heated, cooled, or room temperature. The desiccant material 8. is regenerated with the same method described in FIG. 19.

Figure 22:
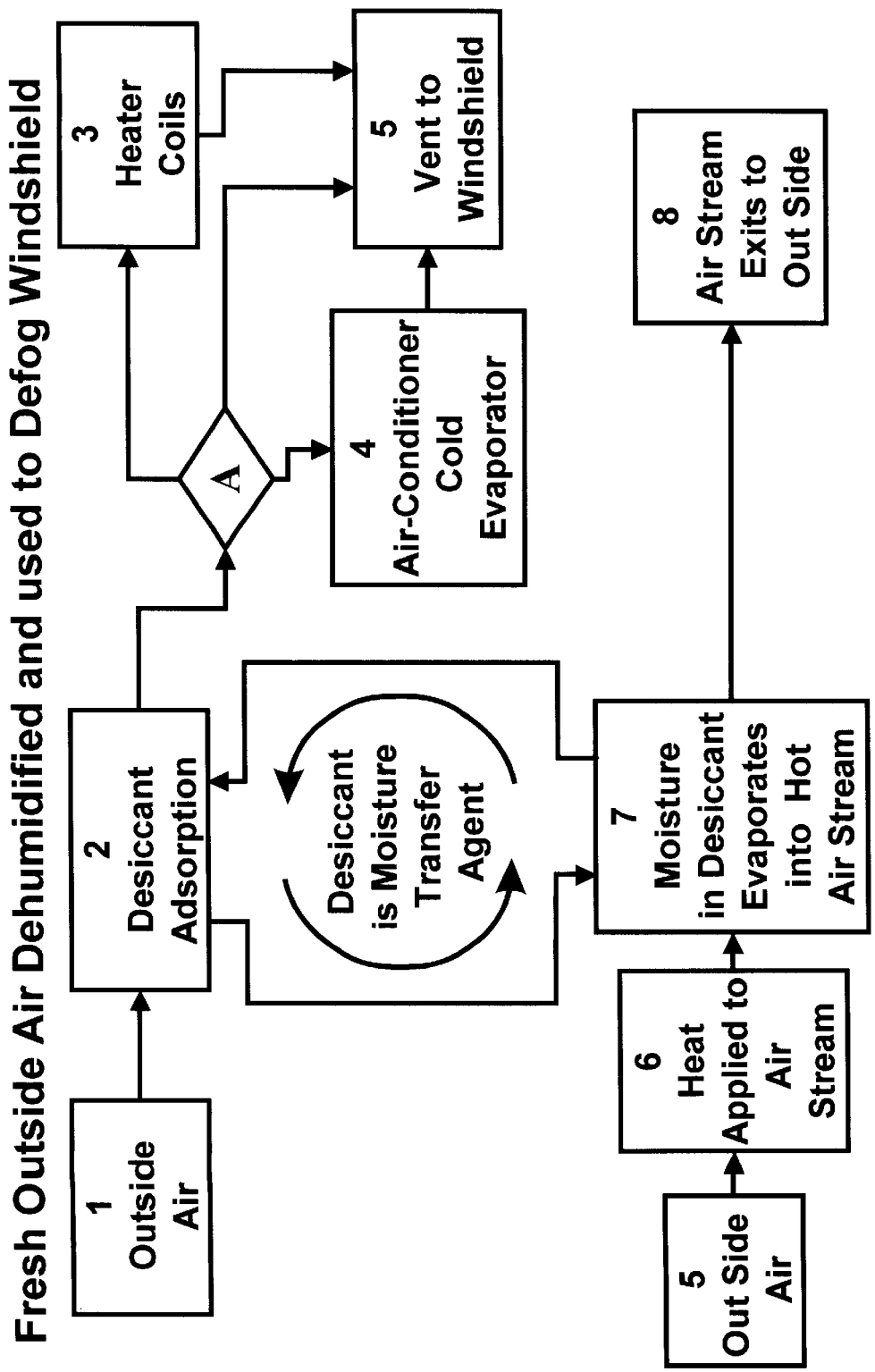
FIG. 22 is a method flow chart showing how fresh outside air is dehumidified and then used to defog/defrost the inside surface of the windshield.

FIG. 22 is a method flow chart showing how fresh outside air is dehumidified and then used to defog/defrost the inside surface of the windshield. Item 1. the fresh outside air passes through the desiccant material where the moisture is adsorbed out of the air stream by 2. the desiccant material after which the control unit (not shown) "A" determines where to direct the dehumidified air as it leaves the desiccant. Based on windshield glass temperature and cabin temperature the control unit will direct the air flow to 3. the heater coils, 4. the air-conditioner evaporator coils, or directly to 5. the windshield vent where the impinging air stream will defog/defrost the inside surface of the windshield glass. If the air is directed through 3. the heater coils or 4. the air-conditioner cooling coils it then flows through to the windshield vent. These variations on the method allow for defrosting of the inside windshield glass with fresh outside air that is either heated, cooled, or room temperature. The desiccant material 8. is regenerated with the same method described in FIG. 19.

FIG. 23 is a summary chart showing 5 of the general functions and benefits of the inventive method.

Figure 24:
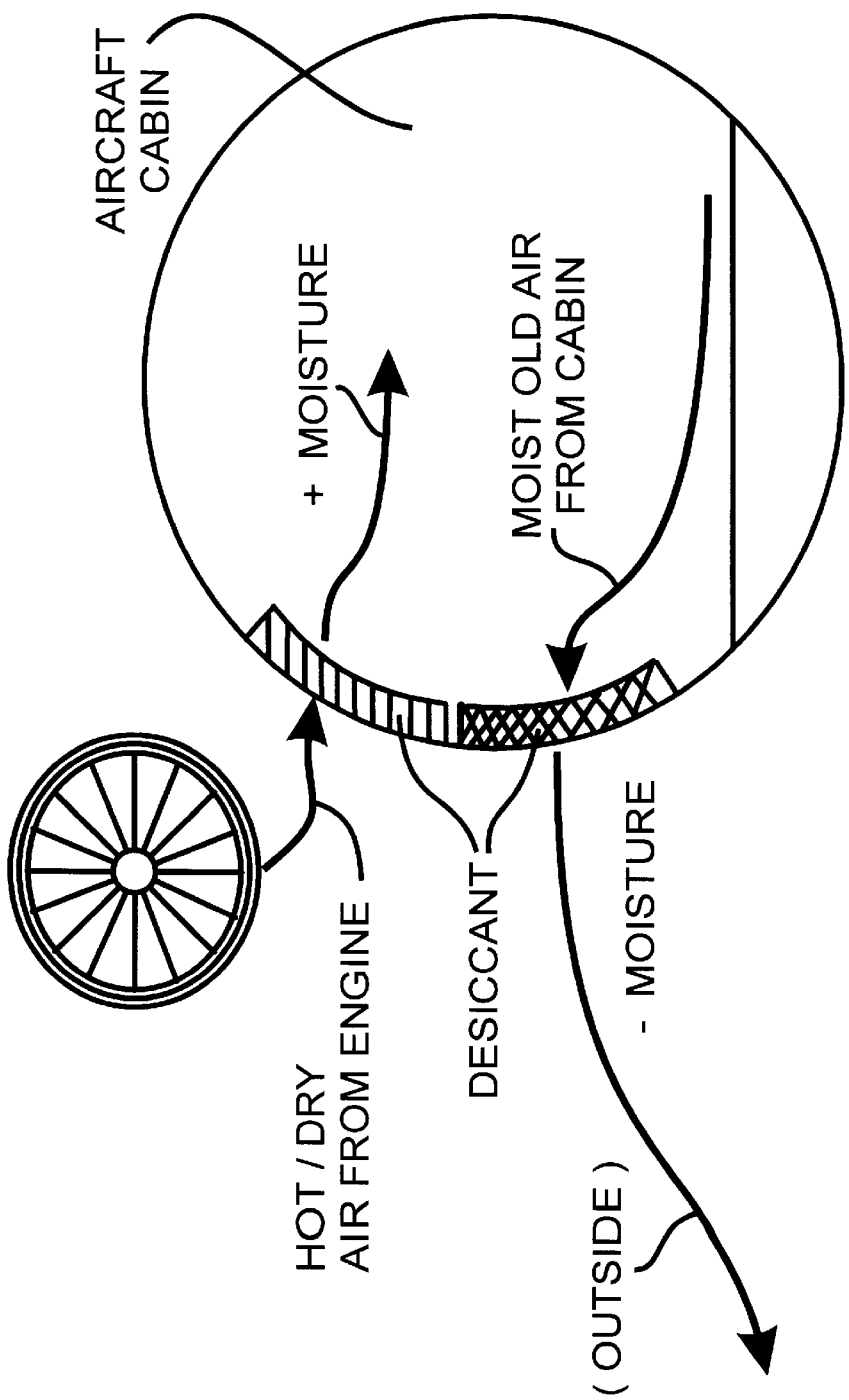
FIG. 24 is a diagram showing the desiccant process of humidification of a fresh air stream going into an aircraft cabin from the engine compressor to increase the relative humidity of the cabin.

FIG. 24 is a diagram showing the desiccant process of humidification of a fresh air stream going into an aircraft cabin from the engine compressor. The hot dry air from the engine compressor passes through a hydrous desiccant material causing the moisture in the desiccant to evaporate into the hot air stream after which the hot humid air enters the aircraft cabin. Stale cabin air leaving the cabin first passes through a desiccant material where the moisture is adsorbed into the desiccant before the air exits the aircraft. The repositioning of the desiccant or the altering of the air stream provides for the alternation of the desiccant as one section becomes saturated with moisture and the other regenerates from evaporation. This drawing shows the reclamation of moisture given off by the passengers and the return of the moisture to the cabin as the stale air escapes from the cabin.

Figure 25:
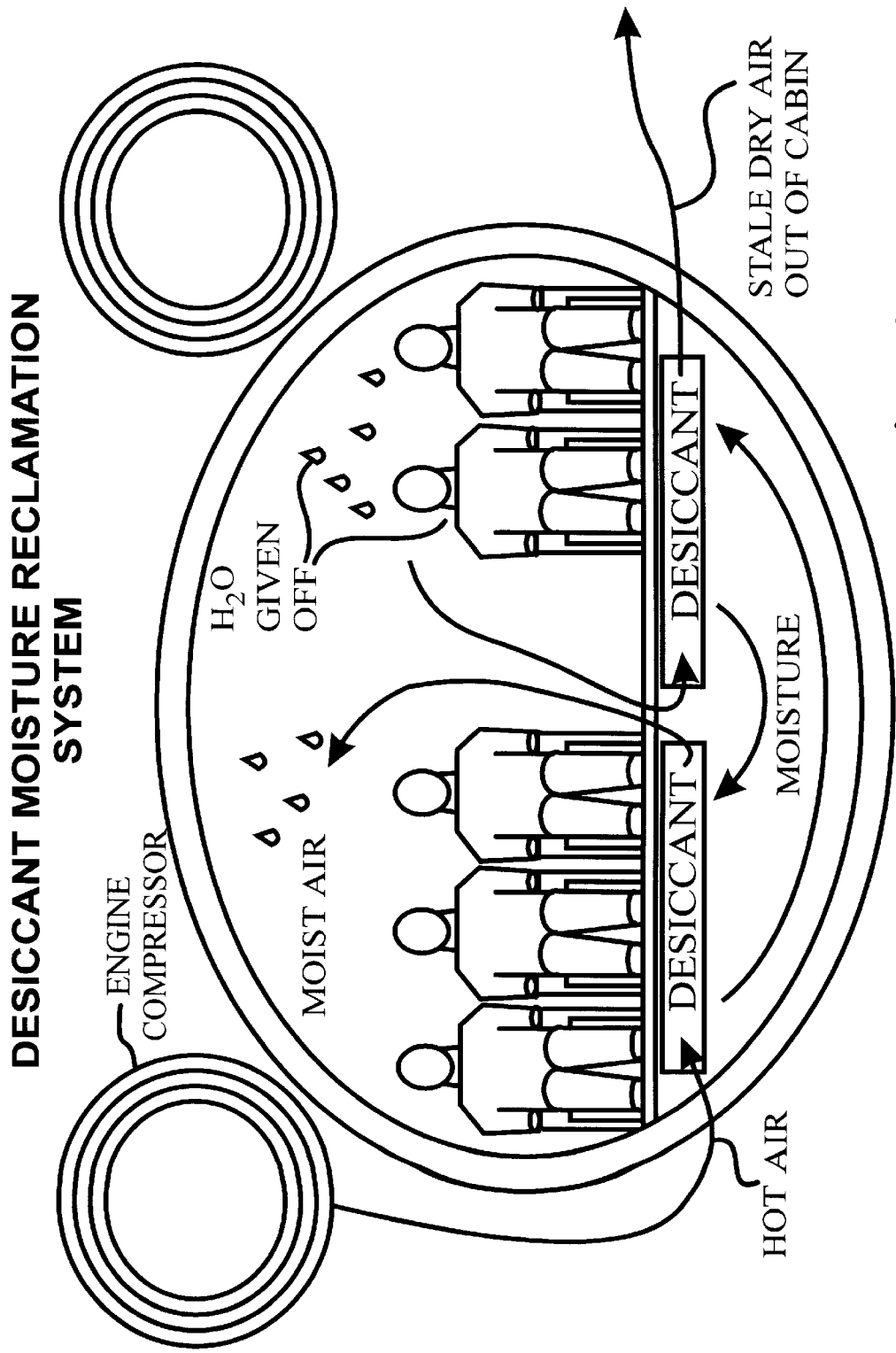
FIG. 25 is a diagram showing the source of moisture and the air flow for the desiccant humidification of an aircraft cabin.

FIG. 25 is a diagram showing the source of moisture and the air flow for the desiccant humidification of an aircraft cabin. The functions and method are similar to those shown in FIG. 24. with the addition of large arrows showing the reposition of the desiccant from one air stream to another.

Figure 26:
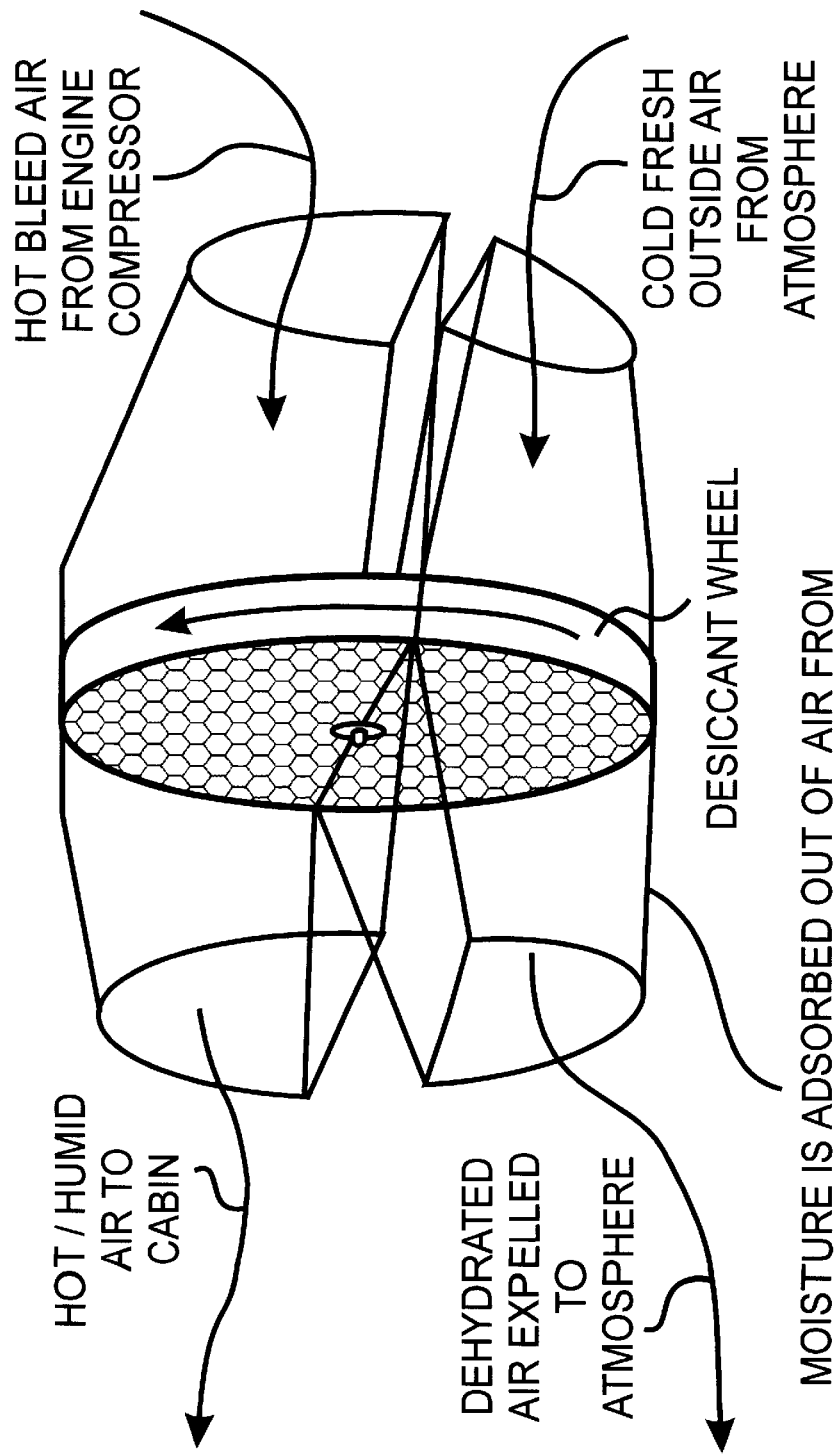
FIG. 26 is a concept drawing showing a desiccant based aircraft cabin humidification system utilizing a desiccant wheel where the source of moisture is the outside air.

FIG. 26 is a drawing showing a desiccant based aircraft cabin humidification system utilizing a slowly rotating desiccant wheel where the source of moisture is the outside air. The outside air passes through the desiccant wheel lower section where moisture is adsorbed into the desiccant material. After the outside air passes through the wheel and the moisture is adsorbed into the desiccant the dry air is expelled back out into the atmosphere. The hot bleed air from the turbine compressor passing through the other half of the desiccant wheel causes the moisture in the desiccant material to evaporate into the air stream going to the cabin. The desiccant wheel method can continuously supply humidified hot air to the cabin over an indefinite period of time.

Figure 27:
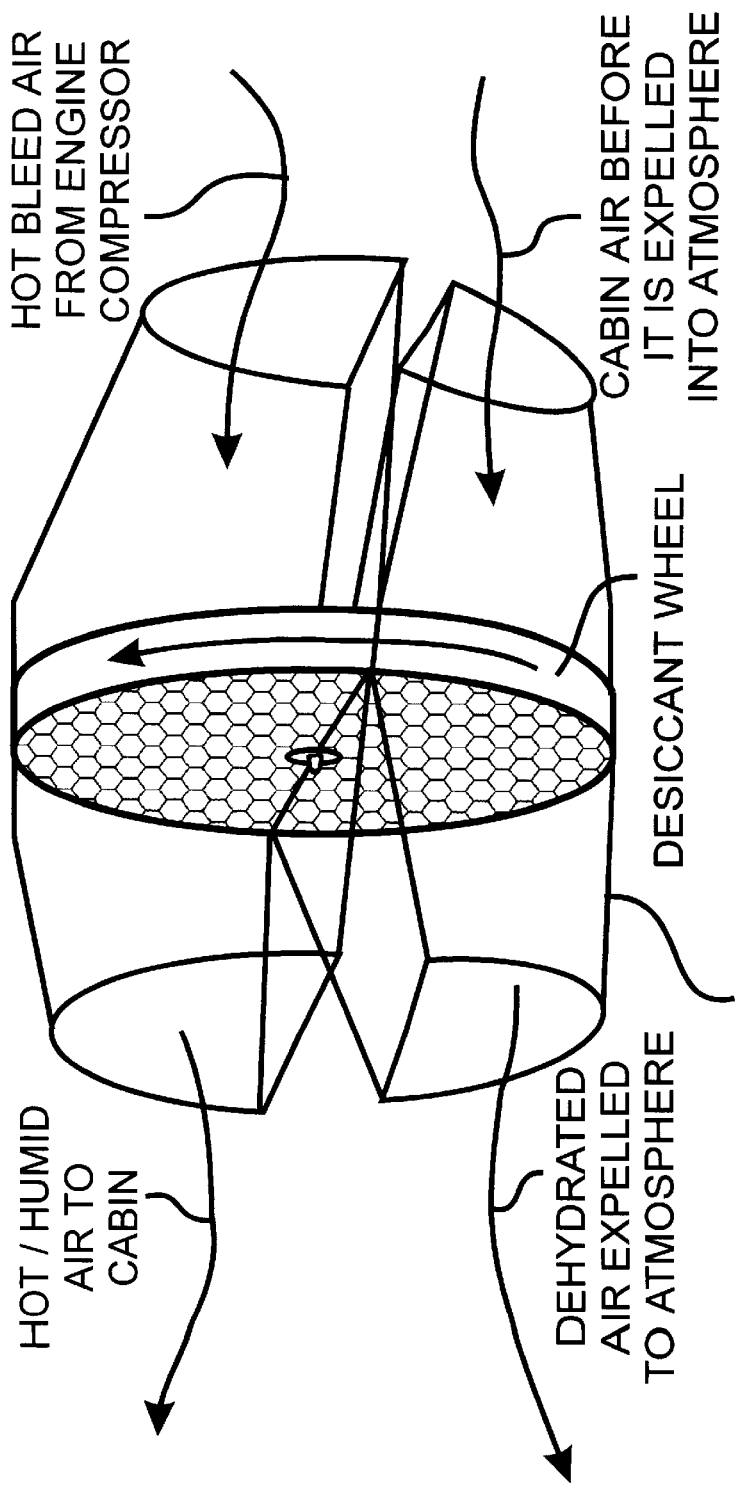
FIG. 27 is a concept drawing showing a desiccant based aircraft cabin humidification system utilizing a desiccant wheel where the source of moisture is the stale cabin air before it is expelled from the aircraft.

FIG. 27 is a drawing showing a desiccant based aircraft cabin humidification system utilizing a desiccant wheel where the source of moisture is the old cabin air before it is expelled. The method shown in FIG. 27. is similar to that shown in FIG. 26. except the source of moisture is the expelled stale air leaving the cabin. In this method the stale cabin air passes through half of the desiccant wheel where the moisture generated by the occupants is adsorbed into the desiccant material before the air is expelled outside. With this method the bleed air from the engine may provide the air flow both for the air going into the apparatus from the engine and out of the apparatus as the stale cabin air is allowed to escape when the cabin is pressurized.

Figure 28:
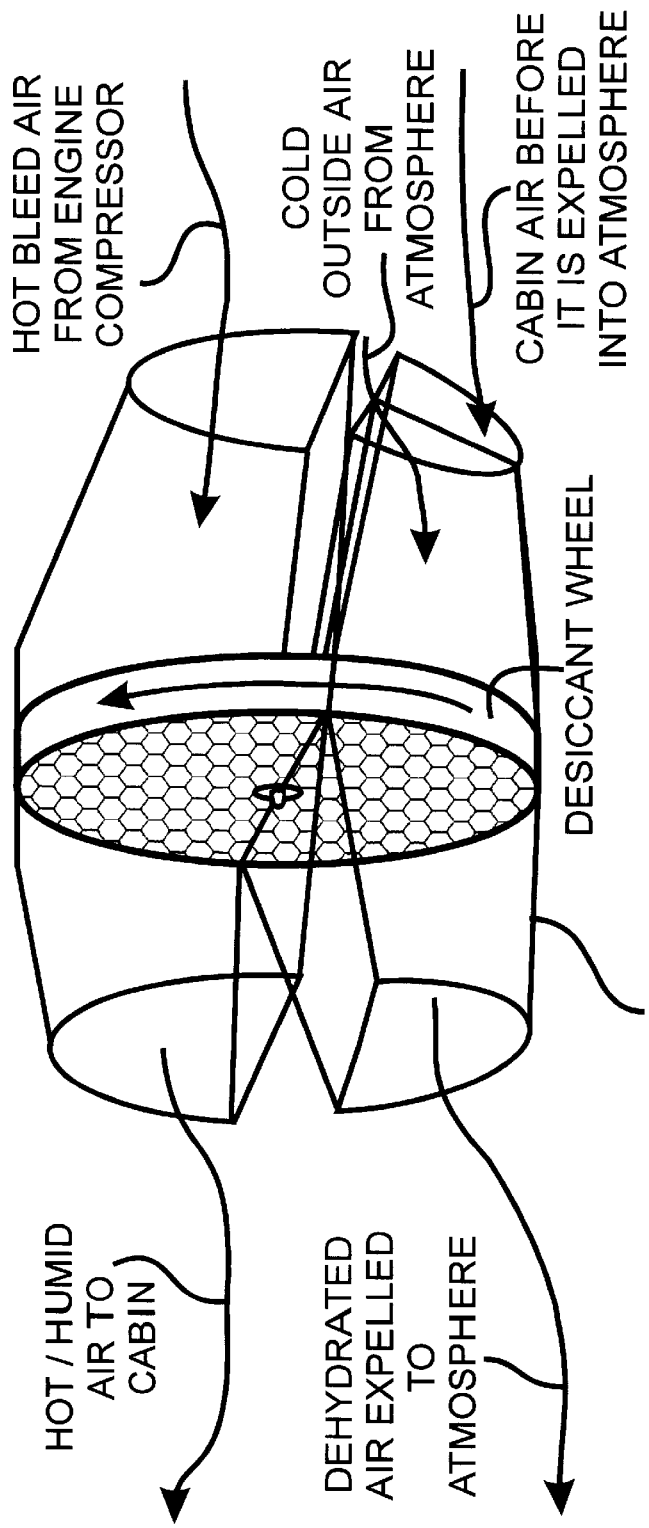
FIG. 28 is a concept drawing showing a desiccant based aircraft cabin humidification system utilizing a desiccant wheel where there is a duel source of moisture.

FIG. 28 is a drawing showing a desiccant based aircraft cabin humidification system utilizing a desiccant wheel where there is a duel source of moisture. The method shown in FIG. 28. is similar to the methods shown in FIGS. 26. & 27. except that the source of moisture are both the outside air and the stale cabin air. The control unit through the use of sensors would determine the desired direction of rotation of the desiccant wheel and then activate the torque drive motor to rotate the wheel toward the source with the highest relative humidity. If the stale cabin air has a higher relative humidity then the wheel would pass through the outside air stream first and then pass through the higher humidity stale cabin air to add additional moisture into the desiccant wheel before it rotates into the hot air stream for evaporation from the engine compressor's hot air stream.

Figure 29:
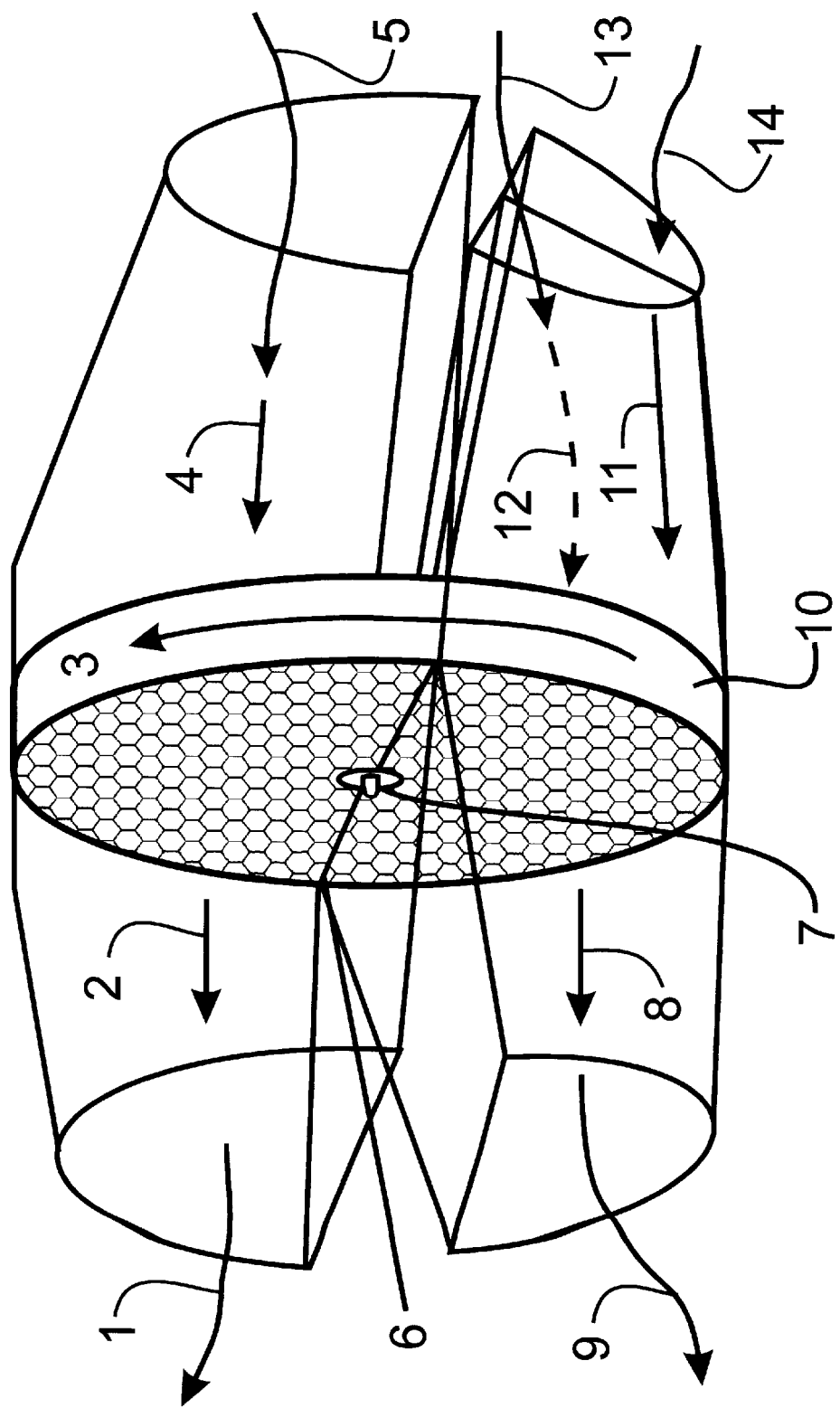
FIG. 29 is a drawing showing a desiccant based aircraft cabin humidification system utilizing a desiccant wheel.

FIG. 29 is a drawing showing more details of the similar drawing FIG. 28 with a desiccant based aircraft cabin humidification system utilizing a desiccant wheel with a duel source of moisture. Item 1 is the hot and humid air going to the cabin from the apparatus to provide fresh heated air with humidity for the cabin. Item 2 is the hot humid air passing out of the top half of the desiccant wheel. Item 3 is the top half of the desiccant wheel with an arrow showing the direction of rotation when the stale cabin air has a higher relative humidity than the fresh outside air used for adsorption. The direction of rotation of the wheel may be reversed to change the sequence of adsorption air sources. Item 4 is the air way directing the hot dry air from the compressor into the desiccant wheel. Item 5 is the hot air supply from the compressor section of the turbine engine. Item 6 is a seal used to separate the adsorption side of the apparatus from the evaporation side of the apparatus. Other seals (not shown) are utilized to separate the air flow and prevent bleed over of air from one section to another.

With the apparatus utilized in a pressurized cabin the small amount of air leakage past the seals would be in the direction of the stale cabin air since this air mass has the lowest pressure. Item 7 is the axle of the center drive desiccant wheel. Item 8 is the air way used to eject the stale dry air after the desiccant removes the moisture by adsorption. Item 9 is the dry air exiting the apparatus into the atmosphere. Item 10 is the adsorption side of the desiccant wheel where moisture is adsorbed out of both the stale cabin air and/or fresh air where the moisture is later used for evaporation when the desiccant wheel rotates up into the hot air stream. Item 11 is the air way directing stale cabin air into the slowly rotating desiccant wheel. Item 12 is the air way directing the outside air stream toward the desiccant wheel. Item 13 is the outside air supply Item 14 is the stale cabin air supply.

Figure 30:
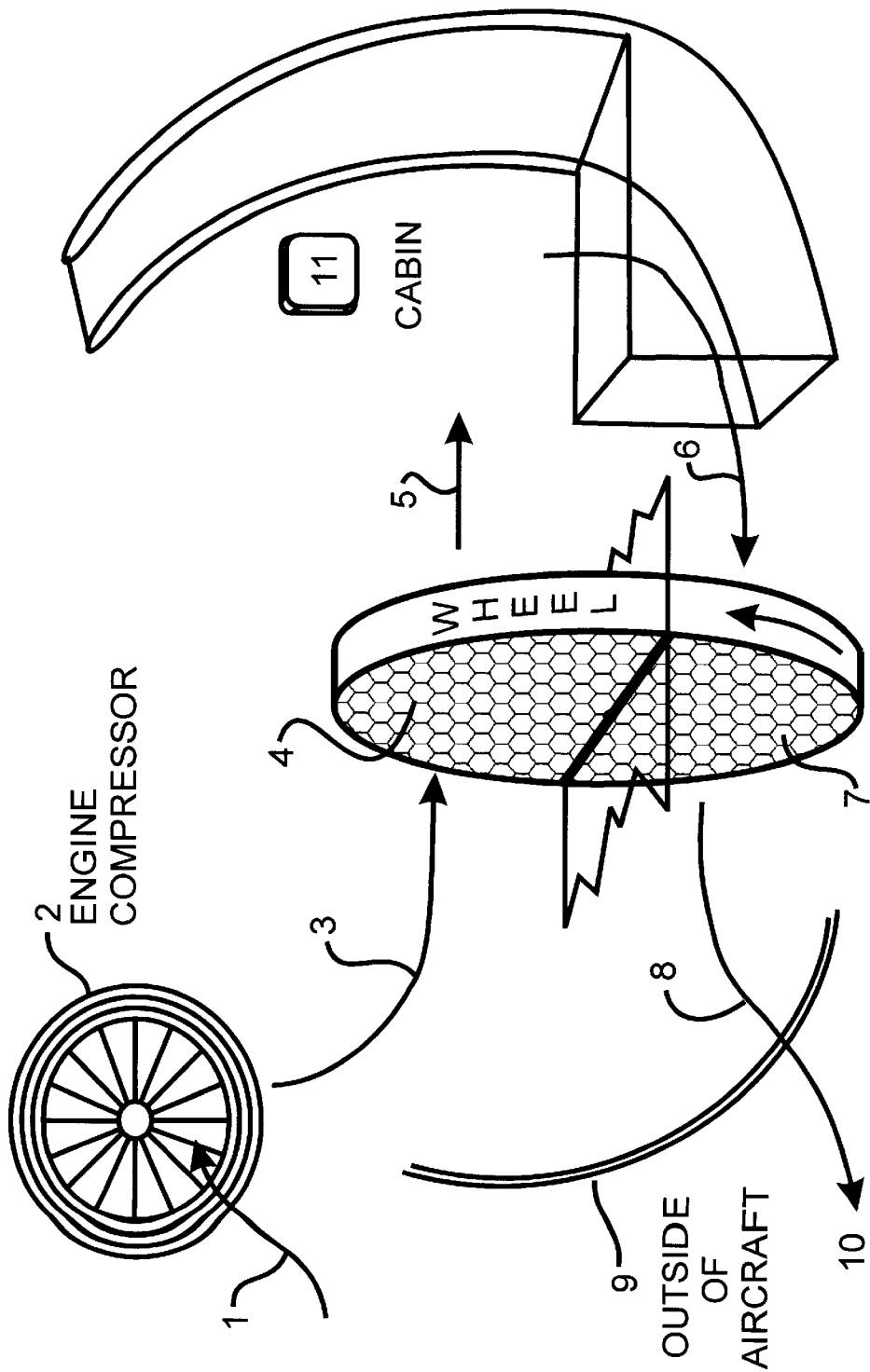
FIG. 30 is a schematic showing a desiccant wheel aircraft cabin humidification system.

FIG. 30 is a schematic showing a desiccant based aircraft cabin humidification systems. Item 1 is the outside fresh air entering 2 the turbine engine compressor section where the air is heated as it is compressed after which the hot compressed air is piped from the engine to the cabin where the hot dry air enters 4 the evaporation side of the desiccant wheel and humidification of the air stream occurs as the moisture in the hydrous desiccant material evaporates into the air stream. Item 5 is the moist hot air passing through an air duct into the cabin. Before the air stream enters the cabin, the air may be further conditioned by either heating or cooling elements (not shown) to regulate the temperature of the cabin air mass. Item 6 is the stale cabin air vented out of the cabin to 7 the adsorption side of the desiccant wheel. The stale cabin air contains moisture given off by the occupants of the cabin and other sources; and this moisture is reclaimed by the adsorption of the desiccant wheel as it slowly rotates through adsorption cycle where the moisture is extracted from the air stream by the desiccant material. The moisture adsorbed into the desiccant material coated on the wheel slowly rotates up into the evaporation side of the apparatus where the moisture is released into 3 the hot air stream going into the cabin through the process of evaporation. After the moisture is removed by 7 the desiccant wheel 8 the stale dehumidified air exits the aircraft to 10 the outside atmosphere. Item 11 the control unit regulates the air flow through the apparatus and stops or starts the humidification process by activating or deactivating the desiccant wheel torque drive motor (not shown). When the wheel rotation stops the humidification process also stops while the air-continues to flow through the wheel unaffected. The control unit may also control the cabin temperature regulation.

Figure 31:
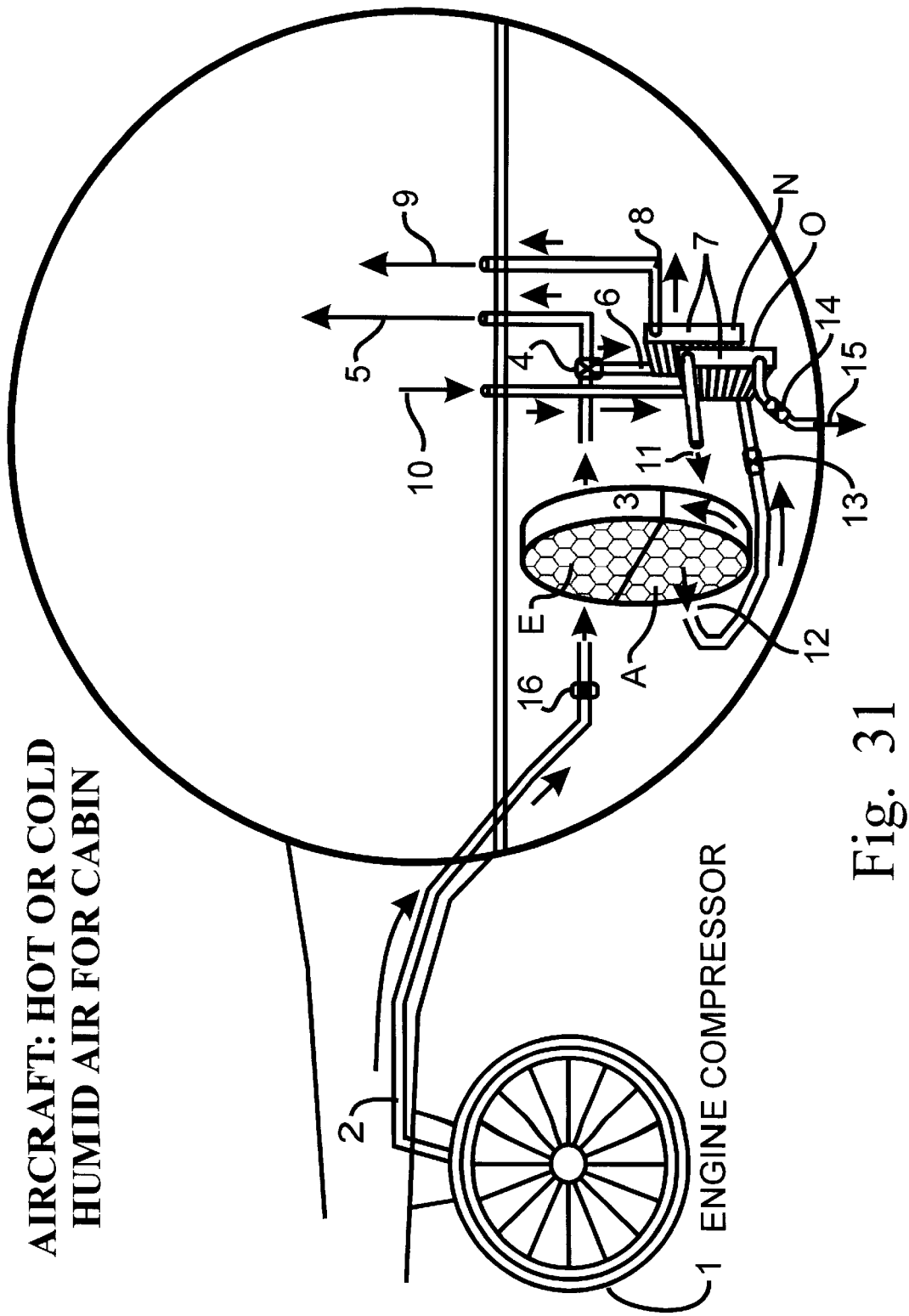
FIG. 31 is a schematic showing a desiccant based aircraft cabin humidification system utilizing a desiccant wheel including a cooling unit to lower the air temperature of both the fresh air after it is humidified and also the old stale air before the moisture is adsorbed into the desiccant wheel.

FIG. 31 is a schematic showing a desiccant based aircraft cabin humidification system utilizing a desiccant wheel including a cooling unit to lower the air temperature of both the fresh air after it is humidified and also capable of lowering the temperature of the stale cabin air before the moisture is adsorbed from it into the desiccant wheel. Item 1 represents the turbine engine compressor section, Item 2 is a vent pipe through which the hot compressed air passes from the engine to valve 16 which has three positions: the first position is to direct the hot dry compressed air directly into the cabin vent system without adding moisture, the second position is to direct the air stream into "E" the evaporation side of 3 the desiccant wheel, and the third position of the valve is the closed position to stop the hot air flow to the cabin completely. The hot compressed air stream passes from 16 the engine air valve through 2 the air vent pipes to 3 the desiccant wheel, where it enters "E" the evaporation side of 3 the desiccant wheel where the heat in the air stream causes the moisture in the hydrous desiccant wheel to evaporate out of the wheel and into the fresh air stream.

After the desiccant wheel releases the moisture into the hot fresh air stream from the engine compressor, the moist hot compressed air stream is directed by 4 the hot air valve to either 5 the cabin or to 6 the vent pipe to the "N" section of 7 the expansion unit cooler where the air temperature is lowered before the humid air stream enters the cabin. The control unit (not shown) regulates 4 the hot air valve when the vent line temperature sensors (not shown) and the cabin air temperature sensors (not shown) indicate that there is a need to cool the hot humid air from the desiccant wheel before it enters the cabin. Item 8 is the vent pipe through which the cool humidified air enters the cabin. Item 9 is the cool moist air entering the cabin. Item 10 is the stale cabin air entering the vent pipe going into the "O" side of 7 the expansion unit cooler where the stale moist cabin air is cooled before it enters 11 the vent pipe through which the air passes to the "A" adsorption side of 3 the desiccant wheel where the moisture in the stale cabin air is adsorbed into the desiccant material coated on the desiccant wheel. Item 12 is the stale dry air exiting the desiccant wheel and flowing through a vent pipe to 13 the expansion pressure regulator valve that allows the pressurized cabin air to rapidly expand to near outside atmospheric pressure an also maintains the cabin pressure at the correct pressure altitude. This rapid expansion of the cabin air in 7 the expansion chamber provides the cooling effect for the air streams passing through 7 the expansion unit. Item 14 the expansion unit temperature regulator valve controls the temperature of 7 the expansion unit by regulating the amount of expansion allowed in the expansion chamber as compared to the expansion occurring as the air escapes to the outside atmosphere. Item 15 is the dry stale cabin air exiting the aircraft. The automatic control unit (not shown) regulates the action of the valves and torque motor (not shown) of the desiccant wheel to maintain the desired cabin temperature, relative humidity and rate of air flow.

Figure 32:
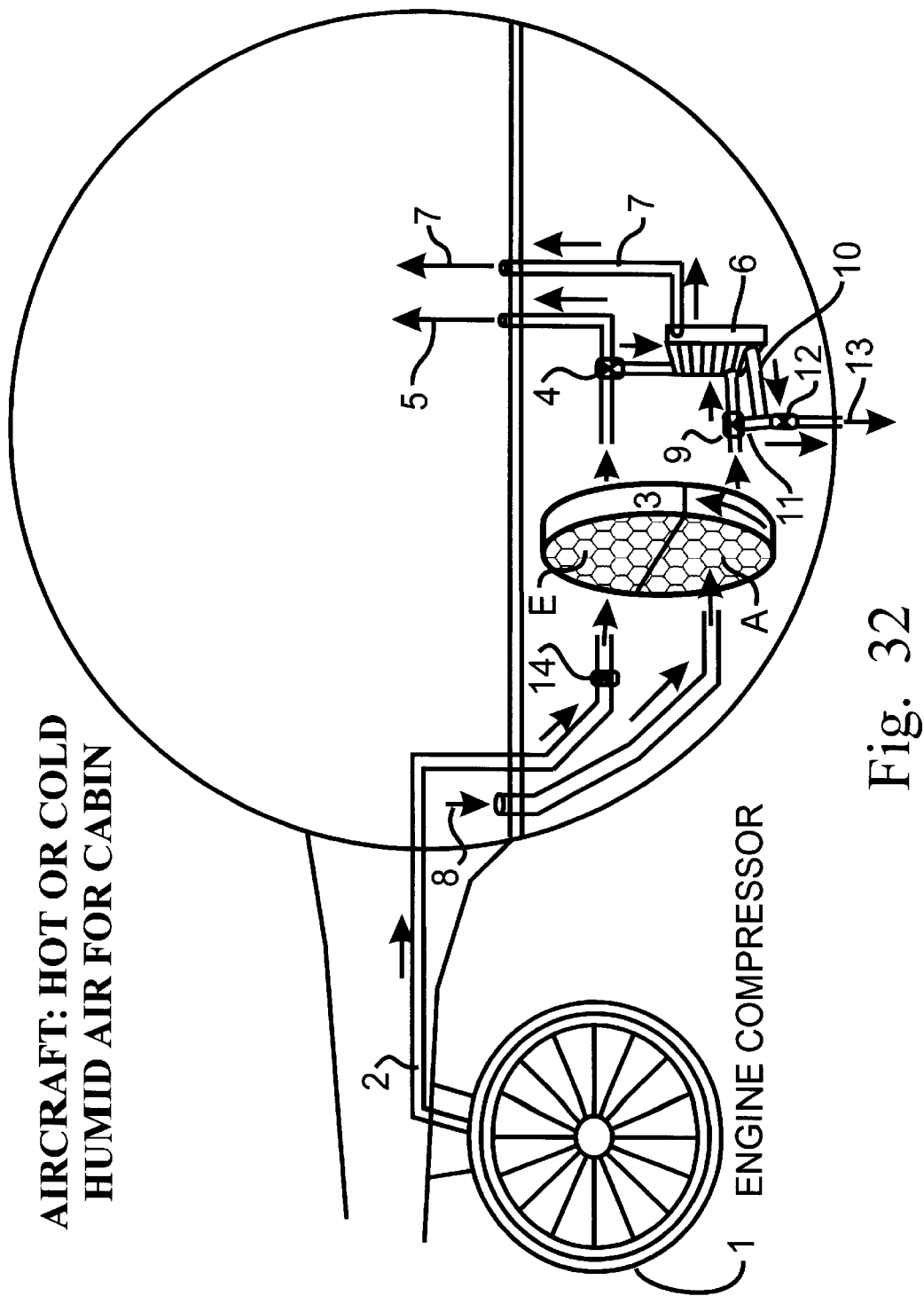
FIG. 32 is a schematic showing a desiccant based aircraft cabin humidification system utilizing a desiccant wheel including a cooling unit to lower the air temperature of the fresh air after it is humidified. The stale cabin air is not cooled before it passes through the desiccant wheel.

FIG. 32 is a schematic showing a desiccant based aircraft cabin humidification system utilizing a desiccant wheel including a cooling unit to lower the air temperature of the fresh air after it is humidified. FIG. 32 is similar to FIG. 31 except that the stale cabin air entering the desiccant wheel is not pre-cooled by the expansion unit in FIG. 32. Item 1 represents the turbine engine compressor providing 2 the fresh hot compressed air for the cabin that passes through 2 a vent pipe to "E" the evaporation side of 3 the desiccant wheel where the hot air causes the moisture in the hydrous desiccant coated on the wheel to evaporate in to the hot air stream. The hot humid air then passes through a vent pipe to 4 the fresh air temperature regulator valve where the automatic control unit (not shown) directs the hot humid air to either 5 the cabin or 6 the expansion unit cooler where the air temperature is lowered before it enters the cabin 7 as a cool moist air stream. Item 8 is the stale moist cabin air entering the vent pipe going to "A" the adsorption side of 3 the desiccant wheel where the moisture in the stale cabin air is adsorbed into the desiccant material coated on the desiccant wheel. The dry stale cabin air exits the desiccant wheel and travels through a vent pipe to 9 the cabin pressure regulator valve that maintains the correct pressure altitude for the cabin. An embodiment to the design has this 9 valve controlling also direction of the air flow to 6 the expansion unit cooler or directly out to atmosphere. Item 10 is the stale dry exiting 6 the expansion unit cooler through a vent pipe to 12 the temperature regulator valve that regulates the expansion allowed in the expansion unit before the stale cabin 13 exits the aircraft into the atmosphere. Item 11 is the dry stale air stream leaving 9 the cabin pressure regulator valve and bypassing 6 the expansion unit going directly to 12 the temperature regulator valve. The automatic control unit (not shown) regulates the action of the valves and torque motor (not shown) of the desiccant wheel to maintain the desired cabin temperature, relative humidity and rate of air flow.

Figure 33:
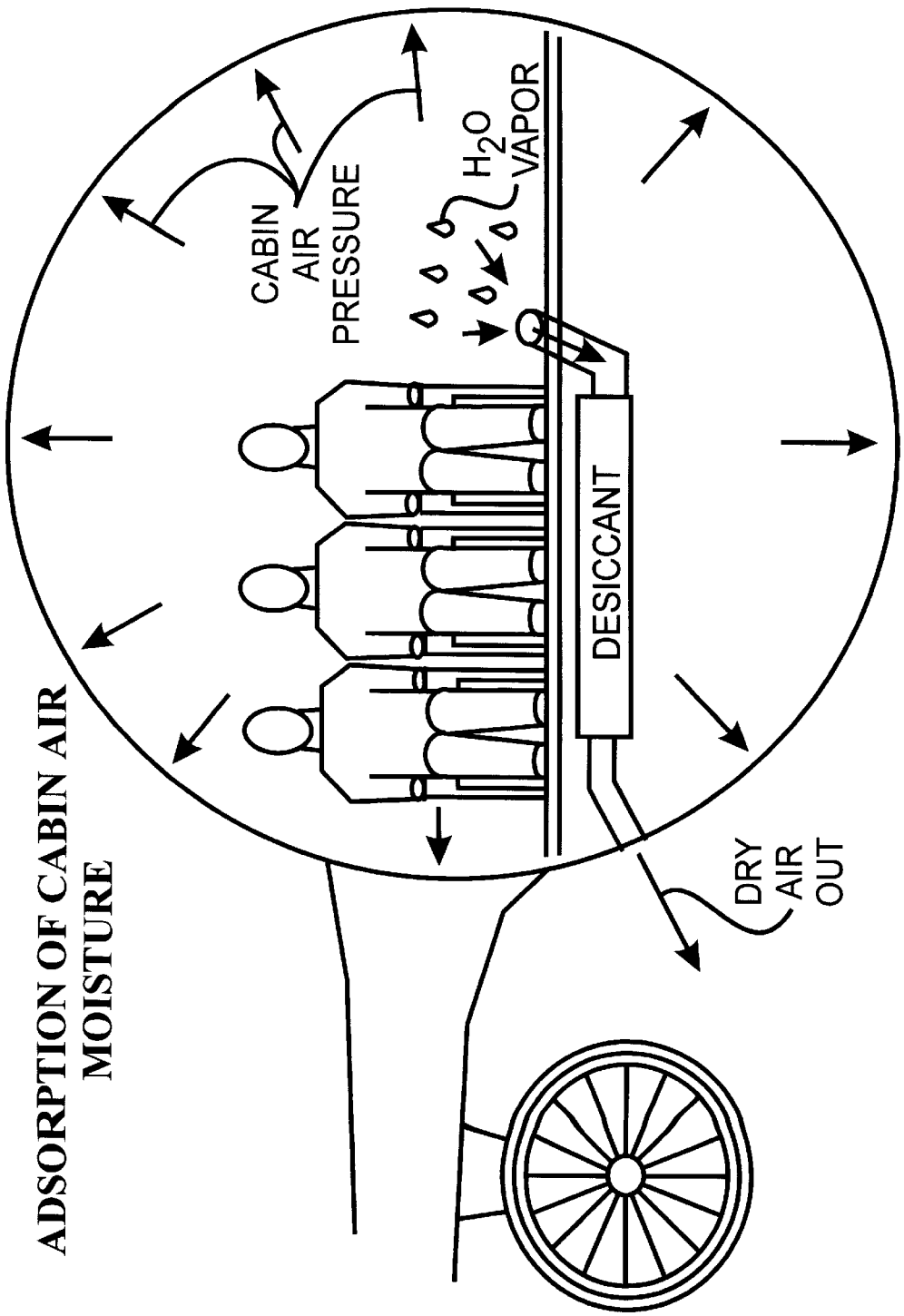
FIG. 33 is a diagram showing the adsorption of moisture by a desiccant canister from stale cabin air before the air is released into the atmosphere.

FIG. 33 is a diagram showing the adsorption of moisture by a desiccant canister from old cabin air before the air is released into the atmosphere. The moisture given off by the occupants of the cabin evaporates in to the cabin air and passes through a canister containing NOMEX honeycomb as the stale cabin air escapes from the cabin of the aircraft. As the moist stale cabin air passes through the desiccant coated material the moisture is adsorbed into the desiccant. The stale cabin air is allowed to exit the aircraft while the moisture remains in the desiccant material.

Figure 34:
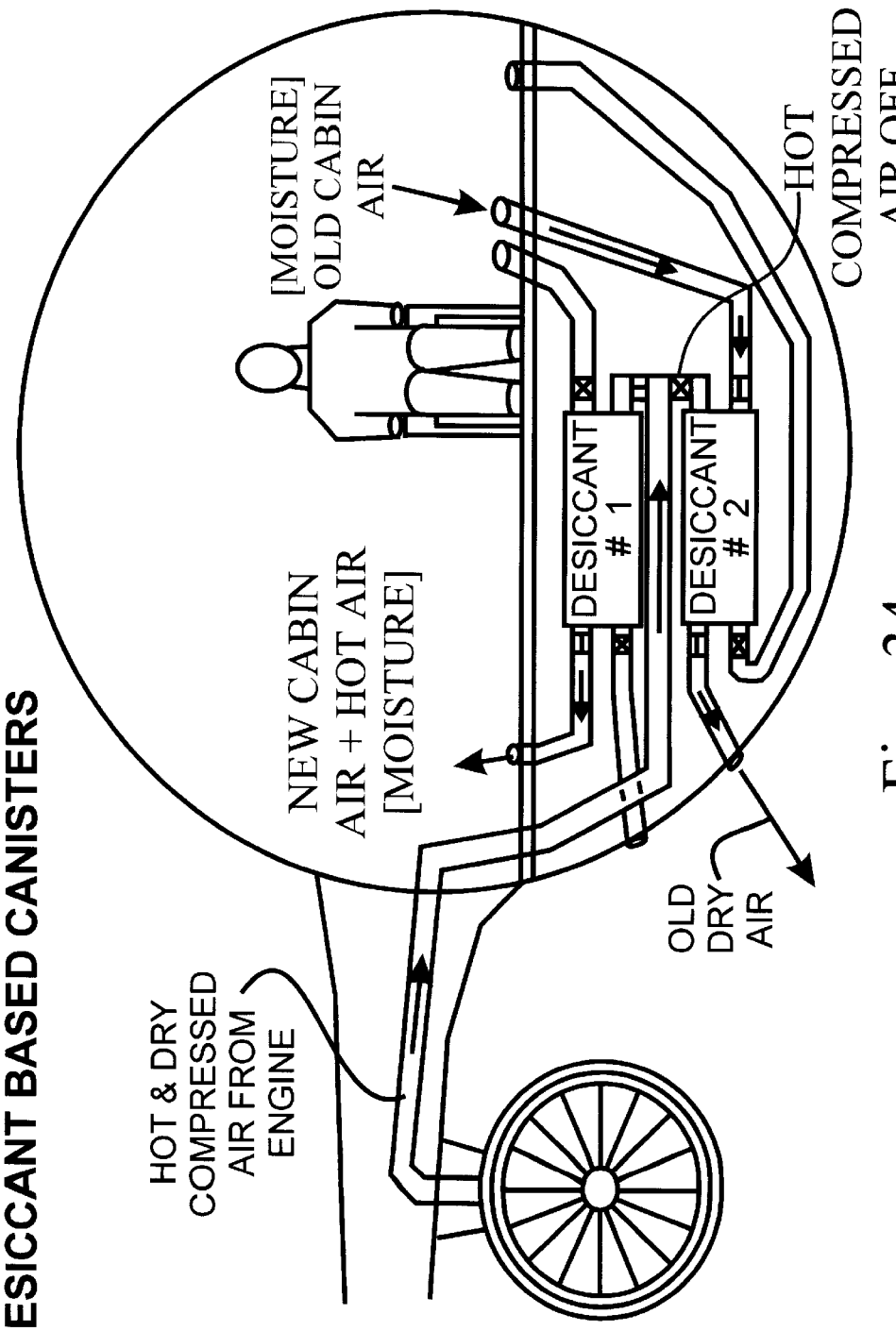
FIG. 34 is a schematic drawing showing a duel alternating desiccant canister process where one canister is in the adsorption cycle while the other is in the evaporation (regeneration) cycle.

FIG. 34 is a schematic drawing showing an embodiment of a duel alternating desiccant canister process where one canister is in the adsorption cycle while the other is in the evaporation cycle. In this drawing the two desiccant canisters are labeled DESC. #1. & DESC. #2. and each canister alternates through the process of adsorption and evaporation where one is in the adsorption cycle while the other is in the evaporation cycle. The arrows show the adsorption air flow as the old "stale" cabin air enters the vent pipe to the desiccant canister #2 where the old "stale" cabin air exits the canister through a vent pipe to a valve that when open allows the air to exit the aircraft. The other air flow starting with the hot compressed air which causes the moisture in the desiccant evaporate and thus produces the desiccant regeneration process where the hot compressed air from the engine compressor enters the desiccant canister #1 where it evaporated the moisture out of the desiccant into the hot air stream. The hot moist air then enters the cabin and in this way increases the relative humidity of the cabin as compared to the current method of allowing the moisture in the stale cabin air to exit the aircraft. The process reclaims the water vapor in the air and provides a method of reintroduction of the moisture back into the cabin. When the moisture contained in the hydrous desiccant material in DESC. #1 canister completes the evaporation cycle an becomes anhydrous and the desiccant in the other canister DESC #2 becomes saturated by adsorbing moisture out of the stale air stream the automatic control unit changes the valves to alter the air flow.

Figure 35:
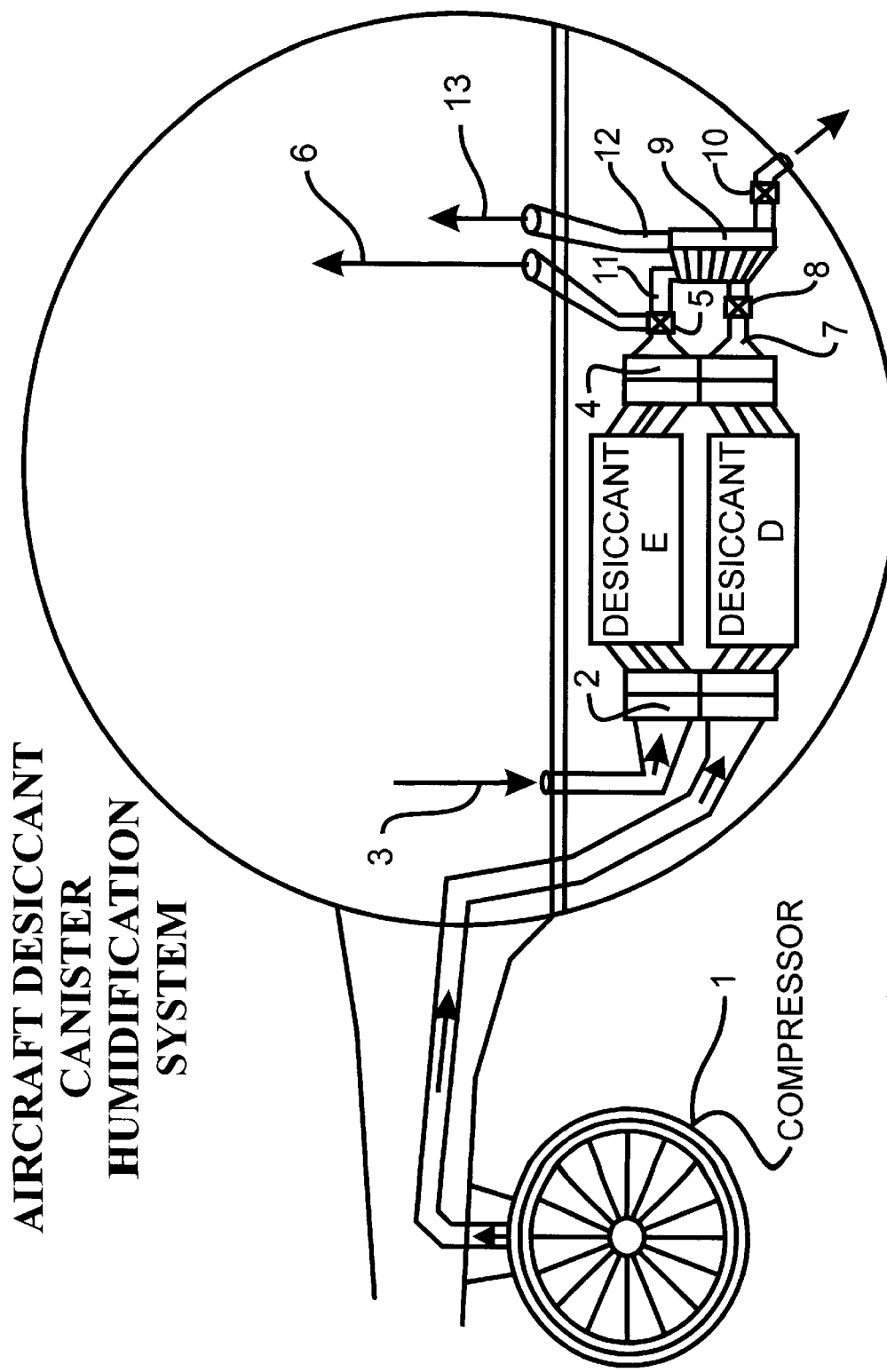
FIG. 35 is a schematic drawing showing a duel alternating desiccant canister process where one canister is in the adsorption cycle while the other is in the evaporation cycle included is the crossover valve and the fresh air cooling unit.

FIG. 35 is a schematic drawing showing a duel alternating desiccant canister process where one canister is in the adsorption cycle while the other is in the evaporation cycle included in this drawing are the duel crossover valves and the expansion air cooling unit. Item 1 represents the hot compressed fresh air from the turbine engine compressor entering the vent pipe directing the hot air stream to 2 the entry crossover valve which function is to switch the air flow from one desiccant canister labeled "E" to the other canister labeled "D" and also switch 3 the stale air flow to the opposite canister from the fresh hot air stream. The 2 entry crossover valve routes 1 the hot compressed fresh air to canister "E" while the 3 stale cabin air is routed to the other canister "D". The compressed hot fresh air from the engine performs the regeneration of the hydrous desiccant by evaporating the moisture previously adsorbed into the desiccant during it's adsorption cycle, resulting in an increase in the relative humidity for the fresh hot air stream going into the cabin. Item 3 represents the stale cabin air containing moisture entering the vent pipe leading to the 2 entry crossover valve that directs the moist air into the anhydrous desiccant canister beginning the adsorption cycle. The separated air flows in both the "D" & "E" canisters are toward 4 the exit crossover valve where 4 the exit crossover valve directs the dry stale air stream to 7 the vent pipe leading to 8 the pressure regulator valve. The pressure regulator valve 8 controls the pressure altitude of the cabin air and directs the air stream into the expansion unit cooler where the expansion of the air due to the reduction from the high cabin pressure to the low atmospheric pressure outside of the cabin resulting in a significant reduction in temperature. The air exits 9 the expansion unit cooler and passes through 10 the temperature regulator valve and exits the aircraft. The larger the opening in 10 the temperature regulator valve the more expansion takes place within the expansion unit and therefore causes a higher rate cooling effect. When 10 the temperature regulator valve opening is smaller less expansion occurs in the expansion unit resulting in less cooling in 9 the expansion unit and more cooling occurs as the air exits the temperature regulator valve as the air escapes into the atmosphere.

After the compressed hot fresh air from the engine is humidified during the evaporation cycle in the desiccant canister the air is directed by 4 the exit crossover valve toward 5 the fresh air temperature regulator valve where the air stream is either directed toward 6 the cabin or 11 the vent pipe to the 9 the expansion unit cooler, where the fresh moist hot air is cooled to regulate the cabin temperature. The control unit (not shown) regulates the opening an closing all the valves, this includes the activation of the crossover valves to perform change over of the desiccant canisters from the adsorption cycle to the evaporation cycle. The control unit through the use of temperature, pressure, and relative humidity sensors automatically controls the process by activating the various valves to regulate the cabin pressure, temperature, and relative humidity. Although this drawing only shows two canisters the apparatus may have several sets of canisters to level the air stream pressure so there is never a time when the air stream is restricted.

Figure 36:
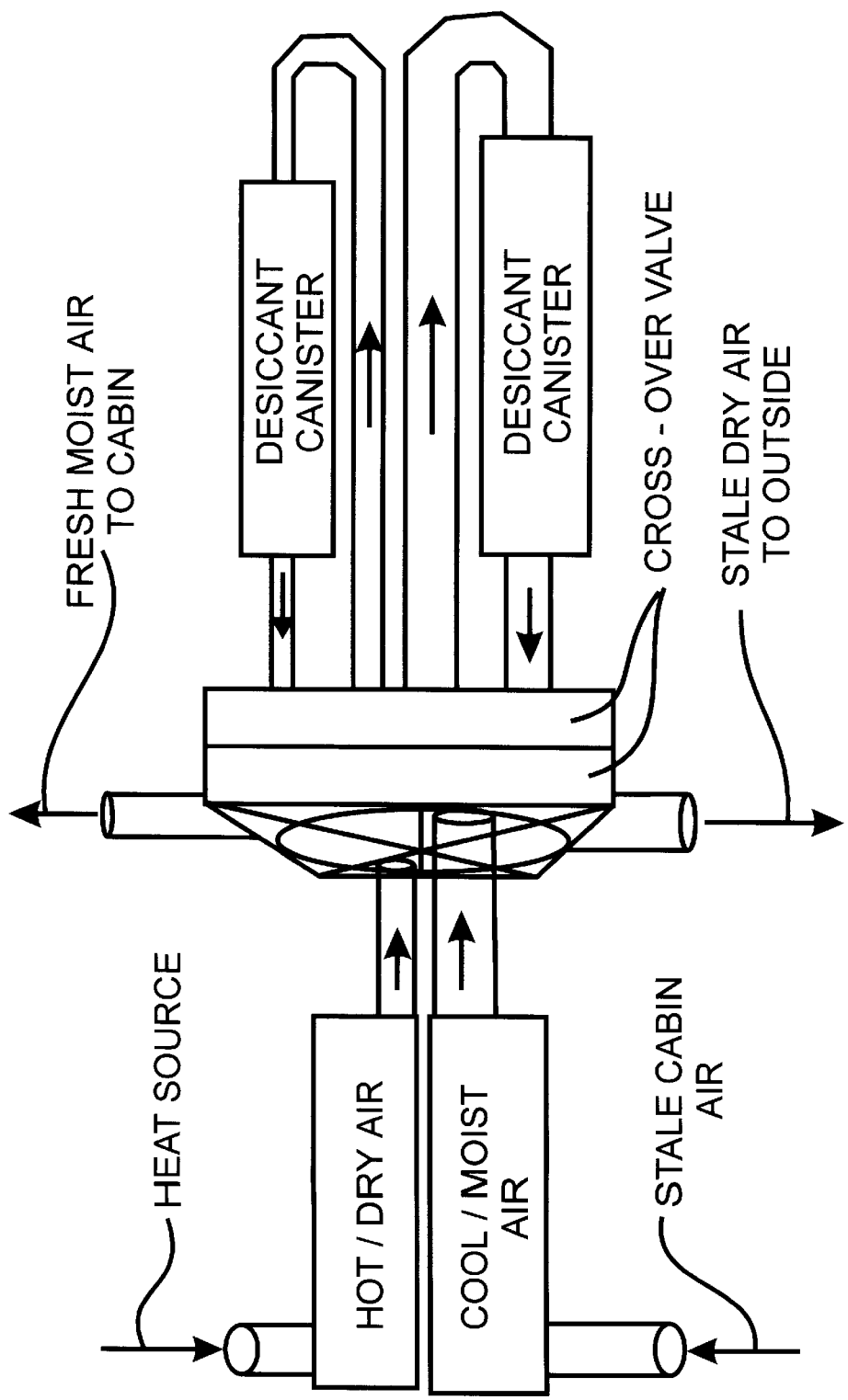
FIG. 36 is a block diagram of an aircraft canister desiccant process where a single crossover valve is utilized to alternate the air flow both into and out of the canisters.

FIG. 36 is a block diagram of an aircraft cabin desiccant process where a single crossover valve is utilized. The single crossover rotary valve is utilized to alternate the air flow to and from a duel desiccant canister system for the cabin humidification process. The valve consist of a cylinder within a cylinder with 8 (eight) to 16 (sixteen) connections to the valve to accommodate the inputs and out flows for the 8 connection configuration and 16 for the system with a flow pressure leveling feature. The 8 connection valve has connections to (1) heated fresh air from the engine compressor represented as hot/dry air, (2) stale cabin air represented as cool/moist air, (3) desiccant canister #1 input, (4) desiccant canister #1 outflow, (5) desiccant canister #2 input, (6) desiccant canister #2 outflow, (7) fresh moist air from the apparatus to the cabin, (8) stale dry cabin air exiting the aircraft. The 16 connection configuration has in addition to the 8 connections listed above an additional 8 connections to level the pressure during cycle switching to eliminate the sound and air pressure change when it switches from one desiccant canister to the other canister. The rotary crossover valve has a torque drive motor (not shown) used to rotate the valve.

Figure 37:
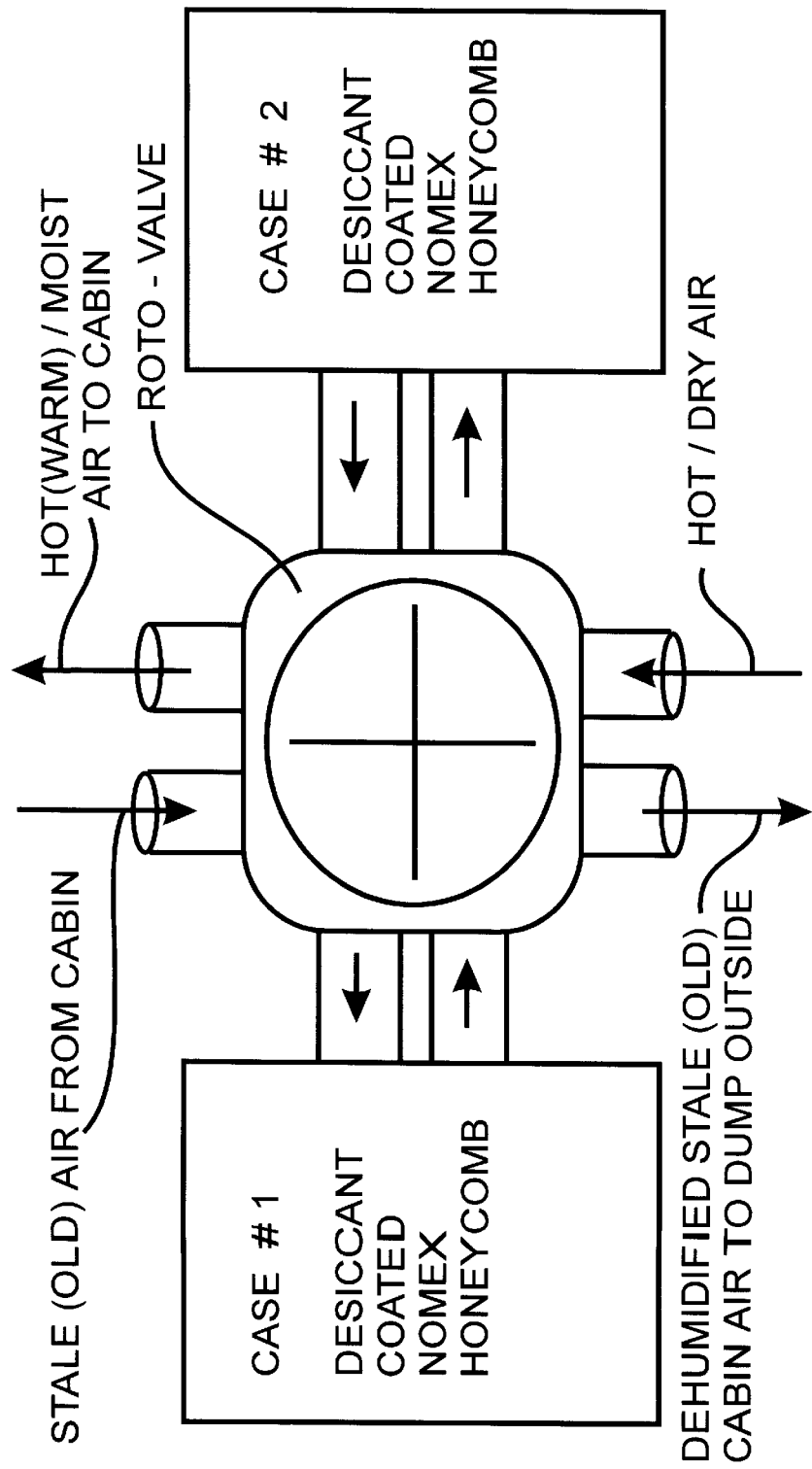
FIG. 37 is a block diagram showing the airflow through the rotary crossover valve.

FIG. 37 is a block diagram showing the airflow through the rotary crossover valve. The rotary crossover valve is shown connected to the same Items as listed in FIG. 36. In this diagram desiccant canister labeled CASE #1 is in the adsorption cycle and CASE #2 is in the evaporation cycle. When the automatic control unit determines that the desiccant in CASE #1 is saturated with moisture and CASE #2 has been regenerated from evaporation, the control unit exchanges the air flow into and out of CASE #1 with that of CASE #2. The rotation of the inner chamber of the valve makes the exchange of air flow connections take place. The rotation of the valve is activated by the automatic control unit and performed by the action of the rotary valve torque motor.

Figure 38:
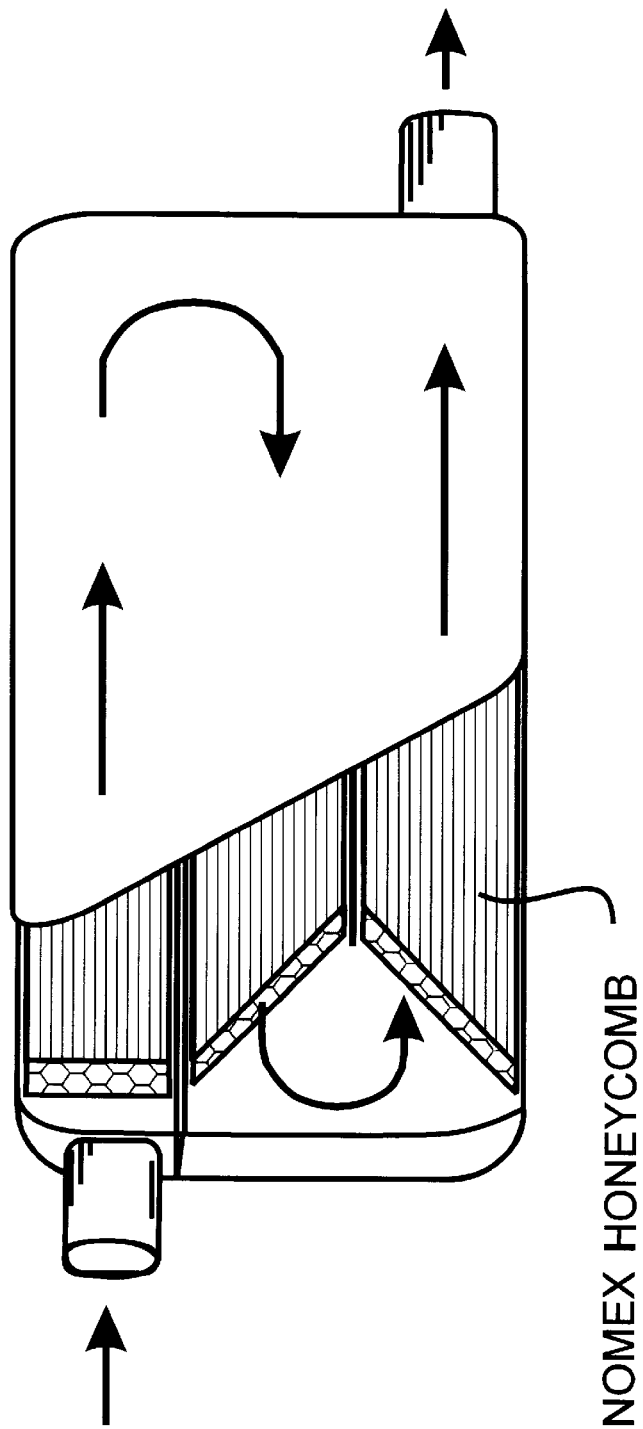
FIG. 38 is a cutaway drawing of a desiccant canister.

FIG. 38 is a cutaway drawing of a desiccant canister. The tube shape of the NOMEX honeycomb passage ways are oriented so that the air will flow through the desiccant coated honeycomb passing in the direction indicated by the arrows. Where the arrows indicate the air flow is making a 180° turn the honeycomb is cut on a 45° angle to allow the air stream to make the turn at the end of the canister. The canister can be formed in various shapes and sizes to accommodate the available space. They may be relative flat or in the shape of a box or non-symmetric shapes. Several separate canisters may be connected in tandem to male up a group operating together to perform a single cycle together or arranged to allow each set of canister to start or stop their cycle independently. They may have a case made of plastic (NYLON), formed sheet metal, or other material that will support the NOMEX honeycomb and contain the air flow. In some applications the canister must withstand an elevated temperature where metal or high temperature NYLON is necessary.

Figure 39:
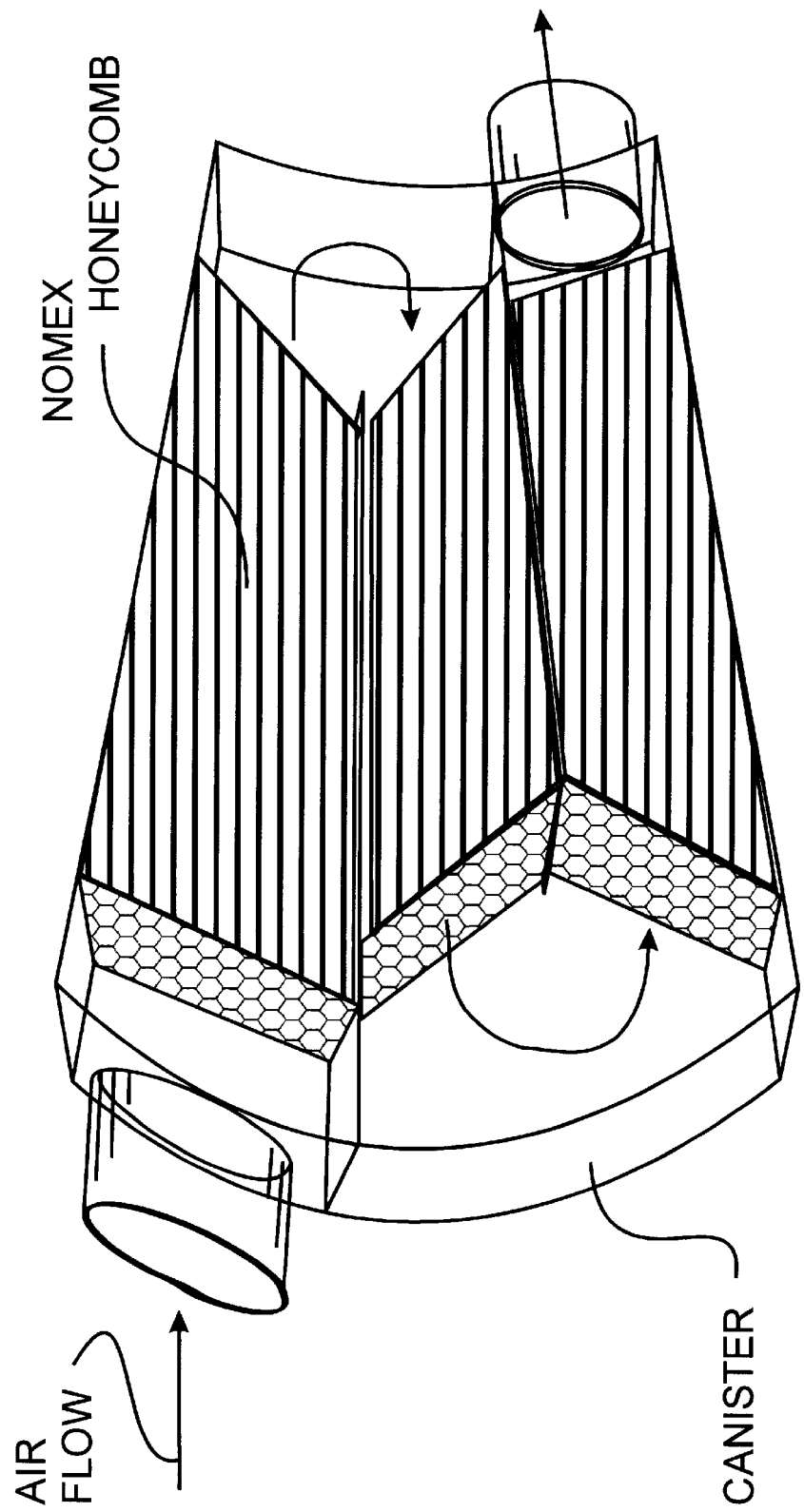
FIG. 39 is a cutaway drawing of a desiccant canister showing how the canister can be adapted to various shape and size requirements.

FIG. 39 is a cutaway drawing of a desiccant canister showing how the canister can be adapted to various shape requirements. The honeycomb can be cut to fit into a curved case designed to fit into the space between the rib and skin of an aircraft fuselage or other complex shaped areas. Although this drawing shows the air stream making several turns as it flows through the canister, some cases may not make a turn but simply pass straight through the canister.

Figure 40:
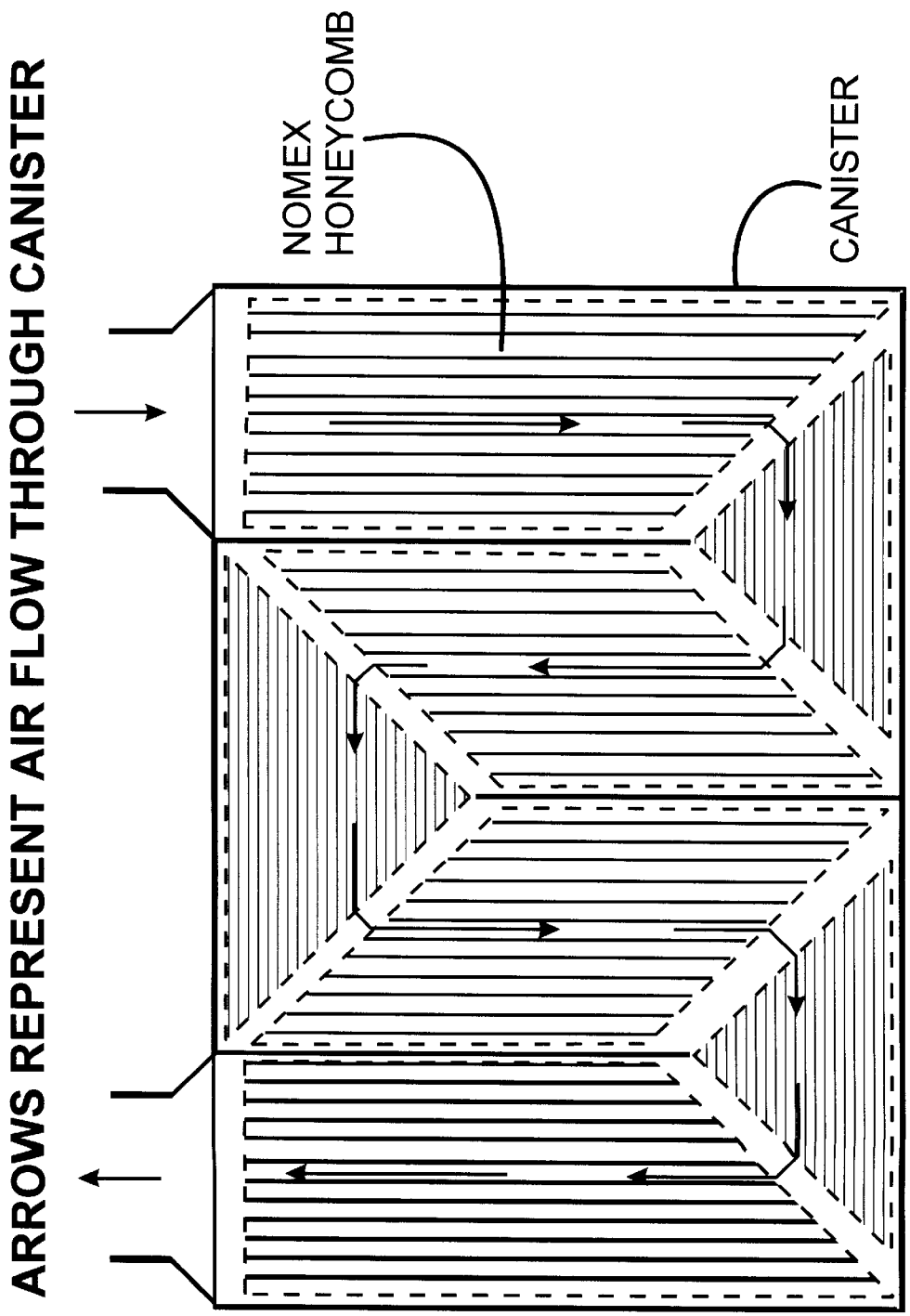
FIG. 40 is a cutaway drawing top view of the air flow, baffles, and honeycomb orientation in a desiccant canister.

FIG. 40 is a cutaway drawing top view of the air flow, baffles, and honeycomb orientation in a desiccant canister. The honeycomb is oriented and cut to provide an air flow through the canister with the tube shape cells (passage ways) of the honeycomb lined up in the direction of the arrows indicating the direction of the air flow. Where the air flow changes direction and makes the turn around the baffle the honeycomb is cut and a space is provided for the air to pass to the next section of honeycomb. The next section of honeycomb has a different direction of orientation for the tubes formed by the honeycomb that aligns with the desired air flow direction. The number of internal baffles and air direction changes may vary and the shape of the canister may vary to fit the vehicle space requirement and desiccant performance requirements. The case may be made from sheet metal, injection molded plastic, blow molded plastic or other materials.

FIG. 41A is a cutaway drawing of a desiccant canister that serves also as a crash force absorption panel in the event of an accident. The shape and size of the canister may vary to meet the space availability, crash impact absorption requirements, and desiccant performance requirements. The arrows labeled "A" represent the air flow into, through, and out of the canister. The honeycomb structure is oriented to allow the air to pass through in a direction that offers the greatest compression strength from the honeycomb structure during a crash. The arrows labeled "C" represent the direction of the crash force expected during an accident. The case may be made from sheet metal, injection molded plastic, blow molded plastic or other materials. A metal or plastic air flow diffuser consisting of a flat sheet of rigid material with numerous hole openings is positioned between the entry air opening and the honeycomb to aid in the even diffusion of air through the honeycomb (diffuser is not shown).

Figure 41B:
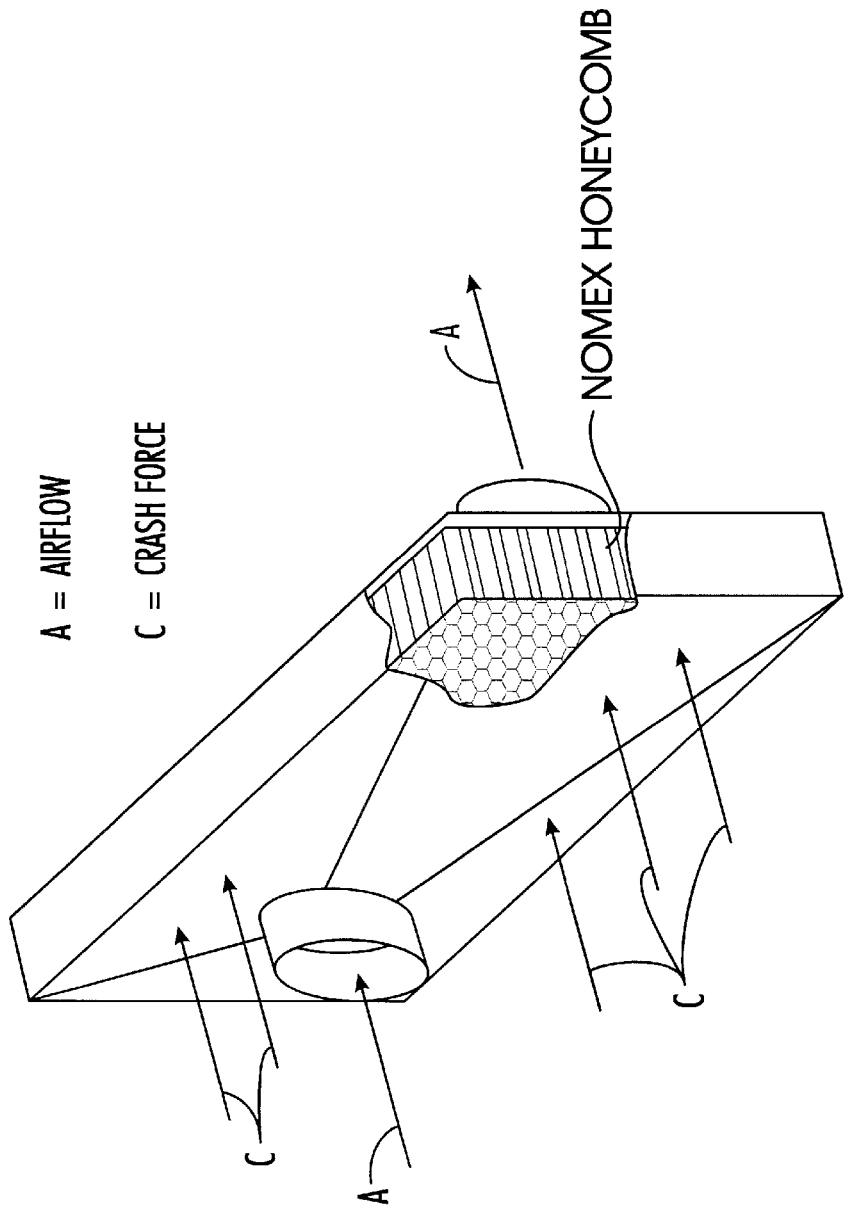
FIG. 41B is a cut away of a desiccant canister which also serves as a crash adsorption panel with an offset input and out flow opening.

FIG. 41B is similar to FIG. 41A with the input and out flow openings offset to aid in diffusion of air flow through the honeycomb.

Figure 42:
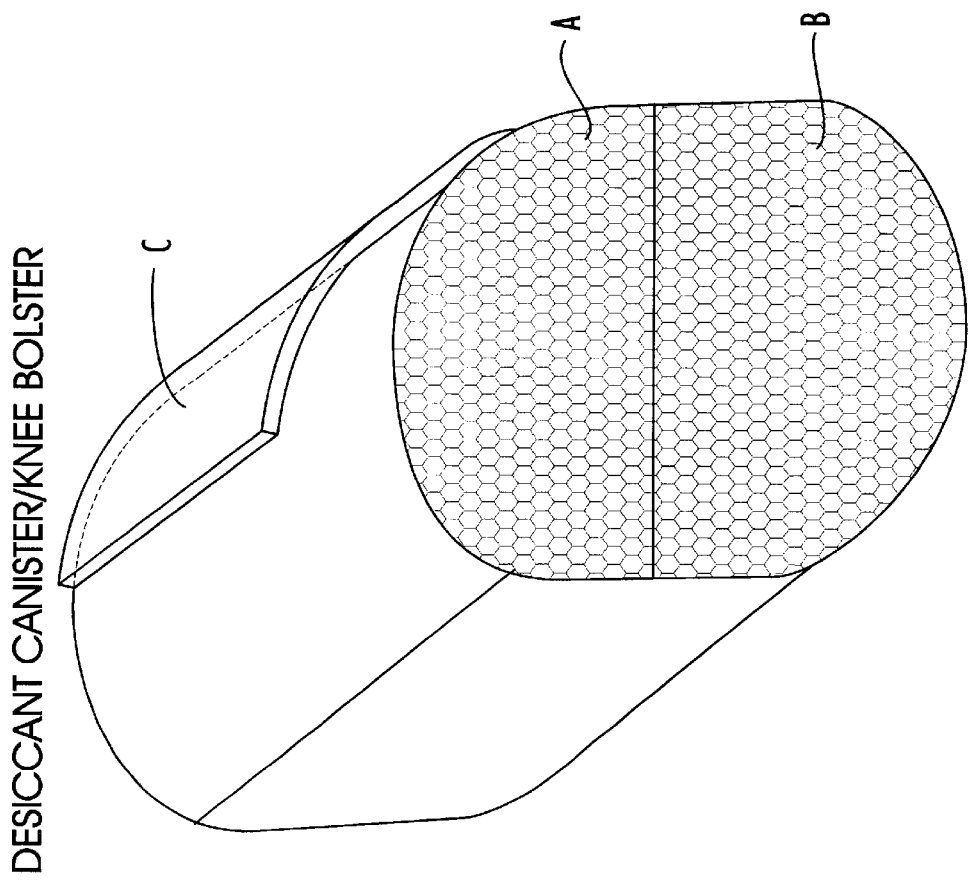
FIG. 42 is a drawing of a duel purpose desiccant canister with the end enclosure removed to show the two canisters filled with honeycomb which may be formed in various shaped to serve as a knee bolster for the front seat in the event the vehicle is in a crash.

FIG. 42 is a drawing of a pair of desiccant canisters connected together which also serve as a knee bolster for the front seat of a vehicle to offer crash impact protection to the passenger in the event of an accident. Item "C" the insulation is shown partially removed. Item "A" & "B" represent a cut away view of the two canisters with the end caps removed. The air stream would pass straight through from one end to the other. The end caps (not shown) would connect to air vents and air valves to direct the alternating air streams for the adsorption and evaporation cycles. In this drawing the direction of the air passage ways formed by the honeycomb would be aligned with the long direction of the canister. In the event of an accident the crash impact would be so that the sides of the passage ways would be collapsed as opposed to the ends of the cylinders taking the crash impact load.

Figure 43:
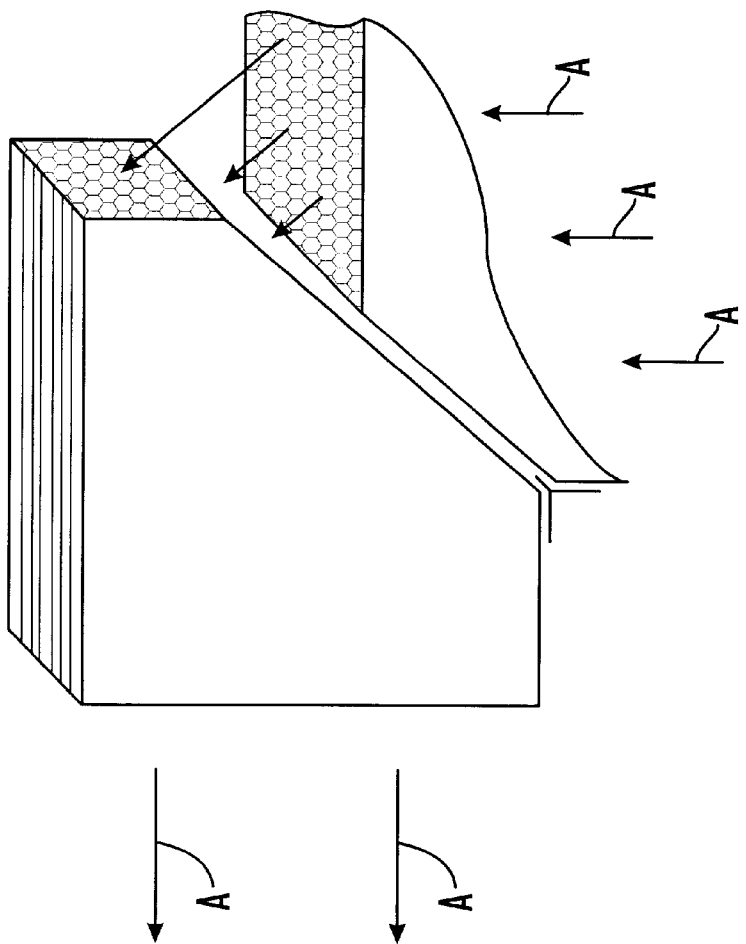
FIG. 43 is a drawing of a shaped NOMEX honeycomb showing the air flow through the tubes (passages) created by the honeycomb structure with an air space to allow a turn in air flow direction.

FIG. 43 is a drawing of a shaped NOMEX honeycomb inside of the canister showing the air flow through the tubes (passage ways) created by the honeycomb structure. The air flow direction through the desiccant coated NOMEX honeycomb is labeled "A". The space between the two sections of honeycomb allows the air flow to make the turn and in this way the various baffles may be incorporated into the case to facilitate effective air flow over the desiccant surface and enable the shape of the canister to vary to fit the space available.

Figure 44:
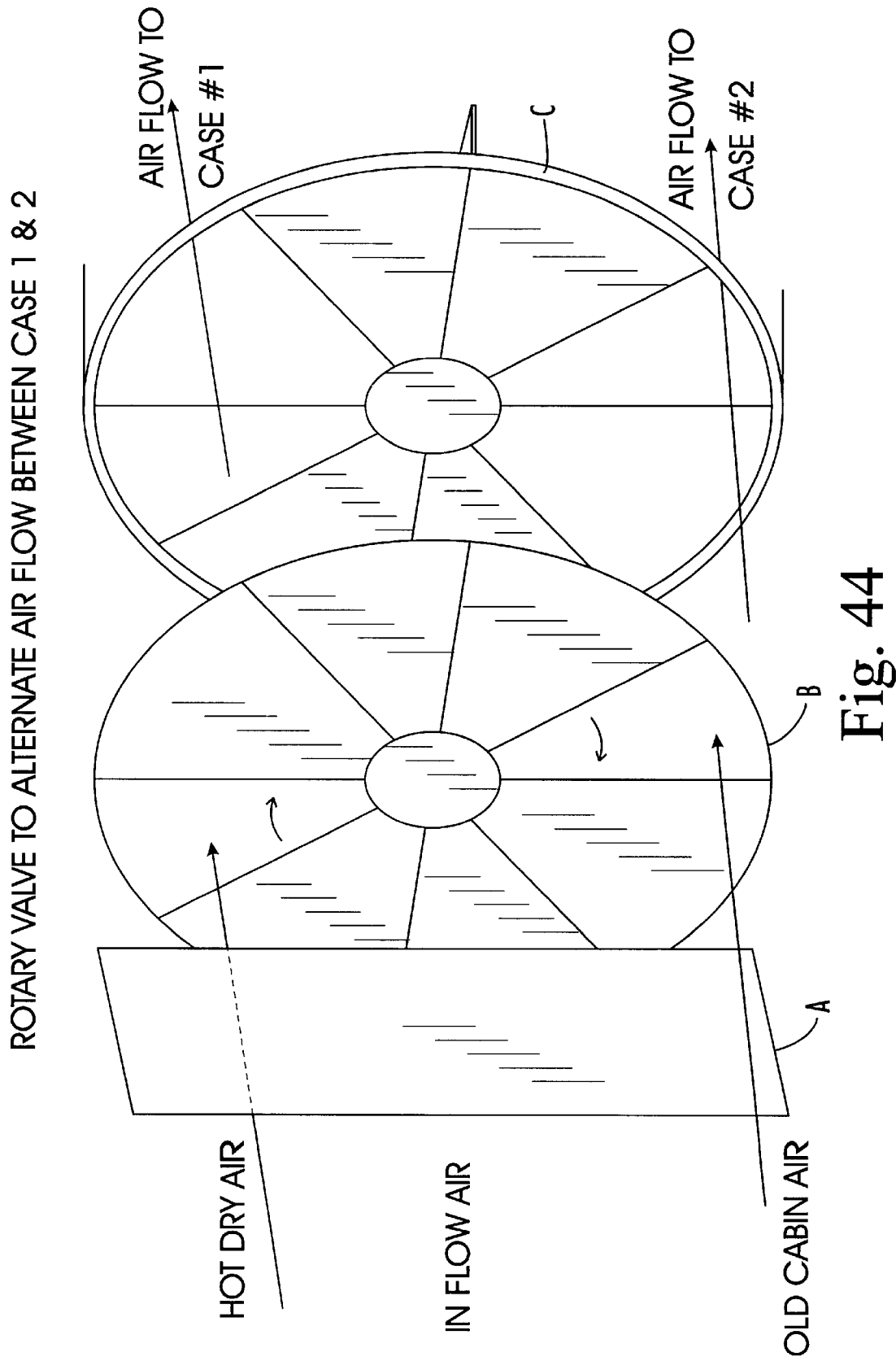
FIG. 44 is a drawing of a rotary crossover input valve.

FIG. 44 is an exploded view with the details parts shown separated to aid in explaining the function of a simple rotary crossover valve which functions as a component of the apparatus for regulating the (input) air flow into the canisters. The valve operates by rotation action driven by either electrical or pneumatic power (not shown) where it's function is to alternate the hot dry airflow and the stale "old" air containing the moisture from one desiccant canister to the other desiccant canister. Plate "B" rotates and plate "C" is fixed. The rotation direction arrows represent the first rotation action with 45° of movement. When the adsorption and evaporation cycle is completed the plate rotates back to the starting position. The valve continues to rotate in this back and forth action as long as the automatic controller determines that it needs to perform the process. The vertical divider "A" represents the separation of the hot dry air and the old "stale" cabin air. The horizontal divider aft of the fixed wheel "C" represents the separation of the air flowing to canister "case" #1 and canister "case" #2.

Figure 45:
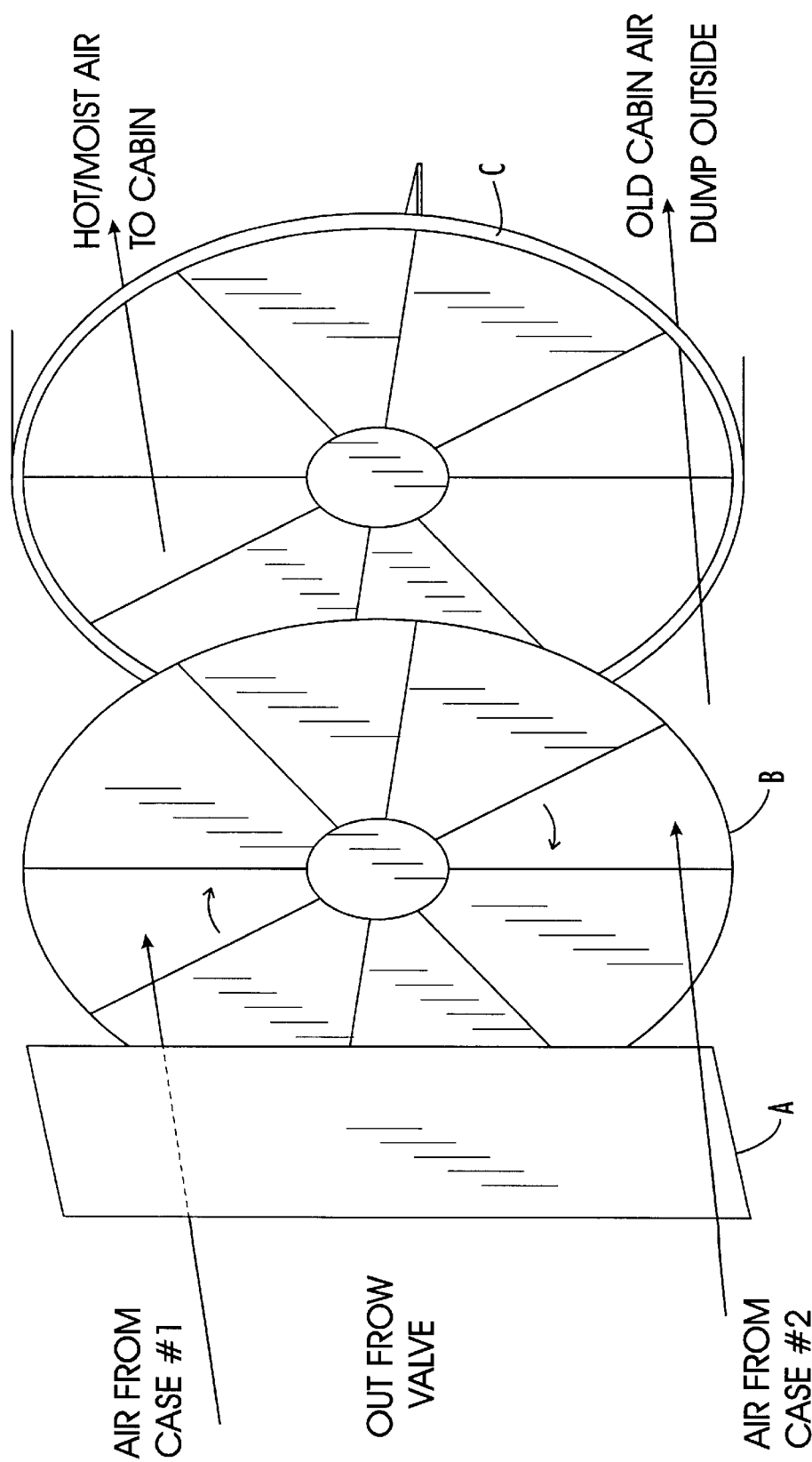
FIG. 45 is a drawing of a rotary crossover out flow valve.

FIG. 45 is an exploded view with the details shown separated to aid in explaining the function of a simple rotary crossover valve regulating the (output) air flow from the canisters of the apparatus. The function is similar to that described in FIG. 44 and works in unison with the input valve.

Figure 46:
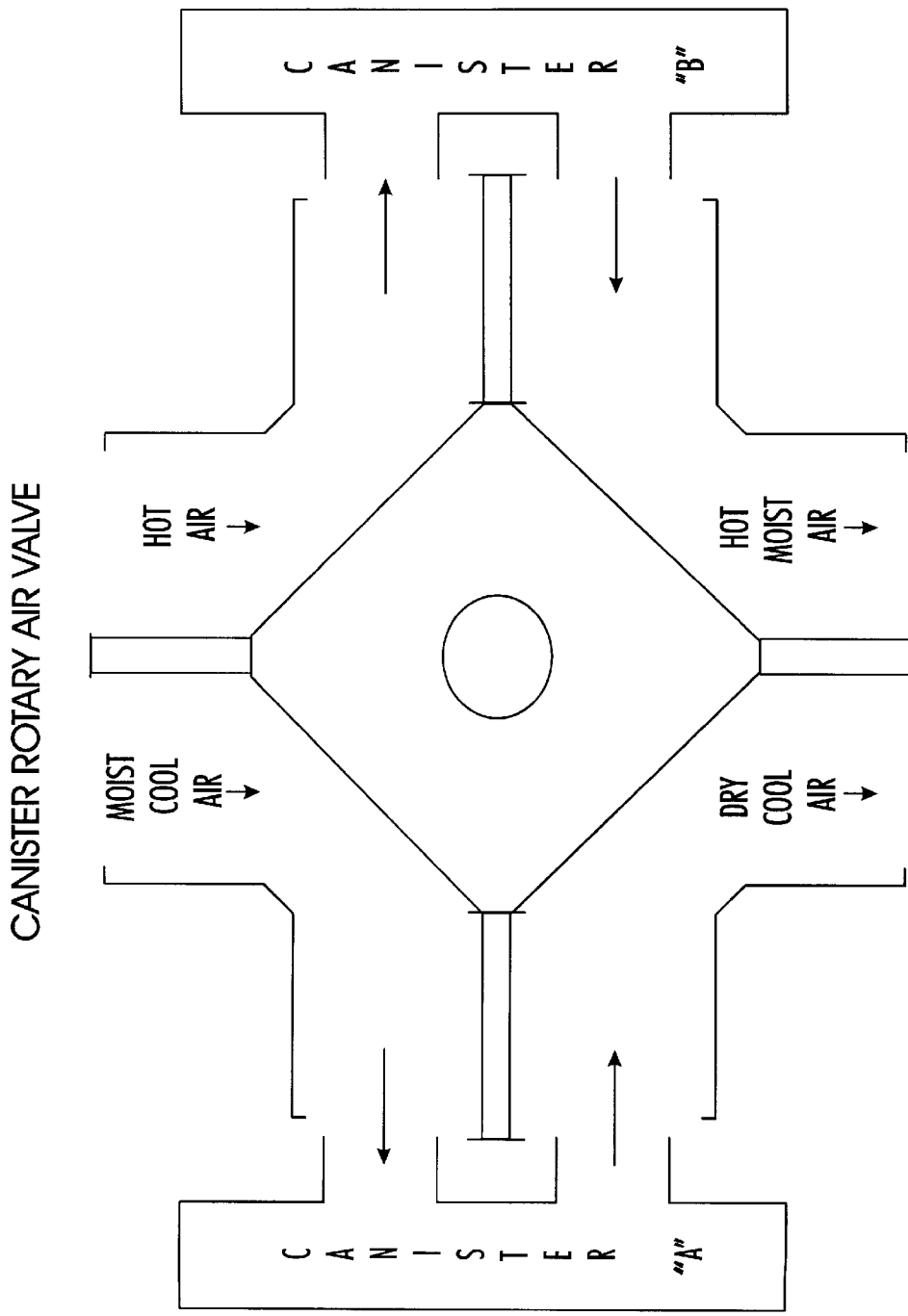
FIG. 46 is a block diagram showing the air flow of a single cycle of the rotary crossover valve.

FIG. 46 is a block diagram showing the air flow of a single cycle of the rotary crossover valve.

Figure 47:
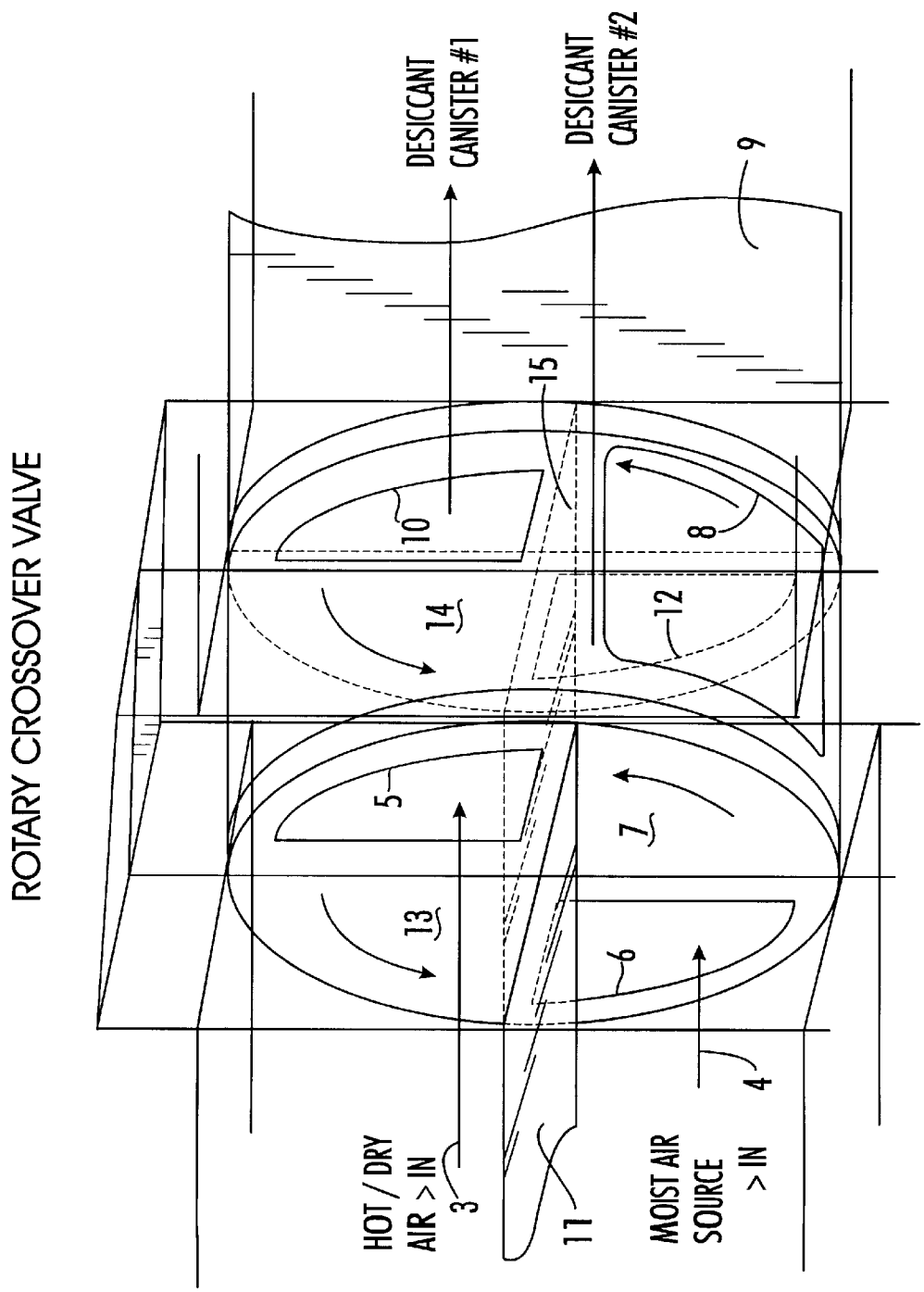
FIG. 47 is a drawing of the rotary crossover valve with (8) eight connections.

FIG. 47 is a drawing of the rotary complex crossover valve showing (4) four of the (8) eight connections for an eight connection valve and (1) one of the openings in the cylinder for the other (8) connections which are not shown. The valve is in the position of supplying 3 hot/dry air through the end opening in the cylinder 5 through which the air passes into the cylinder where the only other opening in the chamber is 10 that allows the air to flow to desiccant canister #1. The 15 horizontal plate in the cylinder along with a similar vertical plate Item 7 is the containment for the air flow through the cylinder limiting the air streams 3 & 4 each to ¼ of the volume or the cylinder. In the valve position shown the 4 moist air source (stale cabin air) enters 6 the opening in the cylinder through which the air passes to opening 12 in the other end of the cylinder. The air then flows out through opening 12 to the other desiccant canister #2. When the automatic control unit determines that the adsorption and evaporation cycle are complete it activates the rotary power to rotate the valve cylinder 90° causing the air flow to each of the desiccant canisters to change from one desiccant canister to the other desiccant canister. Item 13 is the input side plate with an opening 5 at the top and opening 6 at the bottom and 14 is the other cylinder end plate also with openings 10 & 12. Item 8 is a side opening in the cylinder wall which is part of the valve system for the other (4) four connections to regulate the air flowing out of the canisters. The second side wall opening (not shown) is opposite the Item 8 opening. The rotary valves are a method of alternating the air flow into and out of the desiccant canisters and may be substituted by other components such as slide valves, gate valves or other inventive methods to alternate the air flow.

Figure 48:
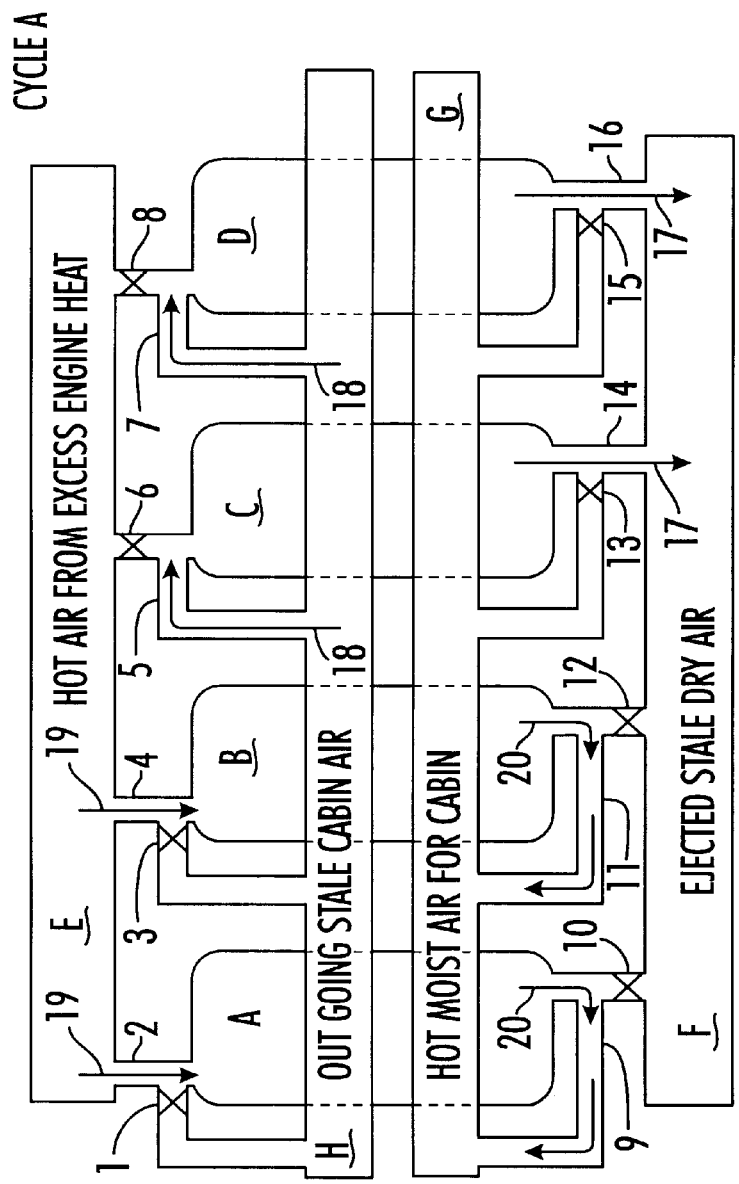
FIG. 48 is a schematic drawing of a multi canister desiccant system to provide uninterrupted air flow, while the valves for two canisters change over, the other two canisters continue to flow uninterrupted.

FIG. 48 is a schematic drawing of a multi canister desiccant system. Desiccant canisters "A" & "B" are in the evaporation cycle where 19 hot fresh air passes through valves 2 & 4 to enter the desiccant canisters to evaporate the moisture out of the desiccant material coated on the NOMEX honeycomb. Item 20 is the hot moist air after the moisture has evaporated into the air stream. The hot moist air exits the canisters through valves 9 & 11 to enter the cabin. The stale cabin air 18 exits the cabin through valves 5 & 7 and enters desiccant canisters "C" & "D" where the moisture is adsorbed into the desiccant coated NOMEX honeycomb after which the dry stale air 17 exits the canisters through valves 14 & 16. The valves may be either slide opening valves, damper type, rotary crossover or other remotely controlled valves that are activated by an automatic control unit. The "A" cycle is shown in the drawing. When the control unit alternates to the "B" cycle the valves change the air flow to cause the "A & "B" desiccant canister to begin the adsorption process by opening valves 1, 3, 10, and 12; and closing valves 2, 4, 9, and 11. The control unit also changes canisters "C" & "D" over to the evaporation process by opening valves 6, 8, 13, and 15; and closing valves 5, 7, 14, and 16. Although this schematic drawing shows an aircraft cabin humidification apparatus, the multiple desiccant canister method can be used to dehumidify, defog/defrost, and increase the efficiency of the cabin air-conditioning.

Figure 49:
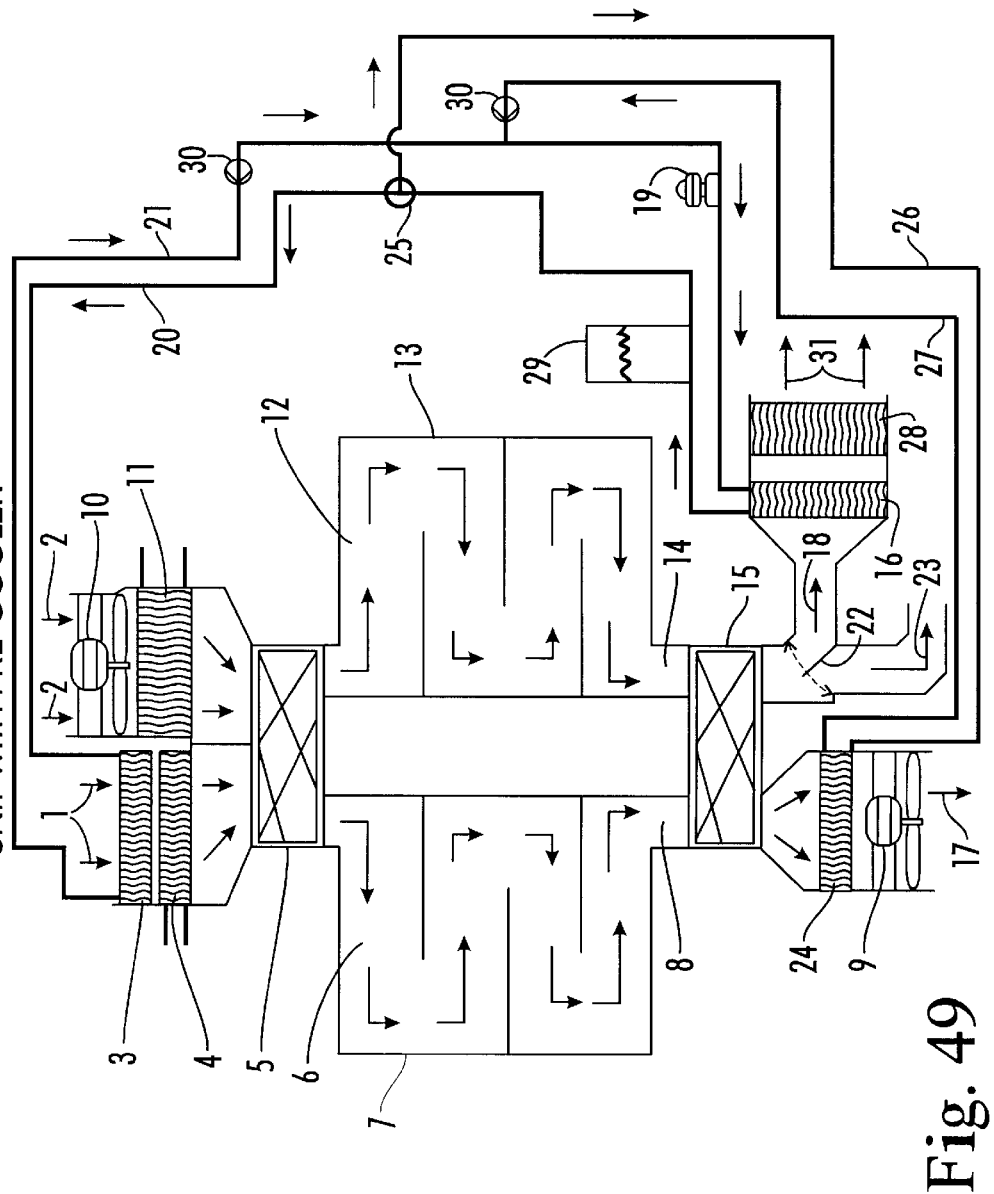
FIG. 49 is a schematic view of a duel canister, duel rotary crossover valve cabin desiccant apparatus for a non-pressurized vehicle utilizing after process cooler & air-conditioner coils to further condition the air going to the cabin which will humidify, dehumidify the cabin air and defrost/defog the windshield.

FIG. 49 is a schematic view of a duel canister full function desiccant apparatus for preferably a non-pressurized aircraft cabin or surface vehicle showing one alternative of the inventive method utilizing duel crossover valves to humidify and/or dehumidify the cabin and defog/defrost the windshield and/or increase the air-conditioner cooling efficiency. Item 1 is the air supply used to either provide the moisture for humidification from which moisture is adsorbed into the desiccant material or provides the hot air stream into which the moisture evaporates from the desiccant material during the dehumidification mode. The Item 1 air stream exits the apparatus into atmosphere after it performs it's intended function. Item 1 may be stale cabin air when the cabin is receiving fresh air from atmosphere and the apparatus is in the cabin humidification mode with the stale cabin air having a higher relative humidity than the outside air. Item 2 is either an outside fresh air supply going to the cabin or recirculated cabin air supply which will go into the cabin to perform the necessary humidification or dehumidification of the cabin air; or defrost/defog the windshield glass by evaporating the condensation from the windshield and lowering the relative humidity of the impinging air stream on the inside of the glass. PRE-COOLER FUNCTION: Item 16 is a heat exchanger that works in conjunction with heat exchanger 3 or 24 to regulate the temperature of 18 the air stream to the cabin as it passes through 16 the heat exchanger coils. Item 28 is the air-conditioner cold evaporator coil to cool 18 the air stream from the humidification process. Item 31 is the conditioned air going into the cabin. The automatic control unit regulates 31 the air stream entering the cabin from the apparatus to maintain the cabin air mass levels with respect to relative humidity, temperature, and rate of air flow (CFM) by monitoring the sensors connected to the control unit (not shown) comparing these readings to the desired results and then activating the components of the apparatus to obtain the desired results. The pre-cooler 16 changes the temperature of the air going to the cabin when the coolant fluid is circulated through the 16 pre-cooler heat exchanger and 3 or 24 the other heat exchanger which is heated or cooled by the flow of outside air across the coils.

When the automatic control unit sensors indicate that the temperature of the air going to the cabin needs to be changed to increase or decrease the cabin temperature to meet the desired cabin temperature, and the temperature of the outside air is closer to the desired temperature than 18 the air stream going to the cabin, the control unit activates the coolant circulator pump 19, selects either Item 3 or 24 by activating Item 25 the coolant fluid selector valve in the direction of the desired heat exchanger and fan motor 9 to pull 1 air stream through the apparatus causing the air to passes through 3 the heat exchanger coils which changes the temperature of the coolant fluid after which the coolant fluid circulates back to the pre-cooler coils 16 where 10 the cabin fan is activated to forces the air stream 18 through the pre-cooler coils 16 and results in a change of the temperature of air stream 31 going into the cabin. The coolant fluid circulated between the two heat exchanger coils 3 & 16 or 24 & 16 by pump 19 through supply lines 20 or 26. Item 3 or 24 heat exchanger coils cool or heat the coolant fluid and the coils 16 increases or decreases the temperature of the air stream going to the cabin. When the automatic control unit sensors indicate that the temperature of the air stream passing over the heat exchanger coils 24 is closer to the desired cabin temperature than the temperature of the air passing over the coils of heat exchanger 3, the valve 25 changes the coolant flow from 20 the line to heat exchanger 3 and redirects the flow of coolant to 26 the line to heater exchanger 24. The check valves 30 in the return lines 21 and 27 are provided to prevent the coolant fluid from backing up in the lines. Item 29 is a coolant fluid reservoir with a filler cap and vent (not shown). DEHUMIDIFICATION/DEFOG MODE:

For dehumidification of the air going to the cabin to either reduce the relative humidity of the cabin air, increase the efficiency of the air-conditioner cooling unit, or defrost/defog the windshield, or any combination of the functions listed above, 1 the air stream must be heated to a temperature necessary for evaporation of the moisture previously adsorbed into the desiccant by 4 heat exchanger which is a high temperature heat exchanger and is supplied with heat from excess engine heat. When the automatic control unit sensors detect the need to lower the cabin relative humidity, lower the relative humidity of the air going to the air-conditioner cooling unit to increase the efficiency or defog/defrost the windshield the automatic control unit for the apparatus starts the dehumidification mode. During this mode the heat exchanger 4 raises the temperature of 1 the outside air to a level which will evaporate the moisture in the selected desiccant canister as the hot air stream passes over the surface of the desiccant and exits the apparatus to the atmosphere as hot humid air. The air flow of the outside air stream 1 is pulled through the apparatus by the air fan 9. The air fan 9 pulls the air 1 through 3 the per-cooler heat exchanger, then through 4 the high temperature heat exchanger where the air stream is heated to a high enough temperature to evaporate the moisture out of the desiccant, then the air stream passes through 5 the entry crossover valve, the air stream then alternately flows through one of the selected desiccant canisters 7 or 13 where the moisture previously adsorbed into the desiccant coated on the NOMEX honeycomb 6 or 12 is evaporated into the hot air stream to regenerate the desiccant and prepare the desiccant material for the next adsorption cycle. The air flow continues out of the canister and passes through 15 the exit crossover valve. The crossover valves 5 & 15 may be a rotary, slide, damper or another type of valve used to switch the air flow alternately between desiccant canisters. Next the air flows through the heat exchanger 24 as it is pulled through the outside fan 9 after which it exit the apparatus as 17 hot moist air. The other air stream is item 2 which is conditioned by the adsorption of it's moisture by the desiccant while passing through the selected canister of the apparatus during cabin dehumidification and is pulled into the apparatus by the cabin side fan 10 which then forces the air through the apparatus and into the cabin. The air stream 2 entering the apparatus may be either fresh outside air or recirculated cabin air. For the cabin dehumidification mode the heater exchanger 11 is not activated when the air passes through the heat exchanger to 5 the entry crossover valve. The air stream then enters one of the desiccant canisters 7 or 13 where the desiccant material coated on the honeycomb adsorbs the moisture out of the air going to the cabin. The dehumidified air exits the canister through the exit crossover valve 15 and flows to the defog valve 22 which directs the air stream either to 23 the defog/defrost vent for the windshield or to the cabin or to both the cabin and the defog vent 23. The air stream 18 from the crossover valve to air stream 31 going into the cabin first passes through 16 the pre-cooler where the air stream temperature may be increased or lowered and then through 28 the air-conditioner evaporator cooling coils where additional cooling may be performed. The air entering 28 the air-conditioner cooling coils from the desiccant canister has a reduced level of relative humidity resulting in a savings of cooling energy since less energy is required to cool dry air than is required to cool high humidity air of the same temperature. When the outside air is hot and humid, the air 31 exits the apparatus as cool dry air for occupant comfort in the cabin. The automatic control unit (not shown) may activate cabin air cooling by either or both of the coils 16 & 28 when the sensors determine if cooling is necessary and what level of cooling must be performed. The automatic control unit may activate the apparatus to only supply dehumidified air to the cabin to lower the cabin relative humidity without cooling the air stream and/or the control unit may supply dehumidified air to the windshield defrost vent 23 without cooling the air stream. The air stream 18 may also be heated by the heat exchanger 16. HUMIDIFICATION MODE: When cabin humidification is necessary to raise the relative humidity of the cabin air for the occupant's comfort the same sequence as described above is activated by the automatic control unit with the exception that the heat to 4 the high temperature heat exchanger is turned off causing the air flowing through the apparatus to remain at a low temperature which will allow the moisture from 1 the outside or stale cabin air flow to be adsorbed into the desiccant material and valve 25 changes the coolant flow going to heat exchanger 3 to heat exchanger 24. Item 2 the air going to the cabin will either have it's relative humidity increased or decreased as it passes through the apparatus before it enters the cabin. When the inventive apparatus is activated to reduce the cabin relative humidity, increase the air-conditioner efficiency, or defog/defrost the inside of the windshield glass the relative humidity of 2 the air stream going to the cabin will pass through one of the desiccant canisters which was previously regenerated (had the moisture evaporated out of the desiccant) causing the moisture in the air stream to be adsorbed into the desiccant material. The cabin fan 10 forces the air through the apparatus and then into the cabin. The arrows in the desiccant canisters 7 & 13 indicate the air flow through the NOMEX honeycomb 6 & 12 as it flows through the tubes (passage ways) formed by the honeycomb. The size and shape of the desiccant canisters may vary and the number of turns the air flow must make may also vary depending on the size, shape, and desiccant performance requirements. After the air stream passes through the desiccant and the moisture is removed by the adsorption of the desiccant the dry air with a low relative humidity then passes through 15 the exit crossover valve (a rotary or other type of valve) to alternate the flow from the canisters to the cabin. When canister 7 is in adsorption, canister 13 is in evaporation. Item 22 the defrost air flow valve directs the air to either 16 the pre-cooler and 28 the air-conditioner cooling coil and then into the cabin or 23 the vent to the windshield to defog the windshield or to both. The dehumidified air to defog the windshield glass may be heated before it is directed toward the inside surface of the glass. Another alternative to the action of the crossover valves and process air flow may include a different sequence of valve actions by the crossover valves where Item 1 the outside air stream may provide fresh air to the cabin when Item 1 passes through Items 3 & 4 into 5 the crossover valve then pass through either canister 7 or 13 into 15 the exit crossover valve which directs the air flow into the cabin as 31 or 23. Item 2 the stale cabin air would pass through the crossover valves so as to exit the apparatus 17 into the atmosphere.

Figure 50:
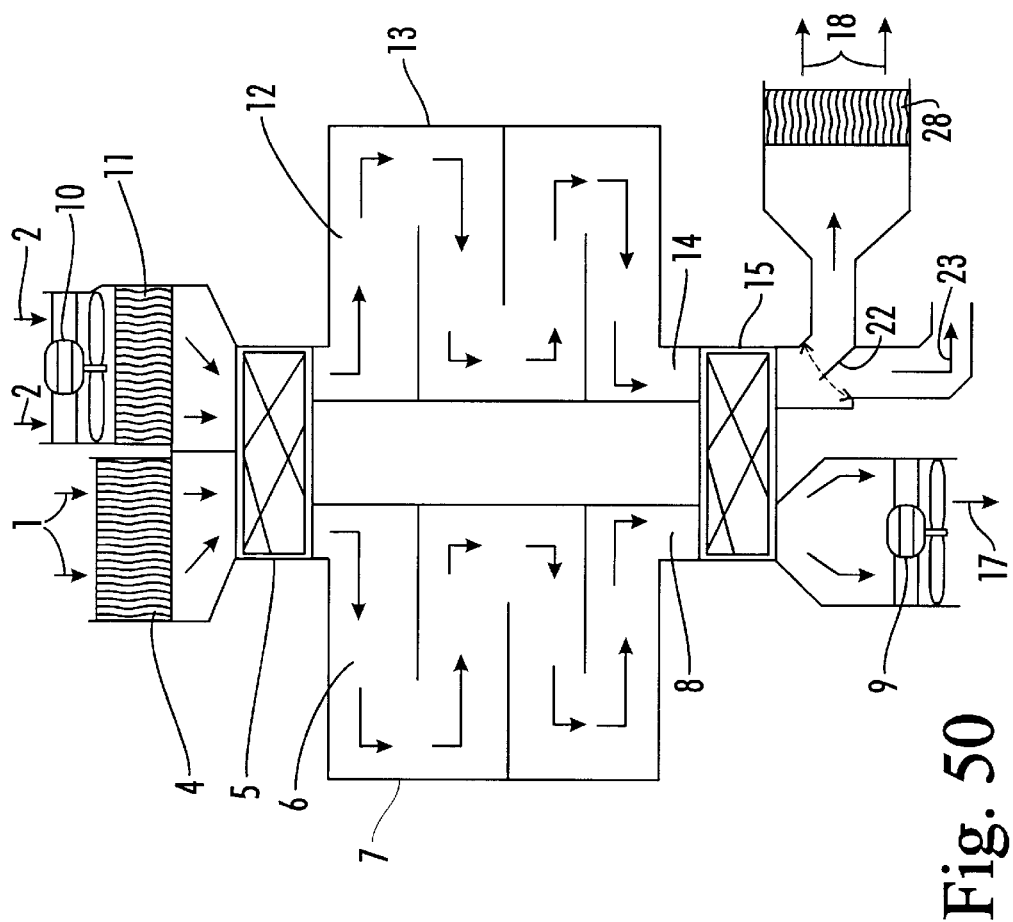
FIG. 50 is a schematic view of a duel canister desiccant apparatus for a non-pressurized cabin showing a configuration utilizing duel crossover valves to humidify, dehumidify the cabin and defog/defrost the windshield.

FIG. 50 is a schematic view of a duel canister, duel rotary crossover valve cabin desiccant apparatus utilizing the methods described in FIG. 49 with the exception that 16 the pre-cooler unit has been removed along with it's associated components.

Figure 51:
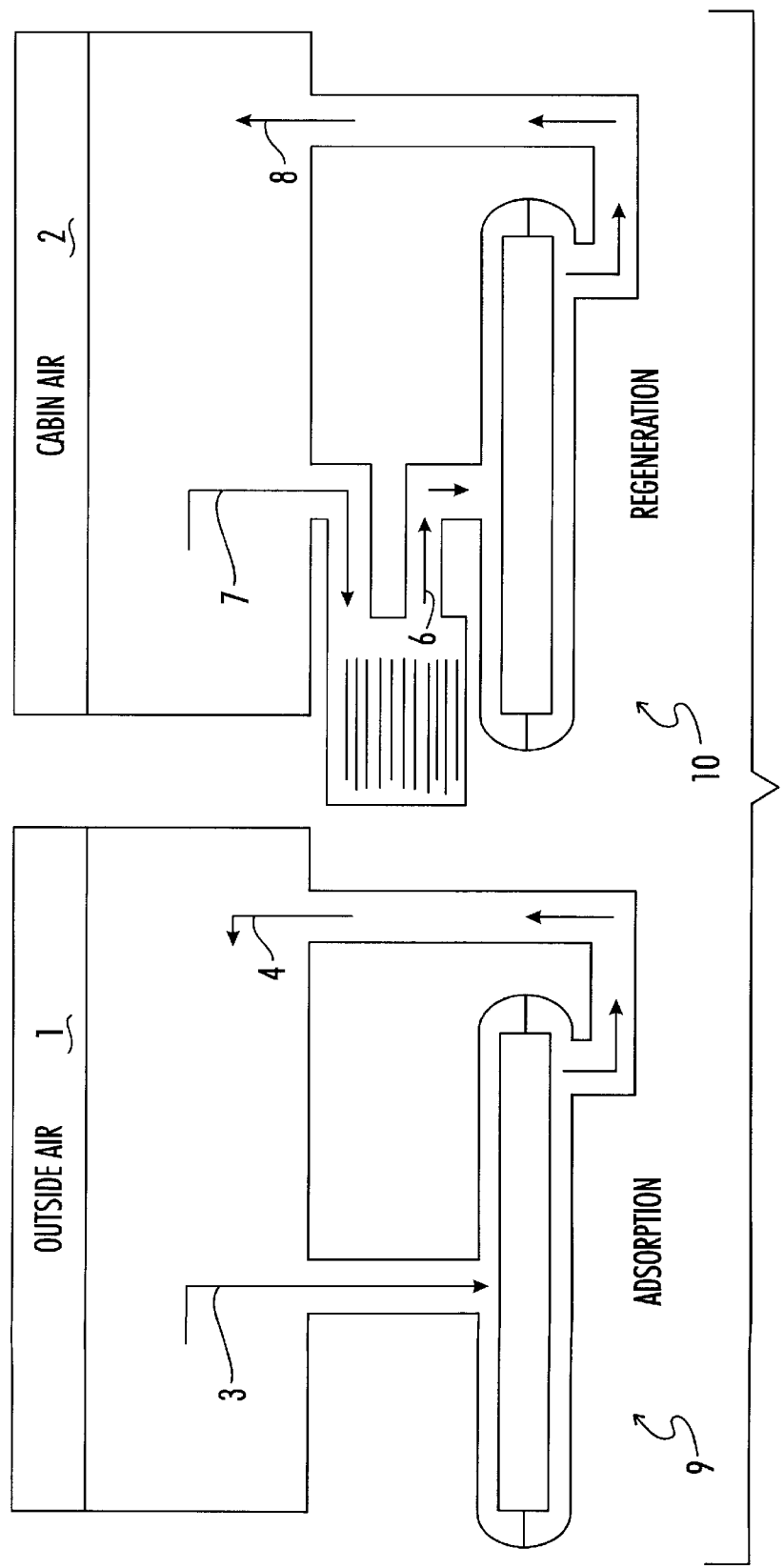
FIG. 51 is a diagram showing the adsorption and regeneration process used in the humidification of recycled cabin air.

FIG. 51 is a diagram showing the adsorption and regeneration process used in the humidification of recycled cabin air. Item 9 the diagram identified as the adsorption process involves the process of extracting moisture out of an outside air mass into the desiccant material. The arrows represent 3 the air flow from atmosphere to the desiccant material where the moisture (water vapor) in the air stream is adsorbed into the desiccant, after which the air exits the apparatus 4 back into the atmosphere leaving the moisture in the desiccant. As the adsorption process is in operation, 10 the regeneration process is also in operation. Item 7 the cabin air enters the apparatus as the arrows indicate and flows toward 6 the heat exchanger where the temperature of the air stream is increased to a level sufficient to cause the hydrous desiccant material to release the moisture into the air stream through evaporation. After the desiccant material releases the moisture into the air stream, the air returns to the cabin 8 as recirculated air with an increased relative humidity. By replacing the desiccant in the adsorption side 9 with the other desiccant material on the regenerative side 10 after the adsorption and regeneration are complete the processes can begin another cycle of adsorption and regeneration. The alternating replacement of the two desiccant canisters may be accomplished not by physically moving the canisters, but by the changing of the air streams through the use of various fans, valves, and air vent lines. The desiccant canister method differs from the desiccant wheel method in that the wheel method physically moves the desiccant from one location to another to alternate the air streams, where the canister method leaves the desiccant canister in a fixed location and the air streams are moved from one canister to another through the use of air valves and vent lines.

Figure 52:
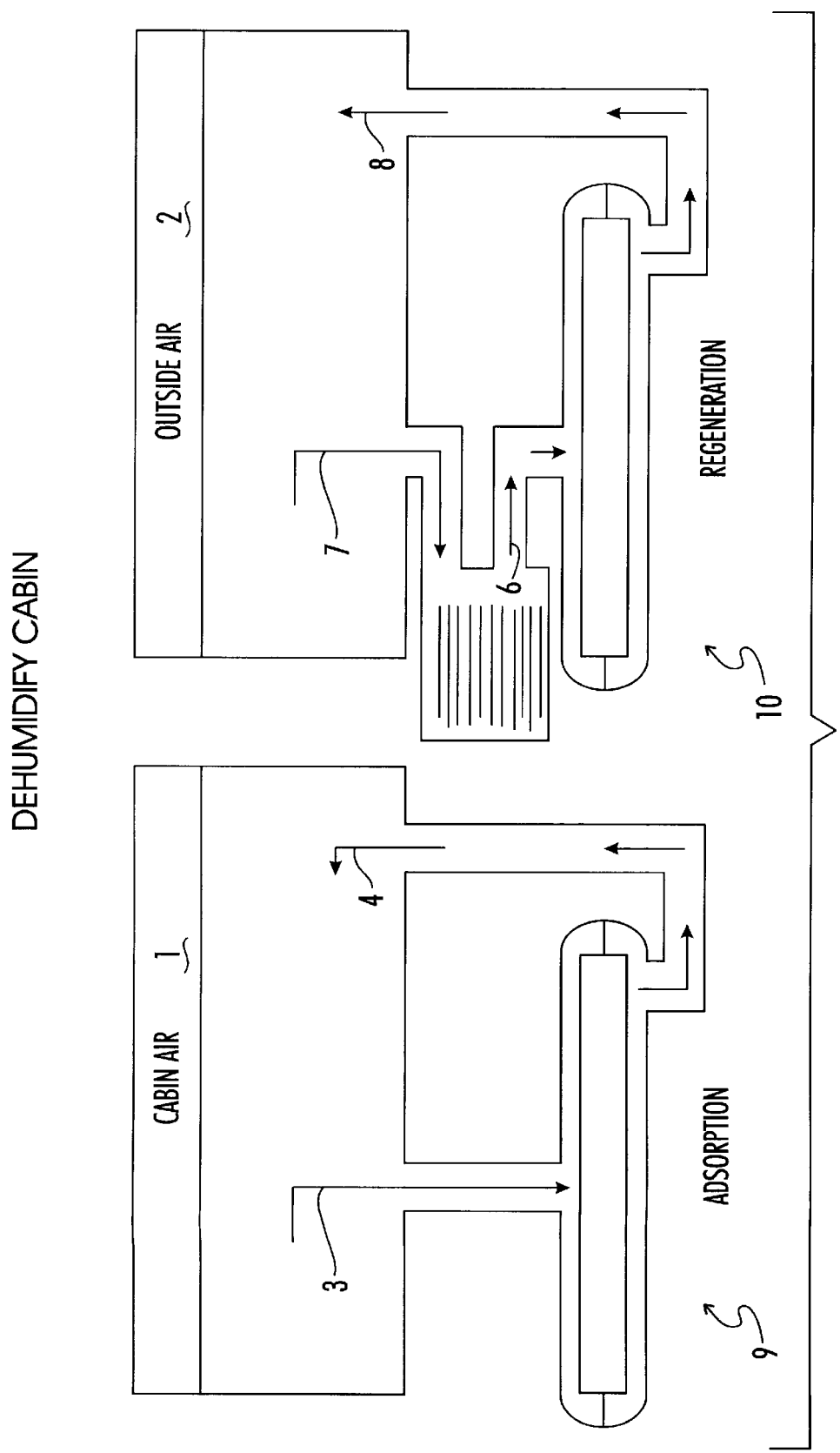
FIG. 52 is a diagram showing the adsorption and regeneration process used in the dehumidification of recycled cabin air.

FIG. 52 is a diagram showing the adsorption and regeneration process used in the dehumidification of recirculated cabin air. The cabin air flow is indicated by the arrows on 9 the adsorption side of the process where 3 the cabin air passes through the desiccant coated material and the moisture in the air stream is adsorbed into the desiccant material, after which the air exits the desiccant material while the moisture remains in the desiccant. The air, Item 4, returns to the cabin with a lower relative humidity. The section of the drawing showing 10 the regeneration process, takes in 7 outside air which passes into 6 the heat exchanger where the temperature of the air stream is increased to a level necessary to cause the moisture in the hydrous desiccant to evaporate out of the desiccant material into the hot air stream. The hot air and the moisture exit the apparatus 8 to atmosphere thus regenerating the desiccant material. By replacing the desiccant in the adsorption side 9 with the other desiccant material on the regenerative side 10 after the adsorption and regeneration are complete the processes can begin another cycle of adsorption and regeneration.

Figure 53:
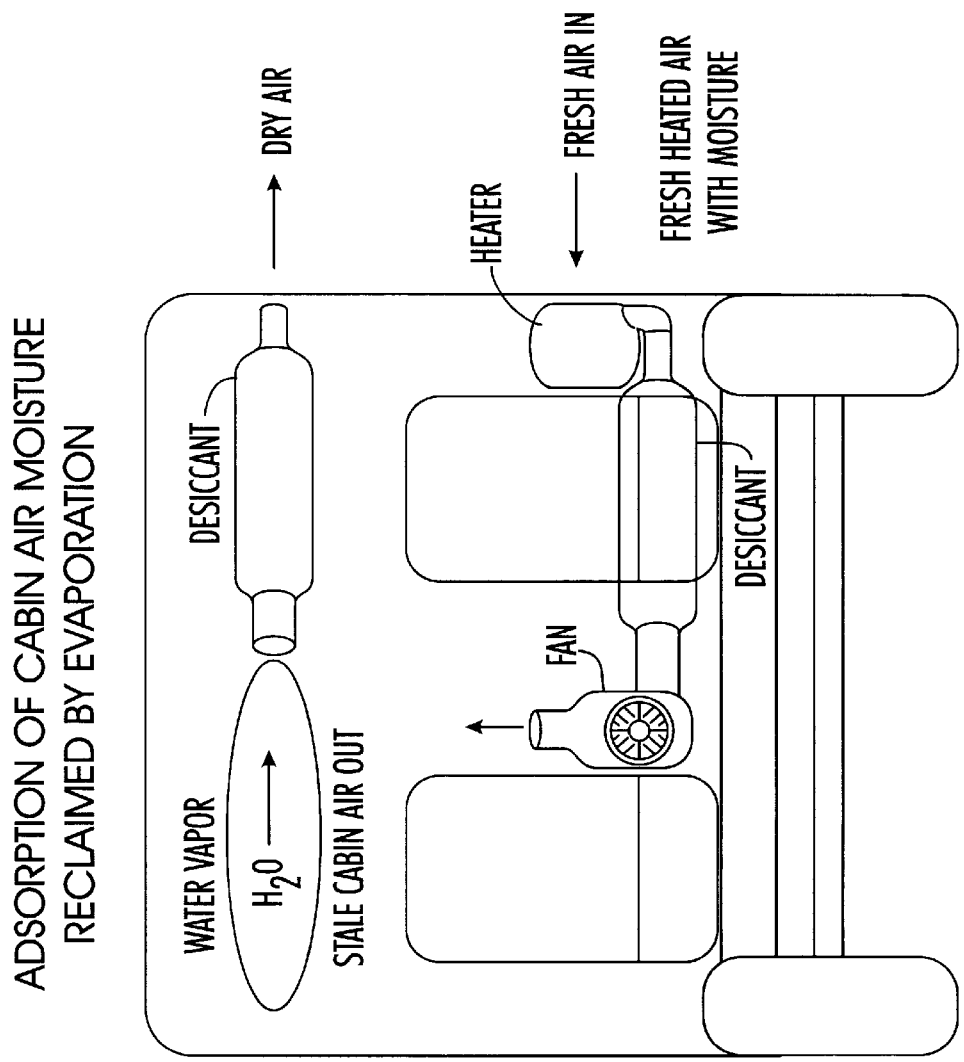
FIG. 53 is a diagram of a land vehicle showing the adsorption of cabin moisture into a desiccant material before the air is vented to the outside, and the evaporation of moisture out of the hydrous desiccant material through the use of an engine heater utilizing excess engine heat where the air is moved by an electrical fan.

FIG. 53 is a diagram of a land vehicle showing the adsorption of cabin moisture into a desiccant material before the air is vented to the outside, and the evaporation of moisture out of the hydrous desiccant material through the use of an engine heater utilizing excess engine heat where the air is moved by an electrical fan. The two desiccant canisters are shown separated and not connected by vent lines or valves only for the purpose of explanation. The top desiccant canister is shown with the stale air from the cabin passing through the desiccant canister where the moisture in the air ($H_2O$) in the form of water vapor is adsorbed into the desiccant, after which the air exits the vehicle leaving the moisture in the desiccant. The lower portion of the vehicle is shown with the evaporation desiccant canister connected to the fresh air from outside by the heater which is a heat exchanger using excess engine heat to raise the temperature of the air passing through the hydrous desiccant canister where the hot air causes the moisture in the desiccant material to evaporate into the air stream as it is pulled through the desiccant canister by a fan that forces the fresh heated moist air into the cabin. In an actual vehicle the desiccant canisters may be located next to each other and connected to various air streams by air vent lines and valves which are not shown. This drawing only shows one function of the inventive apparatus which would have multiple functions in an actual vehicle controlled automatically by the automatic control unit (not shown).

Figure 54:
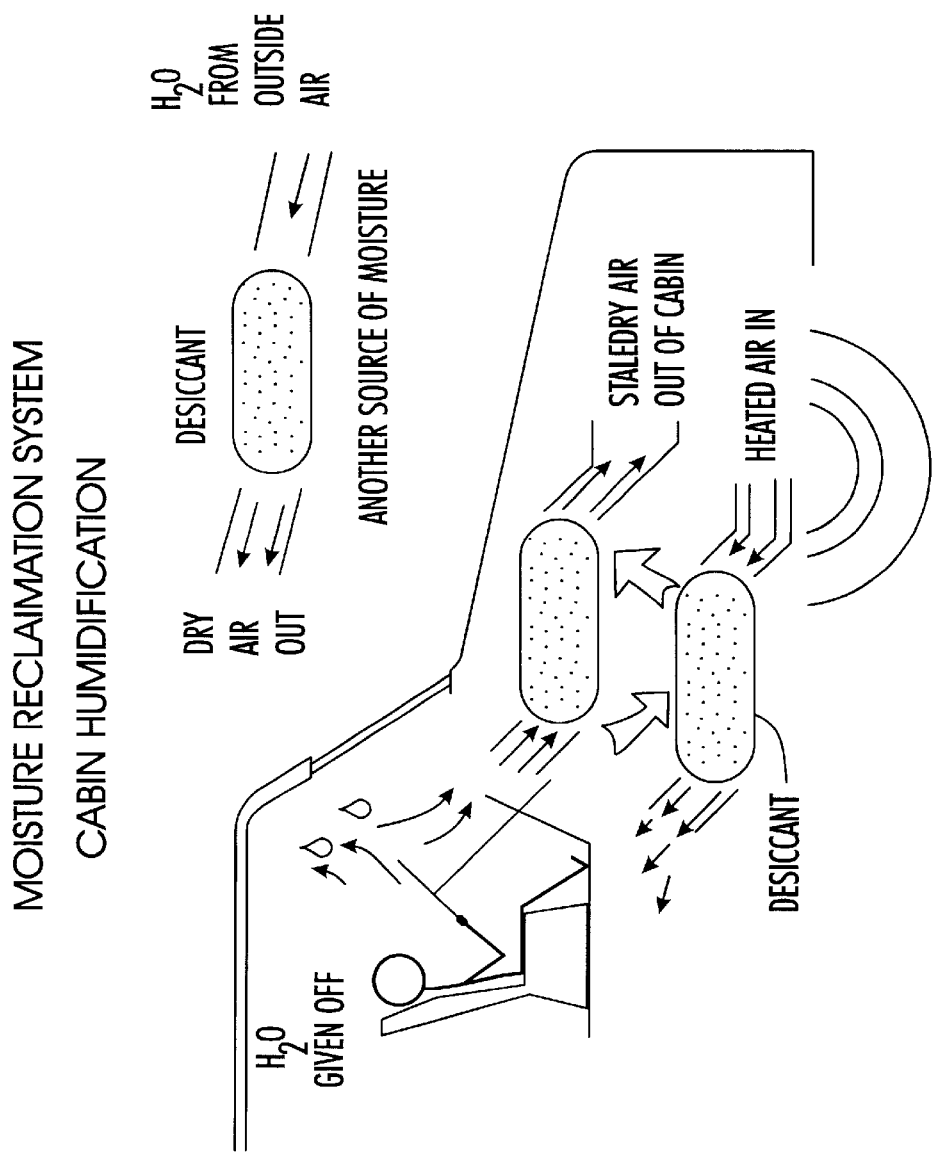
FIG. 54 is a diagram of a land vehicle showing the reclamation of moisture out of stale cabin air and the additional supply of moisture from outside air to humidify the fresh heated air stream entering the cabin.

FIG. 54 is a diagram of a land based motorized vehicle environmental control apparatus showing the reclamation of cabin air moisture before the stale cabin air exits the cabin and the additional supply of moisture from an outside air supply to in crease the relative humidity of the cabin air. The relative humidity of the cabin of the vehicle is in the humidification mode to provide comfort to the occupants. Some of the inventive methods are shown with the adsorption of moisture into an anhydrous desiccant material before the stale cabin air stream is vented to the outside, and heated fresh air is passing through a hydrous desiccant material where the heat of the air stream causes the moisture to evaporate into the air stream resulting in an increase of the cabin air relative humidity. The inset diagram in the upper right shows another source of moisture where a desiccant material is removing the moisture from an outside air stream. The canister adsorbing the outside air moisture will serve as a source of moisture for the cabin when the canister is in the regeneration cycle. The outside air stream passes through an anhydrous desiccant material where the moisture of the air stream is adsorbed into the desiccant material. After the moisture is adsorbed out of the air stream the air returns to atmosphere. When the desiccant material becomes saturated with moisture the air streams are altered so as to replace the saturated desiccant with another desiccant canister which is anhydrous from a previous regeneration cycle. The lower desiccant canister is shown in the process of regeneration with the heated air stream passing through the canister causing the moisture to evaporate. The air streams may continue to provide the same environmental conditioning over an extended period of time due to the alternation of the flow between different canisters. The fans, filters, air valves and control unit are not shown. The actual size, shape, and position of the desiccant canisters may also be configured to provide crash protection for the occupants in the event of an accident.

Figure 55:
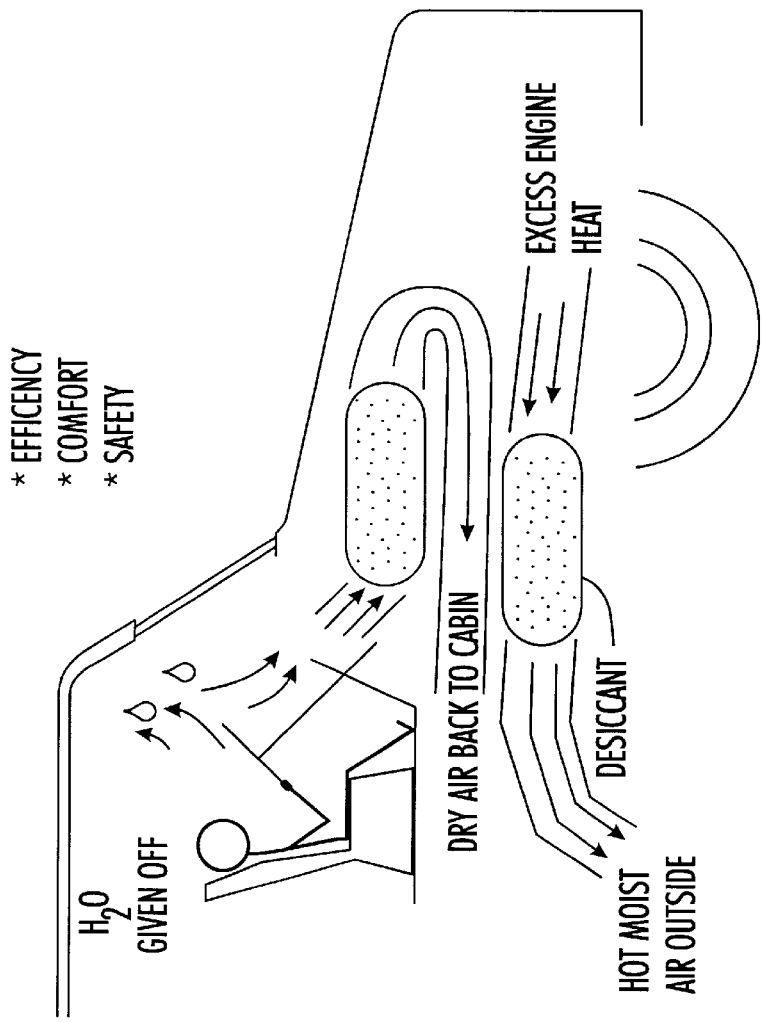
FIG. 55 is a diagram of a land vehicle showing the dehumidification of cabin air to enhance the efficiency of the air-conditioner cooling, improve comfort, and increase the safety by defrosting the windshield.

FIG. 55 is a diagram of a land vehicle showing the dehumidification of air to enhance the efficiency of the air-conditioner cooling, improve comfort, and increase the safety by defrosting the windshield. The water vapor ($H_2O$) given off by the occupants of the vehicle can be removed by the inventive methods shown in this diagram. The top desiccant canister is in the adsorption cycle where the anhydrous desiccant material is adsorbing the moisture out of the cabin air stream after which the air returns to the cabin with a lower relative humidity. The lower relative humidity can have several benefits. The first benefit is the regulation of relative humidity for the comfort of the occupants of the vehicle, where conventional vehicles only control the cabin air temperature, this apparatus can keep the temperature and relative humidity in the comfort zone of 30 to 60% relative humidity or regulate the relative humidity to given level. The second benefit is the efficiency and performance improvement resulting from the reduction in demand on the cabin air-conditioning cooling required due to the reduction in humidity. The air-conditioner will have less moisture to condense out of the cabin air on a hot and humid day. The vehicle can provide comfort to the occupants with a smaller air-conditioning unit and the air-conditioner cooling unit will be used less often since the occupants will feel comfortable at a higher temperature when the relative humidity is lower. The third benefit is the improvement in safety for the occupants since the apparatus has the capability to automatically eliminate and prevent the formation of condensation on the inside of the windshield glass of the vehicle. The lower relative humidity air is directed toward the windshield to defog or defrost the windshield. As the desiccant in the top canister becomes saturated with moisture, the lower canister is completing it's regeneration cycle and the air streams into and out of both canisters are alternated so as change the airflow from one canister to the other canister.

Figure 56:
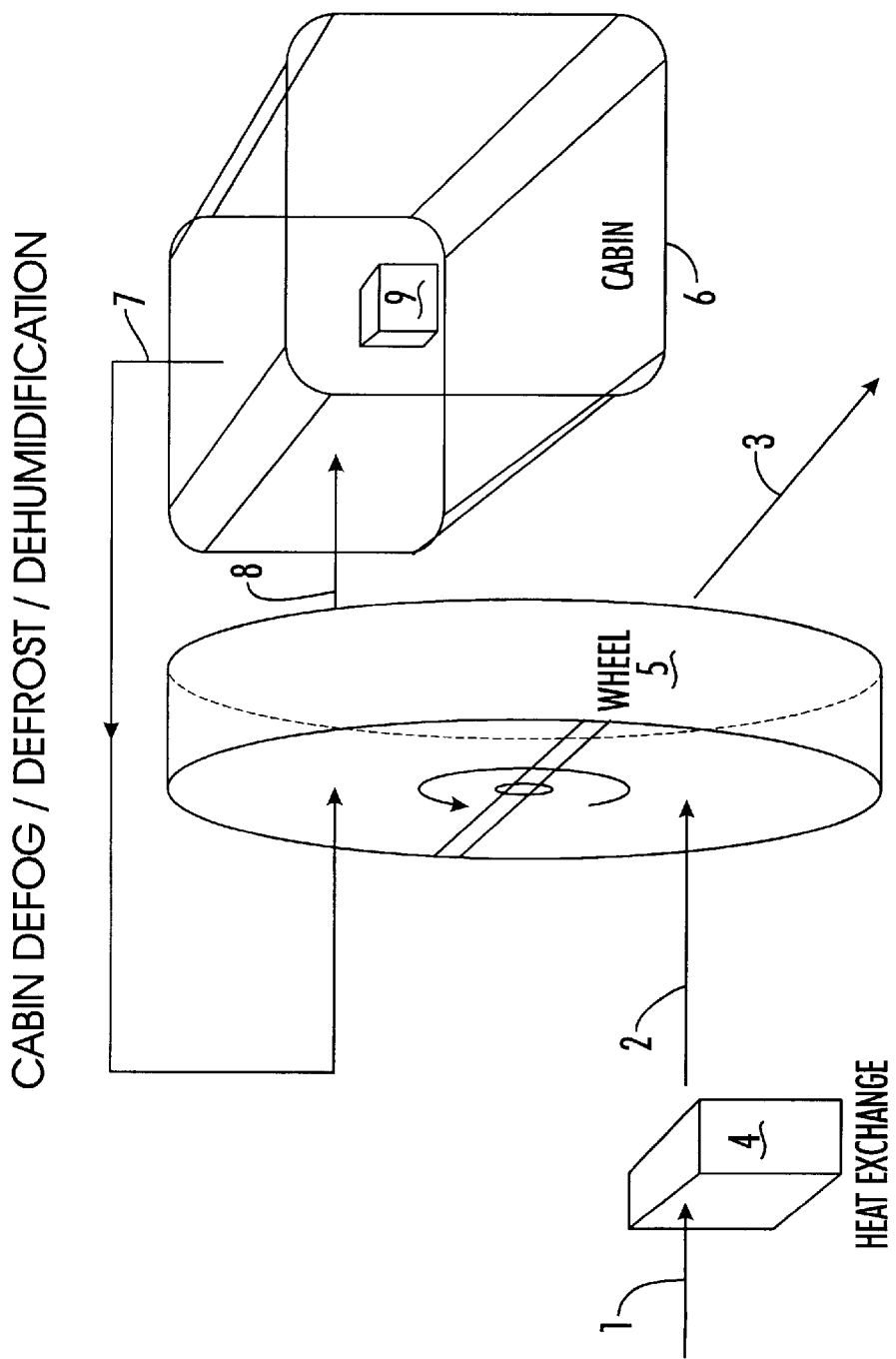
FIG. 56 is a diagram of the air flow through a desiccant wheel to perform defog/defrost/dehumidification of recirculated cabin air.
Figure 78:
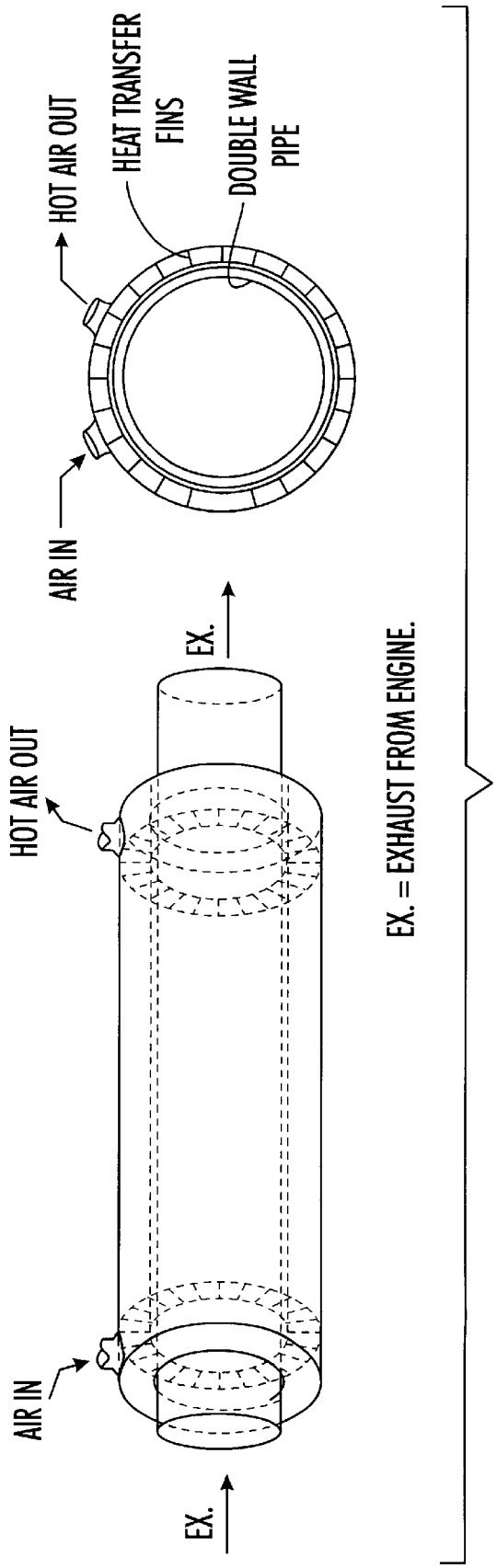
FIG. 78 is a drawing of an engine exhaust heat exchanger.
Figure 79:
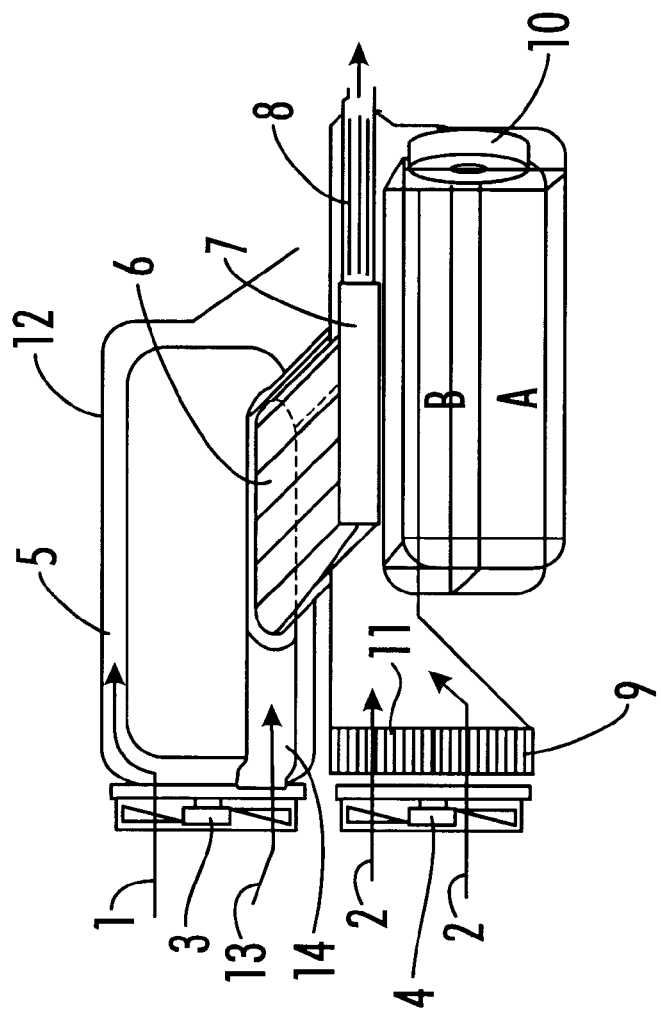
FIG. 79 is a drawing of an excess engine heat recovery systems connected to the desiccant canister environmental system.

FIG. 56 is a diagram of the air flow similar to the flow chart shown in FIG. 17 when the defog/defrost/dehumidification process is operating where outside air (from the atmosphere) 1 enters the heat exchanger 4 to raise the temperature of the air providing the necessary latent heat of evaporation for the previously adsorbed moisture in the desiccant, the excess heat from the engine of the motorized vehicle is obtained from either the engine coolant system or the exhaust system that may be similar to the type shown in FIG. 78 & 79. NOTE: precaution must be given to the danger of carbon monoxide mixing with the cabin environmental system. As Item 2 the hot air passes through the lower half of the desiccant wheel 5 the evaporation of the moisture in the desiccant material of 5 the wheel occurs, the hot humid air stream 3 exits the motorized vehicle, the desiccant wheel 5 slowly rotates the anhydrous desiccant which is regenerated in the lower section of the wheel to a position at the top area of the wheel, The anhydrous section of the wheel rotates up into the humid air stream 7 from the cabin 6 and as the humid air from the cabin passes through the anhydrous side of the desiccant wheel 5, the moisture is adsorbed out of the cool moist cabin air into the desiccant material on the wheel, the dry air 8 exits the wheel and returns to the cabin 6 to lower the relative humidity of the cabin air mass. The process and apparatus are controlled by the automatic control unit 9 which monitors the temperature and relative humidity sensors; and activates the various components of the apparatus to regulate the cabin environmental.

Figure 57:
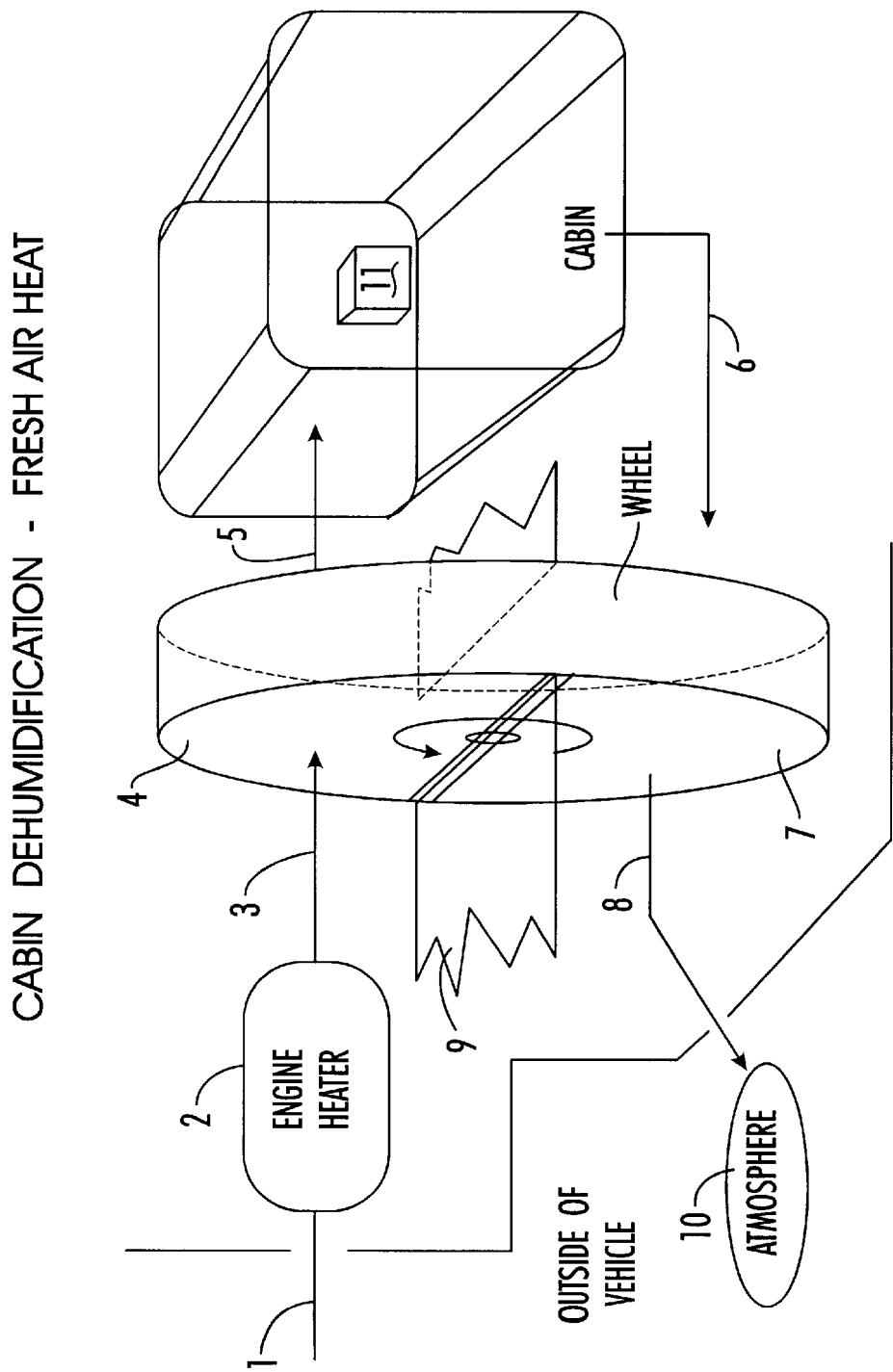
FIG. 57 is a diagram of the air flow through a desiccant wheel to perform the humidification of fresh heated air going into the cabin.

FIG. 57 is a diagram of the air flow through a desiccant wheel to perform the humidification of fresh heated air going into the cabin, which is similar to the flow chart shown in FIG. 15. Item 1 the fresh outside air is heated by a heat exchanger 2 utilizing excess engine heat to raise the temperature of the outside air stream to the level necessary to cause the moisture in the desiccant material to evaporate. Item 5 the hot air exits the heater and passes through 4 the evaporation side of the desiccant wheel where the moisture in the hydrous desiccant material evaporates into the air stream, which then exits the desiccant wheel 5 as hot humid air and enters the cabin to provide heat with humidity. The automatic control unit 11 regulates the temperature and relative humidity of the cabin by activating the fans, motors, and valves to provide a comfortable environment for the occupants. Item 9 represents a plane which separates the air flow to the adsorption side of the wheel from the evaporation side of the desiccant wheel. Where the structure of the apparatus which represents plane 9 intersects the wheel there are seals provided (which are not shown) to prevents the air flow from one air stream from mixing with the other air stream. The outside air 6 enters the desiccant wheel 7 on the adsorption side where the moisture from the outside air stream is adsorbed into the desiccant material coated on the wheel. After the moisture is adsorbed out of 8 the air stream exits the vehicle 10 back into the atmosphere. The moisture which is adsorbed into the adsorption side of the desiccant wheel causing the desiccant to become hydrous after which the hydrous desiccant rotates up into 4 the evaporation position where the moisture evaporates. When the sensors for the automatic control unit detect that the humidity has reached the desired level and humidification is no longer necessary the air fans may continue to operate to provide heat while the control unit turns off the desiccant wheel torque motor (not shown) and the wheel rotation stops, thus the humidification stops.

Figure 58:
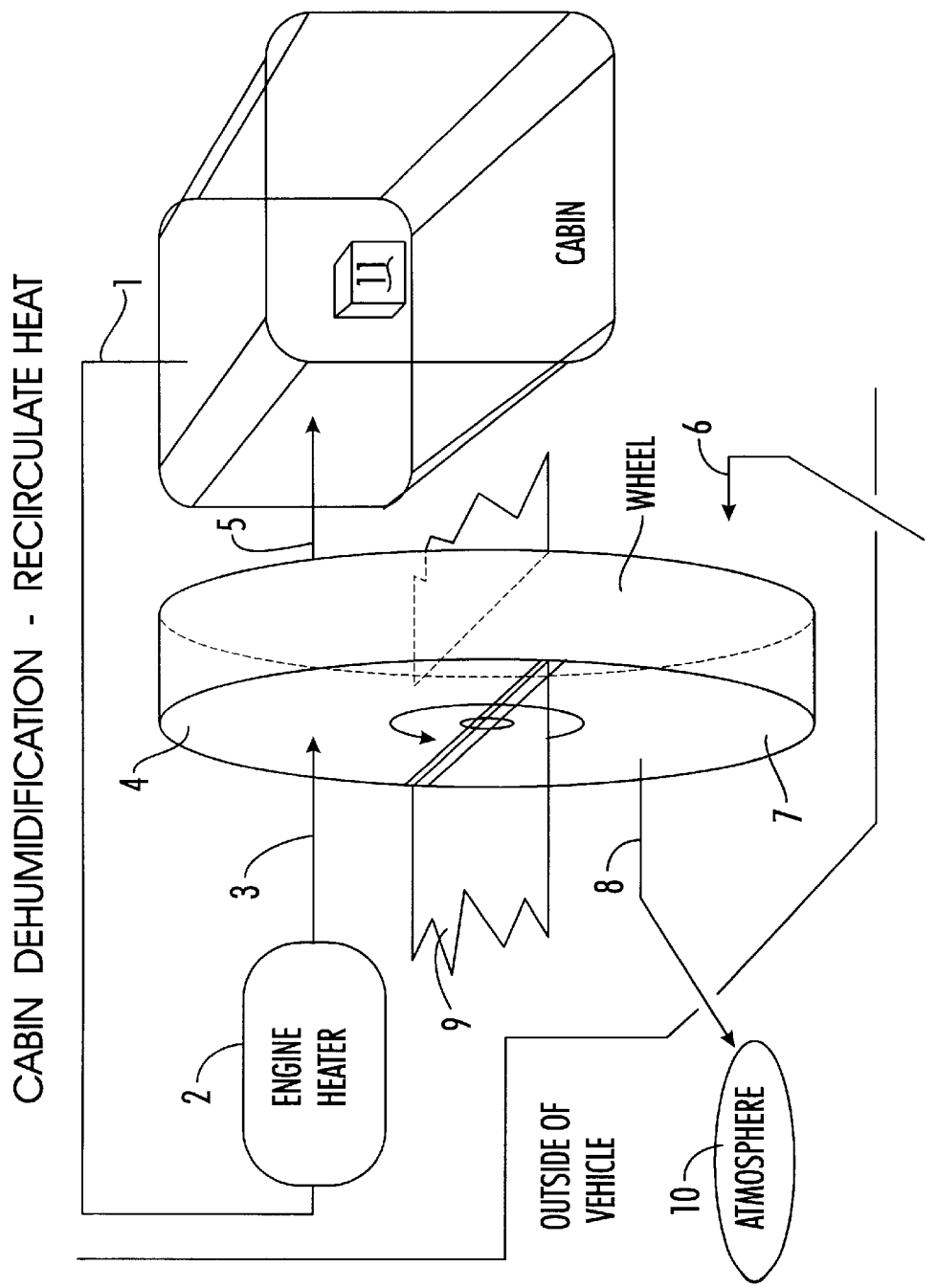
FIG. 58 is a diagram of the air flow through a desiccant wheel to perform the humidification of recirculated heated air going into the cabin.

FIG. 58 is a diagram of the air flow through a desiccant wheel to perform the humidification of recirculated heated air going into the cabin. The process of humidification in this diagram is similar to that of FIG. 16, where 1 recirculating air from the cabin enters 2 the heat exchanger utilizing various sources of excess engine heat to increase the air temperature up to the level necessary to evaporate the out of 4 the hydrous desiccant coated on the surface of the slowly rotating wheel, after which 5 the air stream containing the increased level of relative humidity returns to the cabin to raise the relative humidity of the air mass contained in the cabin. Item 9 represents a plane which separates the air flow to the adsorption side of the wheel from the evaporation side of the desiccant wheel. Where the structure of the apparatus which represents plane 9 intersects the wheel there are seals provided (which are not shown) to prevents the air flow from one air stream from mixing with the other air stream. The outside air 6 containing moisture from the atmosphere passes through the adsorption side of the desiccant wheel where the moisture is adsorbed into the desiccant material. The slow rotation of the wheel causes the anhydrous desiccant section of the wheel to rotate into the moist air stream where the desiccant is converted into hydrous desiccant. Item 8 the dry air stream exits the vehicle and returns to the atmosphere. The process will continue to extract moisture out of the atmosphere and release the moisture into the cabin as long as 11 the automatic control unit provides electrical power the wheel rotation torque motor (not shown). When the automatic control unit stops the rotation of the desiccant wheel, the humidification also stops. The automatic control unit regulates the cabin environmental conditions including the relative humidity to provide comfort to the occupants of the vehicle.

Figure 59:
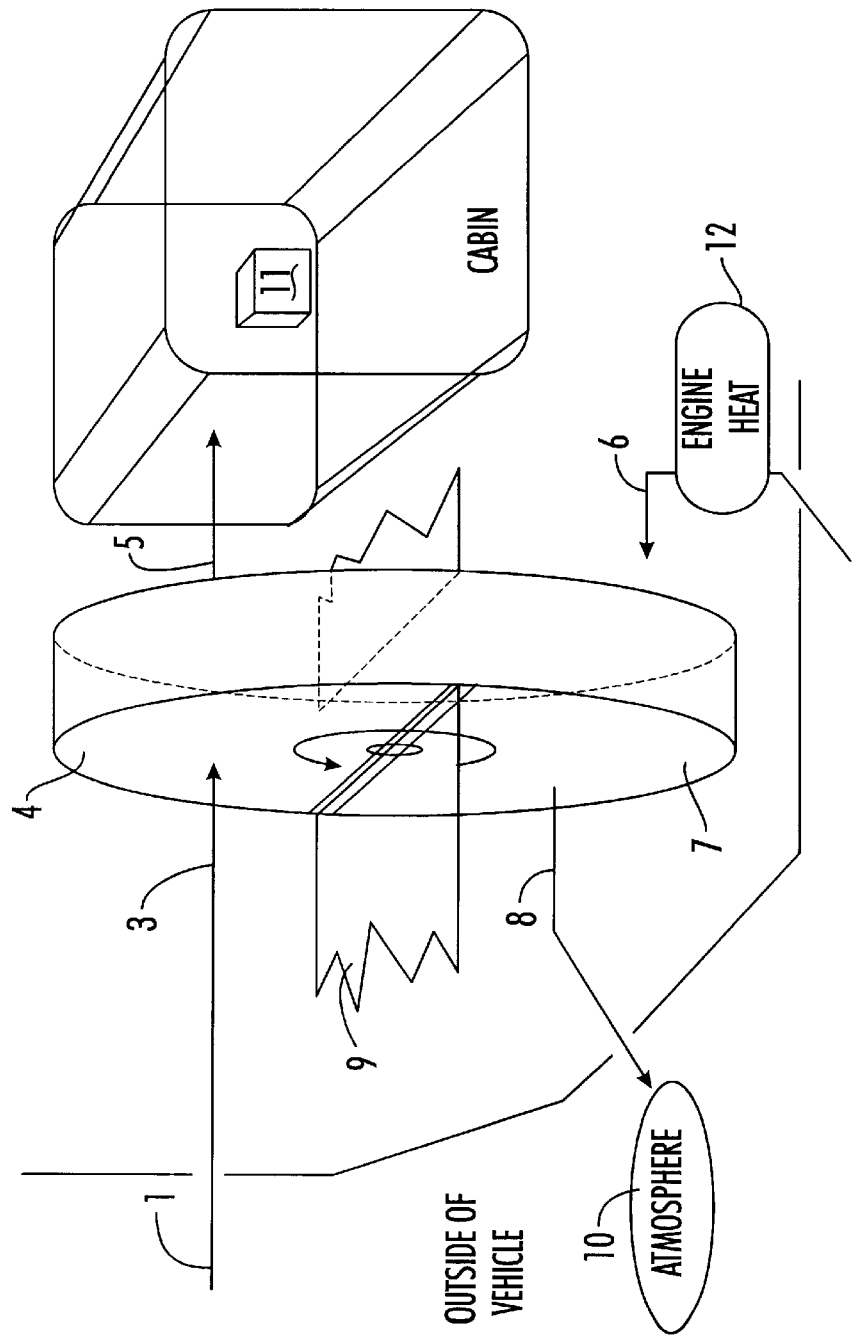
FIG. 59 is a diagram of the air flow through a desiccant wheel to perform the dehumidification of fresh outside air going into the cabin.

FIG. 59 is a diagram of the air flow through a desiccant wheel to perform the dehumidification of fresh outside air going into the cabin. The process shown in this drawing is similar to the process flow chart in FIG. 18, where Item 1 fresh outside air enters the apparatus to pass through a vent system 3 where it enters the adsorption side 4 of an anhydrous desiccant wheel which adsorbs the moisture out of the air stream. The dehumidified air exits the wheel 5 and passes into the cabin to lower the relative humidity of the cabin air mass, or may be directed to the air-conditioner cooling coils to increase the air-conditioner efficiency, or directed to the windshield where the impinging air flow would remove or prevent the formation of fog/frost on the inside surface of the windshield glass. The dehumidified air stream 5 may also receive other conditioning to regulate the air temperature before it enters the cabin. Item 9 represents a plane which separates the air flow to the adsorption side of the wheel from the evaporation side of the desiccant wheel. Where the structure of the apparatus which represents plane 9 intersects the wheel there are seals provided (which are not shown) to prevents the air flow from one air stream from mixing with the other air stream. The evaporation side of the desiccant which converts the desiccant material on the wheel from hydrous to anhydrous desiccant utilizes fresh outside air which enters the heater 12 and raises the air temperature to the level necessary to perform the regeneration of the desiccant material. Item 12 the engine heater utilizes excess engine heat to produce 6 the hot air stream entering 7 the adsorption side of the desiccant wheel to perform the evaporation, and after which exits the wheel 8 as hot humid air taking with the air stream the moisture previously contained in the desiccant wheel. Item 8 the hot humid air exits the vehicle and returns to the atmosphere 10. The automatic control unit 11 regulates the apparatus by monitoring the temperature and relative humidity sensors and activating or deactivating the components of the apparatus. The automatic control unit may continue to power the air flow through the apparatus, but discontinue the dehumidification by deactivating the desiccant wheel torque motor (not shown) causing the wheel rotation to stop thus the dehumidification will stop while the air stream continues to flow. The automatic control unit may also regulate the temperature of 5 the air stream entering the cabin.

Figure 60:
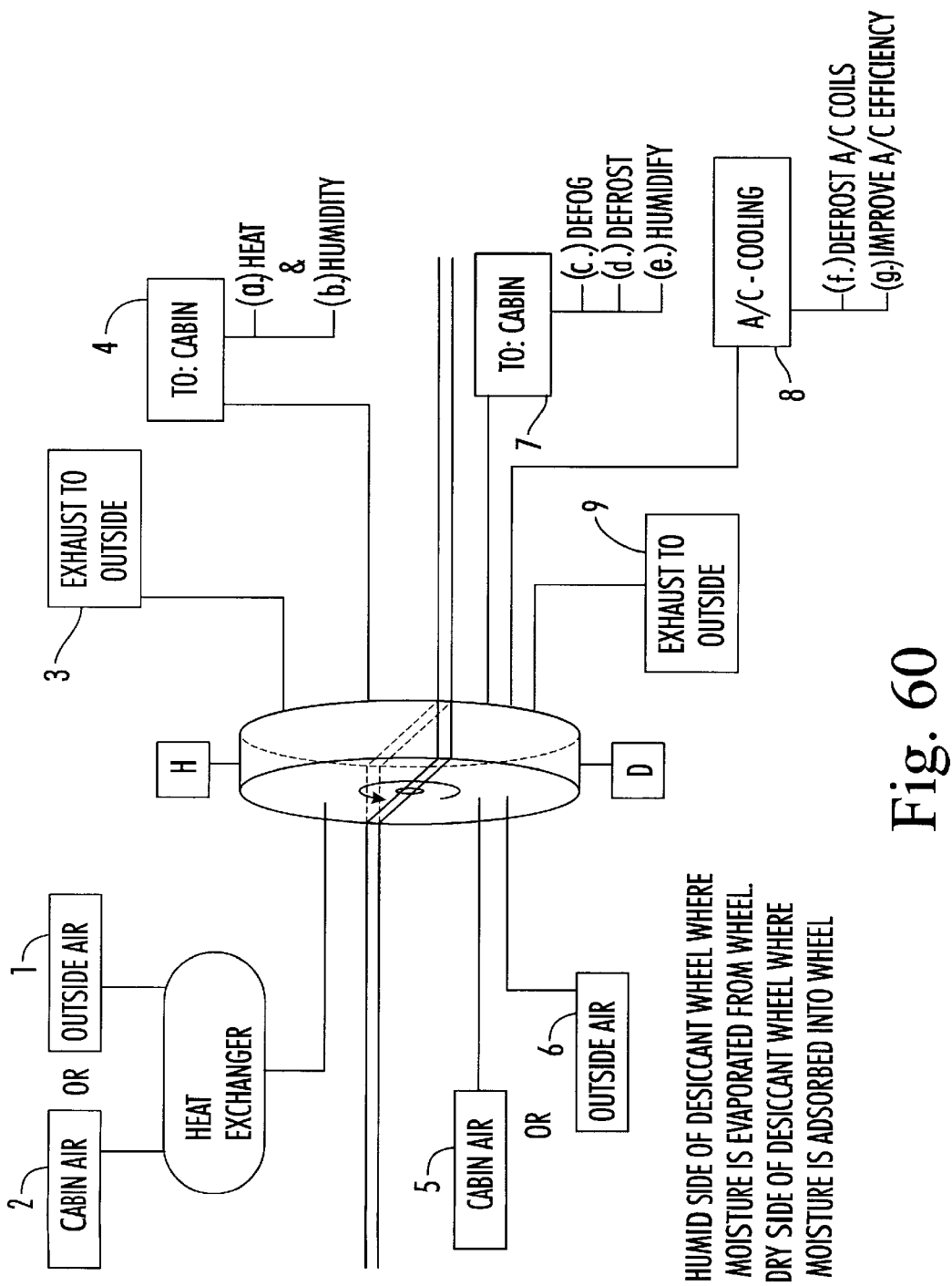
FIG. 60 is a process flow diagram of the multiple processes integrated into a single apparatus utilizing a desiccant wheel capable of providing heat with increased humidity, defrost/defog function for the windshield, and dehumidified air to increased air-conditioner efficiency and comfort.

FIG. 60 is a diagram of a desiccant based wheel process capable of providing heat with increased humidity, defrost/defog function for the windshield, regulation of the cabin relative humidity level, and increased air-conditioner efficiency. The diagram is divided by a set of parallel lines passing through the center of the desiccant wheel which represent a separation of the air streams passing through the wheel with the process heat exchanger located in the upper section of the diagram. The heat exchanger may receive excess heat from the engine or other sources to raise the temperature of the selected air stream which will pass through the desiccant wheel to cause the moisture in the desiccant to evaporate into the air stream. The desiccant wheel is divided into two sections; the first section at the top of the wheel labeled "H" contains the moisture which will be released into the hot air stream. As the wheel slowly rotates into "H" position the portion of the wheel containing hydrous desiccant moves into the upper air stream and the moisture begins to evaporate out of the desiccant material as the desiccant passes through the hot air stream for the purpose of completing the moisture evaporation as the wheel completes it's cycle through the "H" position resulting in the conversion of the desiccant into an anhydrous condition which prepares the desiccant for the next "D" cycle during which time the desiccant on the wheel will adsorb moisture. The desiccant coated on the wheel enters the "D" position as anhydrous and after the desiccant on the wheel completes it's rotation through the "D" position where the adsorption occurs as a moist air stream passes through the desiccant resulting in the conversion to hydrous before it rotates back into the "H" position.

The automatic control unit through the monitoring of temperature and relative humidity sensors determines which valves, fans, or motors (not shown) to activate to obtain the desired results. The automatic control unit selectively activates the components of the apparatus or the occupants may set the control unit to a desired setting such as the selection of fresh outside air or recirculated cabin air. The occupant would select the cabin air source identified as (1) outside air or (2) cabin air and the automatic control unit would activate the components of the apparatus to deliver a desirable temperature, humidity, air source, and air flow volume/rate (CFM). Items 3 & 4 represent the output of hot humid air which may be utilized to heat and humidify the cabin or the hot humid air may be expelled into the atmosphere. The automatic control unit would automatically activate the necessary apparatus components to cause the hot humid air stream to go to either the cabin or be expelled into the atmosphere. Items 5 & 6 represent the air sources for the air stream entering the lower section of the diagram, where 5 the recycled cabin air enters the anhydrous desiccant wheel which adsorbs the moisture out of the air stream after which the air returns to the cabin to either defog/defrost the inside windshield glass or lower the relative humidity of the cabin. The dehumidified air stream may also go to the air-conditioning cooler coils to increase the efficiency of the air-conditioner and enable the designer to install a smaller size unit in the vehicle since the air-conditioner unit will only have to lower the temperature of dry hot air, not lower the temperature of hot and humid air on a hot and humid day. These improvements from lower relative humidity could represent 20-to- 30% reduction in energy consumption for the air-conditioner. If the control unit selects 5 the cabin air source for dehumidification on the "D" side of the wheel, the control unit would not select 2 cabin air for the "H" side of the wheel. When 5 or 6 enters the desiccant wheel the dehumidified air stream exiting the desiccant wheel may be directed out of the vehicle and into the atmosphere as indicated with Item 9.

Figure 61:
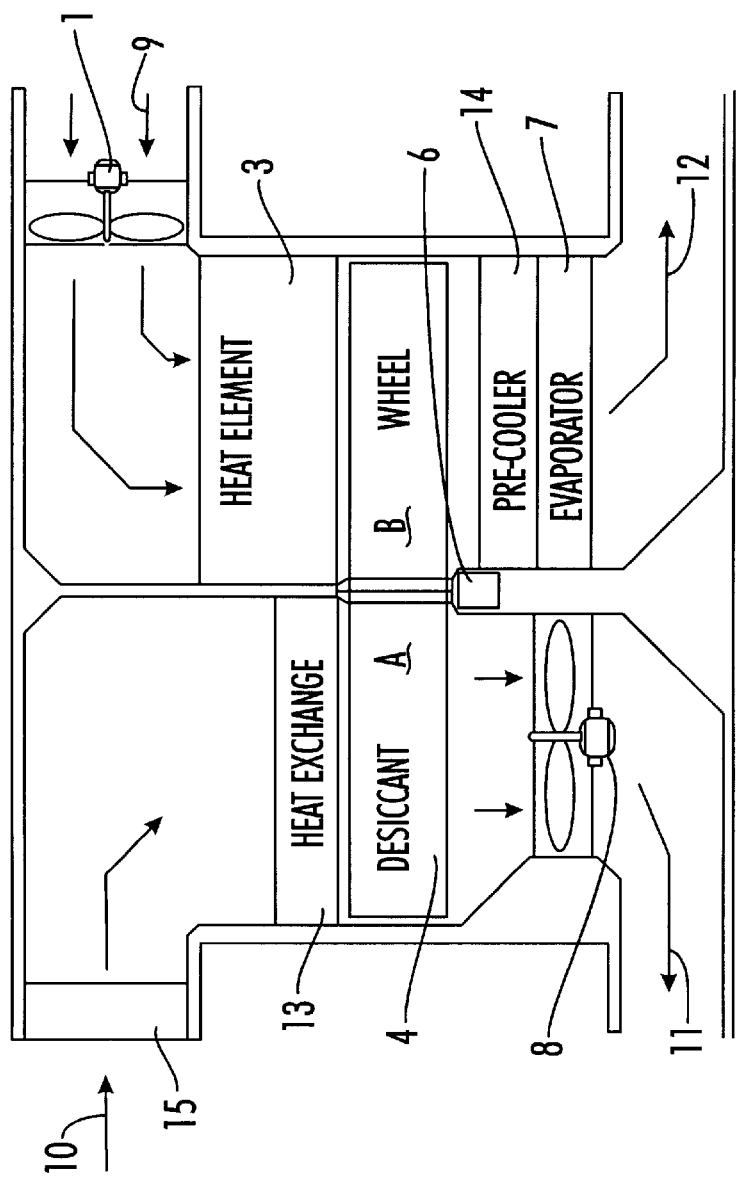
FIG. 61 is a side view of a desiccant wheel vehicle humidification/dehumidification/defog unit with a pre-cooler and cabin heating & cooling capability.

FIG. 61 is a side view drawing of a desiccant wheel vehicle humidification/dehumidification/defog apparatus with a pre-cooler and one heat element. The apparatus is capable of performing multiple functions.

The Function of Humidification

When the sensors of the automatic control unit detects that the cabin environmental system needs to supply humidified heated air to the cabin the automatic control unit activates the following items: 1 Cabin side fin which forces 9 either cabin air or outside air through the apparatus where the air is heated and humidified before it enters the cabin as warm or hot humid air. When the occupant of the vehicle selects fresh air or recirculated air the automatic control unit activates an air valve or air damped gate (not shown ) to direct the desired air stream into the cabin. The air stream forced by 1 the cabin side fan first passes through the heater element 3, which heats the air before it continues through the desiccant wheel 4 where the heat of the air stream evaporates the moisture out of the hydrous desiccant material of the desiccant wheel. In the portion of the desiccant wheel 4, which is located in the (B) position of the case, is where the desiccant material releases it's moisture into the hot air stream. If the temperature of the air stream is higher than desired for the cabin then 14 the pre-cooler is activated by the automatic control unit which supplies power to a circulator pump causing a coolant fluid to circulate between 14 the pre-cooler (heat exchanger) and 10 another heat exchanger connected by tubes or hosed to circulate the coolant between the two heat exchangers. The automatic control unit regulates the flow of coolant between the heat exchangers to regulate the air temperature, The air-conditioner cooling evaporator coils 7 are not activated during this process. The air stream 12 enters the cabin as warm or hot humid air to provide comfortable healthful heated air with moisture for the occupants of the vehicle. The supply of moisture is provided by the other side of the apparatus. The automatic control unit sensors measure the relative humidity of both the outside air and the cabin air, and if the occupant has selected fresh cabin air for the cabin then the automatic control unit will select as a source of moisture either outside or cabin air with it's preference toward the air with the higher relative humidity, however, if the cabin air is set to recirculate then the automatic control unit will select outside air as 10 the source of moisture for the "A" portion of the desiccant wheel. The air stream 10 is the source of moisture for the process. Air stream 10 is pulled through the apparatus by 8 the outside fan and passes through 15 the heat exchanger for the pre-cooler. The air stream continues through 13 another heat exchange which is not activated for this process. The air stream then enters "A" the adsorption side of the desiccant wheel where the moisture in air stream 10 is adsorbed into the anhydrous desiccant material. After the moisture is adsorbed out of the outside air 10, the dry air 11 is ejected form the apparatus by the outside air fan 8 into the atmosphere.

As the torque motor 6 slowly rotates the desiccant wheel 4 out of the "A" position where the moisture is adsorbed into the desiccant into the (B) position in the case the moisture in the desiccant wheel is evaporated out of the desiccant into the hot air stream passing through the "B" position of the wheel. The heater elements 3 provide the heat to raise the air temperature providing the hot air necessary to perform the regeneration (evaporation of moisture out of the desiccant) of the desiccant coating on the wheel. In summary, the (A) side of the desiccant wheel 4 accumulates moisture, then as the wheel slowly rotates into the (B) position the desiccant on the wheel releases the moisture into the hot air stream 12. The outside air fan 8 pulls outside air through the apparatus and then expels the air back outside.

During the humidification cycle the following items are not activated: 14 & 15 the pre-cooler coils, 7 evaporator, or 13 heat exchanger,. Under normal environmental conditions the need to humidify and cool the cabin air seldom occurs. Although the system normally only needs to provide humidification while the heater for the cabin is operating, a different variation of the inventive apparatus can be modified to perform humidification and cooling, however, such an alternative would be inefficient and is not shown in this drawing.

The Function of Dehumidification

The inventive apparatus is capable of supplying dehumidified air to the cabin which has had the moisture removed from the air stream as it passes through the "B" side of the desiccant wheel. The air source 9 entering the cabin side of the apparatus may be outside air or recirculated cabin air which is pushed through the apparatus by 1 the cabin side fan and passes through heat element 3 which is deactivated during this process. The air stream then passes through the "B" portion of the slowly rotating desiccant wheel, where the anhydrous desiccant material adsorbs the moisture out of the air stream. The dehumidified air stream then enters the pre-cooler 14 which may be activated by the automatic control unit when the air stream 10 passing through 15 the heat exchanger has a temperature closer to the desired cabin temperature than that of the dehumidified air stream exiting the "B" portion of the desiccant wheel. When the pre-cooler is activated by the automatic control unit power is supplied to a circulator pump (not shown) which starts to move a coolant fluid between 14 the pre-cooler (heat exchanger) and 15 the other heat exchanger connected by tubes or hosed (not shown) to circulate the coolant between the two heat exchangers. The dehumidified air stream next passes through the air-conditioning evaporator cooling coils which may be activated by the automatic control unit to lower the temperature of the dehumidified air stream going to the cabin. The dehumidified cool/cold air stream 12 is directed by the automatic control unit either to the inside of the windshield glass to prevent fog or frost on the windshield or is directed into the cabin or the automatic control unit may direct the air stream to both the cabin and the windshield. As the hydrous desiccant material from the "B" position of the desiccant wheel slowly rotates into the "A" position to have the moisture removed form the desiccant, the air stream 10 is utilized to evaporate the moisture out of the desiccant material when the air stream 10 may be heated by the heat exchanger 15, when it is activated, and heat exchanger 13 which may utilize excess engine heat to raise the temperature of the air stream to the level necessary to cause the moisture in the desiccant material in the "A" position to evaporate into 11 the hot air stream as it is pulled out of the apparatus by the outside air fan 8 which ejects the hot humid air into the atmosphere. When the automatic control unit sensors indicate that the relative humidity has been lowered to an acceptable relative humidity level the control unit turns off the power to 6 the desiccant wheel rotation torque motor which will discontinue the dehumidification process and may allow the apparatus to continue operate other components of the apparatus to regulate the cabin temperature without changing the level of the relative humidity.

Figure 62:
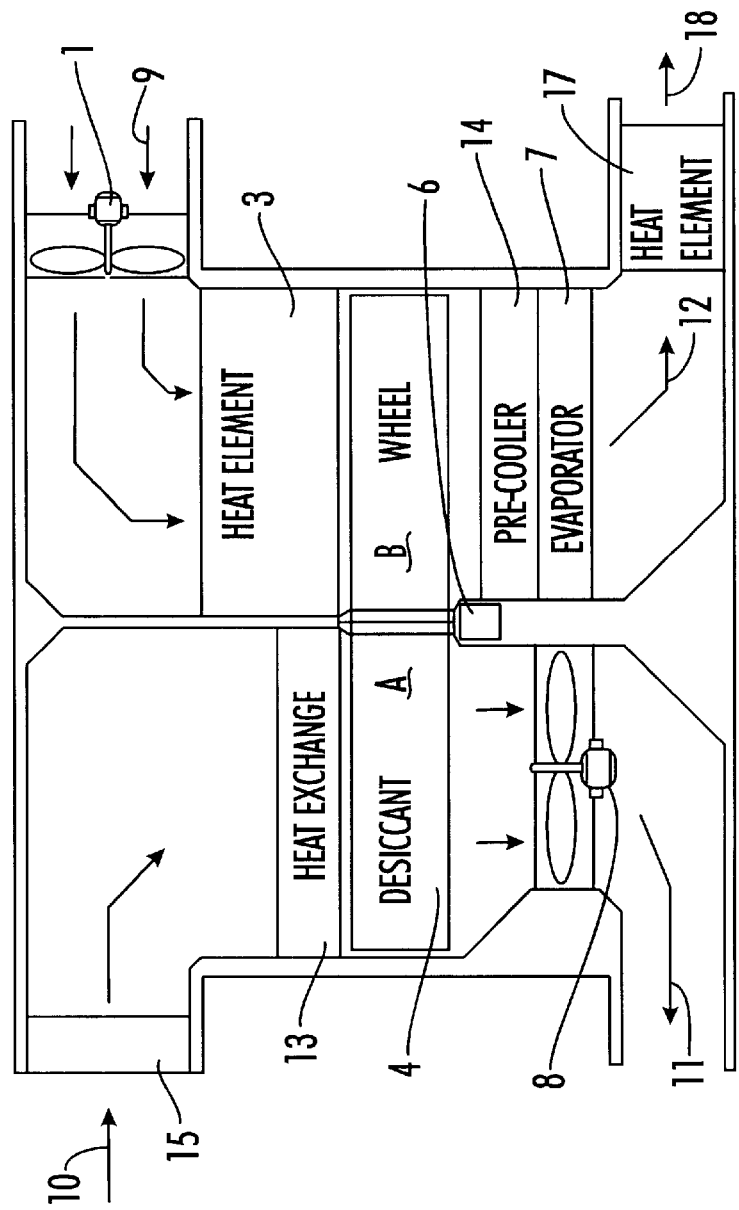
FIG. 62 is a side view of a desiccant wheel vehicle humidification/dehumidification/defog unit with a pre-cooler and cabin heating & cooling capability with the additional feature of dehumidified heat.

FIG. 62 is a side view of a desiccant wheel vehicle humidification/dehumidification/defog unit with a pre-cooler and two heat element. In this alternative of the inventive apparatus the drawing shows the operation of a motorized vehicle's humidification/dehumidification/defog functions which are enhanced with a pre-cooler. The apparatus is capable of performing multiple functions.

The Function of Humidification

When the sensors of the automatic control unit detects that the cabin environmental system needs to supply humidified heated air to the cabin the automatic control unit activates the following items: 1 Cabin side fan which forces 9 either cabin air or outside air through the apparatus where the air is heated and humidified before it enters the cabin as warm or hot humid air. When the occupant of the vehicle selects fresh air or recirculated air the automatic control unit activates an air valve or air damped gate (not shown ) to direct the desired air stream into the cabin. The air stream forced by I the cabin side fan first passes through the heater element 3, which heats the air before it continues through the desiccant wheel 4 where the heat of the air stream evaporates the moisture out of the hydrous desiccant material of the desiccant wheel. When the portion of the desiccant wheel 4, is located in the (B) position of the case, the desiccant material releases it's moisture into the hot air stream from 3 the heat element which may be a heat exchanger. If the temperature of the air stream is higher than desired for the cabin then 14 the pre-cooler is activated by the automatic control unit when power is supplied to a circulator pump (not shown) which starts to circulate a coolant fluid between 14 the pre-cooler (heat exchanger) and 15 the other heat exchanger connected by tubes or hosed to circulate the coolant between the two heat exchangers. The air-conditioner cooling evaporator coils 7 are not activated during this process. If the temperature of the air is not high enough to meet the comfort needs of the occupants the heater element 17 may provide additional heat to the air stream 12 which contains the moisture from the desiccant material. The air stream 18 enters the cabin as warm or hot humid air to provide comfortable healthful heated air for the occupants of the vehicle. The supply of moisture for the process is provided by the other side of the apparatus.

The automatic control unit sensors measure the relative humidity of both the outside air and the cabin air, and if the occupant has selected fresh air for the cabin then the automatic control unit will select as a source of moisture either outside or cabin air with it's preference toward the air with the higher relative humidity, however, if the cabin air is set to recirculate then the automatic control unit will select outside air as 10 the source of moisture for the "A" portion of the desiccant wheel. The air stream 10 is the source of moisture for the process. Air stream 10 is pulled through the apparatus by 8 the outside fan and passes through 15 the heat exchanger for the pre-cooler which may add heat to 10 the air stream when the pre-cooler is activated. The air stream continues through 13 another heat exchange which is not activated for this process. The air stream then enters "A" the adsorption side of the desiccant wheel where the moisture in air stream 10 is adsorbed into the anhydrous desiccant material. After the moisture is adsorbed out of the outside air 10, the dry air 11 is ejected form the apparatus by the outside air fan 8 into the atmosphere. The torque motor 6 slowly rotates the desiccant wheel 4 through the (B) position in the case where the moisture in the desiccant wheel is evaporated out of the desiccant into the hot air stream. The heater elements 3 provide the heat to raise the air temperature providing the hot air necessary to perform the regeneration (evaporation of moisture out of the desiccant) of the desiccant coating on the wheel.

In summary, the (A) side of the desiccant wheel 4 accumulates moisture, then as the wheel slowly rotates into the (B) position the desiccant on the wheel releases the moisture into the hot air stream 12. The outside air fan 8 pulls outside air through the apparatus and then expels the air back outside. During the humidification cycle the following items are not activated: 7 the evaporator, or 13 heat exchanger. Under normal environmental conditions the need to humidify and cool the cabin air seldom occurs. Although the system normally only needs to provide humidification while the heater for the cabin is operating, a different variation of the inventive apparatus can be modified to perform humidification and cooling, however, such an alternative would be inefficient and is not shown in this drawing.

The Function of Dehumidification

The inventive apparatus is capable of supplying dehumidified air which has had the moisture removed from the air stream passing through the "B" side of the desiccant wheel. The air source 9 entering the cabin side of the apparatus may be outside air or recirculated cabin air which is pushed through the apparatus by 1 the cabin side fan and passes through heat element 3 which is deactivated during this process. The air stream then passes through the "B" portion of the slowly rotating desiccant wheel, where the anhydrous desiccant material adsorbs the moisture out of the air stream. The dehumidified air stream then enters the pre-cooler 14 which may be activated by the automatic control unit when the air stream 10 passing through 15 the heat exchanger has a temperature closer to the desired cabin temperature than that of the dehumidified air stream exiting the "B" portion of the desiccant wheel. When the pre-cooler is activated by the automatic control unit power is supplied to a circulator pump (not shown) which causes a coolant fluid to circulate between 14 the pre-cooler (heat exchanger) and 10 another heat exchanger connected by tubes or hosed (not shown) to circulate the coolant between the two heat exchangers. The dehumidified air stream next passes through the air-conditioning evaporator cooling coils which may be activated by the automatic control unit to lower the temperature of the dehumidified air stream going to the cabin. The cool/cold dry air 12 going to the cabin passes through the deactivated heat element 17 which is a heat exchanger not used when the air needed to be cooled. The dehumidified cool/cold air stream 18 is directed by the automatic control unit either to the inside of the windshield glass to prevent fog or frost on the windshield or is directed into the cabin or the automatic control unit may direct the air stream to both the cabin and the windshield. As the hydrous desiccant material from the "B" position of the desiccant wheel slowly rotates into the "A" position to have the moisture removed form the desiccant, the air stream 10 is utilized to evaporate the moisture out of the desiccant material when the air stream 10 may be heated by the heat exchanger 15, when it is activated, and heat exchanger 13 which may utilize excess engine heat to raise the temperature of the air stream to the level necessary to cause the moisture in the desiccant material in the "A" position to evaporate into 11 the hot air stream which is pulled out of the apparatus by the outside air fan 8 which then ejects the hot humid air into the atmosphere.

When the automatic control unit sensors indicate that the relative humidity has been lowered to an acceptable relative humidity level the control unit turns off the power to 6 the desiccant wheel rotation torque motor causing the apparatus to discontinue the dehumidification process and allow the apparatus to continue to regulate the cabin air temperature without changing the level of the relative humidity. When the automatic control unit sensors indicate that the cabin air temperature is below the desired temperature level and the cabin needs either cabin heat with a lower relative humidity or windshield defrost with heat, the automatic control unit activates the same components as ere activated for dehumidified cool/cold air, except the 14 pre-cooler and the air-conditioner evaporation cooling coils 7 are deactivated, and the heat element 17 which may be a heat exchanger utilizing excess engine heat is activated to increase the temperature of the dehumidified air stream to the desired temperature to defog/defrost the windshield or increase the temperature of the cabin, an option (not shown) in this drawing is a separate vent line and air valve which would allow the automatic control unit to direct hot dehumidified air toward the windshield to heat and defog/defrost the glass and provide a different air stream temperature regulated for the cabin of the dehumidified air for improved occupant comfort during windshield defrosting at a different temperature. With this option, the dehumidified air stream is split with one portion going to the windshield with a temperature necessary to defog/defrost the windshield and the other portion of the air stream with it's temperature regulated separately to provide occupant comfort.

Figure 63:
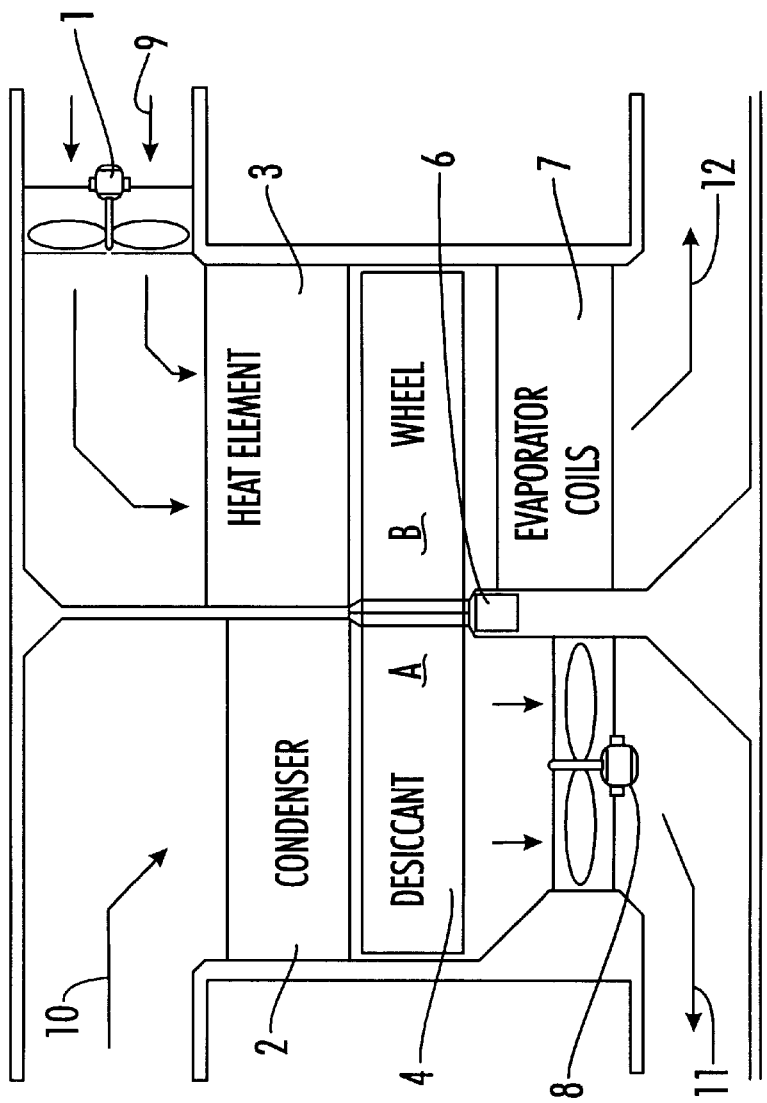
FIG. 63 is a side view of a desiccant wheel vehicle humidification/dehumidification unit showing the air-conditioner condenser as the heat source for evaporation.

FIG. 63 is a side view of a desiccant wheel vehicle humidification/dehumidification/defog unit similar to the inventive apparatus shown in FIG. 61 without the pre-cooler feature and 13 the heat exchanger has been replaced by 2 the air-condenser coils to provide the necessary heat energy to regenerate the desiccant material in the "A" position of the desiccant wheel rotation. In this alternative of the inventive apparatus the heat energy for regeneration of the desiccant is derived from the heat of the air-conditioner when the air-conditioner is operating or from the heater when the heater is operating.

Figure 64:
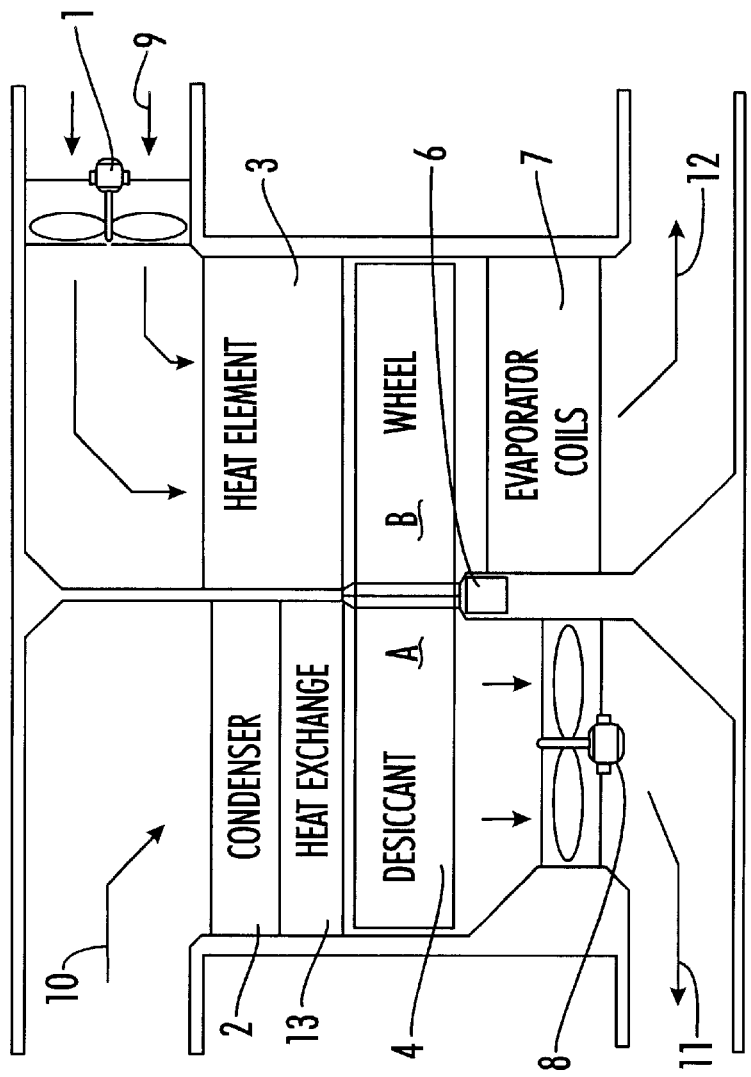
FIG. 64 is a side view of a desiccant wheel vehicle humidification/dehumidification unit showing the air-conditioner condenser as a second heat source for evaporation.

FIG. 64 is a side view of a desiccant wheel vehicle humidification/dehumidification/defog unit similar to the inventive apparatus shown in FIG. 61 without the pre-cooler feature and the air-conditioner condenser coils 2 have been placed in air stream 10 to provide both cooling of the condenser coils and additional excess heat energy to assist Item 13 heat exchanger which could utilize excess engine heat energy to raise the temperature of air stream 10 which will regenerate the desiccant in the "A" position of wheel rotation.

Figure 65:
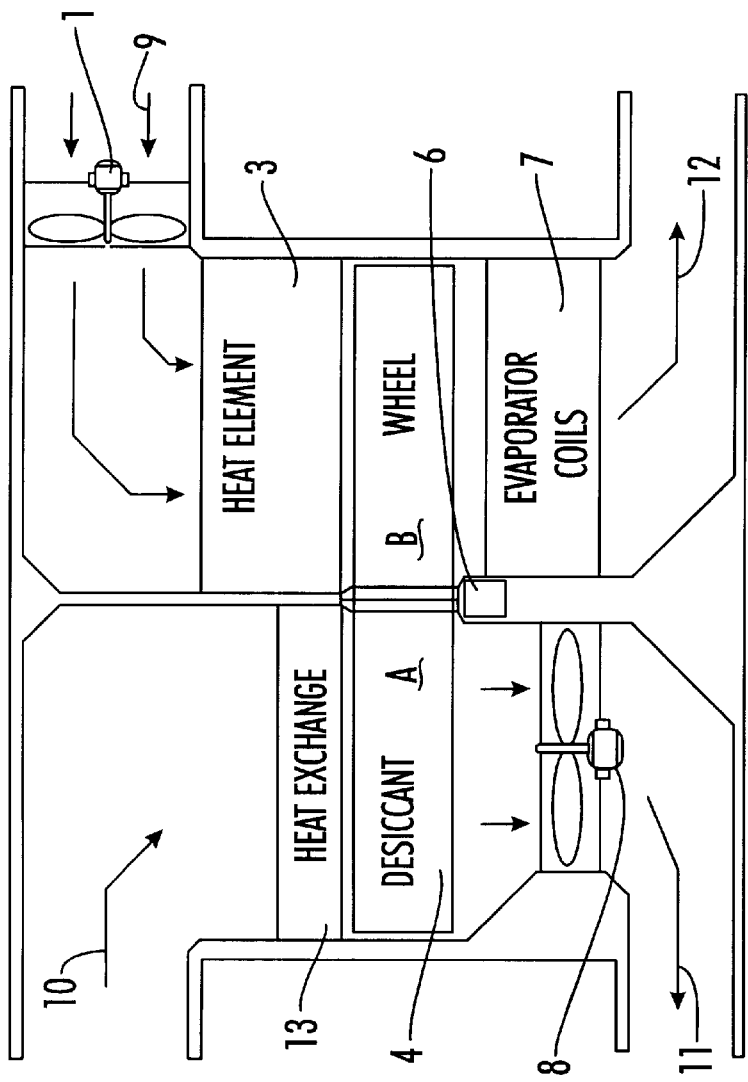
FIG. 65 is a side view of a desiccant wheel vehicle humidification/dehumidification/defog unit.

FIG. 65 is a side view of a desiccant wheel vehicle humidification/dehumidification/defog unit similar to the inventive apparatus shown in FIG. 61 without the pre-cooler feature. The apparatus is also similar to FIG. 64 except the air-conditioner condenser has been removed from the air stream of the apparatus and the heat energy for regeneration is supplied by only the excess engine heat to heat exchangers 3 or 13.

Figure 66:
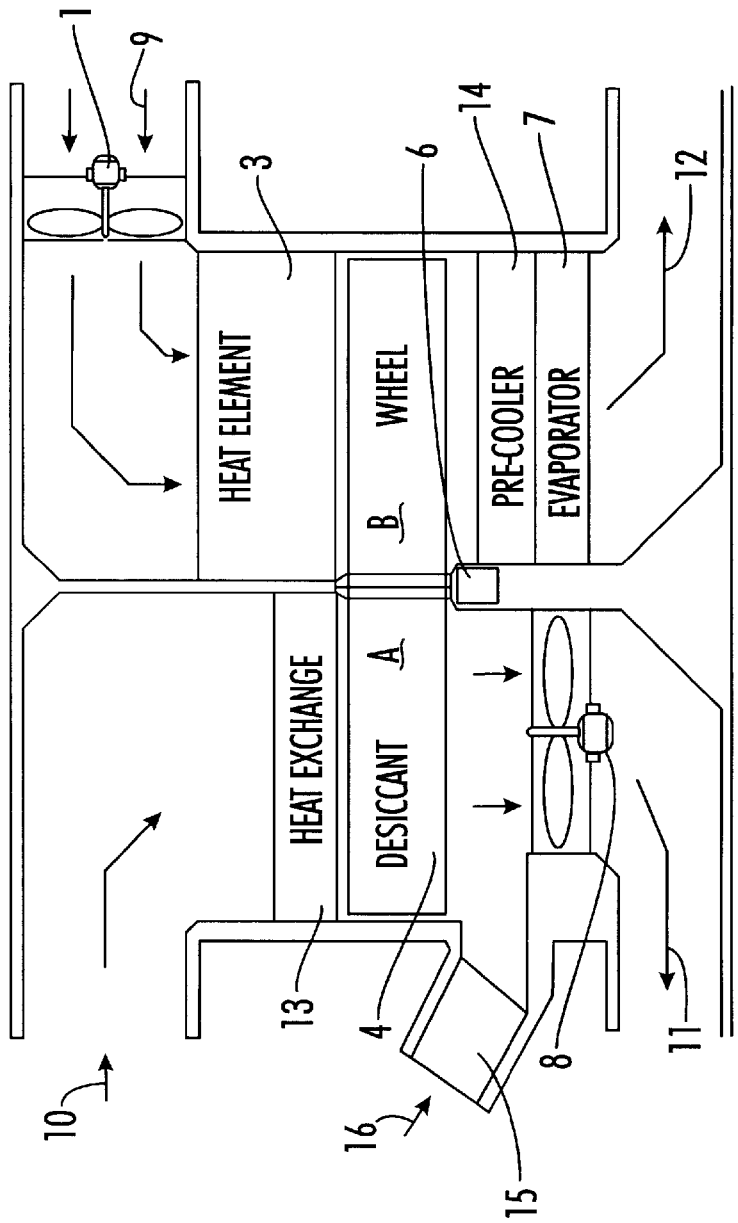
FIG. 66 is a side view of a desiccant wheel vehicle humidification/dehumidification/defog unit with a pre-cooler showing an additional heat exchanger positioned below the desiccant wheel which utilizes the fan without heating the air stream entering the wheel.

FIG. 66 is a side view of a desiccant wheel vehicle humidification/dehumidification/defog unit with a pre-cooler similar to the inventive apparatus shown in FIG. 61 with the exception that the heat exchanger 15 has been repositioned out of 10 the air stream which passes through the desiccant wheel and placed where the air stream 16 is pulled through the heat exchanger without increasing the air temperature of the air flow through the desiccant wheel "A". This arrangement of the heat exchanger would allow for the operation of the pre-cooler without increasing the temperature of the air stream providing moisture for the adsorption process which with a higher air temperature would reduce the adsorption capability of the desiccant when the air temperature is increased. This arrangement of 15 the heat exchanger would enable the automatic control unit to operate the pre-cooler while the heat element 3 is heating 9 the air stream performing the evaporation of moisture out of the desiccant material in the "B" position of wheel rotation which provides moist hot air to the cabin. The heat element 3 increases the air temperature to a level high enough to effectively evaporate the moisture out of the desiccant while the pre-cooler can reduce the temperature to a lower temperature for passenger comfort. The automatic control unit will activate or deactivate the coolant fluid pump (not shown) to regulate 12 the air stream entering the cabin.

Figure 67:
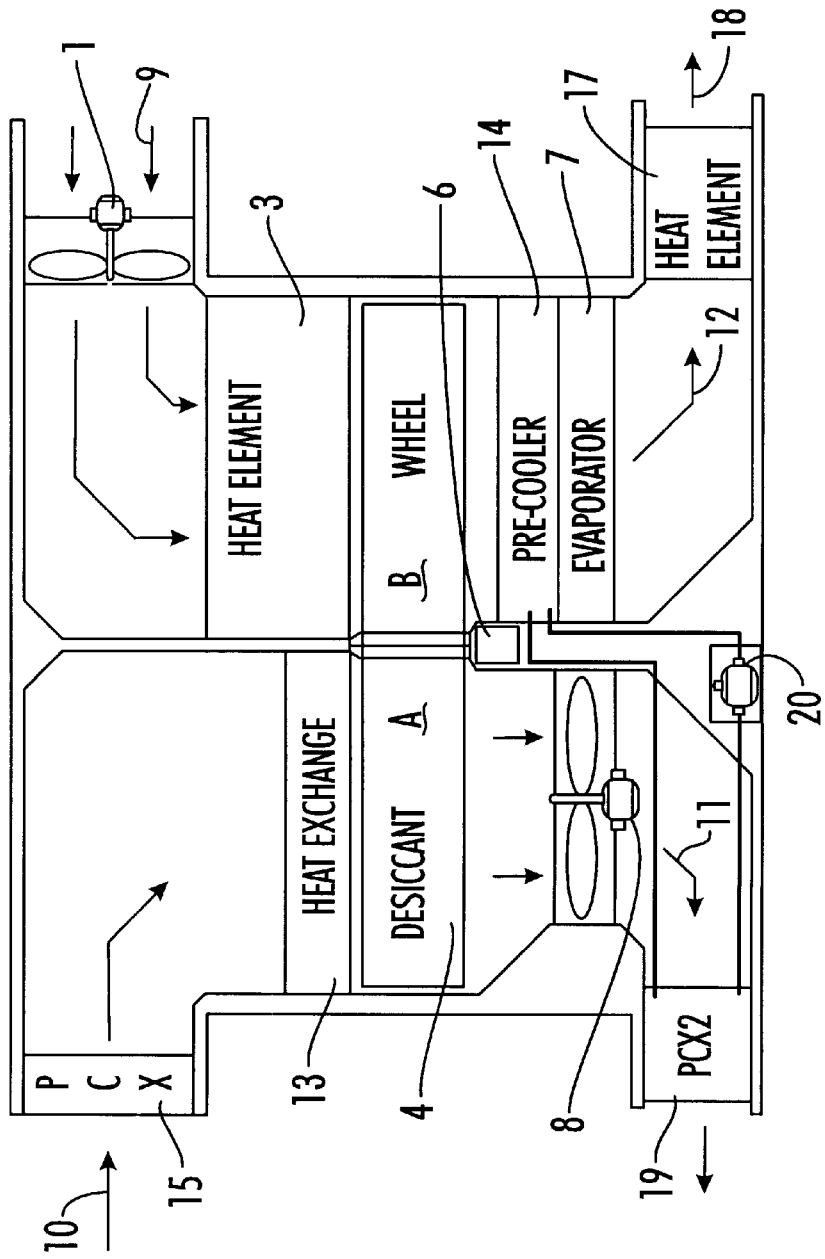
FIG. 67 is a side view of a desiccant wheel vehicle humidification/dehumidification/defog unit with a pre-cooler and two PCX heat exchanger coils.

FIG. 67 is a side view of a desiccant wheel vehicle humidification/dehumidification/defog unit with a pre-cooler and two PCX coils which is similar to the inventive apparatus shown in FIG. 61. The apparatus is shown with the pre-cooler configured to produce maximum humidification with moderate or high temperature heat. The apparatus operates in a similar manner as previously described in FIG. 62 and in addition the pre-cooler coils 14 are used to lower the air temperature after the moisture is evaporated into the air stream. This drawing shows the pre-cooler 14 heat exchanger matched with the (PCX2) pre-cooled heat exchanger 19 or the pre-cooler heat exchanger 14 may be matched with 15 (PCX). The automatic control unit selects which heat exchanger should be utilized activates a coolant flow valve to cause the coolant to be directed to the desired heat exchanger.

The Function of Humidification

The cabin or fresh air enters the apparatus through cabin fan 1 as described previously. The air is heated by heat element 3 before the air enters the desiccant wheel 4 to evaporate the moisture out of the desiccant and increase the relative humidity of the air stream. The air exits the (B) side of the desiccant wheel as a hot and humid air stream. The air enters the pre-cooler 14 where the temperature is regulated by the pre-cooler. The evaporator 7 and heat element 17 are not normally activated during this process. The air 18 going to the cabin may have the air temperature and the relative humidity both regulated by the apparatus during humidification. The outside air fan 8 forces the cool air flow 11 over the pre-cooler exchange unit (PCX2) 19. Coolant fluid is circulated between the pre-cooler 14 and the PCX2 19 by fluid coolant pump 20. In this way the apparatus first uses maximum heat for evaporation of moisture out of the desiccant, then removes some of the heat in the air stream before it enters the cabin and the air stream 10 going to "A" the adsorption side of the desiccant wheel remains at a lower temperature to provide maximum adsorption.

The Function of Dehumidification

The apparatus automatically determines when the air should be dehumidified for the cabin or when the air going to the air-conditioner cooling unit should be dehumidified or when defog/defrost is necessary and automatically activates the necessary components to produce the desired results. Dehumidification may be accomplished while the environmental system is either heating or cooling the cabin air. To produce a hot dry air stream 18 for the cabin when the temperature is below the desired level and the relative humidity in the cabin is above the desired level. The cabin side fan 1 may pull the humid air out of the cabin and into the apparatus. The air is forced through the deactivated heat element 3 into the (B) side of the desiccant wheel 4. As the desiccant adsorbs the moisture out of the cool air stream the relative humidity decreases and the dry cool air 12 is forced into the heat element 17 where the temperature is raised to the desired level. The hot dry air 18 continues to be delivered to the cabin until the measurement by the sensors which are electrically transmitted to the automatic control unit equal the desired level for temperature and humidity. If the sensors indicate that more heat is needed but not humidity, the control unit continues to operate the cabin fan 1 and heat element 17. The control unit turns off the power to the desiccant wheel torque motor 6 which will cause the desiccant wheel to stop rotating and the process of dehumidification will also stop. To stop the dehumidification process the control unit may also turn off the outside air fan 11 and it may also stop the flow of heat to the heat exchanger 13. The requirement for dehumidification normally occurs when the air-conditioner is cooling the cabin air or when the outside relative humidity is high but dehumidification can be accomplished as described in the previous FIGURES. If the control unit senses the relative humidity is below the desired level the apparatus will start the humidification cycle as previously mentioned. If the air-conditioner cooling is on when the automatic control unit senses that the relative humidity needs to be lowered the system automatically starts the dehumidification cooling cycle. The benefit of having an apparatus with the 14 pre-cooler matched with 15 PCX heat exchanger or 19 PCX2 heat exchanger is: (1) the pre-cooler can operate without increasing the temperature of air stream 10 or the pre-cooler can increase the temperature of 10 air stream. (2) depending on which heat exchanger is selected, PCX or PCX2 the temperature of the 14 pre-cooler's coolant fluid can be better regulated.

Figure 68:
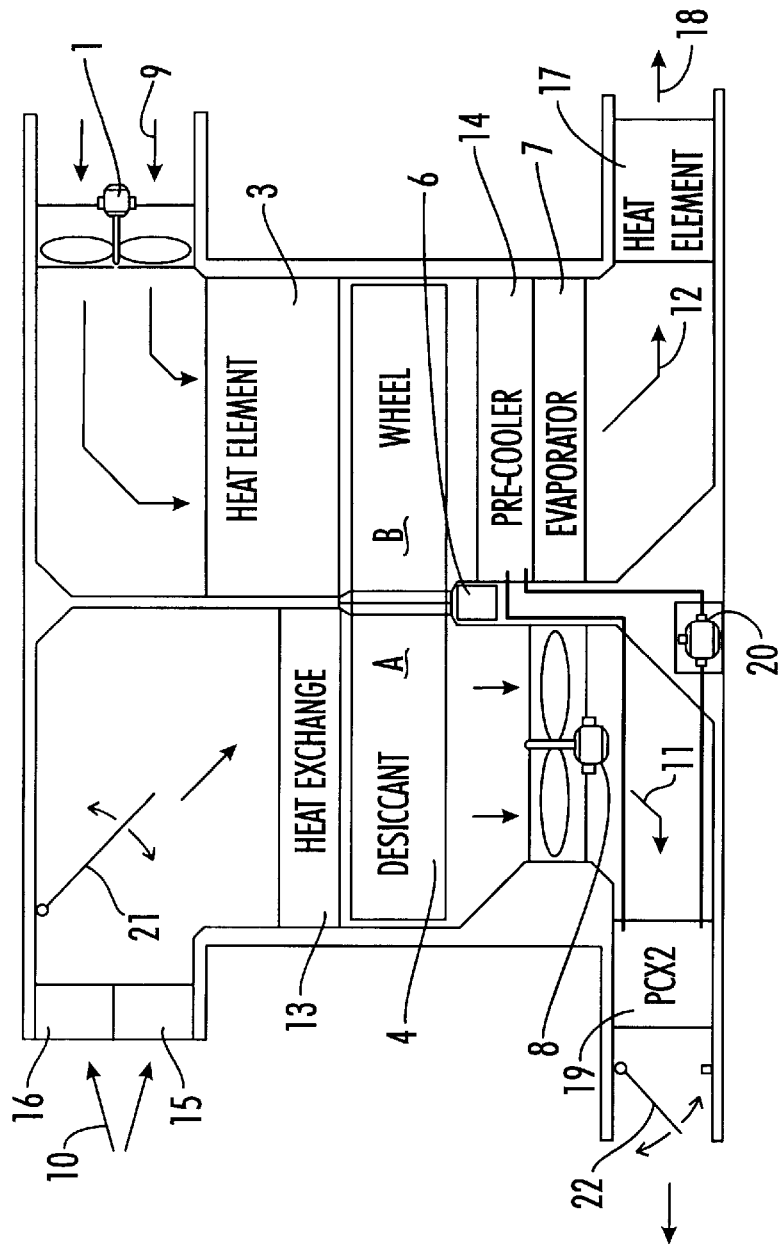
FIG. 68 is a side view of a desiccant wheel vehicle humidification/dehumidification/defog unit with a pre-cooler, PCX coils, and a split set of coils to provide heat exchange for the pre-cooler and the air-conditioner. Regeneration retention doors are shown which isolate the desiccant after regeneration while the engine is off to provide instant defog/defrost immediately after engine start up.

FIG. 68 is a side view of a desiccant wheel vehicle humidification/dehumidification/defog unit with a pre-cooler, PCX2 coils, and a split set of coils 15 & 16 to provide heat exchange for the pre-cooler and the condenser for the air-conditioner; and is similar to alternative inventive apparatus described in FIG. 62. In FIGS. 68 Items 21 & 22 damper valves and 155 Items 21, 22, & 23 damper valves are added to isolate the "A" desiccant portion of the wheel after engine shut down and after the desiccant has been regenerated to provide instant dehumidification from the residual regeneration effect on the desiccant contained in the closed apparatus and is available to provide instant dehumidification when the engine is started again. The evaporator 7 cools the air going to the cabin in a way similar to the traditional cabin air-conditioner.

The Function of Dehumidification

The apparatus removes the humidity from the air going to the evaporator coils 7 of the air-conditioning cooling. Cabin or outside air 9 enters through the cabin side fan 1 and is forced through the apparatus. The air passes through the deactivated heat element 3, then enters the desiccant wheel 4 on the (B) side where the moisture in the air is adsorbed into the desiccant. The pre-cooler 14 is activated by the automatic control unit, not shown, when the outside air 10 temperature is lower than the temperature of the air exiting the desiccant wheel 4. The coolant fluid in the pre-cooler coil 14 is circulates through pump 20, to the pre-cooler heat exchange coils 15 or 19 the PCX2 an alternate heat exchanger where the outside air 10 passes through the heat exchangers. When 14 the pre-cooler heat exchanger's coolant fluid is routed to the matching heat exchanger 15 the air stream 10 temperature may increase and cause the desiccant to adsorb less moisture during cabin humidification mode, for this reason the alternate heat exchanger PCX2 is located below the desiccant wheel where the increase in air stream temperature for 11 will not effect the desiccant on the wheel since the air stream has past the desiccant wheel before it passes through the PCX2 heat exchanger. The coolant fluid would be directed to heat exchanger 15 when additional heat is desired for air stream 10 the cabin is in the dehumidification mode. As the air stream 10 enters the system the heat transfers out of the coils 15 into the air stream which next enters the heat exchanger 13 where additional heat may be added for greater evaporation of the moisture in the "A" side of the desiccant wheel. The heat exchanger 13 may be heated by excess heat from the engine. The source of the excess engine heat may be either the engine coolant system or excess heat from the engine exhaust system. The outside air is pulled through the heat exchanger 13 and the (A) side of the desiccant wheel 4 by the outside air side fan 8. As the hot air passes through the "A" side of the desiccant wheel 4 where the moisture is evaporated out of the desiccant material. The evaporation of the moisture regenerates the desiccant coated on wheel 4. The regeneration prepares the desiccant for the adsorption cycle when it enters the (B) side of the apparatus. The torque motor slowly rotates the wheel 4 into the (B) side of the apparatus to continuously repeat the process. The condenser coils 16 for the air-conditioner cooling unit may be located in the entry of the outside air stream or in another area of the motorized vehicle. The condenser coil location for the air-conditioner cooling unit may be split, with some located in the apparatus as item 16 and others located outside the apparatus at another location in the motorized vehicle. The inventive apparatus reduces the relative humidity of the cabin side air going to the evaporator coils 7 thus increasing the efficiency of the cooling unit because the unit is cooling dry air in place of humid air. Since the relative humidity of the air passing over the evaporator coils 7 is less, the dew point of the air passing over the coils is lower. This lower dew point will allow the temperature of the coils to be lower without forming condensation. The lower temperature of the evaporator coils 7 will allow the air-conditioner cooling unit to deliver colder and dryer air to the cabin.

The cooling unit can perform the cabin cooling function with a smaller volume of air flow (CFM) for two reasons: 1.) the air has a lower temperature and 2.) the air has a lower relative humidity allowing the occupant's body to naturally cool itself through more rapid evaporation. The occupants are more comfortable and the motorized vehicle consumes less fuel. Because the environmental unit operates with a lower volume of air (less CFM) this produces a quieter cooling unit with quicker cooling results and the occupants avoids the necessity of enduring a loud blast of cool air in the face. In this drawing the air-conditioning cooling and heat system of the motorized vehicle are shown integrated into the inventive apparatus. This alternative of the inventive apparatus shown in this drawing will also provide the windshield and window glass defrost/defog/condensation removal functions automatically when the automatic control unit's sensors detect environmental conditions that could result in windshield condensation. The defog/defrost function may be performed with either fresh outside air or recirculated cabin air set by the occupant of the vehicle. The air stream 9 is pulled into the apparatus by the cabin side fan 1 which forces the air stream through the deactivated heat element 3 and passes through the "B" side of the desiccant wheel where the moisture in the air stream is adsorbed into the desiccant material. The pre cooler 14 and the air-conditioner evaporator may be deactivated during the defog mode. The dehumidified air stream 12 then passes through the heat element 17 which may be activated to melt outside ice on the windshield or increase the effect of the dehumidified air stream on defrosting of the inside glass. A damper valve (not shown) would allow the automatic control unit to provide dehumidified air 12 heated toward the windshield while the remainder of the air stream could pass into the cabin without heating or in another configuration the air may be heated for the windshield defrosting and the air going to the cabin could be cooled by the air-conditioner evaporator. The residual regeneration feature provides instant dehumidification. Depending on the vehicle's residual heat energy available after engine shut down a vehicle could be configured one of two ways: (I.) After engine shut down the wheel torque motor 6 is deactivated to stop the rotation of the desiccant wheel. The 1 cabin side fan, 3 heat element, 14 pre-cooler, 7 evaporator, and 17 heat element on the cabin side of the apparatus are deactivated. Air stream 10 is pulled by fan 8 through heat exchangers 15 & 16 and heat exchanger 13 which continues to have the engine residual heat transferred to the heat exchanger by the engine coolant circulator pump. Air stream 10 continues to receive the heat from the heat exchanger as long as there is sufficient heat energy to evaporate the moisture in the "A" portion of the wheel or until the desiccant has completed it's regeneration cycle after which fan 8 is deactivated and the air valves (damper doors) 21 & 22 close to prevent any outside moisture from entering the closed area and become adsorbed into the desiccant wheel. The anhydrous desiccant remains isolated until the engine is restarted which activates the apparatus and the anhydrous desiccant rotates into the "B" position as anhydrous desiccant before the engine temperature has increased to the required evaporation temperature. (II.) The apparatus functions as previously described with the difference that for an engine with more residual excess heat the apparatus would have two (2) additional damper doors or air valves (not shown) to prevent air from entering 9 or 18 which would close as soon as the engine stops. The cabin side fan 1, and the other components of the cabin side air stream would be deactivated (1, 3, 14, 7, & 17). The desiccant wheel torque motor remains activated to continue to slowly rotate the wheel through the hot air stream to regenerate the complete wheel after which the motors and pumps are deactivated, which would leave the complete desiccant wheel regenerated, and all the doors are closed to isolate the desiccant from any moisture that may be in the outside atmosphere.

Figure 69:
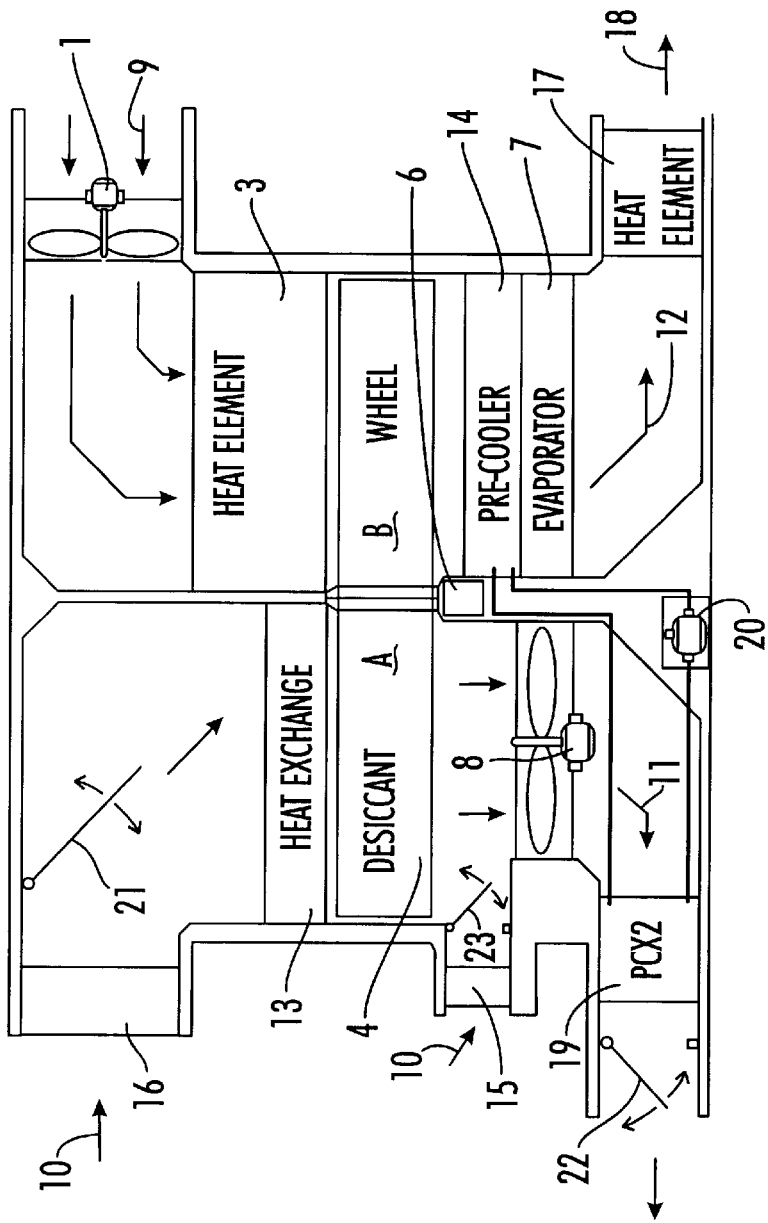
FIG. 69 is a side view of a desiccant wheel vehicle humidification/dehumidification/defog unit with a pre-cooler, PCX coils, and a two separated sets of coils to provide heat exchange for the pre-cooler and the air-conditioner. Regeneration retention doors are shown which isolate the desiccant after regeneration while the engine is off to provide instant defog/defrost immediately after engine start up.

FIG. 69 is a side view of a desiccant wheel vehicle humidification/dehumidification/defog unit with a precooler, PCX coils, and a split set of coils to provide heat exchange for the pre-cooler and the air-conditioner similar to the inventive apparatus shown in FIG. 68, with the exception that 15 the heat exchanger has been moved to a location below the desiccant wheel which will allow the apparatus to pass an air stream through 15 the heat exchanger with out increasing the temperature of the air stream going through the "A" side of 4 the desiccant wheel and a damper door or air valve 23 has been also added to provide a complete closure for the apparatus to prevent the intrusion of moisture after the desiccant wheel has been prepared for residual regeneration. The apparatus is capable of using 14 the pre-cooler to regulate the temperature of 12 the air stream going to the cabin under certain conditions without having to activate the air-conditioner cooling evaporator coils which would have use additional energy. The functions of the pre-cooler are similar to those shown in FIG. 66 which also has the 15 heat exchanger located in this position.

Figure 70:
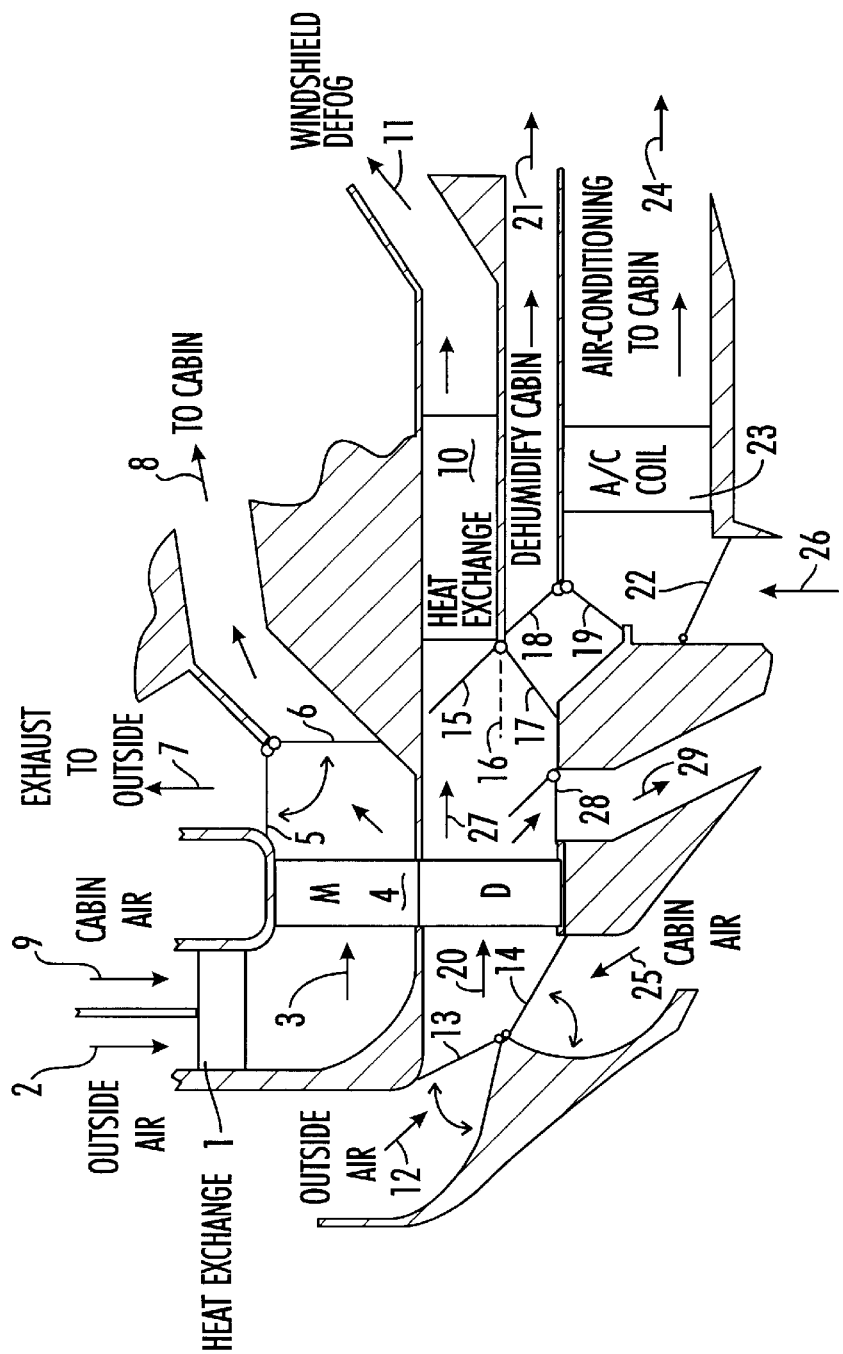
FIG. 70 is a diagram of the air valves for a desiccant wheel vehicle humidification/dehumidification/defog system which may be adapted to a previously manufactured vehicle.

FIG. 70 is a diagram showing the various positions of air valves and components for a desiccant wheel vehicle humidification/dehumidification/defog system where the humidification & dehumidification processes is shown for the apparatus with the functions shown independently and separated from the traditional motorized vehicle environmental control unit. This variation of the inventive apparatus may be adapted to the conventional heating and cooling unit by air ducts and damper valves as shown in FIGS. 60 and 70 through 75. The FIGS. 60 and 70 through 75 show an apparatus that may be attached to an existing motorized vehicle environmental unit for a previously manufactured motorized vehicle. Although this series of drawings and diagrams and others throughout these descriptions do not identify air filters in every case, the air entering the desiccant wheel or canister must be filtered to prevent the accumulation of foreign particles in the small air ways of the internal structure and percent the air stream from impinging on the desiccant coated on the surface of the structural material. The type of filters utilized may vary depending on the requirements of the vehicle. The effective life of the desiccant coated on the wheel depends on the proper adhesion of the desiccant to the structure and the prevention of foreign particle entering the apparatus. If centrifugal filters or other indefinite life filters are not used, then the replacement schedule of filters dirty must be considered by the operator or dirty filter indicators should be considered by the manufacturer to warn the operator to the air flow restriction caused by dirty filters on all units. The dimensions of the inventive apparatus could be modified to match the existing environmental unit of various motorized vehicles. In FIG. 70 the air valves (damper doors) are shown in various positions for the purpose of identification only, the apparatus would not operate as shown in this drawing. In most cases the regenerative side of the apparatus consist of items: 1 the heat exchanger providing the heat for regeneration during the dehumidification mode and defog mode for the windshield, the outside air 2 or cabin air 9 goes through the heat exchanger 1 to produce a hot air steam 3, the hot air stream 3 enters the regeneration (evaporation) side "M" of the desiccant wheel 4, where the air stream is converted to a warm/hot moist air stream when the moisture in the desiccant evaporates in to the air stream, both air valves 5 & 6 are shown in the closed position., when air valve 5 is open the air will flow to 7 the outside atmosphere. If air valve 5 is closed and 6 is open the hot/warm air stream will flow into 8 the cabin to provide moist heated air for the cabin which is either fresh outside air or recirculated cabin air.

In most cases the adsorption side of the apparatus may be described as consisting of: an outside air source 12 with air valve 13 open or cabin air 25 with 14 air valve (damper door) open. Air stream 20 from either 12 or 25 enters the desiccant wheel 4 and passes through the portion of the wheel located in the "D" position where the moisture in the air stream is adsorbed into the anhydrous desiccant material. The desiccant wheel 4 is slowly rotated to transfer the moisture from the "D" position to the "M" position of the case by the wheel torque motor not shown. Also not shown are other various components such as the seals, filters, fan, fan motors, sensors and the automatic control unit. Air stream 27 exits the desiccant wheel with a reduced level of relative humidity to supply 11 an air stream to defog/defrost the windshield, 21 an air stream to lower the relative humidity of the cabin, and/or 24 to increase the efficiency of the air-conditioner cooling. When air valve 15 is open air stream 27 passes through heat exchanger 10 which may be utilized to increase the temperature of the dehumidified air stream 11 which exits the windshield vent as either a cool or hot dehumidified air stream to remove the moisture from the inside of the windshield glass. The apparatus is capable of defrosting the inside of the windshield glass utilizing recirculated cabin air. When air valve 17 is open air stream 27 may enter through air valve 18 for cabin dehumidification or air valve 19 to increase the air-conditioning efficiency. When air valve 15 & 17 are in position 16, air stream 27 will flow to both the windshield defog air way, and the air way to the cabin and the air-conditioner cooling coils 23. When air valve 19 is closed air valve 22 may be opened to allow air stream 26 which may be either outside air or cabin air to pass through 23 the air-conditioner coils without passing through the desiccant wheel. Air valve 28 may be opened when 15 & 17 are closed to allow air stream to exit to 29 the outside atmosphere.

Figure 71:
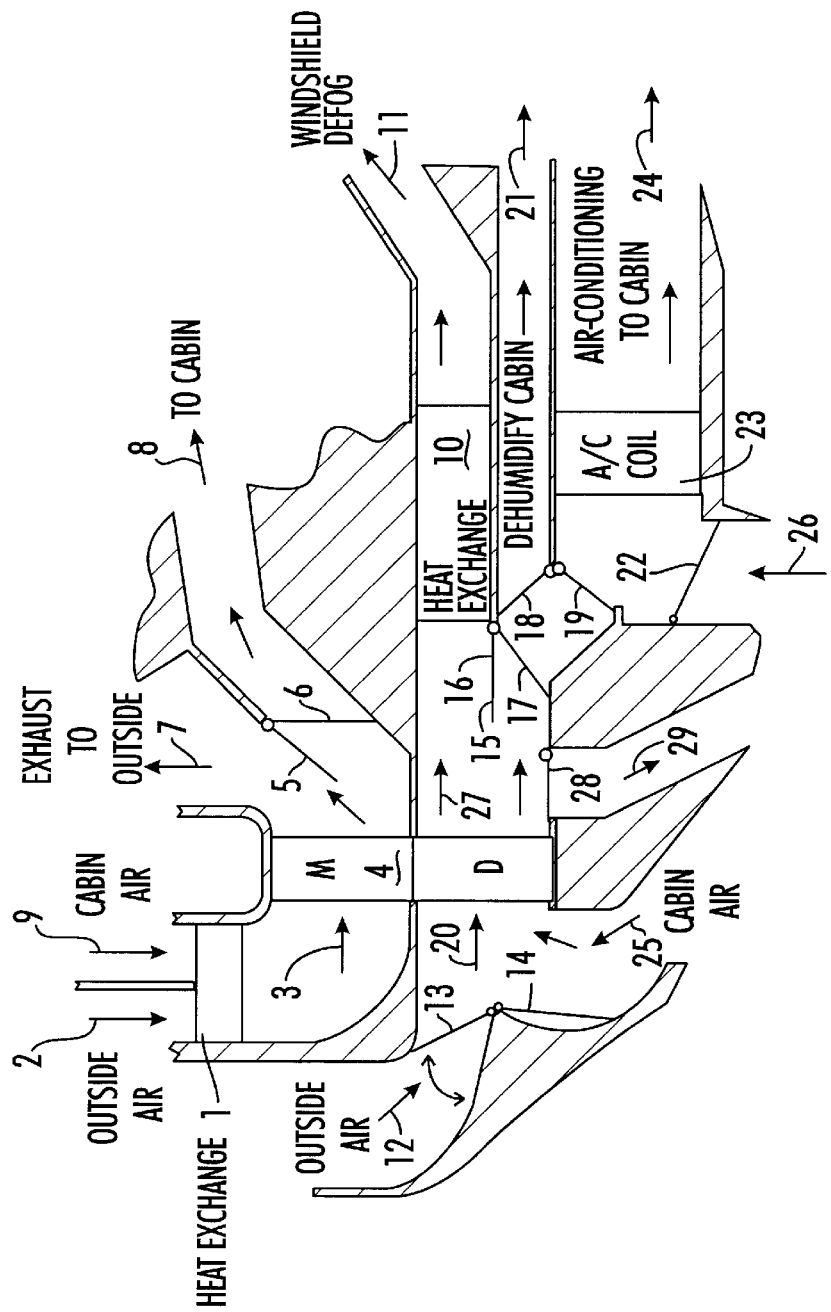

FIG. 71 is a diagram showing the air flow through a variation of the inventive apparatus where dehumidification is utilized for defrosting the windshield. Item 12 fresh outside air or 25 recirculated cabin air may be utilized to defog/defrost the inside windshield glass of a motorized vehicle. Air stream 25 which is recirculated cabin air is shown passing through open air valve 14 which enters the slowly rotating desiccant wheel where the anhydrous desiccant adsorbs the moisture out of the air stream and exits 27 as a dehumidified air stream to pass through open air valve 15 and enter the heat exchanger 10 which may utilizes excess engine heat to increase the temperature of 11 the dehumidified air stream which exits the windshield vent and impinges on the inside of the windshield glass to prevent or remove condensation. The heat from 10 the heat exchanger may be utilized to melt snow or ice on the exterior of the windshield glass or increase the evaporation effect of 11 on the inside of the glass. On the evaporation side of the apparatus air stream 9 from the cabin would not be utilized during this mode of operation. Air stream 2 from outside atmosphere passes through heat exchange 1 to increase the temperature of the air stream to the level necessary to cause the moisture in the hydrous desiccant to evaporate as 3 the hot air stream passes through that portion of 4 the desiccant wheel which has slowly rotated into the "M" position. Air valve 5 is open to allow the hot humid air stream to exit the apparatus into the atmosphere. The apparatus has utilized desiccant materials to removed the moisture from a cabin air stream and transfer that moisture to another air stream which expelled the moisture into the atmosphere. The apparatus is also capable of supplying fresh outside air 12 to perform the windshield defrosting when air valve 13 is open and 14 is closed.

Figure 72:
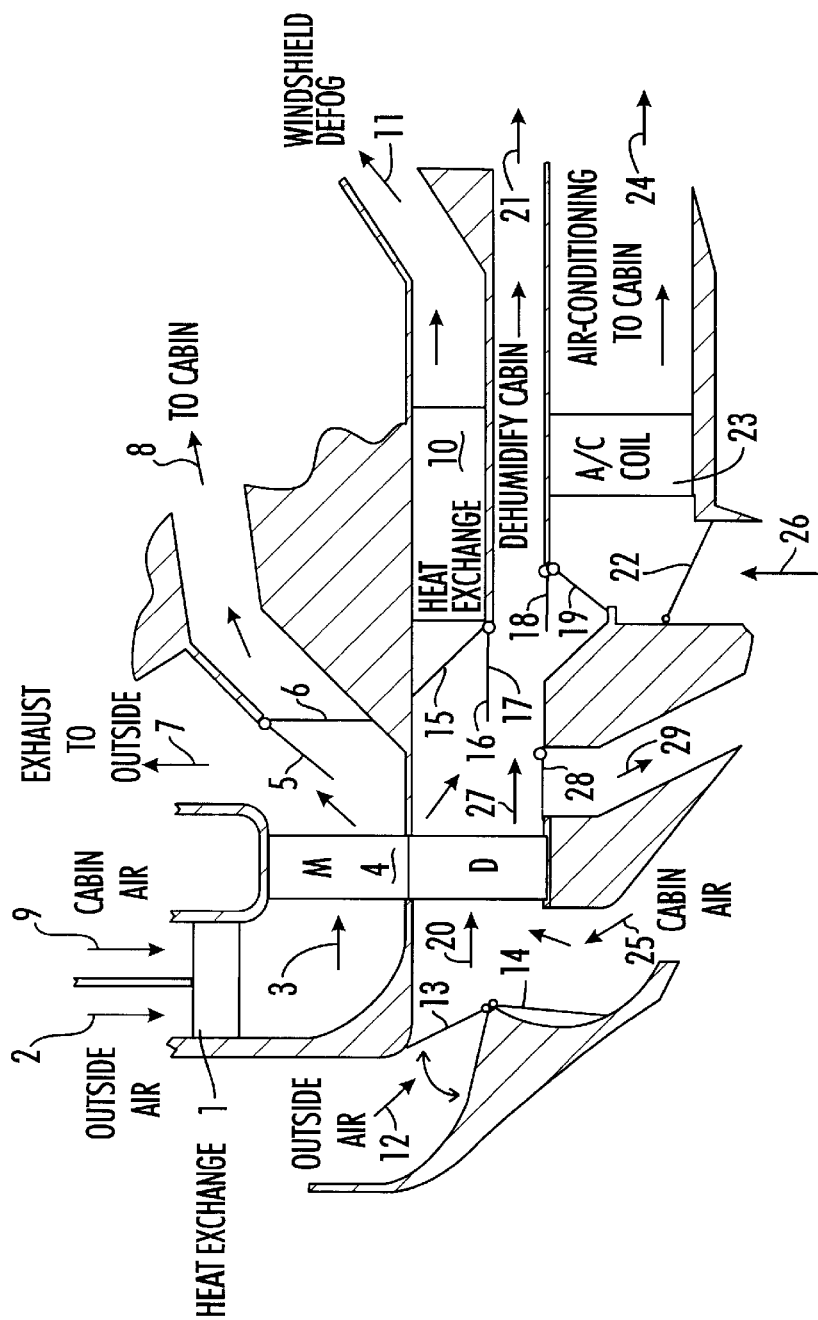

FIG. 72 is a diagram of an alternative of the inventive apparatus utilizing a similar methods to those shown in FIG. 71, but where dehumidified air 21 is directed to the cabin to reduce the relative humidity of the cabin air. The air valve 17 is open to allow the dehumidified air to pass directly into the cabin while air valve 15 is closed to prevent 27 the air stream for going to the windshield vent. Either 25 cabin air may be recirculated into the cabin after the water vapor is removed when air valve 14 is open, or 12 fresh outside air may be utilized when air valve 13 is open and 14 is closed.

Figure 73:
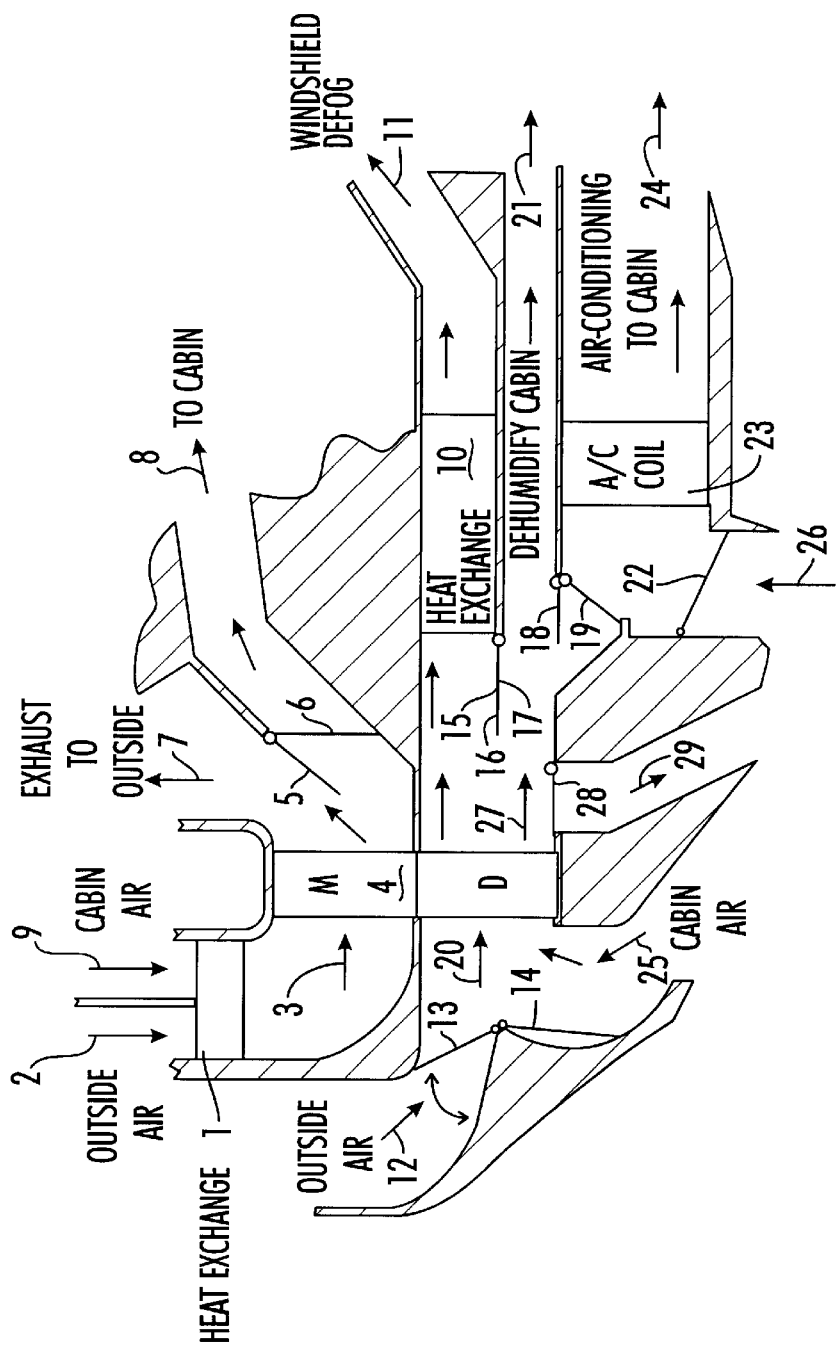

FIG. 73 is a diagram of an alternative of the inventive apparatus utilizing a similar methods as those shown in FIGS. 71 & 72 to provide dehumidified air, but where the dehumidified air stream 27 may pass into both the cabin 21 and also defrost the windshield, where air valves 15 & 17 are open and 16 may move up or down to adjust the percent of air flow to each vent. Air stream 21 may pass through a heat exchanger (not shown) to regulate the temperature of the air cabin stream by transferring excess engine heat to the air stream before it enters the cabin.

Figure 74:
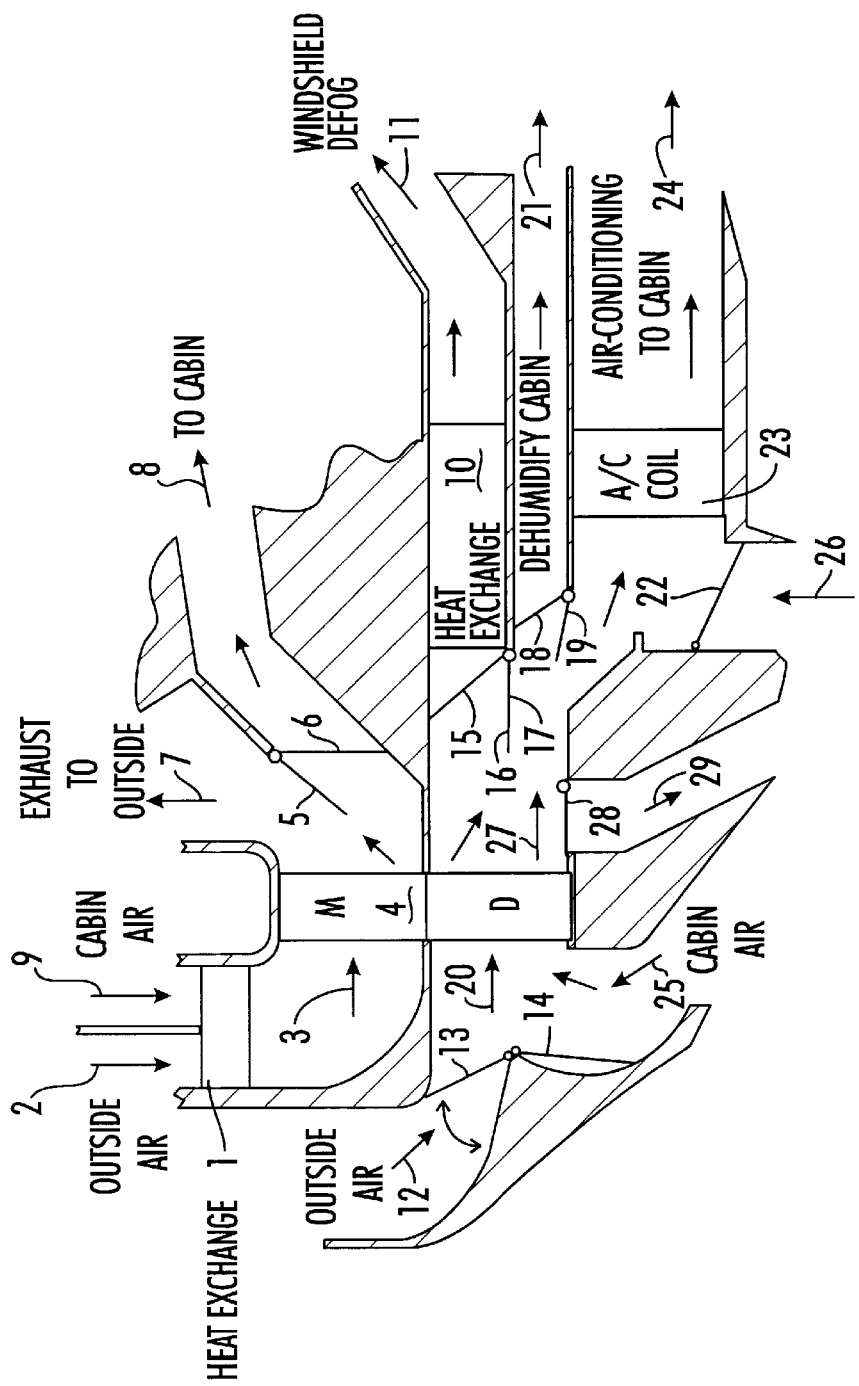
FIG. 74 is a diagram of the air valves for a desiccant wheel vehicle humidification/dehumidification/defog system with dehumidification of the air supply for the air-conditioner to provide enhanced air-conditioner efficiency.

FIG. 74 is a diagram of an alternative of the inventive apparatus where the method of dehumidification is similar to those shown in FIG. 72 to provide dehumidified air, but where air valve 18 to the cabin is closed and air valve 19 is open to direct the dehumidified air stream through the air-conditioner evaporator coils 23 to cool the air stream before it enters the cabin. The removal of the moisture in 27 the air stream before the air passes through the air-conditioner coils 23 increases the efficiency of the air-conditioner. The occupant of the vehicle may select fresh outside air 12 as the air source or recirculated cabin air 25 for dehumidification of the air stream going into the air-conditioner coils.

Figure 75:
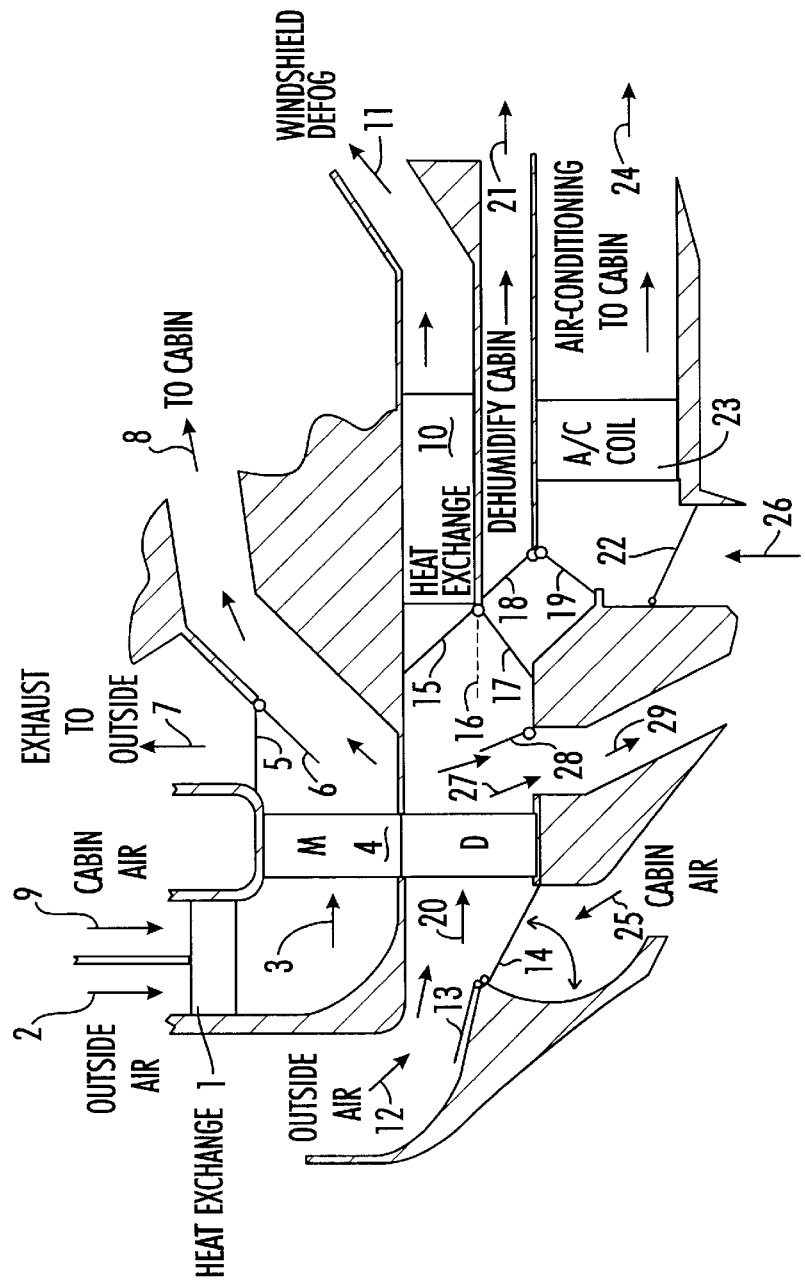

FIG. 75 is a diagram of an alternative of the inventive apparatus where either fresh outside air or recirculated cabin air is heated and humidified to provide the cabin with a warm/hot humidified air stream. The out side air 2 or recirculated air 9 is selected by the occupant which passes through 1 a heat exchanger utilizing excess engine heat to raise the air temperature to a level which will cause the moisture in the portion of the desiccant wheel 4 which is in the "M" positioned to evaporate into the air stream and pass through the open air valve 6 which directs the air stream into the cabin. The cabin relative humidity level is regulated by the automatic control unit (not shown) which activates or deactivates the wheel torque motor to start or stop the humidification process. The apparatus functions similar to the method described in FIG. 57 & 58. The source of moisture for the humidification is either 12 outside air or 25 cabin air.

Figure 76:
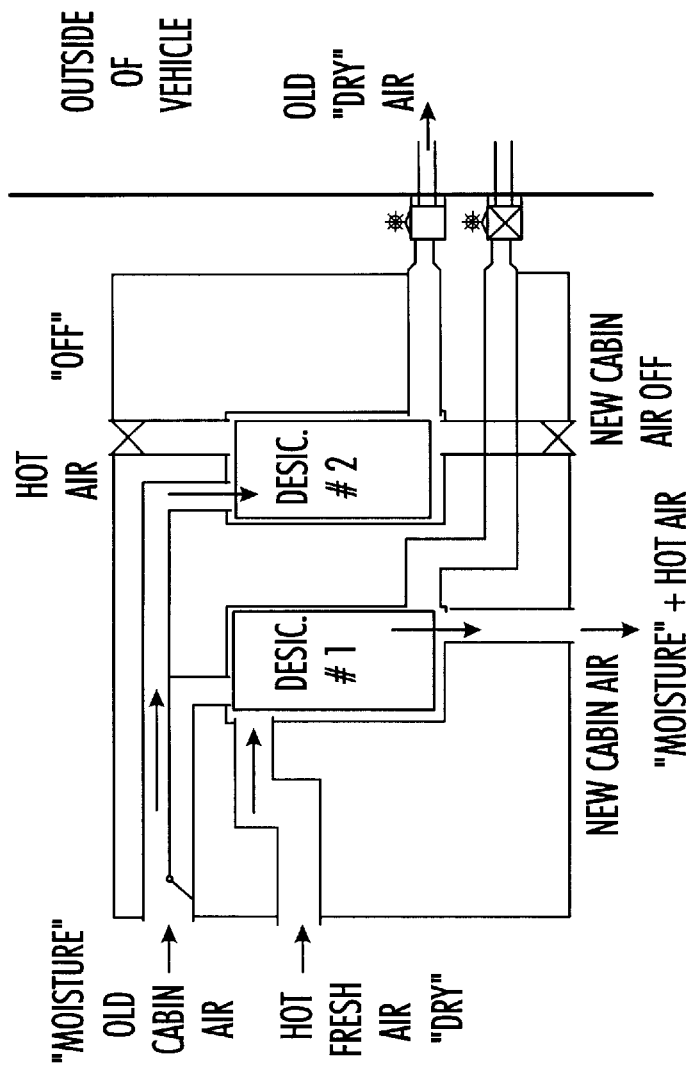
FIG. 76 is a diagram of a duel desiccant canister humidification system for a land based vehicle.

FIG. 76 is a diagram of a duel desiccant canister humidification system for a surface motorized vehicle for land or sea operation which is similar to FIG. 34 where the moisture given off by the occupants of the cabin can be reclaimed and evaporated into the fresh air stream entering the cabin.

Figure 77:
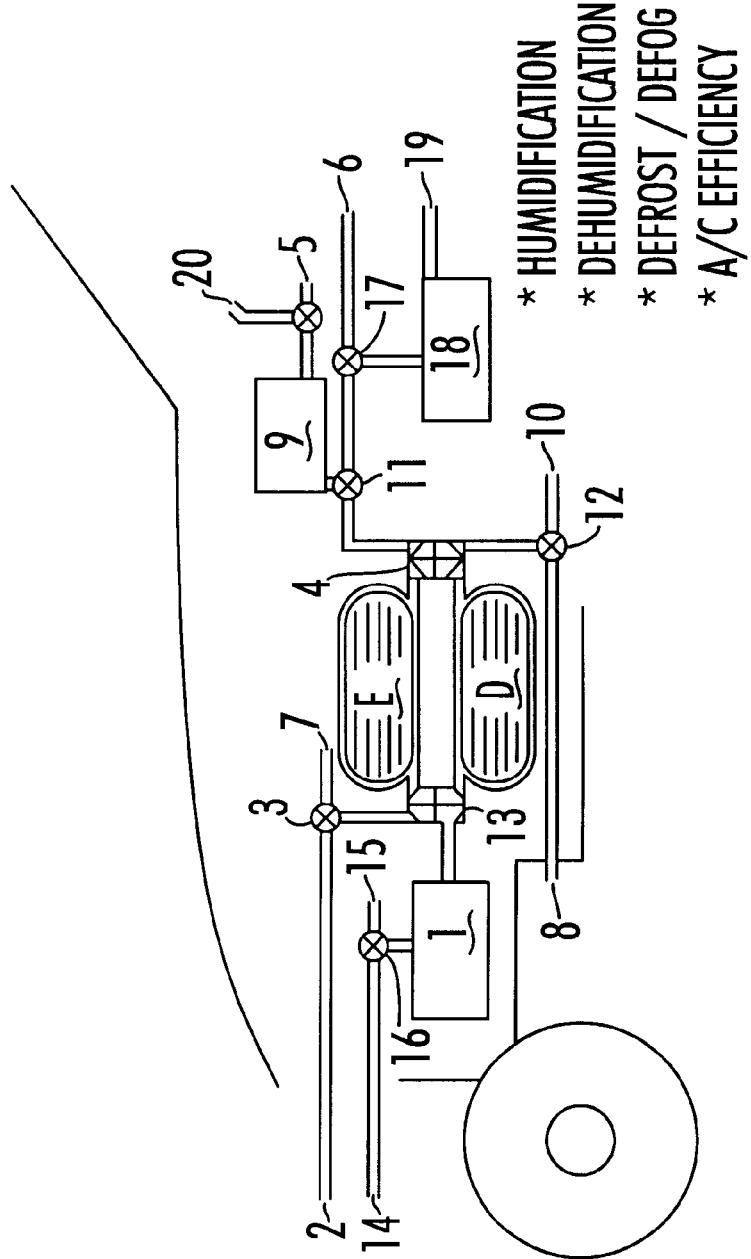
FIG. 77 is a diagram of a duel desiccant canister humidification system capable of humidification, dehumidification, windshield defrost and enhanced air-conditioner efficiency with either fresh outside air or recirculated cabin air going into the cabin.

FIG. 77 is a diagram of an alternative of an inventive apparatus with a duel desiccant canister humidification system capable of humidification, dehumidification, windshield defrosting, and enhanced air-conditioner efficiency utilizing two rotary crossover valves. The use of desiccant canisters in place of a desiccant wheel may offer greater flexibility in the shape, location and size options for the apparatus. The canisters are identified during this cycle as "E" which is releasing moisture through the process of evaporation and "D" which is adsorbing moisture out of the air stream and producing a dry (dehumidified) air stream. The automatic control unit, sensors, fans, the heat exchanger coolant fluid system and filters are not shown.

The Function of Humidification

Fresh outside air 14 or cabin air 15 may be selected by the occupant of the vehicle on the automatic control unit after which the automatic control unit activates the air valve (damper) to deliver the desired air stream to 1 the heat exchanger which increases the temperature of the air stream to the level necessary to perform the evaporation of the moisture out of the hydrous desiccant material when the hot air passes through 13 the input rotary crossover valve and then for this cycle enters desiccant canister "E" where the hydrous desiccant is heated by the hot air stream and the evaporation of the moisture out of the desiccant occurs. The warm/hot humidified air stream then is directed by 4 the output rotary crossover valve to air valve 11 which directs the hot humid air stream through air valve 17 then next into the vehicle heater vent 6 for the cabin heating with moist hot air. The moisture for the process is supplied to the apparatus by either 2 outside air or 7 inside cabin air. The air valve 3 is controlled by the automatic control unit which selects the air source with the highest relative humidity. The air stream then is directed by 13 the rotary crossover valve to the anhydrous desiccant canister "D" where the moisture in the air stream is adsorbed by the desiccant canister during this cycle. The air stream which exits the "D" canister through the output rotary crossover valve 4 leaves it's moisture in the desiccant material and is directed through air valve 12 to the outside atmosphere 8. As the sensors for the automatic control unit detect that the moisture has evaporated out of canister "E" and canister "D" is becoming saturated with moisture the automatic control unit rotates the rotary crossover valves 13 & 4 to switch to different canisters to alternate the process for each canister. A four (4) canister apparatus (not shown) is an alternative to the inventive apparatus where the duel pairs of canisters would cycle at different times to provide uninterrupted air flow and would discontinue utilizing the air stream from the canister as it approaches the completion of it's cycle which would produce the most desirable air stream for the cabin. When the sensors indicate to the automatic control unit that the relative humidity has reached the desired level and humidification is no longer required, the automatic control unit discontinues the cycling of the crossover valves and allows the air stream to continue to flow through one of the canisters which stops the humidification process since no more moisture is added to the desiccant.

The Function of Dehumidification

When the automatic control unit sensors indicate to the controller that dehumidification is required the automatic control unit may utilize 2 outside fresh air or 7 cabin air which will be dehumidified and delivered to the cabin depending on which air source the occupant has set on the automatic control unit. The automatic control unit activates 3 air valve to select the desired air stream which is directed to the 13 the input rotary crossover valve which for this cycle directs the air stream to be dehumidified into "D" desiccant canister which contains anhydrous desiccant to adsorb the moisture out of the air stream as it passes through the canister to 4 the output rotary valve which directs the air stream to 11 air valve which directs the dehumidified air stream into several possible directions depending on the desired result: (1) for windshield defrosting with or without heat or cabin heat with low relative humidity the air valve 11 directs the air stream to 9 a heat exchanger utilized to add heat derived from excess engine heat to the air stream when the coolant flow valve (not shown) is opened. When the coolant fluid flow valve is closed heat is not added. The air stream exits the 9 heat exchanger and passes through another air valve which regulates the amount of air flow to either 20 the windshield defrost vent or 5 the cabin air vent. Air valve 11 may be utilized to direct a hot dehumidified air stream to defrost the windshield while delivering another portion of the dehumidified air stream to the cabin through vent 6 or 19. (2) for dehumidified cabin air or increased air-conditioner cooling efficiency air valve 11 directs the dehumidified air stream from 4 the output rotary crossover valve to air valve 17 which regulates the air flow to either 6 the cabin air vent or for cooling to 18 the air-conditioner evaporator coils which cools the dehumidified air stream before it is directed into the cabin by 19 the air-conditioner vent. The desiccant canisters have similar capabilities to the desiccant wheel utilizing the alternating action of rotary crossover valves or other types of air valves which transfer moisture from one air stream to another.

FIG. 78 is a drawing of an engine exhaust heat exchanger which is capable of transferring excess engine heat from one air stream to another which is utilized to. Caution must be given to the manufacture and location of the apparatus to prevent carbon dioxide gas and other engine exhaust gases from mixing with the cabin air stream or damage to the apparatus. The input and out put arrows labeled "EX." indicate the flow of high temperature exhaust gas from the engine which passes through a section of the exhaust pipe surrounded by another enclosed casement which contains the air stream receiving the heat from the hot exhaust gas without mixing with the exhaust gas. The heated air stream will be utilized as cabin air in some modes of operation of the inventive apparatus.

FIG. 79 is a drawing of an excess engine heat recovery system showing some of the sources of excess engine heat. Any one or combination of the following Items may be utilized to provide the heat source for regeneration of the desiccant which is capable of causing the moisture in the hydrous desiccant to evaporate into the hot air stream. Item 1 is the AIR FLOW OVER THE ENGINE BLOCK contained in an air shroud capable of directing the hot air to the desired location. Item 2 represents the AIR GOING INTO AIR-CONDITIONER CONDENSER COILS & ENGINE COOLANT (RADIATOR), which then is directed into 10 the DESICCANT SYSTEM ROTARY VALVE. Item 3 a FAN FOR ENGINE AND EXHAUST RECOVERY SYSTEM to force the hot air stream through the engine shroud and into the inventive apparatus. Item 4 the FAN FOR CONDENSER & RADIATOR cooling which forces the hot air stream into the inventive apparatus. Item 6 EXHAUST MANIFOLD with an air shroud encasement to direct the air stream which is heated by the manifold into the inventive apparatus. Item 7 is the CATALYTIC CONVERTER encased in an air shroud to direct the hot air surrounding the catalytic converter into the inventive apparatus. Item 8 is a EXHAUST PIPE HEAT EXCHANGER with an (ARROW WHICH REPRESENTS EXHAUST FLOW DIRECTION) similar to the component shown in FIG. 78. Item 9 is the AIR-CONDITIONER CONDENSER COIL. Item 10. is the DESICCANT ROTARY AIR VALVE or SLIDE AIR VALVE used to alternate the hot air flow between the "A" & "B" desiccant canisters. Item 11 is the ENGINE COOLANT RADIATOR. Item 12 is the ENGINE COMPARTMENT WALL or ENGINE COWLING which is utilized to contain the air flow over the engine. Item 13 is the AIR TRAVELING THROUGH A SEPARATE AIR DUCT which is directed over the EXHAUST MANIFOLD, CATALYTIC CONVERTER, EXHAUST PIPE HEAT EXCHANGER, then directed into 10 the DESICCANT SYSTEM ROTARY VALVE. Item 14 is the AIR DUCT TO EXHAUST MANIFOLD. Items "A" & "B" are DESICCANT CANISTERS.

Figure 80A:
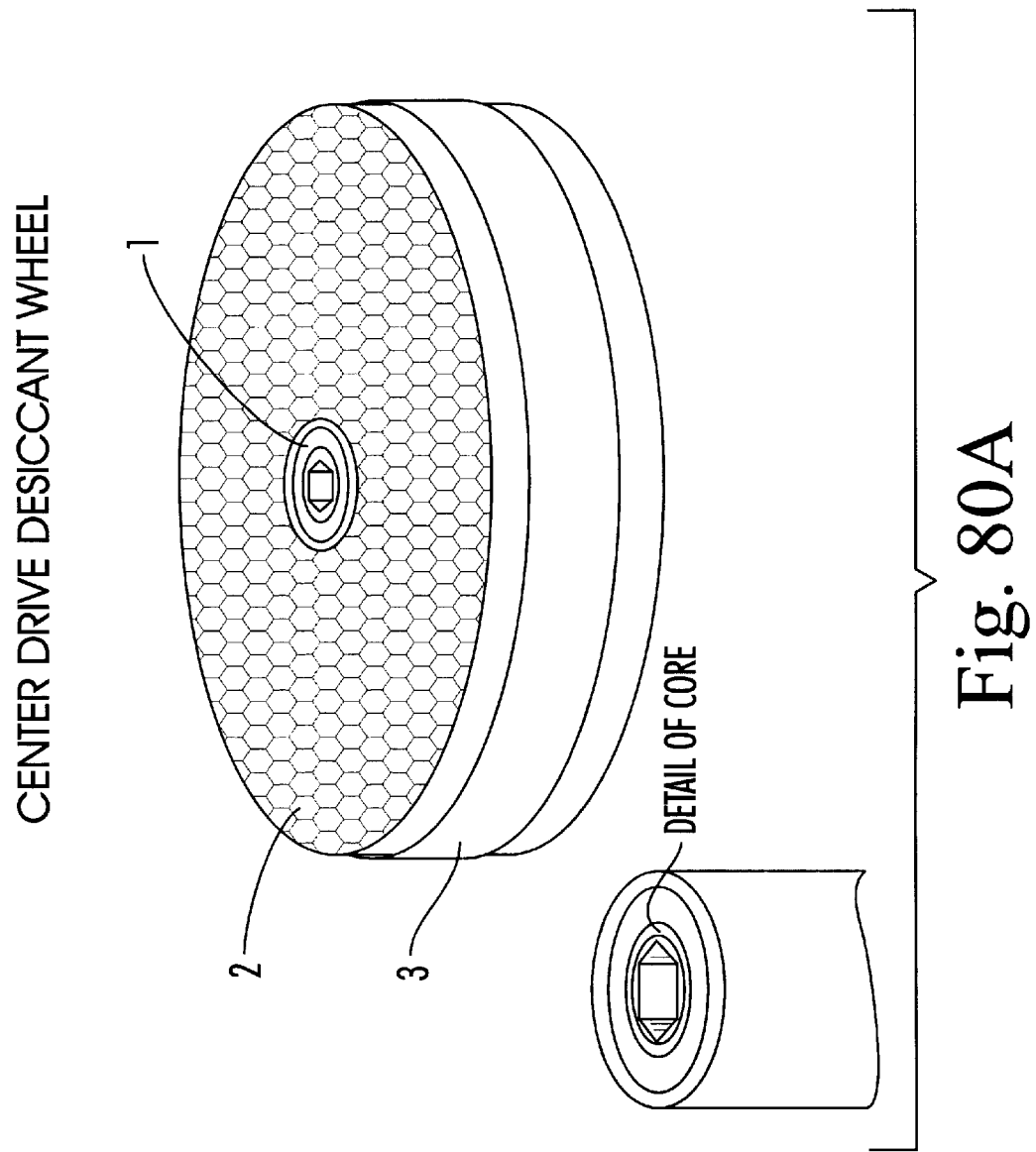
FIG. 80A is a drawing of a desiccant coated NOMEX honeycomb center drive desiccant wheel.

FIG. 80A is a drawing of a NOMEX honeycomb center drive desiccant wheel similar to the one shown in FIG. 9B. Detail "A" shows the female spline drive which connects to the drive shaft from the rotary torque motor for the wheel. Detail "A" shows Item 1 which can be made of metal, plastic or NYLON material and bonded to the center of 2 the NOMEX honeycomb. Item 3 is the perimeter ring which may be metal, plastic, or NYLON to provide a smooth surface for the seals to contact and add strength to the wheel.

Figure 80B:
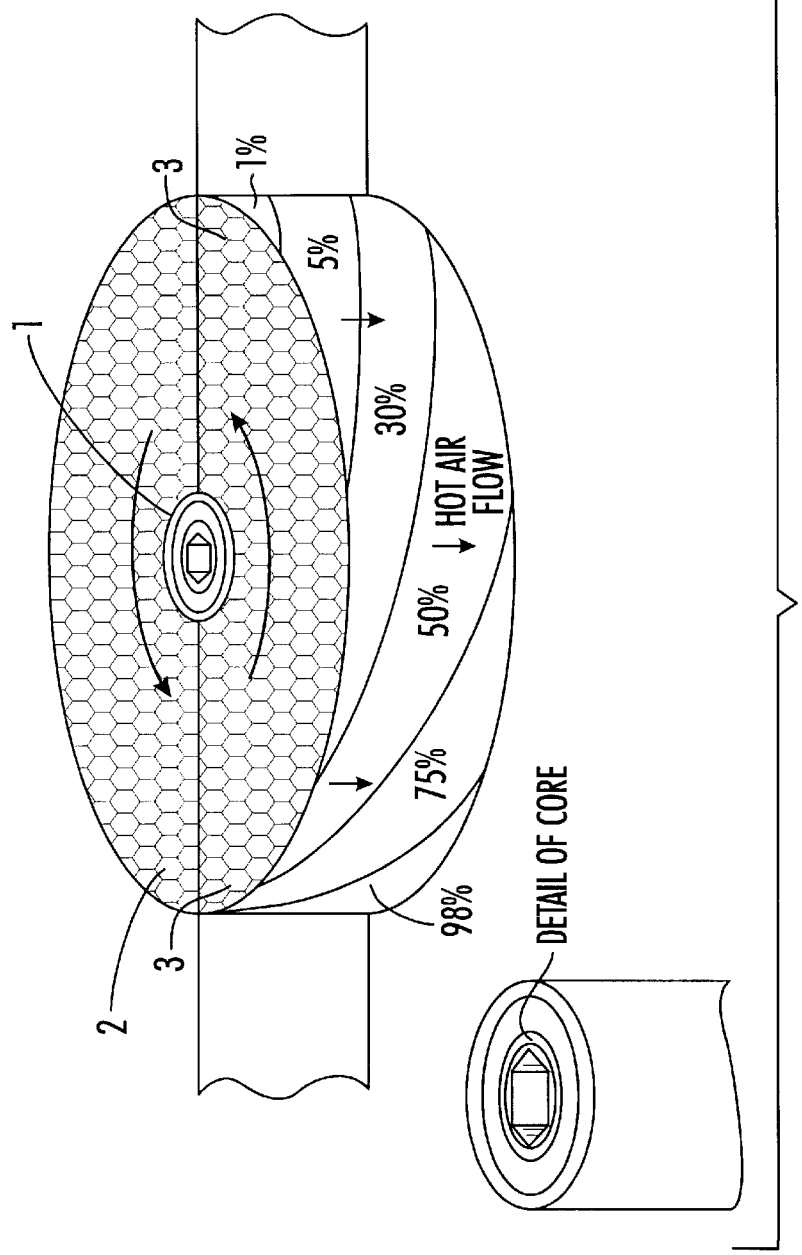
FIG. 80B is a drawing of a desiccant coated NOMEX honeycomb center drive desiccant wheel showing the retained moisture content percentages as the wheel rotates.

FIG. 80B is a drawing of a NOMEX honeycomb center drive desiccant wheel similar to FIG. 80A showing the retained moisture content of the desiccant during rotation. The arrows on each side of 1 the female spline drive represent the direction of rotation as the hot air stream passes through the half of the wheel in the foreground 3 which is in the regeneration cycle while the other half of the wheel 2 is in the adsorption cycle. The three arrows pointing downward represent the direction of air flow for the hot air stream through the honeycomb which evaporates the moisture out of the desiccant. The sloped bands identified with the percentage numbers represent the percent of moisture content as the desiccant wheel slowly rotates through the regenerative position. These bands indicate how the hot air stream evaporates out the moisture at a higher rate when it first enters the small passage ways of the honeycomb and when the air approaches the bottom of the wheel the air has less ability to remove moisture since it is becoming saturated with moisture and it's temperature is beginning to decrease. The longer the wheel is exposed to the hot air stream the lower the moisture content resulting in the slope of the percentage band lines. The speed of rotation, size and shape of the wheel combined with the temperature of both the adsorption and evaporation air stream must be considered for each application to gain the most efficient use of the apparatus. The automatic control unit may monitor the temperature and relative humidity of the input and out put air stream to regulate the operation of the apparatus to gain the optimum efficiency.

Figure 81:
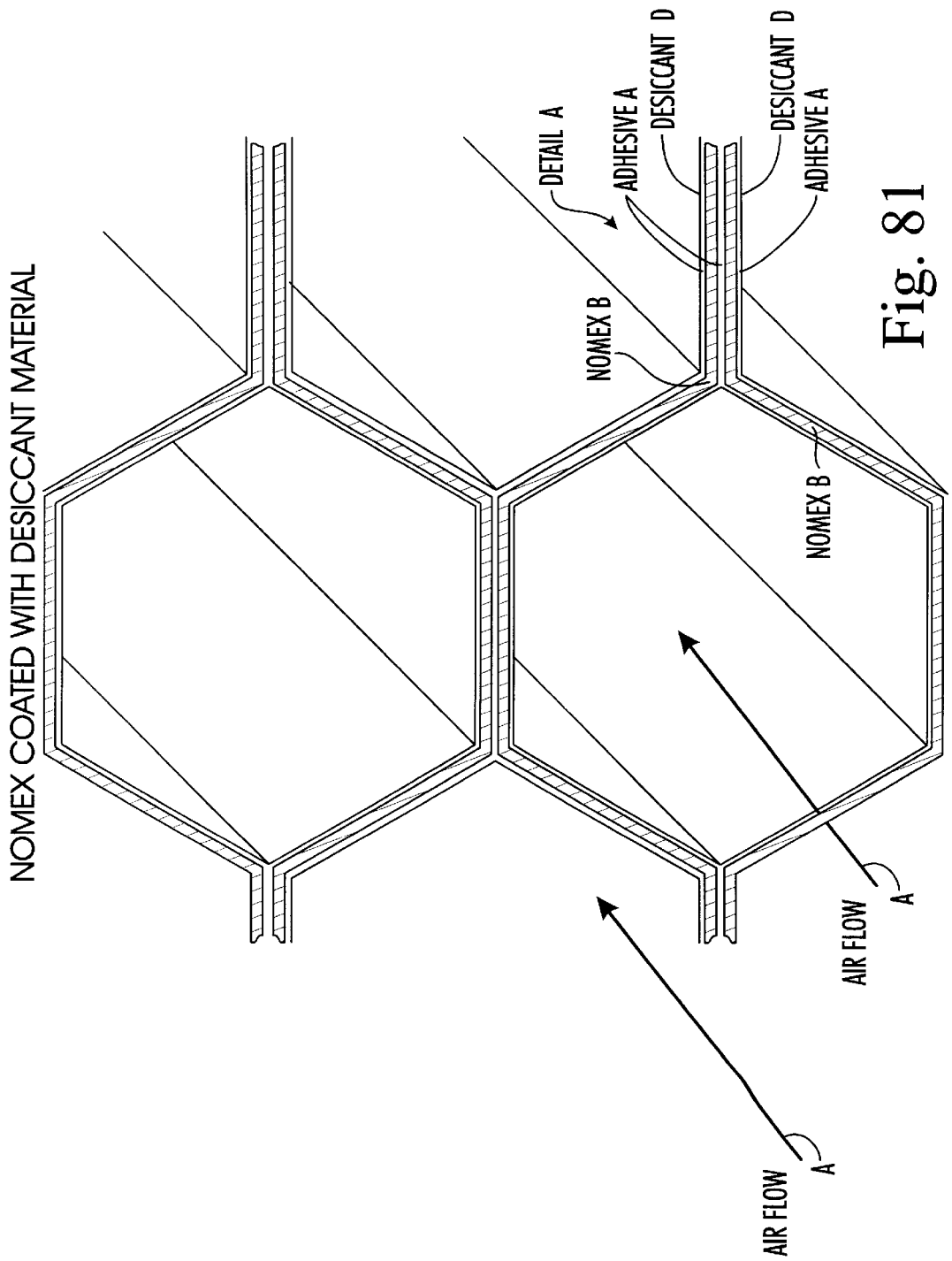
FIG. 81 is a detail view of desiccant coated NOMEX honeycomb.

FIG. 81 is a detail view of the desiccant coated NOMEX honeycomb structure utilized in the desiccant wheel and desiccant canisters to provide the surface area exposure to the air stream with arrows showing the air flow (A) direction as the air stream enters the passageways formed by the NOMEX honeycomb. The desiccant may be coated on the surface of the honeycomb NOMEX which provides the structural shape upon which the desiccant is coated to provide maximum exposure of the desiccant to the air stream. The interior surface of all the small passage ways formed by the honeycomb is preferably coated with the desiccant material. Detail "A" shows two different size enlargements of the honeycomb structure, adhesive, and desiccant. The desiccant may be applied in various ways, one of which is to first coat the surface of the NOMEX with adhesive and then apply the desiccant to the adhesive covering the surface of the NOMEX, another is to mix the desiccant with the adhesive and apply them both to the surface of the NOMEX.

Figure 82:
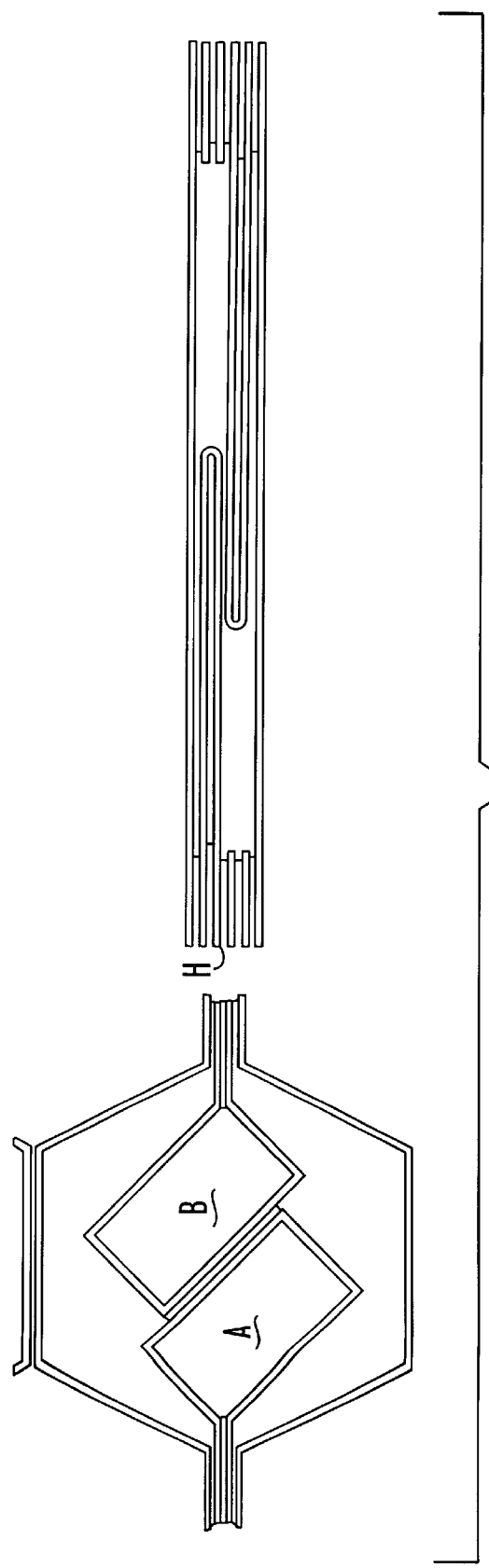
FIG. 82 is a detail view of super surface NOMEX honeycomb providing additional surface area to enhance the adsorption and evaporation process for a desiccant apparatus and the additional structure provides improved compression and lateral strength when the honeycomb is utilized in this apparatus or other structural applications.

FIG. 82 is a detail view of Super Surface NOMEX honeycomb which is an alternative structure and may be utilized for the wheel or canister to provide additional surface area for the enhancement of the adsorption and evaporation process, and increase the structural strength over the traditional NOMEX honeycomb shape. NOMEX honeycomb has been utilized in the manufacture of structural assemblies where strength and weight are important requirements for the structure such as aircraft and other items. In most aircraft structure where the honeycomb is used the honeycomb is sandwiched between and bonded to two sheets of a flat surface material to produce a strong but light weight structure. Since the limitation of weight is such an important requirement in aircraft, every effort has been made to remove the material weight in aircraft manufacturing, however, in the case of "Super Surface" honeycomb weight has been added by the additional shape placed inside the traditional honeycomb shape to increase the exposure of surface area to the air stream. Other efforts to increase the surface area have been limited to making the size of each cell smaller and in this way the surface area is increased, however, this has caused a significant limitation to the ability of the air to flow through the passage ways. In the lower section of the drawing Item "H" is showing the honeycomb before it is expanded with the sheets of NOMEX bonded together. In the upper section of the drawing the "Super Surface" honeycomb is shown expanded with the inventive structure added and identified as Items "A" & "B" positioned in the center of the traditional honeycomb structure.

Figure 83:
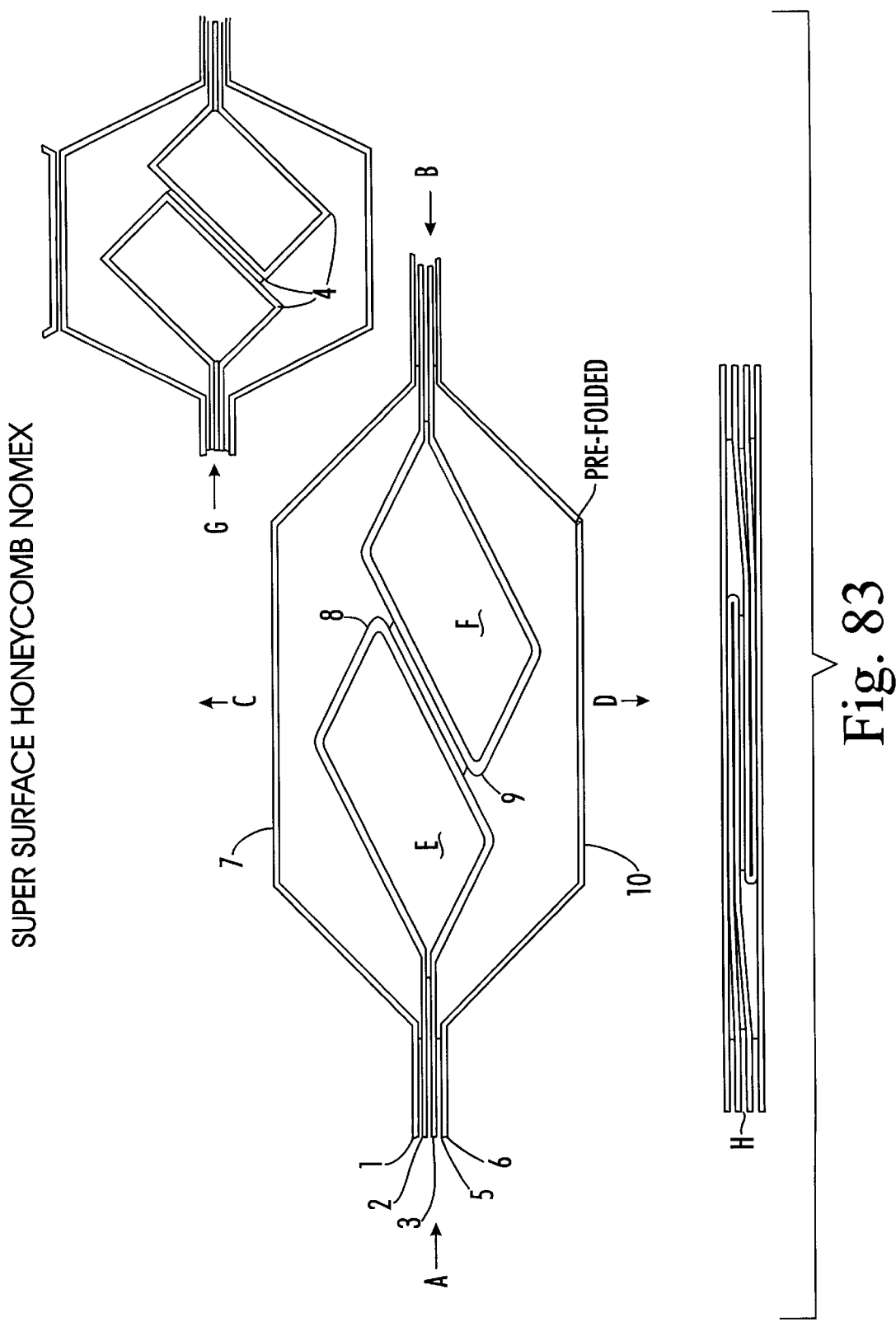
FIG. 83 is a detail view of the expansion process of super surface NOMEX honeycomb showing the flat, partially expanded and the completely expanded structure where the corners of the internal structure have been pre-folded.

FIG. 83 is a drawing showing a detail view of the steps of expansion which causes the Super Surface NOMEX honeycomb to take shape and is similar to FIG. 82. The manufacturing process starts with flat sheets of NOMEX which are indexed to locate the strips of adhesive which are placed on the flat sheets where the bond joints will be located when the structure is expanded. The variation from the traditional honeycomb is the addition of other sections of NOMEX which are cut and pre-folded along the bend lines as shown in Detail "K" to cause the corners to have sharp bends as identified by Item 4 when the structure is expanded. The additional sections Items 8 & 9 have the adhesive applied to the joining points and the sections 8 & 9 are placed between 7 & 10 after which they are bonded. As the structure is expanded to change the shape from "H" to "A" the inventive shape begins to form as the material moves in the direction indicated by the arrows next to "A", "B", "C", & "D". As "A" & "B" move toward each other the area "E" & "F" begin to take the shape of a square or rectangle as indicated in "G". Items 1 & 6 are the sheets of NOMEX forming the traditional structure and sheets 2 & 3 represent the inventive structure which forms the new shape. Item 5 is one of the bond lines. The action of expanding the structure by moving "C" & "D" apart causes the "E" & "F" to move toward each other causing the folded sheets to make the new shape. Item "G" is the finished shape upon which the desiccant will be coated to provide an alternative structure for the wheel and canister filler.

Figure 84:
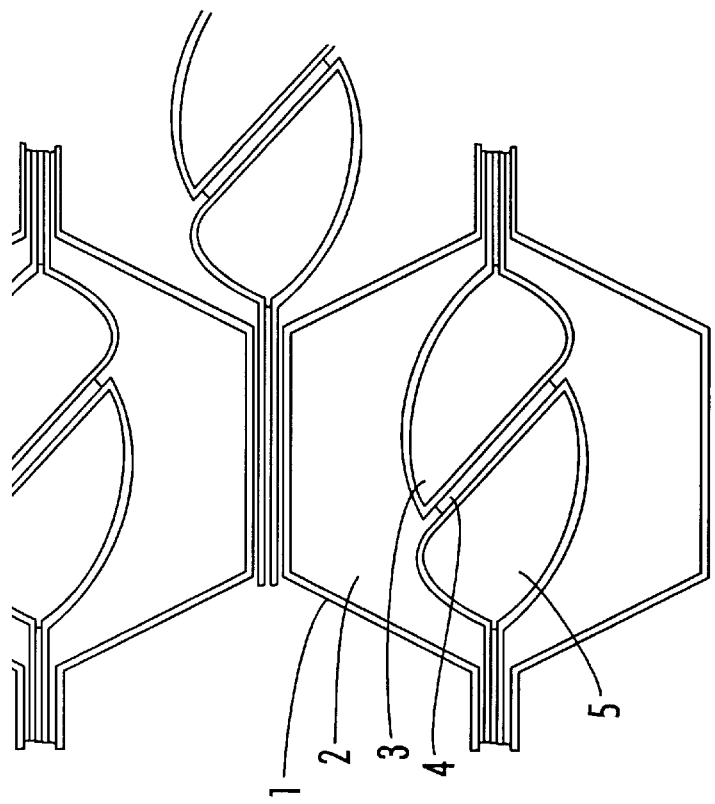
FIG. 84 is a detail view of Poly-Shape NOMEX honeycomb providing both additional surface area and an area capable of receiving a filler material to enhance the adsorption and evaporation process.

FIG. 84 is a detail view of Poly-Shape NOMEX honeycomb providing an area capable of receiving a filler material to enhance the adsorption and evaporation process or may be filled with a structural material to increases the structural strength of the material when used in aircraft or other structural applications. The method of manufacturing this shape is similar to the method shown in FIGS. 82 & 83 with the exception of the elimination of the pre-fold which results in a rounded shape as indicated by Item 5 in place of the square or rectangle shape of the previous figures. Item 1 is the sheet of NOMEX forming the traditional honeycomb shape. Items 3 & 5 are the new inventive air passage ways formed by the added NOMEX material. Item 4 is the adhesive which bonds together the two pieces of inventive structure. The surface of this shape may be coated with desiccant to increase the exposed surface area as compared to the traditional honeycomb shape. The addition of the inventive shape positioned in the traditional honeycomb increases the surface area exposure to the air stream passing through the structure without significantly restricting the air flow. Super Surface honeycomb in FIG. 82 & 83 and the inventive shape in this drawing are both alternative shapes for the structure of the wheel and canister filler of the apparatus.

Figure 85:
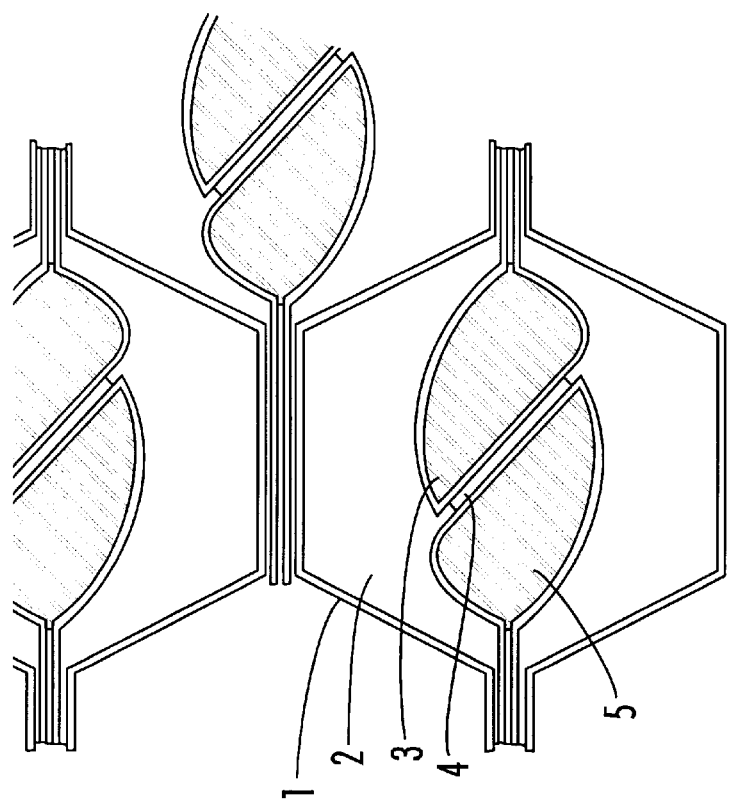
FIG. 85 is a detail view of Poly-Shape NOMEX honeycomb showing an area filled with a desiccant material to enhance the adsorption and evaporation process or structural material to provide higher compression strength and higher rigidity to side loads by locking the honeycomb into the expanded position.

FIG. 85 is a detail view of Poly-Shape NOMEX honeycomb showing an area filled with a desiccant material to enhance the adsorption and evaporation process or structural material to provide higher compression strength and higher rigidity to side loads by locking the honeycomb into the expanded position. When the additional inventive shape is added to the honeycomb to provide greater strength, when Item 5 is a structural filler for manufacturing such items as aircraft structure, the inventive shape may be made by a nonporous material such as NOMEX, however, when the filler 5 is a desiccant material to enhance the adsorption and evaporation properties of the desiccant wheel or canister filler the inventive shape of the nonporous NOMEX must be replaced with a porous type of material such as SONTARA or other material which allows the water vapor to freely pass through the material and also contains the desiccant.

Figure 86:
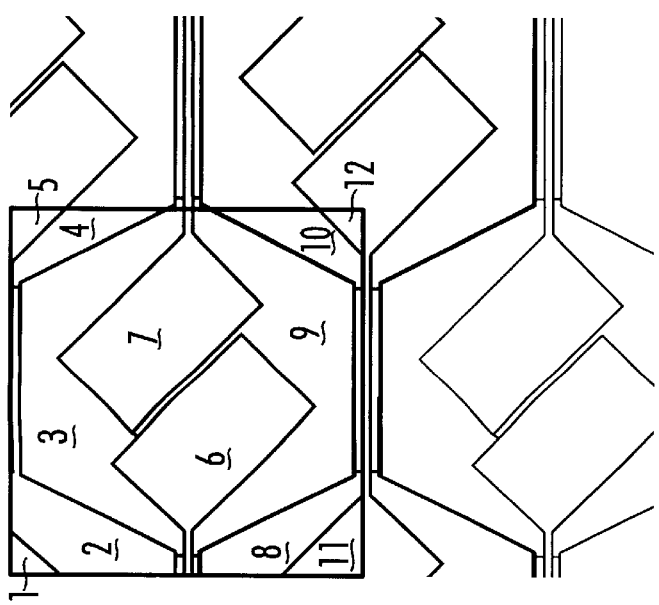
FIG. 86 is a detail view and chart showing the increase in surface air of the Super Surface form over the traditional form of honeycomb with an increase of 24% as compared to a smaller 50% size of the traditional honeycomb shape.
Figure 87:
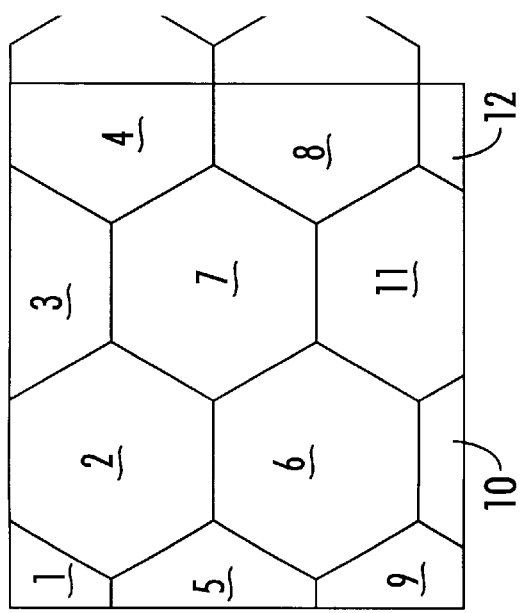
FIG. 87 is a detail view and chart showing the surface area of traditional honeycomb used as a comparison to the Super Surface honeycomb.

FIG. 86 is a detail view and chart showing the increase in surface area of the Super Surface form over the traditional form of honeycomb with an increase of 24% in surface area of the walls of the air passages over a smaller size (50% size shown in FIG. 87) of the traditional honeycomb shape. The surface area exposure of the passageways identified as Items 1 through 12 for a given portion of the wheel or canister have been measured and recorded in the chart in the lower section of the figure. The traditional honeycomb portion of the shape in FIG. 86 is 100%, while the traditional shape in FIG. 87 is 50%. With the inventive structure added to the center of the traditional honeycomb shape of FIG. 86 the surface area is greater than the surface area of FIG. 87 by 24%.

FIG. 87 is a detail view of traditional honeycomb and a chart showing the surface area of the traditional honeycomb with the air passageways identified as Items 1 through 12. The total surface area of 224.1 in FIG. 87 may be compared to the total surface area of FIG. 86 which is 278.2 and shows a surface area increase of 24% with the inventive shape over the traditional shape, even though the traditional shape has more honeycomb shaped cells.

Figure 88:
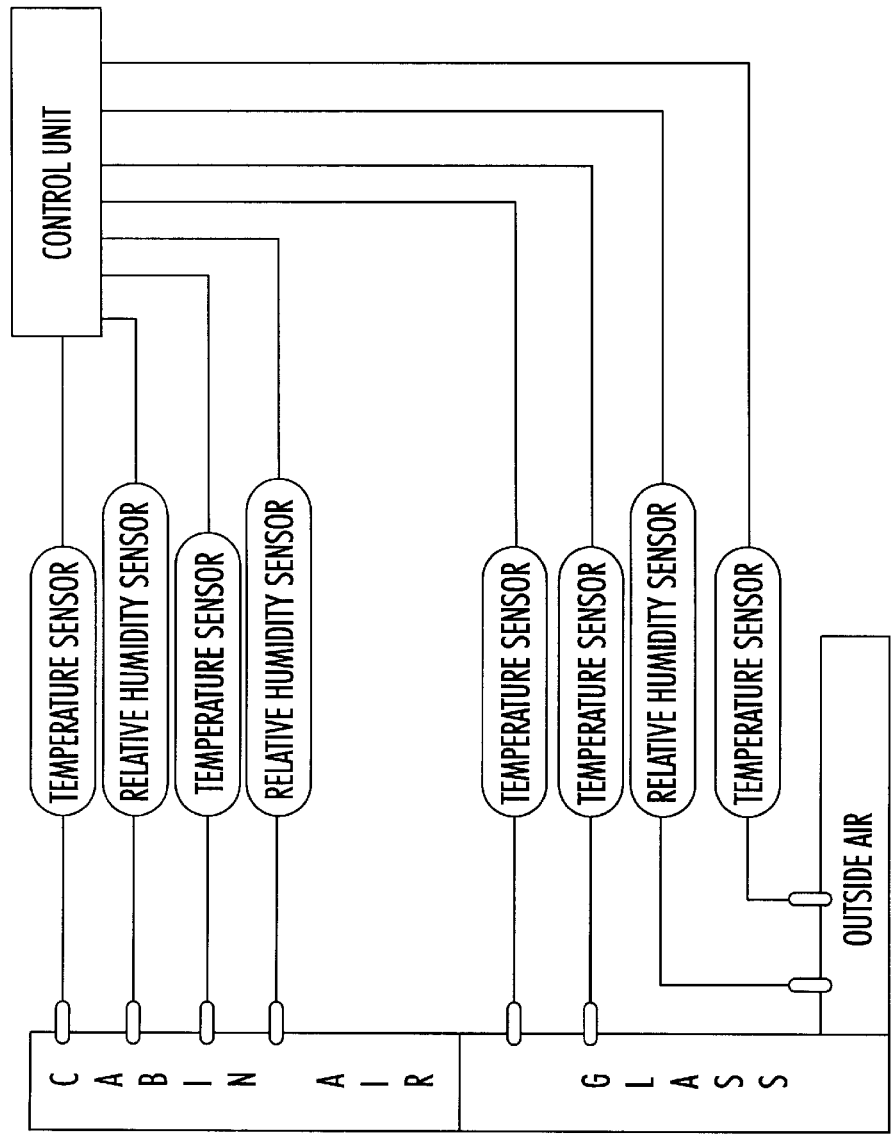
FIG. 88 is a diagram of the sensor for the automatic control unit.

FIG. 88 is a diagram of the sensor for the Automatic Control Unit showing some of the measurements which may be taken to provide input information to the automatic control unit. The Automatic Control Unit component of the inventive apparatus is unique in several ways since it utilizes desiccants to regulate the motorized vehicle's environmental system by monitoring both inside and outside environmental conditions to select an appropriate setting for a particular point in time of the vehicle operation with the direct and complete regulation of environmental conditions such as temperature, relative humidity, fan speed, defrosting of the windshield, air vent selection, and other comfort, safety, & efficiency features. The Automatic Control Unit is an integral component of the inventive method since the motorized vehicle occupants would be distracted from operating the vehicle if only manual control were available to manually activate and deactivate the other components of the apparatus. The Automatic Control Unit may consist of various alternatives of the features described here in and may utilize either all of the features or different combinations of the features. In this chart two sets of temperature and relative humidity sensors are shown measuring the temperature and relatively humidity of the front seat cabin area and the air mass close to the windshield of the vehicle. Additional sensors may be added to provide information to the automatic control unit for monitoring the environmental conditions for both the left and right front seats, additional sensors may be placed in the vehicle to monitor the temperature and relative humidity of the rear seats. Two temperature sensors are shown which measure the temperature of the inside and outside of the windshield glass, and transmit the readings to the automatic control unit. A relative humidity and temperature sensor are shown to measure the outside atmosphere temperature and relative humidity. The automatic control unit utilizes the information received from the sensors to determine which components to activate or deactivate and may also displays some of the information on the automatic control unit visual display.

Figure 89:
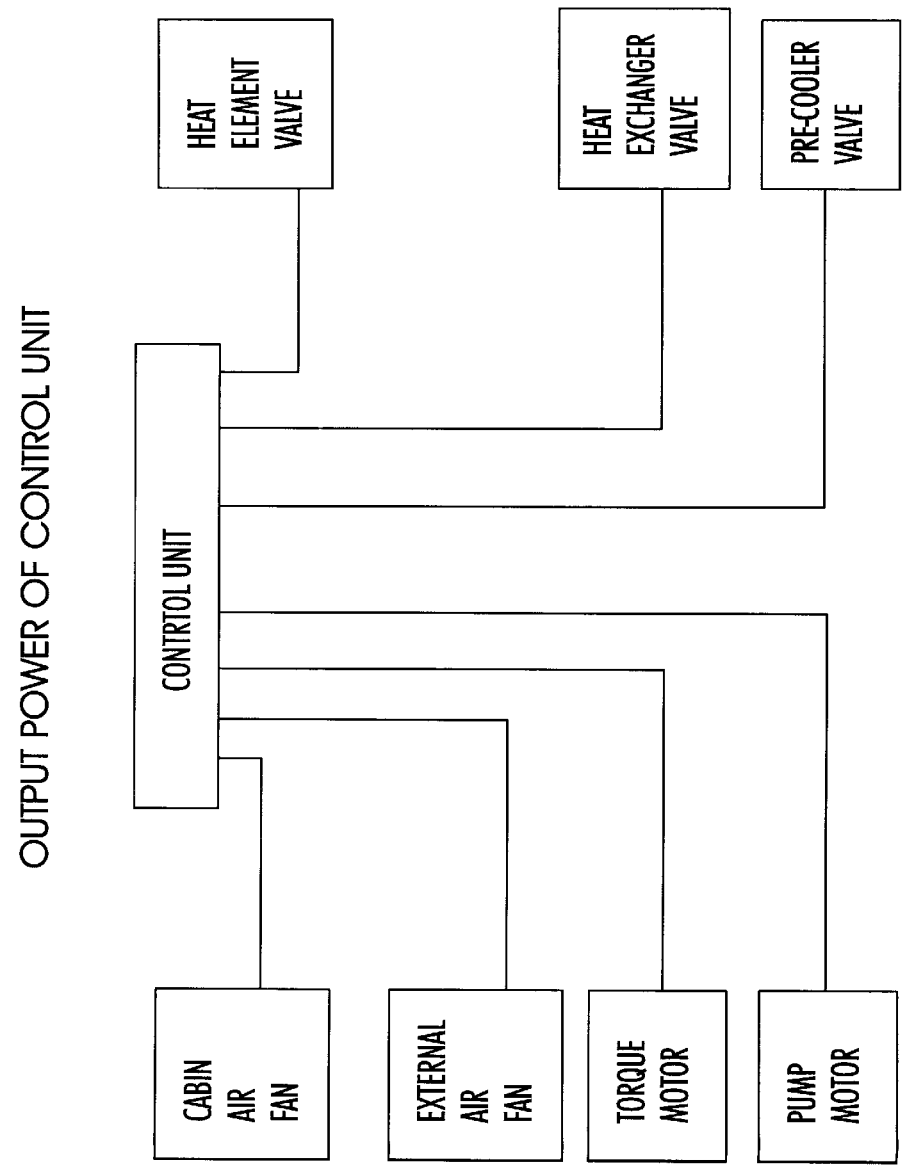
FIG. 89 is a diagram of the electrical output of the control unit to the other components.

FIG. 89 is a diagram showing some of the components which are activated, deactivated or regulated by the output of the automatic control unit. The actual components controlled by the automatic control unit may vary depending on the type of desiccant component (wheel or canister) and the features desired for the vehicle. The inventive apparatus consist of various essential components, one of which is the Automatic Control Unit, which monitors the outside atmosphere, windshield, cabin air conditions, and various air streams within the apparatus to select one of the various profiles of environmental conditions which will be most desirable, and then activates or deactivates various components to automatically regulate the interior cabin environmental conditions of the motorized vehicle.

Figure 90:
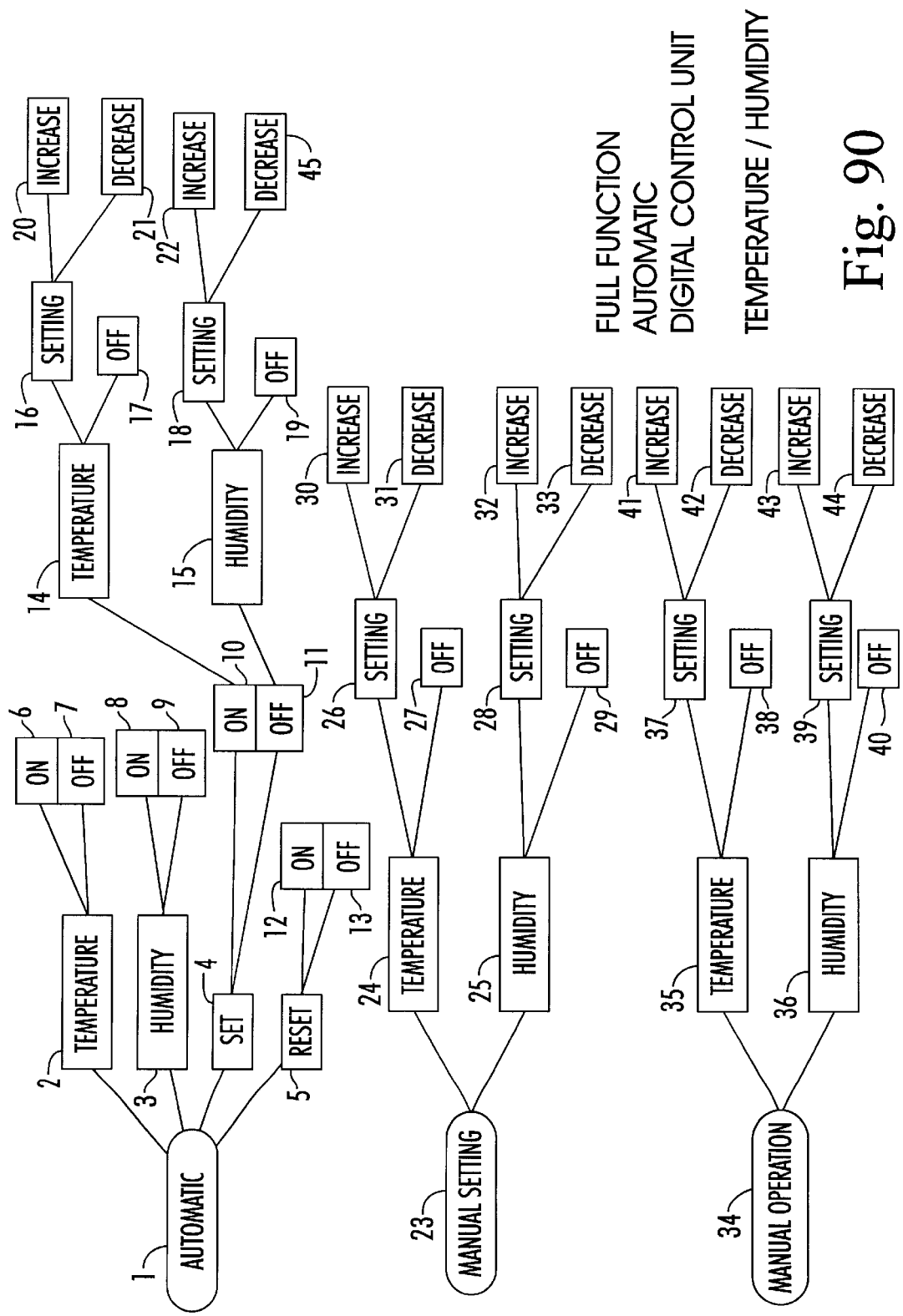
FIG. 90 is a diagram showing some of the occupant's selections for the automatic control unit.

FIG. 90 is a diagram showing some of the selections the occupant of a motorized vehicle equipped with the inventive apparatus may utilize to set the desired mode of operation of the Automatic Control Unit here after referred to as the "ACU". When Item 1 the AUTOMATIC mode is selected the Automatic Control Unit (ACU) completely controls the environmental control system. In this mode the automatic control unit monitors the outside temperature and relative humidity to select the appropriate environmental profile which may be similar to the profile shown in FIGS. 92 & 93, the ACU compares the temperature and relative humidity sensor readings to the desired conditions on the profile and when any sensor readings vary from the desired profile settings the ACU activates the necessary components of the inventive apparatus to produce the desired results. The AUTOMATIC mode is the preferred mode and is automatically selected when the engine is started unless another mode is selected by the occupant. When the vehicle engine is turned off and restarted the ACU will return to the AUTOMATIC mode on the ACU and automatically begin to regulate the cabin environmental conditions the to meet the values on the cabin environmental profile which is selected each time the engine is started. Using the appropriate environmental profile the ACU establishes and regulates independently the: temperature, humidity, and fan speed for the front left, front right, and back seat. The ACU automatically and independently activates or deactivates the defrost/defog air stream and automatically regulates the temperature of the defrost/defog air stream. An alternative to the inventive apparatus for over the road trucks may replace the back seat function with a sleeper compartment function providing a split control unit which may also be operated from the truck sleeper compartment. The occupant of the vehicle may override one or more functions of 1 the AUTOMATIC mode while the ACU remains in 1 the AUTOMATIC mode, by selecting for example, the 2 TEMPERATURE and 7 OFF which will cause the ACU to continue to regulate the relative humidity and fan speed but will activate or deactivate the necessary components to discontinue either adding heat or air-conditioning to the air stream, or the occupant may leave the temperature in 1 the AUTOMATIC mode and turn off the relative humidity function by selecting 3 HUMIDITY and 9 OFF which will discontinue the humidification or dehumidification process while the temperature and fan speed are automatically regulated by the ACU. The occupant of the vehicle may change the environmental profile preset by the factory by selecting 4 the SET and 10 ON then the environmental profile may be changed by selecting the 14 TEMPERATURE or 15 HUMIDITY while the ACU is in the AUTOMATIC mode either the profile temperature or the profile humidity may be 20 INCREASED or 21 DECREASED, 22 INCREASED or 41 DECREASED respectively which will modify the profile to the new values until they are changed by the same procedure or the profile may be returned to the factory values by selecting 5 RESET.

In all preferred modes the ACU automatically regulates the defrost/defog features to prevent the formation of condensation and/or will eliminate any condensation on the windshield automatically under any mode. The ACU will over ride any manual or profile settings to assure the prevention and elimination of condensation on the windshield with the exception of the defog switch which will manually deactivate the defog feature during only one engine start up and run cycle or until the defog switch is again selected, then the defog feature will be restored. When the occupant selects 23 MANUAL SETTINGS the ACU discontinues to utilize the environmental profile feature of the inventive apparatus and will automatically control the components of the apparatus to regulate the temperature and relative humidity to the values which appear on the control unit. The occupant may change the temperature by selecting 24 TEMPERATURE and the 30 INCREASE or 31 DECREASE which will cause the ACU to function similar to a conventional thermostat and regulate the apparatus to the values selected by the occupant. The occupant may select 25 HUMIDITY to increase or decrease the relative humidity setting for the ACU by selecting 32 INCREASE or 33 DECREASE after which the ACU will regulate the relative humidity of the cabin to the percent which is set by the occupant on the ACU. The fan speed may be set by the occupant independently from the automatic feature of the ACU when the fan control is selected and the speed is set by the occupant after which the speed will remain at the setting selected. When the occupant selects 34 MANUAL OPERATION mode the ACU displays "HIGH", "MEDIUM", or "LOW" in place of the ACTUAL or SET numeric values on the face of the ACU, then when 35 TEMPERATURE is selected the occupant can adjust the temperature to either HIGH, MEDIUM OR LOW by then selecting 41 INCREASE or 42 DECREASE. and the ACU will provide unregulated output at the level indicated in the display until another setting is selected by the occupant or the engine is stopped. The 36 HUMIDITY selection functions in a similar way, where 43 INCREASE may be selected to change a MEDIUM output of humidity to HIGH or a MEDIUM output to LOW by selecting 44 DECREASE.

FIG. 91 is a chart showing a list of the elements of the Automatic Control Unit (ACU) functions. When the ACU is in the AUTOMATIC mode the occupant may start and operate the vehicle in comfort and safety without ever taking any action to control the environmental conditions of the cabin.

TEMPERATURE

The inventive apparatus senses the outside air temperature and relative humidity which may indicate the type of clothing the occupant is wearing with respect to warmth, and the current physical condition of the occupant's body temperature with respect to weather the body is cold trying to warm up or hot trying to cool off. The apparatus selects one of several cabin environmental profiles depending on the outside conditions and regulates the temperature to a time/temperature profile which offers temperature comfort for the occupant which may not remain at a fixed level but vary over the elapsed time after engine start up when the outside air temperature is within a particular range.

HUMIDITY

The inventive apparatus is capable of sensing the level of relative humidity in the cabin and automatically setting the humidistat component to the most desired level of relative humidity for the cabin at a given elapsed time after which the ACU will continuously regulate the relative humidity by either increasing or decreasing the level of relative humidity of the cabin to provide comfort for the occupants while the ventilation is set to either fresh outside air or recirculated cabin air. In hot weather when the vehicle is initially started and before the air-conditioner has lowered the cabin temperature to the desired level the ACU senses the cabin air temperature spread between the desired and actual temperature and activates the dehumidification function to utilize it's maximum capability to lower the relative humidity which will assist the air-conditioner and accelerate the occupant's cooling. As time passes the ACU may change the setting for the level of relative humidity to prevent the occupant from feeling too dry.

DEFROST

The ACU automatically prevents or eliminates condensation (frost or fog) from the inside surface of the windshield and monitors the outside & inside environmental conditions to automatically add heat to the dehumidified air stream of the defrost vent to accelerate the removal of inside condensation and/or melt any outside snow, frost or ice which may contact the outside surface of the windshield. The ACU may add heat to the defog/defrost vent to provide clear visibility through the windshield and at the same time provide cabin ventilation without heat. When the ACU sensors indicate that the cabin relative humidity is approaching a level which may cause condensation in conjunction with the windshield glass temperature, the ACU automatically activates the defrost function of the apparatus to prevent the formation of condensation. The ACU will override the humidification mode of the apparatus to limit the humidification to a level which will not cause condensation to build up on the windshield even if the occupant attempts to set the relative humidity at level which would cause condensation on the windshield.

FAN SPEED

In the AUTOMATIC mode the fan speed may be one of the elements of the environmental profile. The fan speed may be regulated automatically by the ACU and when the vehicle is started in hot weather the air-conditioning cooling, dehumidification, and fan speed will automatically start to operate at maximum; and as the cabin and occupant cool down the fan speed will automatically be reduced by the environmental profile element of the ACU when the cabin air relative humidity and temperature reach the desired level. When the vehicle is started in cold weather the cabin fan will not be activated until there is sufficient engine heat to deliver a hot air stream to the cabin, however the dehumidification feature may be activated to direct a dehumidified air stream to the defrost vent only by the fan to eliminate inside windshield condensation. The residual regeneration function would have prepared the desiccant after the last engine shut down and isolated the anhydrous desiccant within the case to enable immediate windshield defrosting. After engine start up when the ACU sensors indicate that there is sufficient engine heat available to deliver to the cabin the ACU will automatically activate the fan to deliver the heated air stream at a level determined by the environmental profile. As the elapsed time progresses the ACU will either decrease or increase the fan speed to meet the desired level set in the profile. If the occupant desires to override the AUTOMATIC mode of the fan and let the temperature and humidity remain in the AUTOMATIC mode the ACU display has a fan speed selection which conveniently allows the occupant to override the automatic level. The fan level may remain where the occupant set the fan while the AUTOMATIC mode continues to follow the profile for the other functions.

VENT SELECTION—(FEET, MID-LEVEL, HEAD, ETC.)

The ventilation may be provided through various levels in the cabin and with different selections for each side of the vehicle which allows the occupant on the right side to direct the air stream to the mid-level while the occupant in the left side may direct the air stream to their feet or any combination of vent levels. In the AUTOMATIC mode the ACU sensors will provide information to the ACU which will determine which vents are utilized to deliver the desired air stream to the cabin. The face of the ACU offers the occupant various selections for the vent when the mode is set to MANUAL SETTINGS, or MANUAL OPERATION.

FRESH/RECIRCULATE AIR SUPPLY

The face of the ACU provides the occupant with the capability to select fresh outside air which may be conditioned and delivered to the cabin or recirculated cabin air may be selected. When either fresh or recirculated cabin air is selected the ACU activates the necessary air valves (damper doors) and other components to deliver the air stream from the desired air source. The AUTOMATIC mode makes no attempt to automatically set the air source for the cabin since the decision of fresh air or recirculated cabin air is made by the occupant and remains at the selected source until changed by the occupant.

Figure 92:
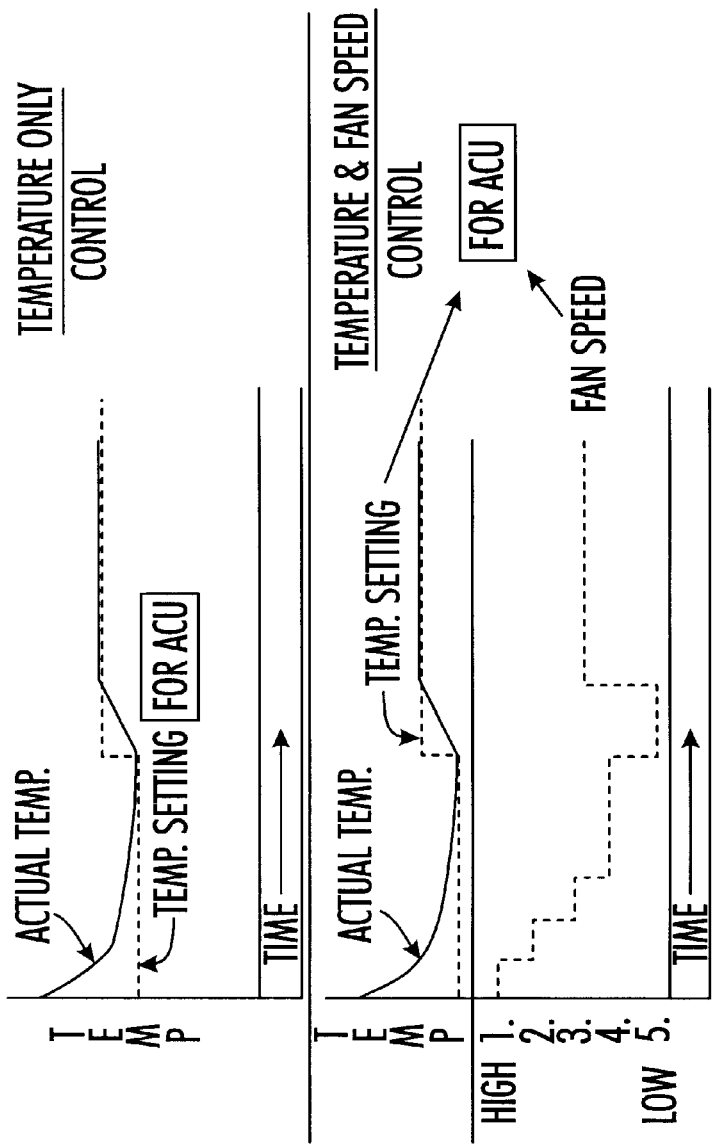
FIG. 92 is a two part chart showing an environmental profile utilized by the automatic control unit for cabin temperature and fan speed based on outside air temperature, relative humidity and duration of operation.

FIG. 92 is a two part chart showing an example of an environmental ACU profile for the automatic control of the settings of cabin temperature thermostat and fan speed settings. The profile is automatically selected by the ACU from a group of previously established profiles for given outside air temperature ranges. The ACU selects a profile by receiving input from outside air temperature sensors then matches the outside air sensor reading to the relevant temperature range for a profile. In the top portion of the chart the temperature only is shown where the outside air temperature sensors indicated the temperature of the outside air when the vehicle started was within a range of 75° F. to 85° F. which caused the ACU to select the profile shown. In this chart, with the outside temperature above the normal comfort level for a human, the profile is designed to start with a cold thermostat setting when the vehicle is first started and then as the elapsed time passes after engine start up, the setting for the thermostat may be adjusted automatically as the ACU reads the profile which may increase the thermostat's temperature setting. In this chart which is showing the temperature setting for the thermostat increasing as time passes, the initial cold temperature setting which would cool down the vehicle and occupant, is then increase so the occupant does not feel chilled by the cold air after the occupant's body metabolism rate is lower and the hot weather clothing offers less warmth. The environmental profile method is designed to set the inside temperature at various levels over a predetermined time span. After the initial cool down for a hot weather profile the thermostat stabilizes at a warmer temperature than would be used for a cold weather since the occupant would be wearing lighter weight clothing in hot weather; and when the outside air temperature is cold the profile would be designed to warm up the vehicle and occupant and then be adjusted along a different and lower profile as time passes since the occupant would be wearing warmer clothing in cold weather.

This method is an improvement over previous thermostats where the occupant must reset the conventional thermostat while operating the vehicle either to lower the temperature level when they first start the vehicle in hot weather for the initial cool down or if the temperature on the thermostat is low enough for initial cool down in hot weather, the occupant must increase the temperature setting as time passes to feel comfortable since the initial temperature which previously felt comfortable would begin to feel cold over time. The actual temperature is shown in the chart first decreasing as the air-conditioning cooling begins to lower the temperature of the cabin. The profile is designed not only to allow for vehicle cabin cool down to the thermostat setting temperature, but also the occupant's body metabolism rate to decrease to a level which would require less cooling. An alternative to the inventive apparatus would provide a visual display of the profile showing the selected profile on a liquid crystal display, CRT, or other display method on the instrument panel next to the ACU controls. The lower portion of the chart shows an example of a ACU profile for a range of 75° F. to 85° F. where the temperature and fan speed may be regulated in a method similar to the profile in the top portion of the chart. In the lower profile the fan starts when the vehicle is started in the maximum setting and as the occupant's body cools down the fan speed is automatically regulated to provide the most comfortable cabin environment to the occupant without the need for the occupant to make manual control adjustments. Various profile may be established for different sizes and types of vehicles where the cool down times and cabin environmental characteristics may vary for different vehicles. The environmental profile inventive method not only utilizes the traditional thermostat to regulate the temperature, but also adjust the thermostat temperature setting and fan speed settings based on the elapsed time the vehicle has been operating and is not related to the time of day. The ACU automatically selects an environmental profile from a group of various profiles each of which is designed for a range of outside air temperatures and will regulate the thermostat settings and fan speed settings which may both vary independently over the elapsed time the vehicle has operated since it started.

Figure 93:
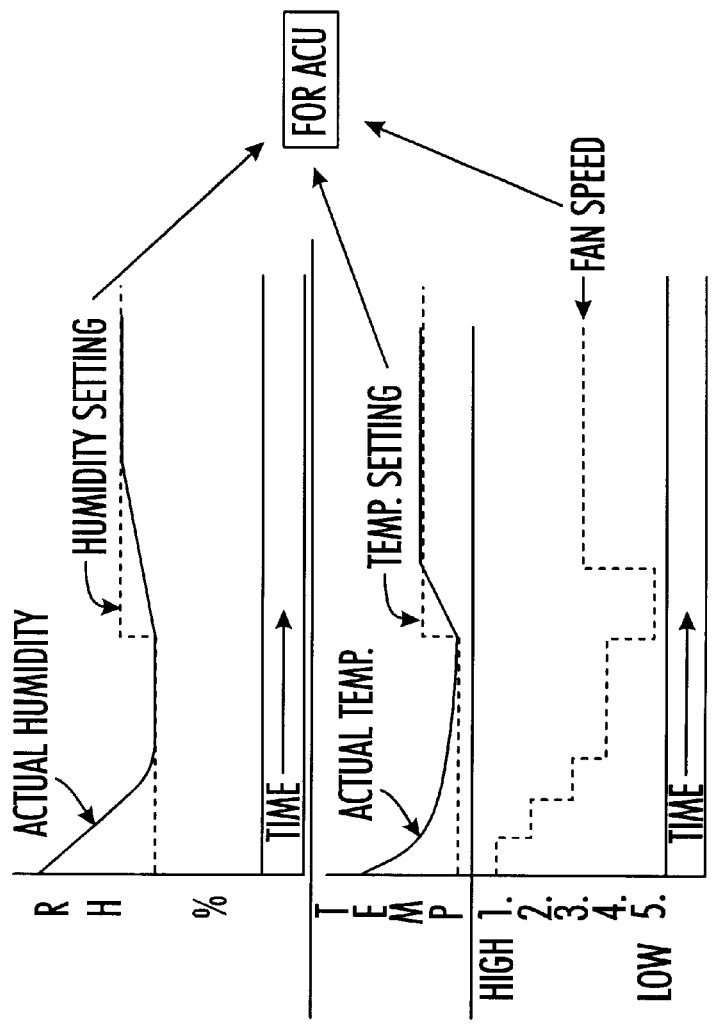
FIG. 93 is a two part chart showing an environmental profile utilized by the automatic control unit for cabin air temperature, relative humidity and fan speed based on the outside air temperature, relative humidity and duration of operation.

FIG. 93 is an example of a two part chart showing an environmental ACU profile for the control of cabin air temperature, relative humidity and fan speed which is automatically selected by the ACU based on temperature sensor input to the ACU of the outside air temperature. Another alternative of the inventive apparatus which may utilize a profile method for an ACU with a relative humidity sensor input in addition to temperature to select a particular environmental profile which may be based on outside temperature and the outside air relative humidity, an example of this type of profile is not shown. For this chart, the top portion shows a relative humidity profile which was selected by the ACU is based on outside air temperature sensor input to the ACU after which the ACU selects the appropriate relative humidity profile which is identified as the humidity setting line representing the desired % of relative humidity for the vehicle cabin at a particular time along the profile. The profile provides the ACU with the desired relative humidity which will be set in the humidistat and may change the relative humidity setting as time passes. The example shown for an outside air temperature of 75° F. to 85° F. would lower the relative humidity when the engine is started to assist the air-conditioner efficiency in cooling the vehicle and provide a low relative humidity to accelerate the evaporation of human perspiration which may be present on the clothing when an individual enters the vehicle. As time passes the % of relative humidity may be regulated at different levels based on the elapsed time along the profile. The lower portion of the chart shows the temperature and fan speed profiles combined with the humidity profile to regulate the ACU which are similar to the temperature and fan speed profiles previously shown in FIG. 92. One alternative to the time oriented profile is a profile which has actual condition readings establishing the starting point for previously established time segments. In this example, when the environmental conditioning system should have reduced the temperature of the cabin to 70° F. & 50% R.H. in 12 minutes and then made a setting adjustment, however, the actual readings of the sensors may indicate that with maximum cooling of the air-conditioner and maximum dehumidification of the desiccant system the resulted in a cabin were only a temperature of 78° F. & 75% R.H., the alternative logic would cause the ACU to recognize the difference in the actual conditions and desired conditions and would then delay the change of temperature, relative humidity, and fan speed setting until the desired actual conditions are reached. The ACU, in this example, considers time and actual conditions before the settings for the cabin are automatically adjusted. An environmental profile is event related where the time line starts with an event and is not controlled by the time of day. An event which would cause the ACU to start utilizing the profile may be the starting of the vehicle engine or in other applications a motion detector may detect the entry of an individual into the cabin or a room or building. In summary, when activated the ACU would receive sensor inputs and based on the readings select a predetermined environmental profile for the range of outside condition which would be automatically selected. In the case of a vehicle, the start of electrical power to the ACU may be the signal of the event of starting the vehicle which would place the ACU at the beginning of the profile's time line, after which the ACU would utilize the values on the profile to set the thermostat, humidistat, fan speed or other parameters of the environmental control system. A profile may have intermediate events to start another segment of the profile, such as the desired temperature on the thermostat having the same temperature reading as the sensor reading of actual cabin temperature for a particular temperature sensor which would allow the ACU to move to the next segment of the profile. Another alternative of the ACU profile may be for a building where certain events from the building security system (motion detectors) which would cause the ACU to evaluate the outside environmental conditions, select a profile, then set the thermostat, humidistat, and other environmental control apparatus which in turn would activate the apparatus to deliver the desired conditions (heating, cooling, humidification, dehumidification, fan speed, or may even include the lighting.

Figure 94:
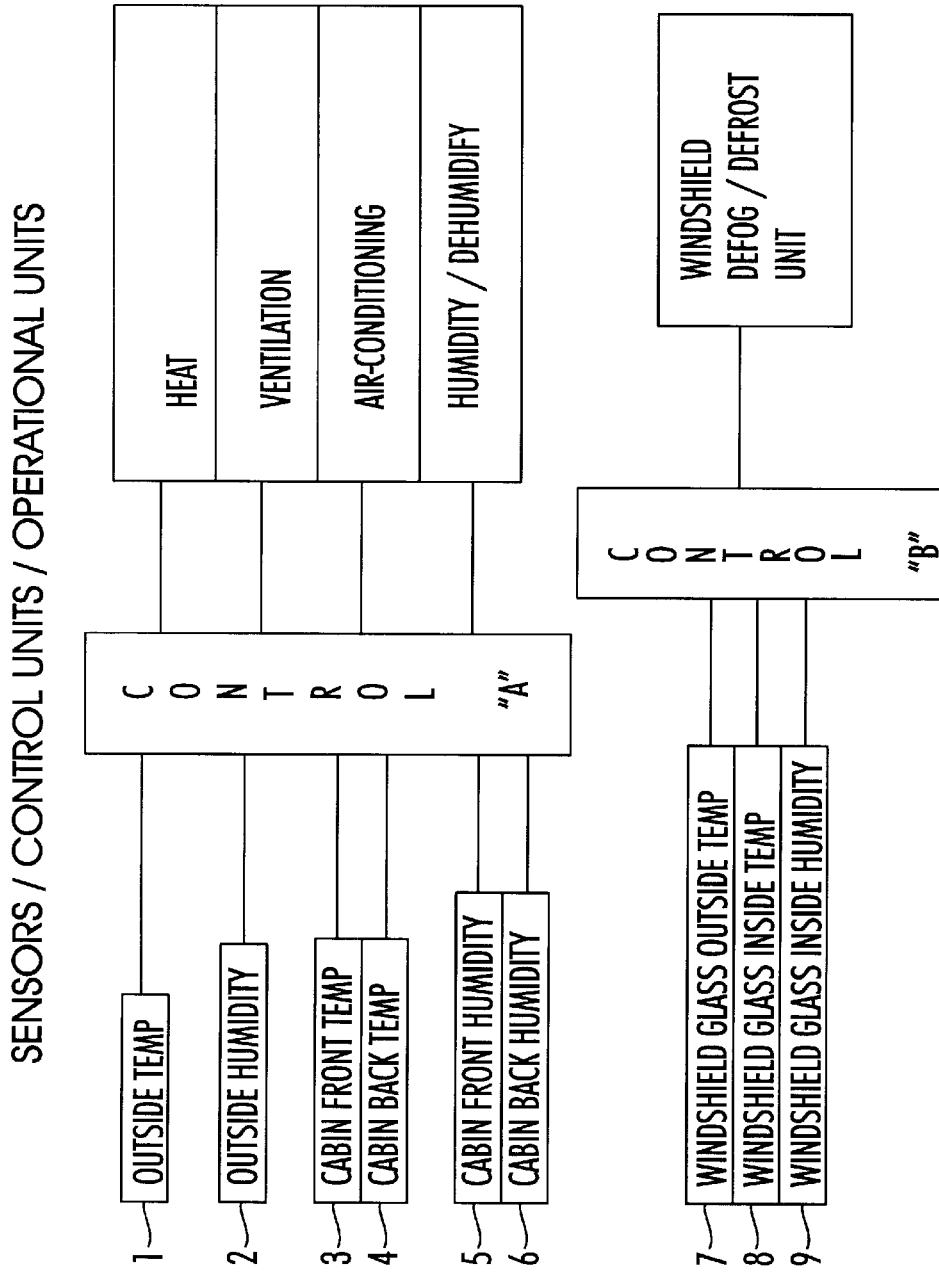
FIG. 94 is a diagram showing sensors, control units, and devices automatically operated by the control unit.

FIG. 94 is a diagram showing the ACU in the AUTOMATIC mode with sensors, control units, and components of the apparatus automatically operated by the ACU. The control function which may be separated into sections such as CONTROL "A" for cabin ventilation and CONTROL "B" for defrost/defog functions with the capability of the CONTROL "B" to override the CONTROL "A" functions of the cabin ventilation to always prevent or eliminate the formation of condensation on the inside windshield glass. Item 1 represents one or more outside air temperature sensors which input temperature information to the ACU. Item 2 represents one or more outside air humidity sensors which input relative humidity information to the ACU. Additional temperature and relative humidity sensors may be utilized to monitor the internal operation of the apparatus, an example of which are the sensors utilized to monitor the level of moisture saturation and evaporation of the desiccant canisters for the ACU to activate the cycle change for the rotary crossover valves to improve the efficiency of the apparatus. Item 3 represents one or more front seat temperature sensor. One alternative to the inventive apparatus may have a separate ACU function with independent environmental conditioning capability for each front seat. Item 4 represents one or more back seat temperature sensors. Item 5 represents one or more front seat relative humidity sensors, and Item 6 represents one or more back seat relative humidity sensors. The CONTROL "A" section of the ACU receives the input from the sensors and compares the sensor readings to match the readings to a predetermined set of possible input ranges which have an established set of output responses. The output responses by the ACU's CONTROL "A" section may activate various components of the apparatus such as the HEAT, VENTILATION, AIR-CONDITIONING AND HUMIDITY components. The windshield defog/defrost functions are performed by the CONTROL "B" section of the ACU by receiving input from: Item 7 which represents one or more temperature sensors for the outside of the windshield glass, Item 8 which represents one or more temperature sensors for the inside of the windshield glass, Item 9 which represents one or more humidity sensors for the air near the surface of the inside windshield glass, and additional relative humidity sensors for the outside air near the surface of the windshield glass may be utilized which are not shown. The CONTROL "B" function automatically activates the components of the apparatus which defogs/defrosts the windshield when the sensor inputs indicate that the conditions have reached or are approaching a level of environmental conditions which could cause condensation to form on the inside surface of the windshield glass or external conditions require a heated air stream to melt or evaporate condensation on the outside surface of the windshield. The automatic environmental profile feature is a component of the CONTROL "A" section of the ACU.

Figure 95:
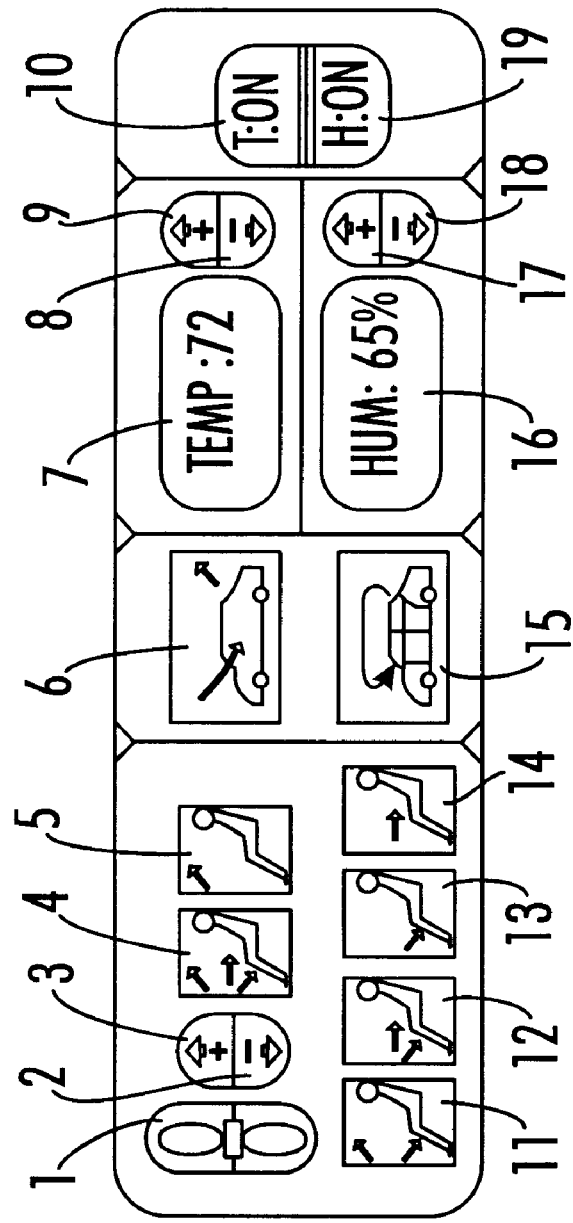
FIG. 95 is a drawing showing one example of the front of the control unit display.

FIG. 95 is a drawing of the front of the control unit for an alternative of the ACU which does not have the automatic "Profile" feature and shows the information which may be displayed to the occupant of the motorized vehicle and the controls which may be selected by the occupant set the ACU to the desired environmental output. Item 1 the fan on/off power selection press to select switch which also indicates if the fan is on or off by an indicator light located behind the face of the switch which illuminates through the switch when the fan is on and off when the fan is off Item 2 (−) is a fan speed switch to reduce the fan speed one level each time it is selected until the fan speed is set to the lowest level. Item 3 (+) is a fan speed switch to increase the fan speed one level each time it is selected until the fan speed is set to the highest level. Item 4 is a vent position selector switch which when selected illuminates and causes the ACU to direct the air stream to high level (windshield level), middle level, and feet when the fan power is in on position. Item 5 is a vent position selector switch which when selected illuminates and causes the ACU to direct the air stream to high level (the vents which deliver air to the upper portion of the cabin) when the fan power is in on position. Item 6 is a selector switch which when pressed will illuminate and cause the ACU to use outside air as the source of air for the cabin environmental system. Item 7 is the cabin thermostat setting indicator display which will illuminate to display the temperature setting for the thermostat when Item 10 the temperature power is activated by the occupant by selecting "ON". Item 8 (−) is the decrease thermostat setting selector switch, which when pressed will decrease the temperature setting for the thermostat. Item 9 (+) is the increase thermostat setting selector switch, which when pressed will increase the temperature setting for the thermostat. The ACU automatically selects and activates the air-conditioning cooling system or the heating system when the cabin temperature sensors indicate that the cabin temperature is above or below the desired temperature range, if Item 10 the temperature system power is in the "on" position. Item 10 is the power "ON"/"OFF" switch for the ACU temperature system to activate either cooling or heating which enables the ACU to automatically activate the components which will regulate the cabin temperature to the desired level which is displayed on Item 7. When Item 10 is in the "ON" position a light will illuminate the switch to indicate that the power is "ON". When Item 10 power is "OFF" the fan may continue to operate to deliver air to the cabin which is not conditioned with heating or cooling. Item 11 is the cabin air stream vent which when selected will direct air to the high level (windshield vent) and toward the feet of the occupant of the front seat. Item 12 directs the air stream toward the middle level and the feet. Item 13 directs the air stream toward the occupant's feet. Item 14 directs the air toward the middle level. When the occupant selects Item 15, the source of air for the cabin environmental system will be from the cabin, which will cause the ACU to recirculate cabin air and illuminate an indicator light behind the switch. Item 16 is the indicator for the relative humidity setting in the humidistat and is illuminated when the power to the humidistat has been turned on by the occupant when Item 19 is selected. Item 17 (+) is the increase humidistat setting selector switch, which when pressed will increase the relative humidity setting for the humidistat. Item 18 (−) is the decrease humidistat setting selector switch, which when pressed will decrease the relative humidity setting for the humidistat. The ACU automatically selects and activates the components of the humidification and dehumidification system when the cabin relative humidity sensors indicate that the cabin relative humidity is above or below the desired relative humidity range, if Item 19 the relative humidity system power is in the "on" position. Item 19 is the power "ON"/"OFF" switch for the ACU relative humidity system to activate either humidification or dehumidification which enables the ACU to automatically activate the components which will regulate the cabin relative humidity to the desired level which is displayed on Item 16. When Item 19 is in the "ON" position a light will illuminate the switch to indicate that the power is "ON". When Item 19 power is "OFF" the fan may continue to operate to deliver air to the cabin which is not conditioned by the addition or removal of humidity. In this figure a manual setting type of ACU is shown for a motorized land vehicle which may be similar to the ACU for an aircraft or water vehicles and which controls the activation or deactivation or the components of the apparatus to regulate the cabin environmental temperature and desiccant based relative humidity with fresh or recirculated air.

Figure 96A:
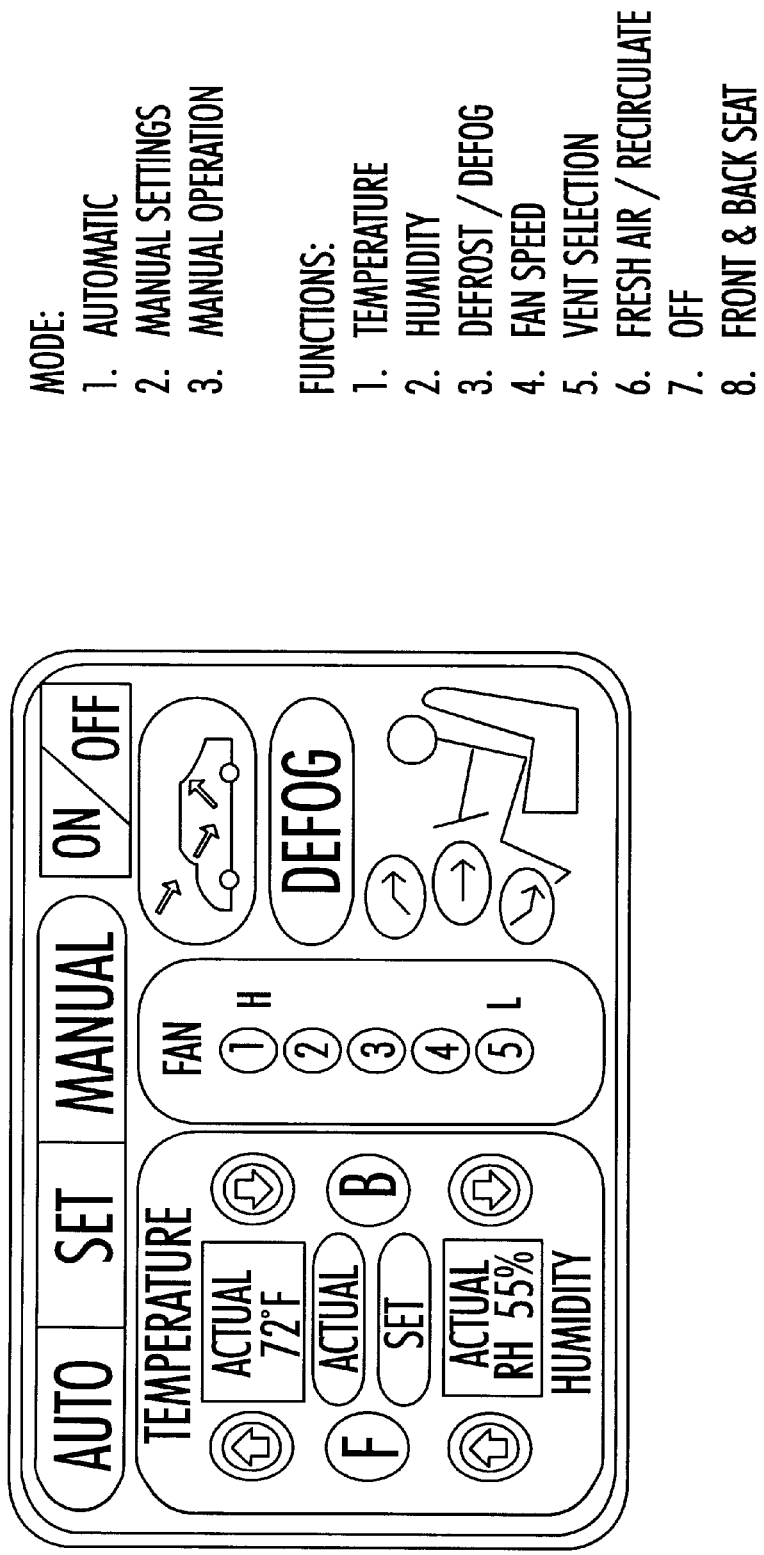
FIG. 96A is a drawing of the full function automatic digital control unit with modes and functions shown.

FIG. 96A is a drawing of the full function automatic digital control unit with modes and functions shown on the face of the ACU and information blocks to the side of the ACU. When the "AUTO" automatic mode is selected the ACU automatically regulates the settings on the system thermostat, humidistat, and fan to provide superior comfort and eliminate the need for the occupant to make environmental system adjustments during the time the individual occupies the vehicle. The functions 1 through 5 settings are automatically established and regulated by the ACU. The decision to utilize fresh or recirculated cabin air may be set by the occupant to remain in one position until the occupant desires that the setting be changed. An "ON"/"OFF" switch is provided for the occupant to override the ACU and turn the system off when the sensors indicate that the cabin needs environmental conditioning, but the occupant wants the system turned off. The automatic function for the front and back seat may be independently overridden by the occupant of the vehicle.

Figure 96B:
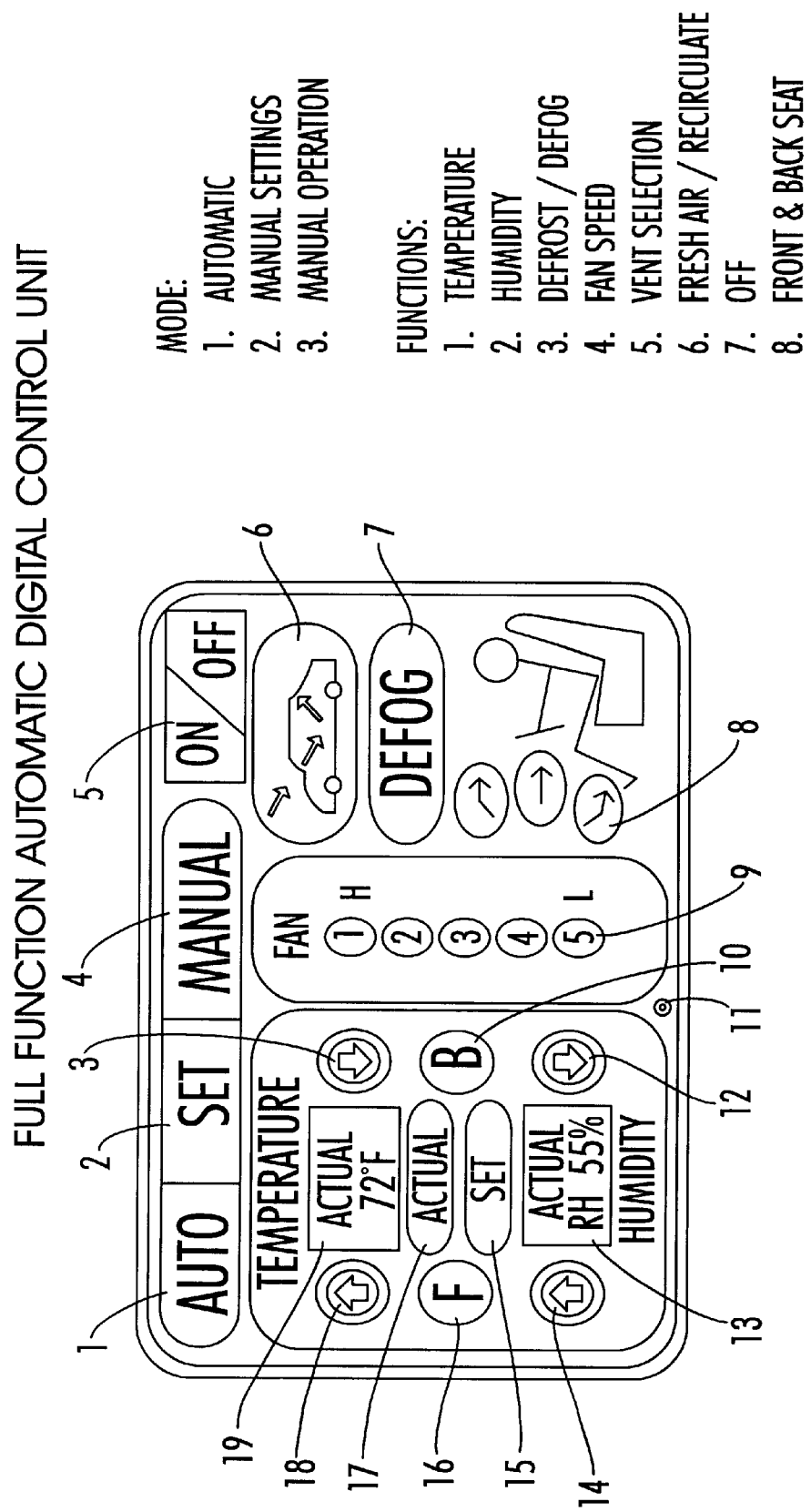
FIG. 96B is a drawing of the full function automatic digital control unit with modes and functions shown and labels for explanation of the controls with the ACTUAL readings in the display.

FIG. 96B is a drawing of the face of a full function ACU showing the "ACTUAL" readings Items 19 & 13 of the cabin temperature and relative humidity sensors displayed. Item 1 is the mode selection switch for the full automatic function of the ACU where the settings for functions 1 through 5 are automatically established and then regulated by the ACU. When the vehicle is started the ACU will automatically start to operate in the full automatic mode which is controlled by environmental profiles unless a particular element of the automatic profile was previously modified and set prior to engine shut down; in this case, the modified profile for the temperature, humidity, or fan speed in use when the engine was shut down is saved and reused for the next engine start up and run cycle. Item 2 is the "SET" mode selection switch where in this mode the occupant establishes the settings for the thermostat, humidistat, fan speed and vent selection. When Item 2 "SET" mode is selected by the occupant the current system settings may be changed by selecting Item 15 the "set range selector" which will cause the display to change the "temperature window" Item 19 from displaying actual sensor readings of the cabin air temperature to a display of the current setting on the thermostat and allow the occupant to change the thermostat setting by selecting Item 18 or Item 3 which will either increase or decrease the temperature setting on the thermostat and provide the indication in the "temperature window" showing "SET" followed by the display of the numeric reading of the thermostat similar to Item 19 of FIG. 96B. For relative humidity regulation, when Item 15 the "SET" switch is selected, the humidistat may also be changed by selecting Item 14 to increase the relative humidity level or Item 12 to decrease the relativity level. When ACU mode of operation is changed to manual Item 4 "MANUAL" is selected which causes the ACU to allows the occupant to directly control the output of the apparatus by selecting "HIGH", "MEDIUM", or "LOW" output. In the MANUAL mode which is not shown the "temperature window" and the "humidity window" the display Item 19 words "SET" or "ACTUAL" are replaced by "HEAT" or "COOL" for the "temperature window" or for the "humidity window" Item 13 will become "HUMIDIFY" or "DEHUMIDIFY" followed by "HIGH", "MEDIUM", or "LOW". The occupant may then change the temperature output by pressing the Item 18 switch to increase the temperature of the air stream or Item 3 to decrease the temperature of the air stream with a range of 6 (six) temperature positions, starting with the highest temperature which is "HEAT" with the word "HIGH" in the lower portion of the "temperature window" and the lowest temperature output displayed as "COOL" followed by the word "LOW" in the lower portion of the "temperature window. The temperature listed below with 1. as the highest temperature output and 6. the lowest temperature output:

| 1. | "HEAT"   | 4. | "COOL"   |
|----|----------|----|----------|
|    | "HIGH"   |    | "HIGH"   |
| 2. | "HEAT"   | 5. | "COOL"   |
|    | "MEDIUM" |    | "MEDIUM" |
| 3. | "HEAT"   | 6. | "COOL"   |
|    | "LOW"    |    | "LOW"    |

The occupant may change the relative humidity if the air stream going to the cabin using a method similar to the one described above for the temperature, where 1. is the highest relative humidity output and 6. is the lowest relative humidity output:

| 1. | "HUMIDIFY" | 4. | "DEHUMIDIFY" |
|----|------------|----|--------------|
|    | "HIGH"     |    | "HIGH"       |
| 2. | "HUMIDIFY" | 5. | "DEHUMIDIFY" |
|    | "MEDIUM"   |    | "MEDIUM"     |
| 3. | "HUMIDIFY" | 6. | "DEHUMIDIFY" |
|    | "LOW"      |    | "LOW"        |

Item 5. the "ON"/"OFF" switch is a manual override to the automatic function of the ACU to turn the system off or after the system is off the system may be turned back on by pressing the switch again. Item 6 is a switch to allow the operator to select fresh outside air for the cabin or by pressing the switch again return to a cabin air source which will recirculate cabin air through the inventive apparatus back into the cabin. When the switch is in the fresh outside air position the switch is illuminated. Item 7 the "OFF" switch. The ACU automatically activates the defrost/defog function when ever the environmental conditions are approaching the temperature and relative humidity levels which would allow the formation of condensation on the windshield. When the DEFOG function is activated by the ACU the DEFOG switch is illuminated. The occupant may override the ACU and turn off the defog function and the switch light by selecting the DEFOG switch. The DEFOG switch position is not saved in memory after the engine is shut off. Each time the engine is started the ACU automatically reactivates the DEFOG function and will start defrosting the windshield when necessary unless the DEFOG is again overridden to the off position by the occupant. Item 8 is the vent selection switch which will allow the occupant to override the AUTOMATIC mode of the ACU vent selection. The vent selection switch is also available to the occupant to select the desired vent when the ACU is in the MANUAL SETTING or the MANUAL OPERATION mode. The occupant may select one or more vents by pressing the desired vent level switch. Item 9 is the FAN speed selection display which allows the occupant to override the AUTOMATIC mode of the ACU and chose a fan speed which may range from 1. "H" (high) to 5. "L" (low). The occupant may use the fan speed selection switch to chose the fan speed when the ACU is in the MANUAL SETTING or the MANUAL OPERATION mode. Item 10 "B" is the back seat selection switch for the ACU (or sleeper compartment for an over the road truck) and when selected the ACU displays of the functions of the control panel may operate some or all of the functions of the back seat with features which are similar to those of the front seat. Item 16 "F" is the front seat selection switch which when selected will return the ACU display to the operation of the front seat. Item 11 is a RESET switch for the ACU which when selected will return the ACU to the factory established environmental profile. The RESET switch may be selected at any time to return all elements of the profile to the original factory profile settings when the occupant no longer wants to utilize a modified profile.

Figure 96C:
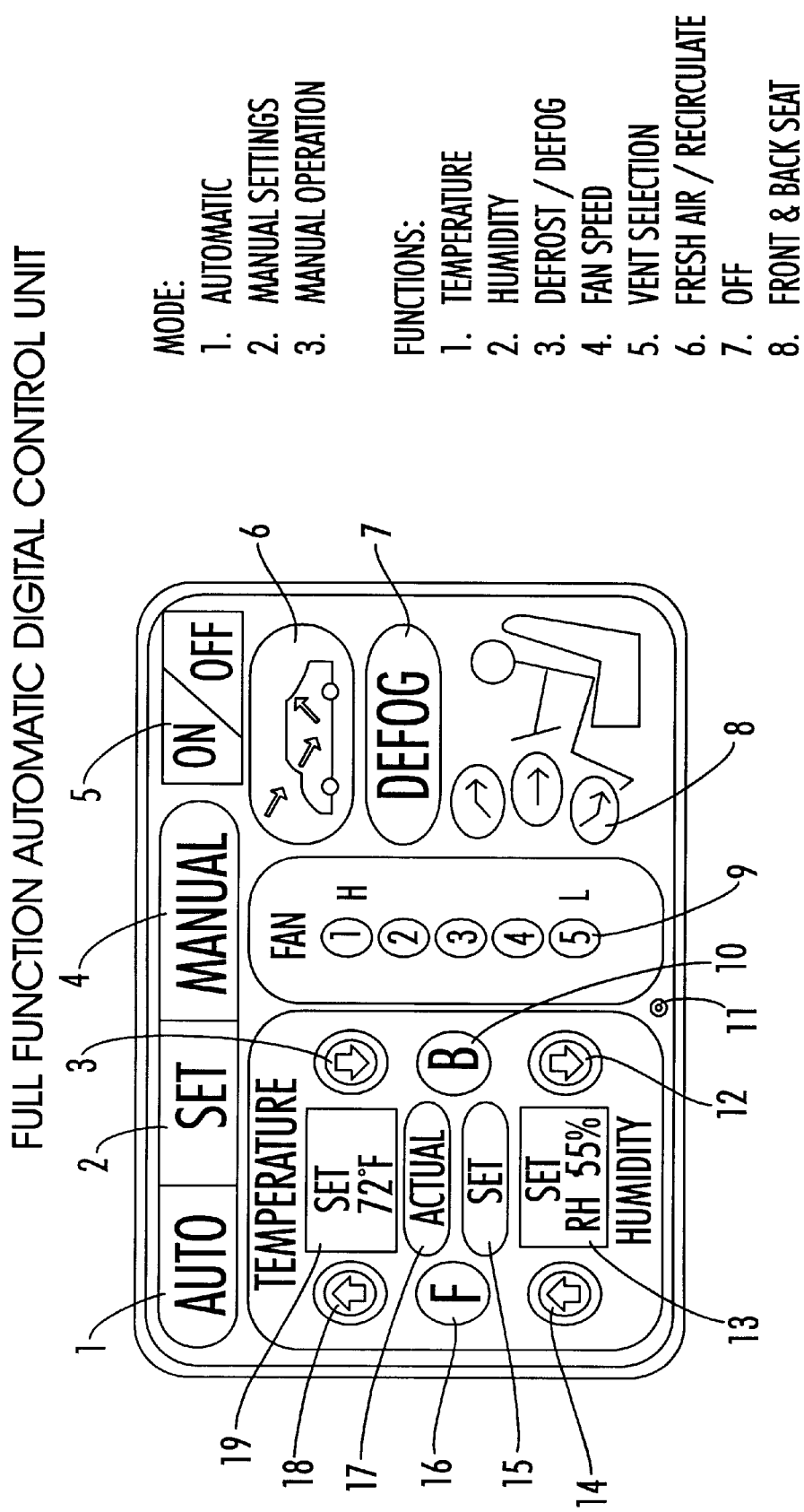
FIG. 96C is a drawing of the full function automatic digital control unit with modes and functions shown and labels for explanation of the controls with the SET readings in the display.

FIG. 96C is a drawing of the face of a full function ACU similar to FIGS. 96A and 96B showing the "SET" readings Items 19 the thermostat & 13 humidistat for the cabin temperature and relative humidity. When Item 15 is selected by the occupant the word "SET" replaces "ACTUAL" in both Item 19 & 13 and the occupant may change the settings by selecting Item 18 or 3 and Item 14 or 12.

Figure 96D:
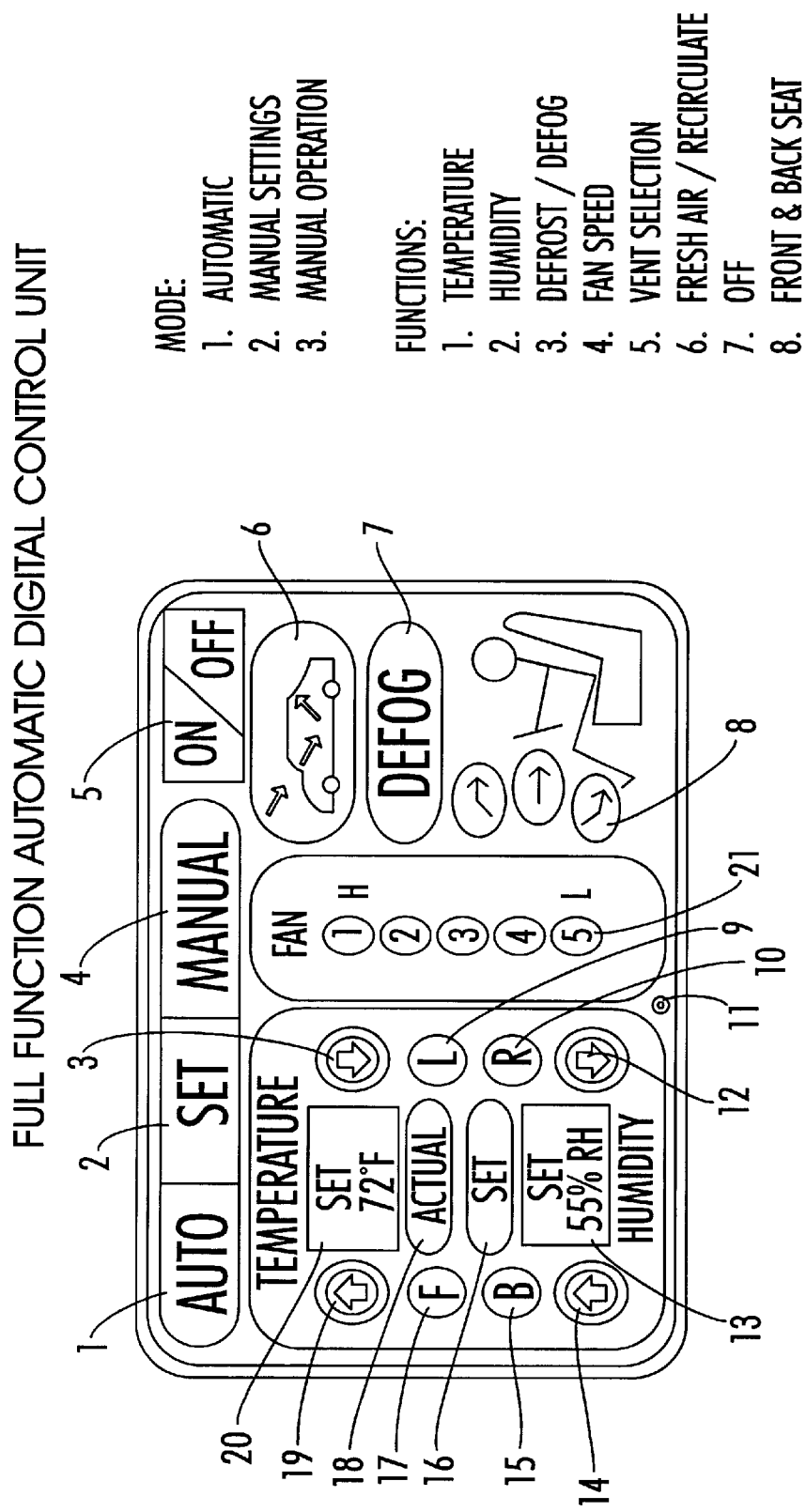
FIG. 96D is a drawing of the full function automatic digital control unit with modes and functions shown and labels for explanation of the controls with the SET readings in the display with additional selection for the left and right side of the vehicle.

FIG. 96D is a drawing of the face of a full function ACU similar to FIGS. 96A, 96B & 96C which has an additional feature to allow the occupant to independently control both the front left and front right seat environmental controls. Item 9 "L" is the selection switch for the LEFT seat which will cause the display for the ACU to operate the portion of the ACU controlling the LEFT seat, and Item 10 "R" is the selection switch for the RIGHT seat which will cause the display for the ACU to operated the portion of the ACU controlling the LEFT seat.

Figure 97A:
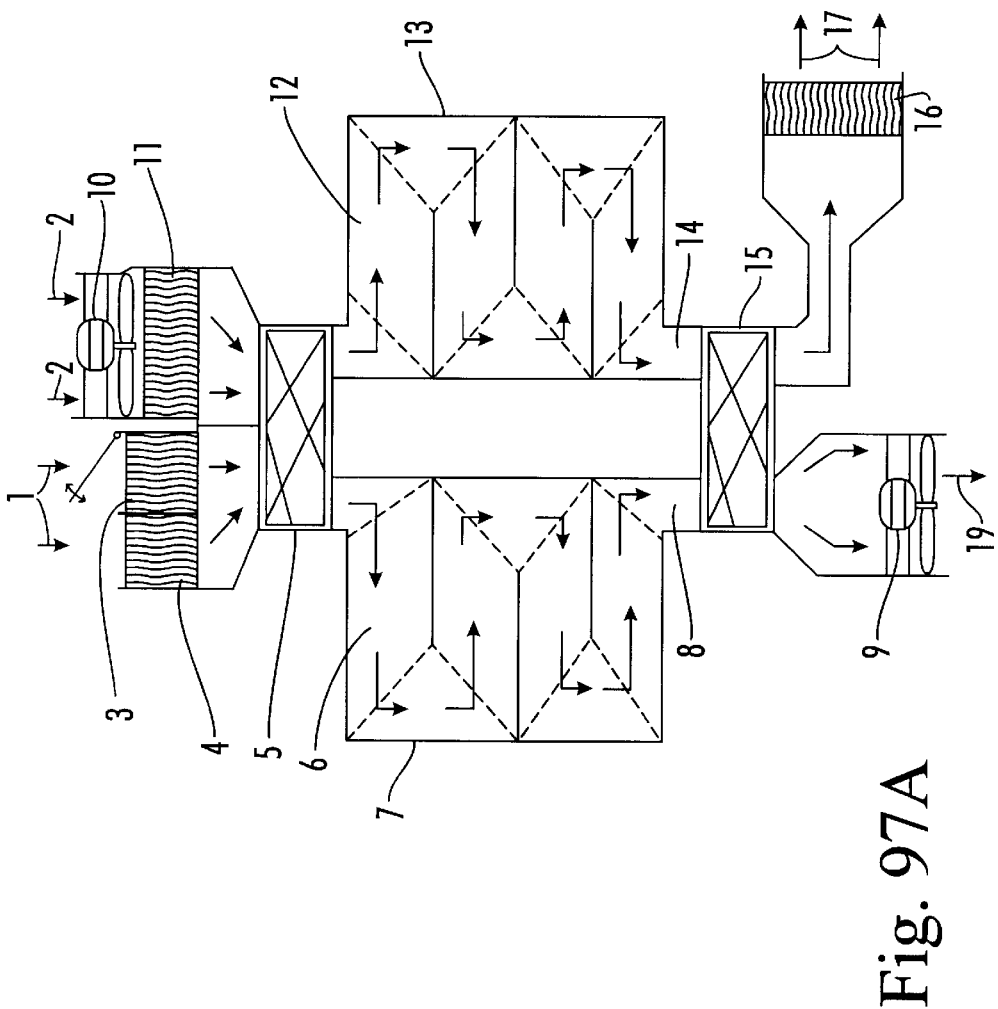
FIG. 97A is a schematic view of a duel canister cabin desiccant apparatus utilizing duel crossover valves.

FIG. 97A is a drawing of a duel canister cabin desiccant apparatus utilizing duel crossover valves similar to the embodiment shown in FIG. 50 with the addition of a heat exchanger Item 3 which may be utilized in conjunction with Item 16 the pre-cooler heat exchanger. A coolant fluid may be circulated between the two heat exchangers to transfer the from the air stream passing through heat exchanger Item 16 into the air stream passing through heat exchanger Item 3. A door is shown which may be closed to prevent the air stream Item 1 from passing through the heat exchanger 3 when the pre-cooler is deactivated. When the door is closed the air stream will be directed to heat exchanger to provide for maximum heating of air stream Item 1 when it is performing evaporation of moisture out of the desiccant. Items 5 & 15 may be rotary crossover valves to alternate the air streams Items 1 & 2 between the desiccant canisters Items 7 & 13. The air valves Items 5 & 15 may be rotary, slide, or damper valves to accomplish the crossover.

Figure 97B:
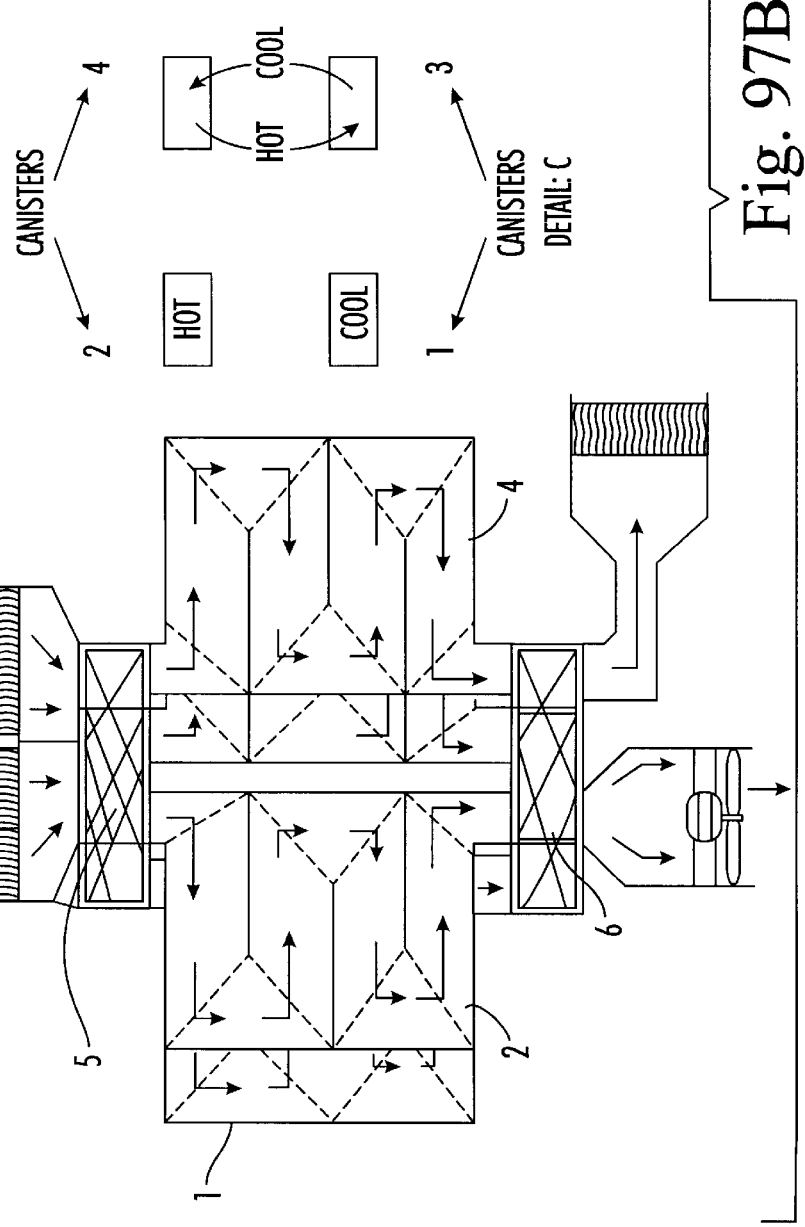
FIG. 97B is a schematic view of a (4) four canister, duel rotary crossover valve cabin desiccant apparatus capable of uninterrupted air flow.

FIG. 97B is a drawing of a FOUR (4) canister cabin desiccant apparatus utilizing duel crossover valves which is similar to FIG. 97A with 4 canisters in place of the 2 canisters. The four (4) canister alternative embodiment allows the air flow to pass uninterrupted through the apparatus because as 5 the crossover valve is switching the air stream from canister Item 3 to canister Item 4 the air stream continues to flow uninterrupted through the other two canisters, Items 1 & 2 as shown in DETAIL: C. Item 5 is the input crossover valve and Item 6 is the output valve. The valves may be rotary, slide or damper type valves which have the capability to switch two air streams while allowing two other air streams to continue to flow. The hot air streams cause the moisture to evaporate out of the desiccant while the cool air streams provides the moisture which is adsorbed into the desiccant contained in the canister case.

Figure 98:
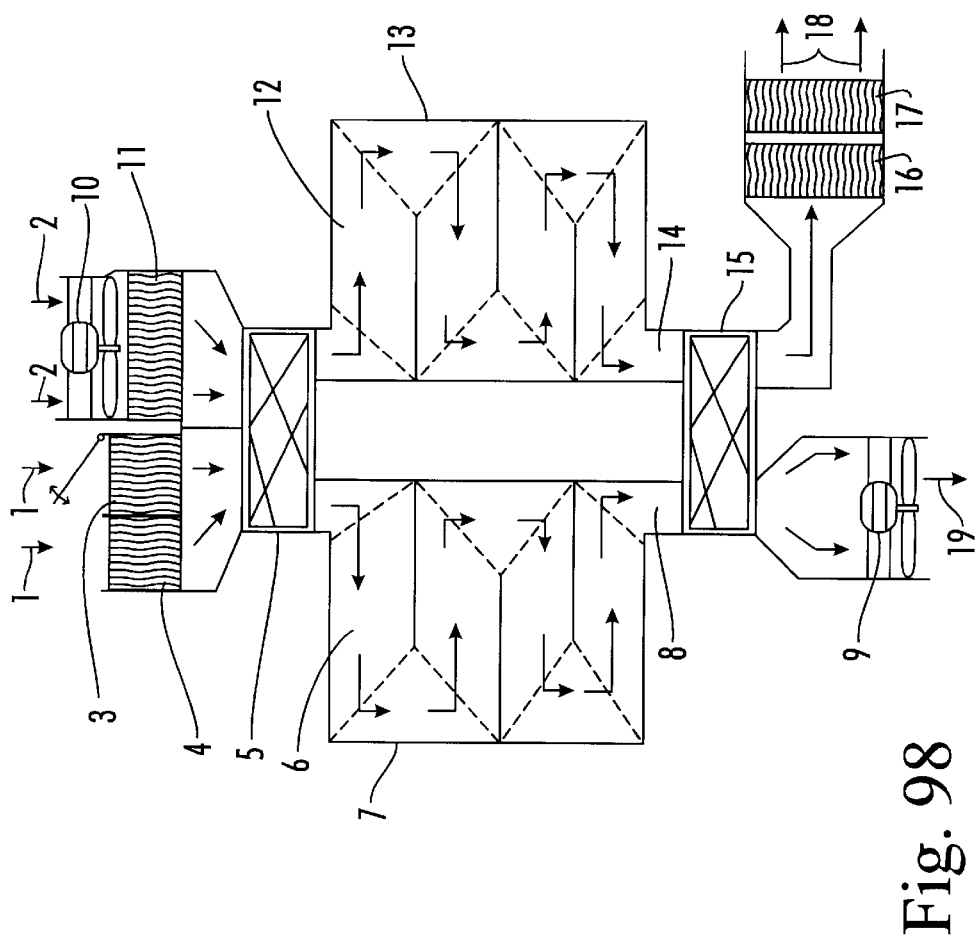
FIG. 98 is a schematic view of a duel canister, duel rotary crossover valve cabin desiccant apparatus utilizing after process cooler/heater coils to further condition the air going to the cabin.

FIG. 98 is a schematic view of a duel canister, duel rotary crossover valve cabin desiccant apparatus utilizing after process cooler/heater coils to further condition the air going to the cabin. This alternative of the apparatus is similar to the one shown in FIGS. 97A and 97B with the addition of a heat exchanger Item 17 and air stream 19 exiting the apparatus to the atmosphere.

Figure 99:
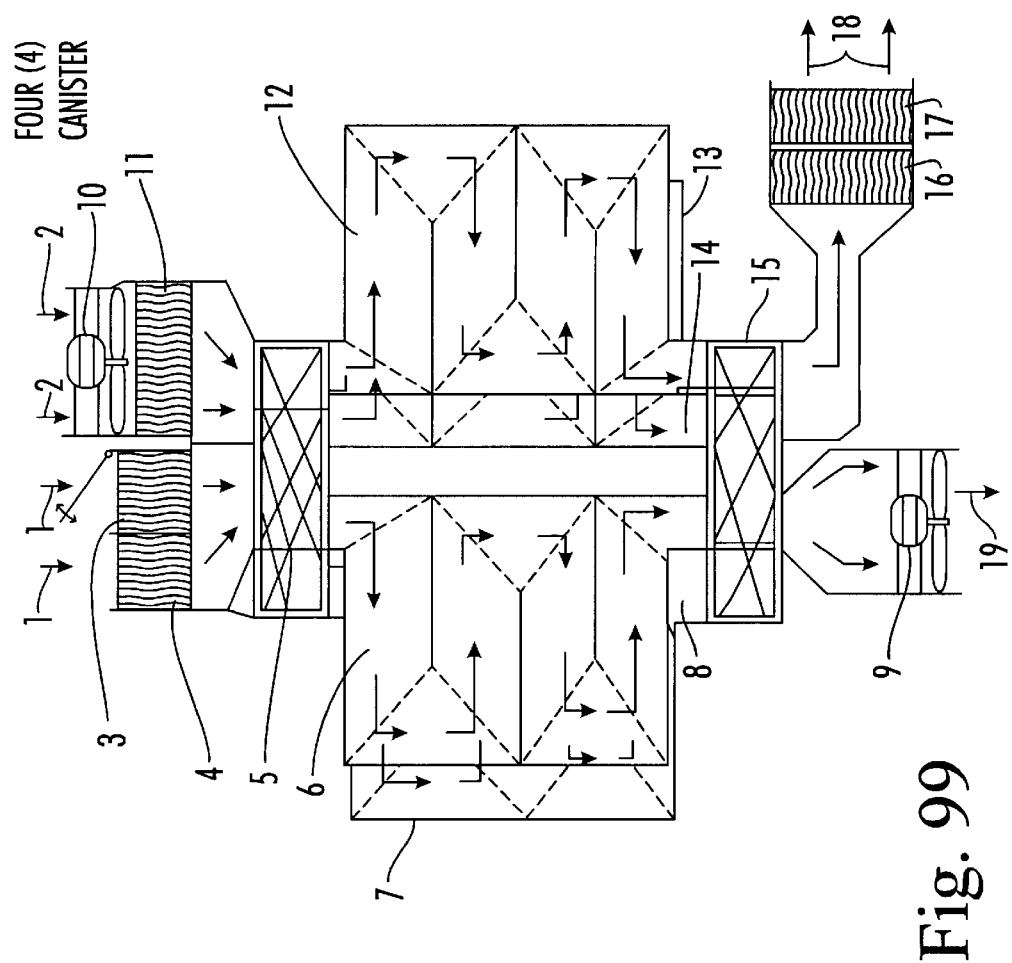
FIG. 99 is a schematic view of a (4) four canister, duel rotary crossover valve cabin desiccant apparatus utilizing after process cooler/heater coils to further condition the air going to the cabin.

FIG. 99 is a schematic view of a FOUR (4) canister, duel rotary crossover valve cabin desiccant apparatus utilizing after process cooler/heater coils to further condition the air going to the cabin which is similar to FIG. 97B. The valves are similar to those shown in DETAIL: C of FIG. 97B.

Figure 100:
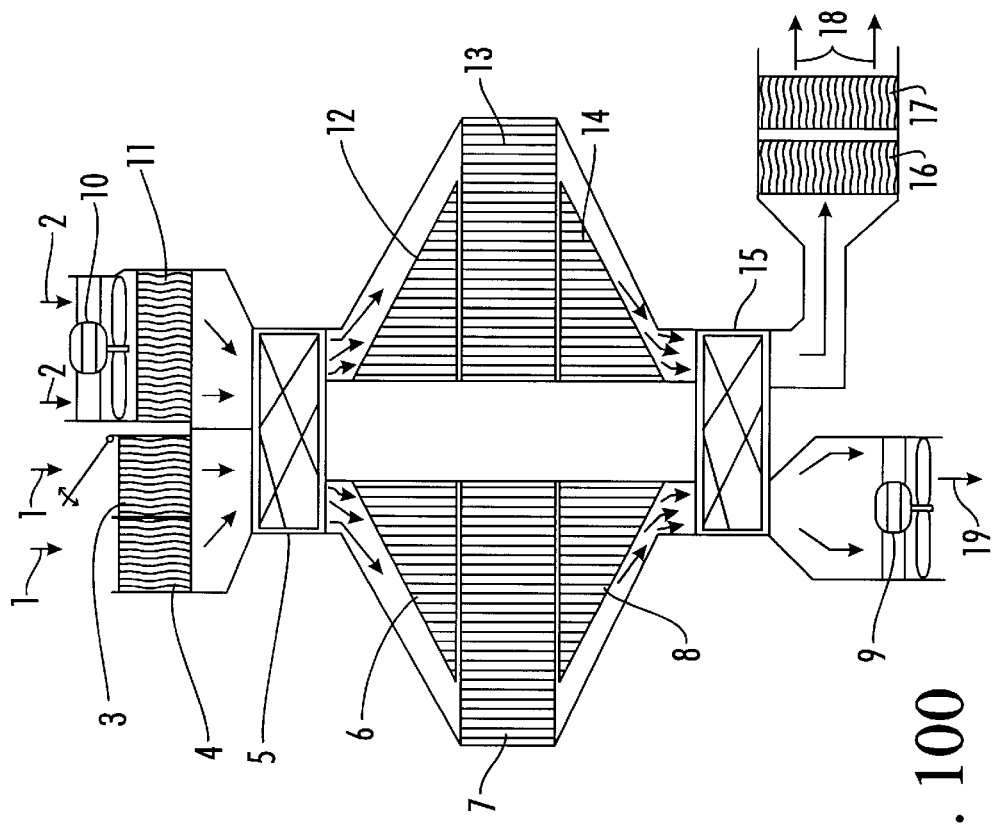
FIG. 100 is a schematic view of a duel canister non-baffled straight through air flow, duel rotary crossover valve cabin desiccant apparatus utilizing after process cooler/heater coils to further condition the air going to the cabin.

FIG. 100 is a schematic view of a duel canister, duel rotary crossover valve cabin desiccant apparatus similar to the one shown in FIG. 98 with straight through air flow canisters. This alternative of the apparatus allows the air stream to pass straight through the canister without going around the baffles shown in FIG. 98. The honeycomb Items 6, 8, 12, & 14 are wedge shaped and positioned on the top and bottom of the main sections of honeycomb Items 7 & 13 with an air space between the sections of honeycomb. The canister shape and the shape of the honeycomb sections provide an even distribution of the air stream through the honeycomb. The elimination of the baffles and this arrangement of the honeycomb offers less resistance to the air flow through the apparatus than a baffle canister. This is another example of how the inventive method may utilize various types and shapes of canisters or wheels and various types of valves to direct the air flow through a desiccant coated material to perform the desired results.

Figure 101:
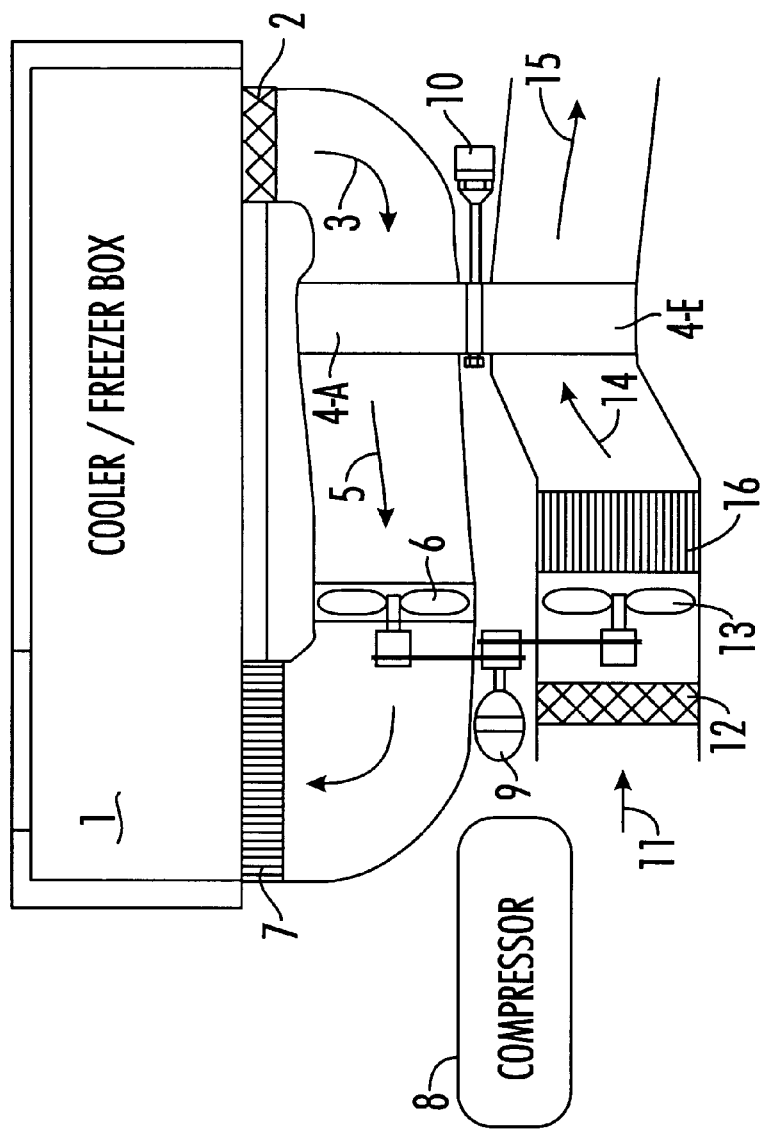
FIG. 101 is a drawing showing a desiccant wheel freezer box dehumidification apparatus with two motors.

FIG. 101 is a drawing of a desiccant based defroster apparatus for a large freezer box or refrigeration unit for a truck or other motorized vehicle, or a freezer box or refrigeration unit located in a commercial building which utilizes the apparatus to eliminates frost and reduces the energy consumption by lowering the relative humidity of the air contained in the box. The inventive apparatus utilizes the excess heat from the compressor and condenser coils to evaporate the moisture out of the hydrous desiccant. Item 1 is the freezer box/cooler which could be used as: a display case in a food store, cold storage box, trailer for an over the road truck, refrigerator for home use, or various other cooler or freezer boxes which may be opened at different times and exposed to another air source which is at a higher temperature and containing moisture. The apparatus dehumidifies the air stream to eliminate frost and reduce the energy consumption of the unit. The warmer air exposed to the cooler/freezer box has the ability to hold it's moisture until it is cooled and then the moisture in the warmer air begin to condense out as the temperature is lowered causing frost to form on the inside of the box and especially on the cold evaporator coils. Two separate air streams are represented in the drawing by arrows. The cold air 3 exits the box through 2 a filter and passes through 4-A the adsorption side of the desiccant wheel where the anhydrous desiccant adsorbs the moisture out of the air stream. Item 5 is the dehumidified cold air stream which is pull into 6 the cold air fan which is powered by fan motor 9. The air stream then enters 7 the cold evaporator coils which lower the temperature of the air returning to the freezer. Since the moisture is removed out of the air stream before it passes through the cold evaporator coils condensation (frost) will not form on the coils as the air passes through the coils. When the cold dehumidified air stream enters the box with it's very low relative humidity it will defrost the box through sublimation. The other air stream 11 may pass over the hot exterior of 8 the compressor and hoses (not shown) either before or after the air stream is filtered by 12 the hot air stream filter. Fan 13 which may be powered by 9 the fan motor forces the air stream through 16 the condenser coils which are positioned between 13 the fan and 4-E the evaporation side of the slowly rotating desiccant wheel. The hot air stream 14 is shown exiting 16 the hot condenser coils at a temperature high enough to evaporate the moisture out of the hydrous desiccant portion of the wheel. The hot moist air stream exits the apparatus into 15 the atmosphere. Titanium Silica, produced by Engelhard Corporation, will allow it's moisture to evaporate off when the air stream temperature passing over the surface of the desiccant is as low as 140° F., and will adsorb moisture at temperatures room temperature or lower. The desiccant wheel may be a center torque drive honeycomb wheel and is shown with a torque motor 10 and reduction gear box connected to the wheel by a drive shaft. The automatic control unit, sensors, seals, wiring, and other components are not shown.

Figure 102:
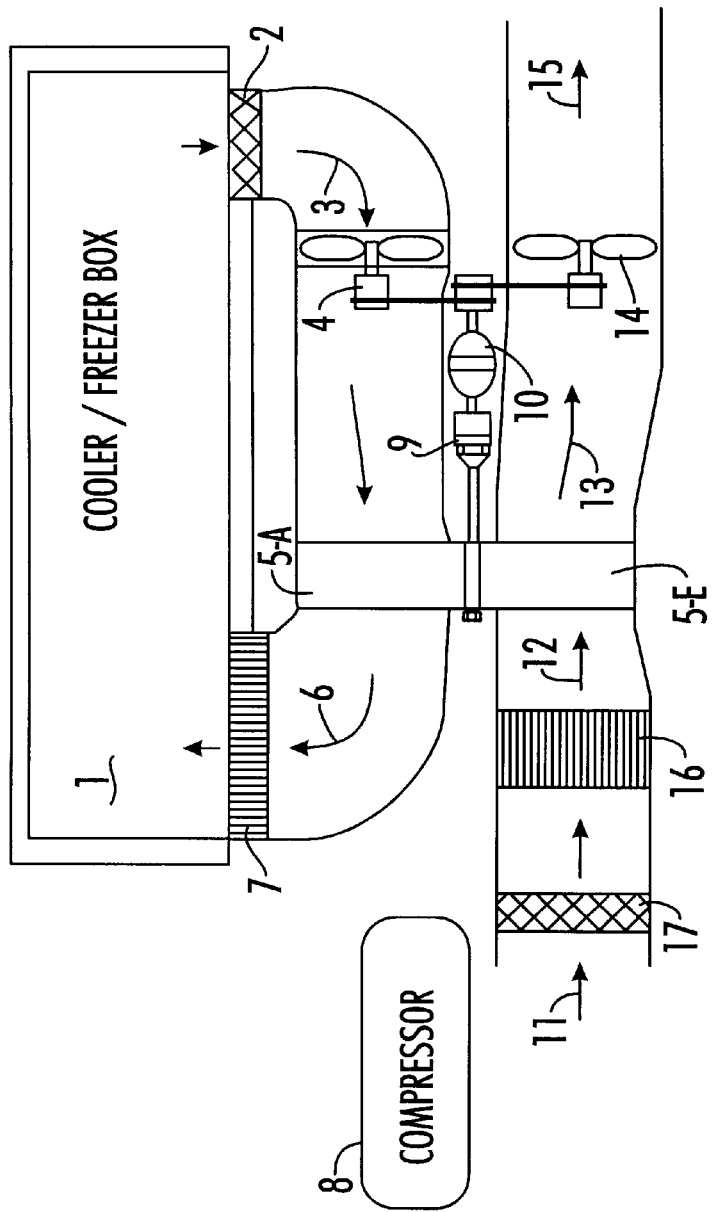
FIG. 102 is a drawing showing a desiccant wheel freezer box dehumidification apparatus with one drive motor.

FIG. 102 is a drawing of a desiccant based defroster apparatus for a large freezer box or refrigeration unit for a truck or commercial building which eliminates frost and reduces the energy consumption by lowering the relative humidity of the air contained in the box similar to FIG. 101 with a different embodiment of the fans, motor and wheel arrangement. The fans in this drawing are shown arranged so that any air leakage past the air seals will not enter the box since the air pressure on the cold side of the wheel will be greater than the air pressure on the hot side of the wheel. As in FIG. 101 the cold air 1 in the box circulates out through 2 the air filter and passes through 4 the cold side fan which forces the air stream through 5-A the adsorption portion of the desiccant wheel where the anhydrous desiccant adsorbs the moisture out of the air stream. The position of 4 the cold air fan which is forcing the air into the wheel causes a higher air pressure within the cold air mass near the wheel than the hot air in the lower portion of the drawing which is pulled through the wheel by 14 the hot air fan. When the cold dehumidified air stream exits the wheel it then passes through 7 the cold evaporator coils which lower the temperature of the dehumidified air stream. In this alternative of the inventive apparatus a single motor Item 10 is shown providing power to both fans 4 & 14 and through a reduction gear box Item 9 torque is also provided to the slowly rotating desiccant wheel. Item 8 is a conventional compressor which may be used as a source of excess heat for evaporation in addition to the normal function of refrigeration. Item 17 is a filter to prevent foreign matter from building up on the surface of the desiccant wheel as 11 the outside air enters the apparatus. The outside air stream passes through 16 the hot condenser coils which increases the temperature of the air stream to the level necessary to evaporate the moisture out of 5-E the evaporation side of the desiccant wheel. Air stream 12 is the hot air stream entering the hydrous portion of the desiccant wheel where the moisture is released from the desiccant into the hot air stream and exits the wheel as hot moist air Item 13. Fan 14 pulls the hot air stream through the apparatus and expels the hot moist air 15 back into the atmosphere.

Figure 103:
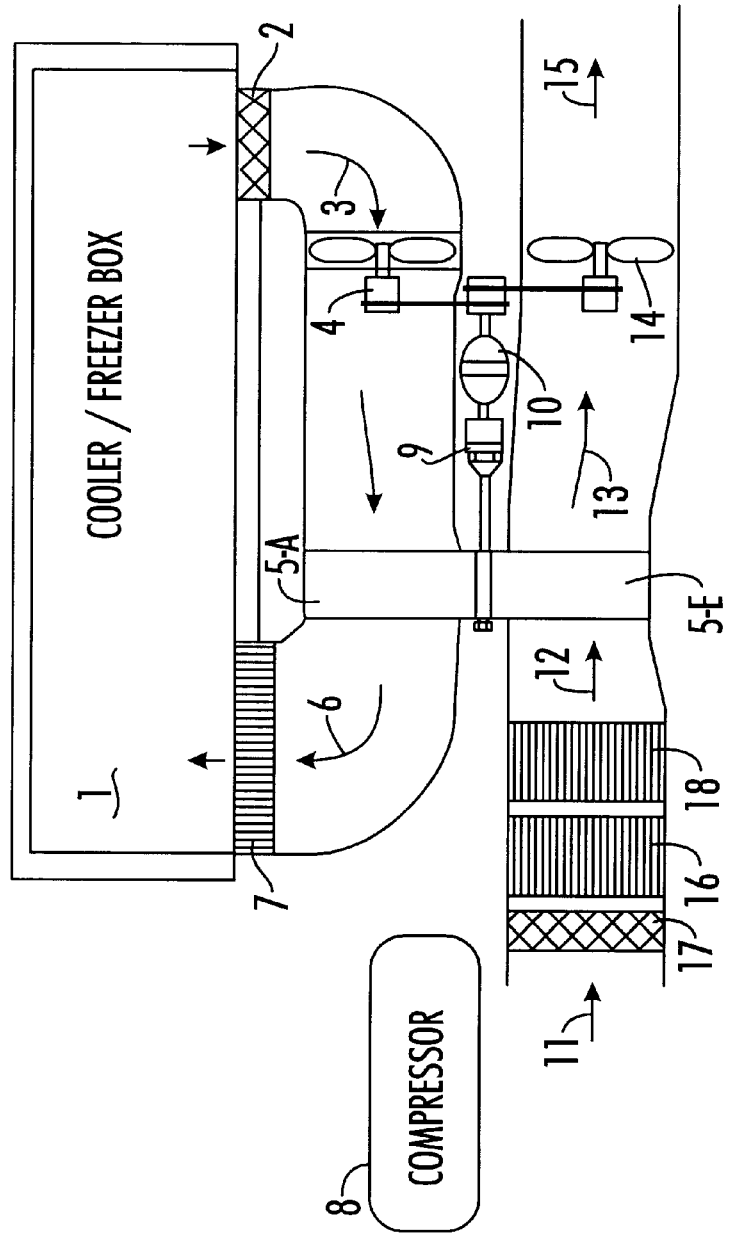
FIG. 103 is a drawing showing a desiccant wheel freezer box desiccant based dehumidification apparatus with two drive motors.

FIG. 103 is a drawing of a desiccant based defroster apparatus for a large freezer box or refrigeration unit for a truck or commercial building which eliminates frost and reduces the energy consumption by lowering the relative humidity of the air contained in the box similar to FIG. 101 and FIG. 102 with a different embodiment of the fans, motor and wheel arrangement. This drawing is similar to FIG. 102 with the exception that there are two motors 9 & 10 in place of one motor 10. In this drawing Item 9 is the torque motor and reduction gear box for the desiccant wheel and Item 10 is the fan motor for fans 4 & 14. An alternative to FIGS. 101 & 102 is Item 18 an auxiliary heat exchanger which may be added to the apparatus and is capable of providing the heat required for evaporation when 8 the compressor is off and dehumidification is desired. The auxiliary heat exchanger 18 would only need to provide the heat for the regeneration of the desiccant only when the compressor is off When the compressor 8 is operating the heat for regeneration would be provided by 16 the condenser coils.

Figure 104A:
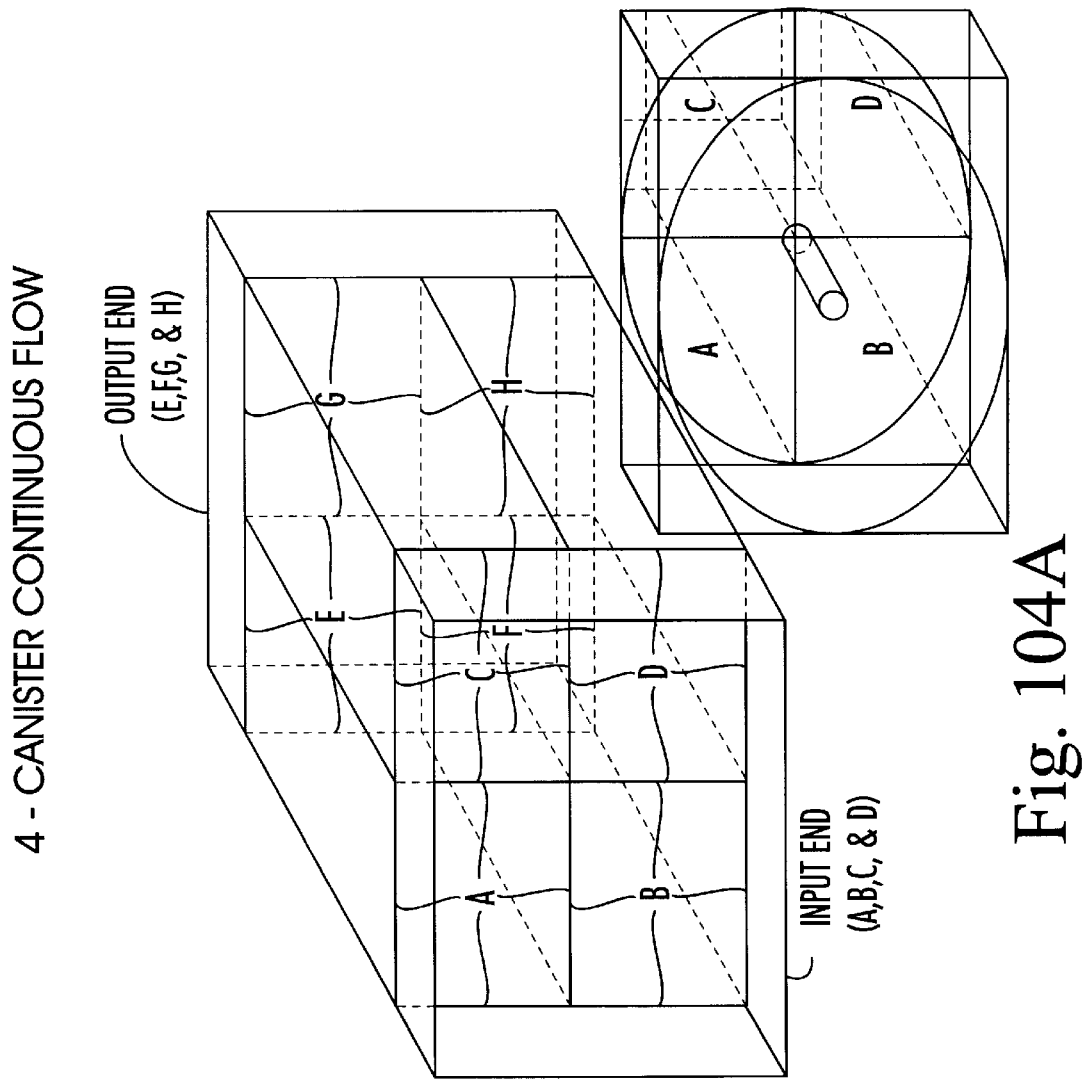
FIG. 104A is a diagram of a continuous flow (4) four canister case section of a desiccant apparatus with straight through unbaffled canisters.

FIG. 104A is a drawing of a (4) four canister desiccant case with straight through air flow in the canisters where the air flow does not make directional changes due to baffles. The input end is shown with the rotary crossover valve removed to the lower right. The hot air stream enters canister "A" and exits the output end "E", while canisters "B" & "D" are making their cycle change ("B" from hot to cool air & "D" from cool to hot air) and while canister "C" has a cool air stream entering the "C" input end and exiting "G" the output end. In this way the "A" & "C" air stream is uninterrupted during the change over of "B" & "D". As canister "A" begins to have it's moisture completely evaporate out into the hot air stream and become anhydrous, canister "C" becomes saturated with the moisture which is adsorbed into the desiccant from the cool air stream as it becomes hydrous, and the changeover of "A" & "C" is accomplished by the crossover valve while the air continues to flows through canisters "B" & "D". The relative humidity sensors of the automatic control unit detect the level of saturation and evaporation and activate the input and output crossover valves to accomplish the crossover.

Figure 104B:
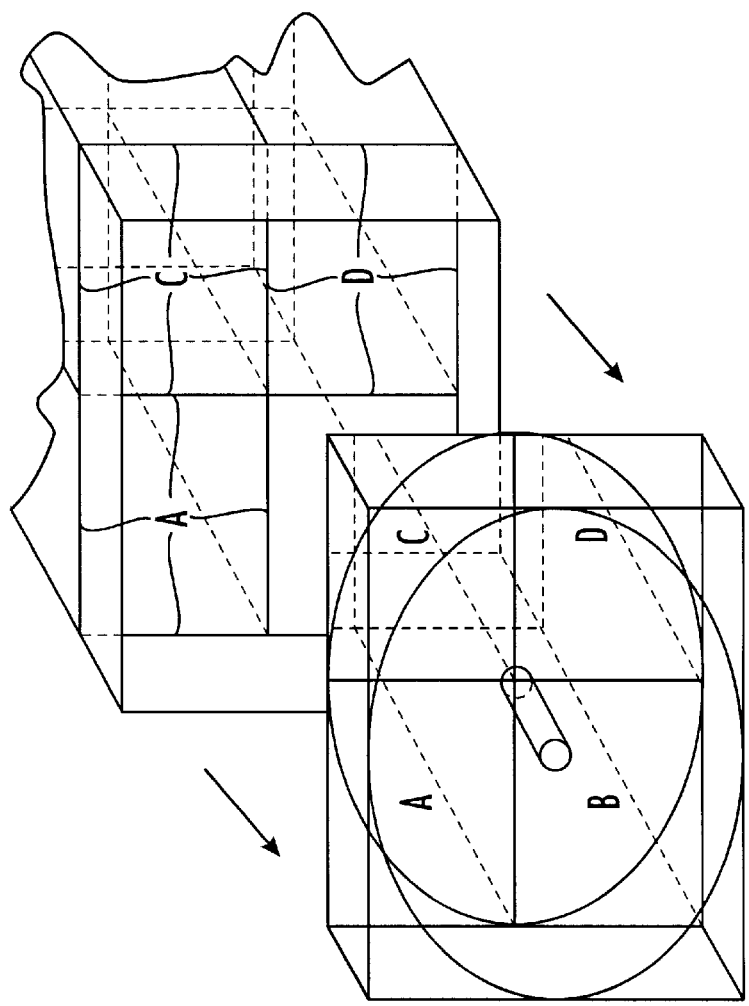
FIG. 104B is a diagram of the position of the rotary valve moved forward to show the relative location of the case.

FIG. 104B is a drawing of the crossover valve moved forward and away from the (4) four canister case to provide a view of the input end of the canisters which is similar to FIG. 104A.

Figure 104C:
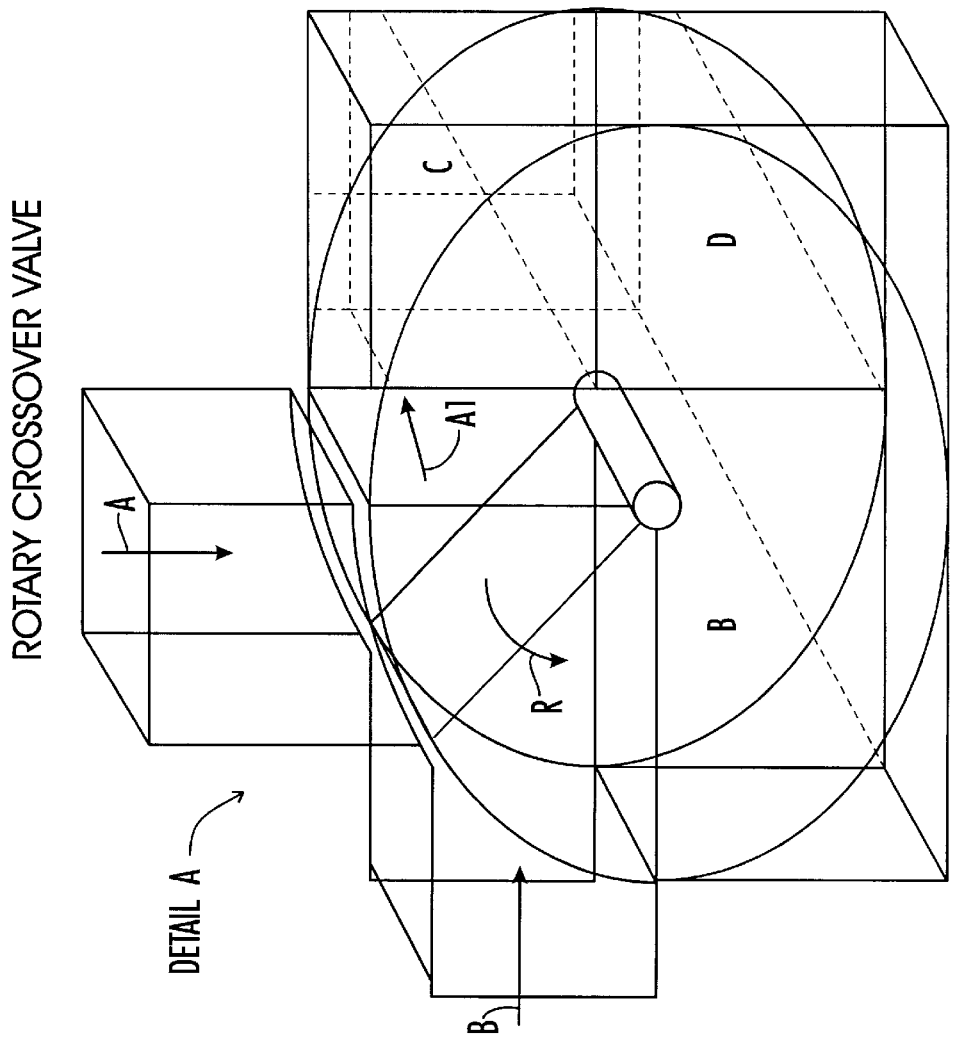
FIG. 104C is a diagram of the rotary crossover valve with a Detail of a section of the valve.

FIG. 104C is a drawing of the rotary crossover valve which may be utilized for a (4) four canister desiccant case. In Detail "A" a portion of the rotary crossover valve is shown in the upper left with (2) two air vents connected to the valve. Air stream "A" is shown entering the valve opening in the top of the valve and making a 90° turn into the canister as air stream "A1". The rotary crossover valves differ from the action of the slowly rotating desiccant wheel in that the crossover valve makes a rapid valve change from one canister to another. The rotation action of the valve is shown with an arrow labeled "R". Air stream "A" may be the hot air stream while air stream "B" may be the cool air stream and "B" is shown closed off from the canister. When the valve rotates air stream "B" is allowed to flow through the opening in the valve and air stream "A" will be closed off buy a section of the valve not shown.

Figure 105:
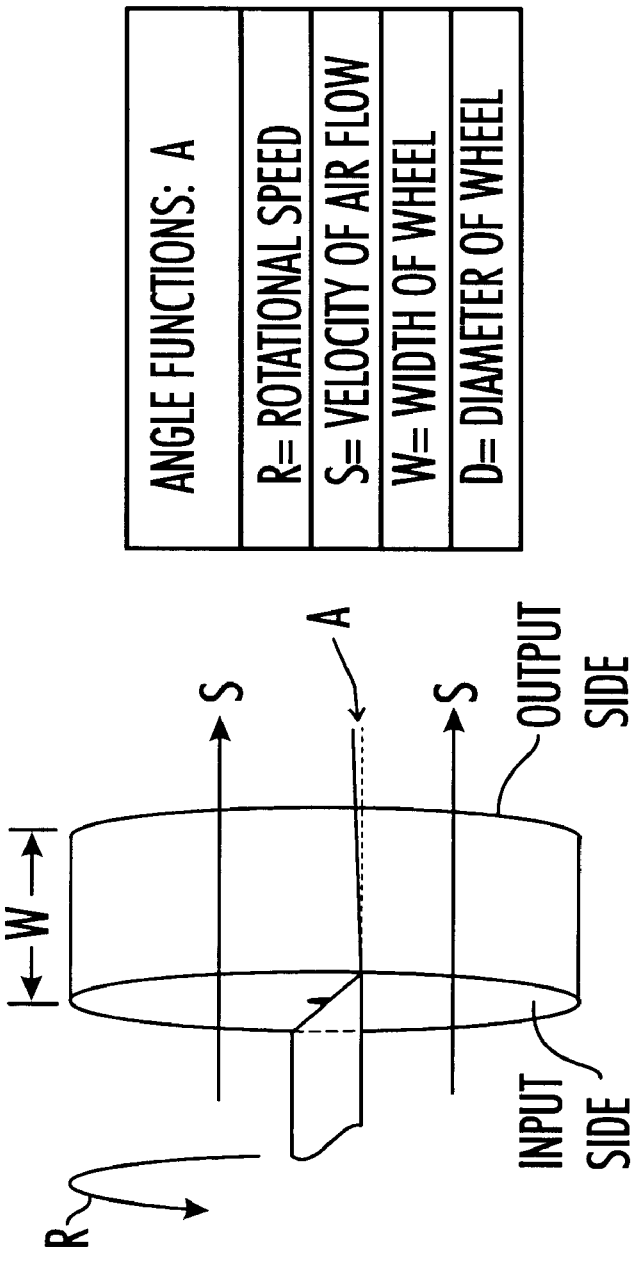
FIG. 105 is a drawing of an example of a desiccant wheel "INPUT -to- OUTPUT" vent off set which compensates for wheel rotation and core cell openings.

FIG. 105 is a drawing showing a slight offset of the output vent from that of the input vent to compensate for the rotation of the desiccant wheel and size of the cell openings. Although the rotation of the desiccant wheel is very slow as compared to the velocity of the air flow through the wheel, for example, there may exist a condition where the adsorption air enters the input side through the cells (air passageways) and as the wheel rotates the air exits the output side of the wheel into the evaporation air stream. The vent off set assures that the adsorption input side cell is completely closed before the output side of the same cell becomes open to the evaporation side vent. "A" represents the angle of the off set on both sides of the center of rotation and is shown as a function of "R"=rotational speed, "S"= velocity of air flow, "W"=width of wheel, and diameter of wheel. There are two additional factors not shown which are: (1) the thickness of the diagonal seal and (2) the size of the cells. The vent off set may help prevent the crossover of the air stream from the adsorption to evaporation side or from the evaporation to the adsorption side of the system.

Figure 106:
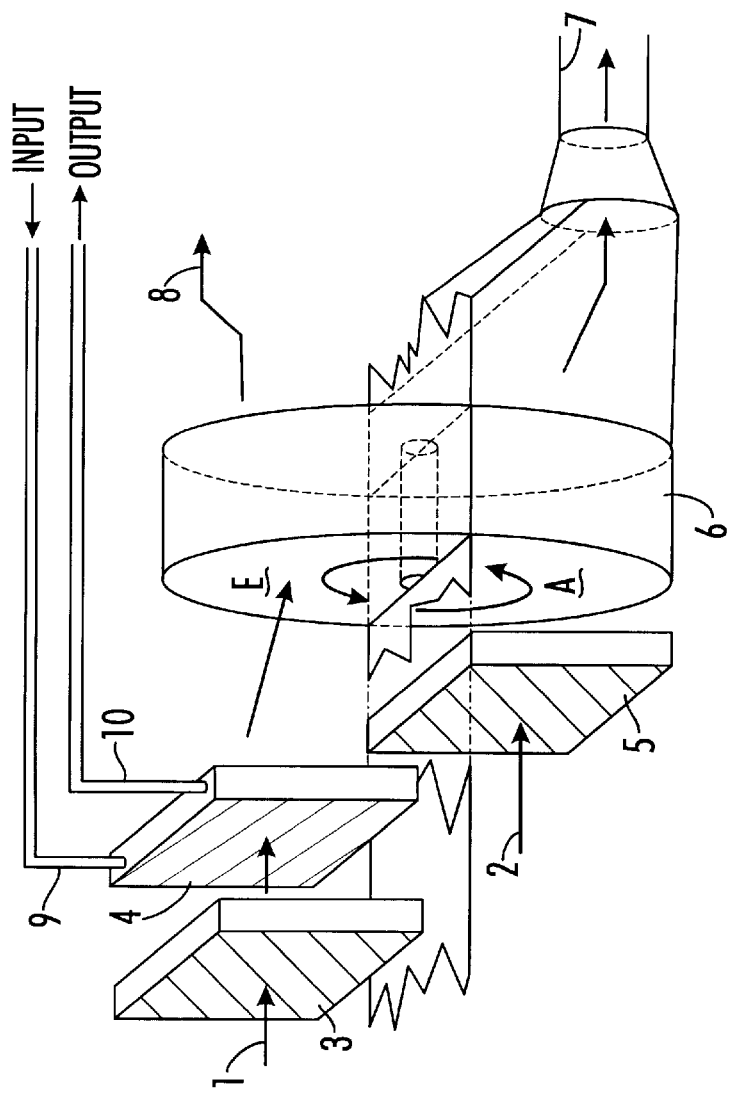
FIG. 106 is a drawing of a desiccant based dehumidification apparatus where an alternative to the inventive method utilizing a desiccant wheel to dehumidify an air stream which will then enter an air compressor to become dehumidified compressed air for use in general construction, commercial, and industrial applications or may be utilized in medical or private compressors.

FIG. 106. is a drawing of a desiccant based dehumidification apparatus where an alternative to the inventive method utilizing a desiccant wheel to dehumidify an air stream which will then enter an air compressor to become dehumidified compressed air. Item 1. the evaporation air stream enters the apparatus from atmosphere an passes through 3. the air filter to prevent the accumulation of foreign matter on the desiccant wheel. After most foreign matter is removed by 3. the air filter from 1. the evaporation air stream which then passes through 4. a heat exchanger supplied by excess heat from various sources such as the compressor, compressor motor or other sources the temperature of the evaporation air stream is increased to the temperature necessary to evaporate the moisture out of E. the desiccant material coated on the surface of 6. the desiccant wheel. The desiccant wheel slowly rotates through E. the evaporation section of the apparatus where the hot air stream exit 4. the heat exchanger evaporates the moisture out of the desiccant material and then returns to 8. the atmosphere with the water vapor. Item 2. the compressor input air stream which will enter the compressor first passes through 5. an air filter to remove foreign matter before entering A the adsorption side of 6. the desiccant wheel. The desiccant coated on the surface of the NOMEX honeycomb wheel adsorbs the moisture out of the air stream as the air passes through the wheel on it's way to 7. the compressor intake. The wheel is slowly rotated causing the desiccant which is coated on the wheel to cycle into and out of the A. and E. positions of the apparatus. The rotation serves to allow the moisture to be adsorbed into the desiccant in the A. position and then be repositioned to E. position where the moisture is evaporated. In this way the desiccant continuously adsorbs moisture out of the input air stream and is regenerated by the evaporation of the moisture from the hot air stream. The heat exchanger Item 4. is shown with pipes/hoses 9. & 10. which are the input and output lines for the coolant from the motor or compressor utilized to transfer the heat from the compressor/motor to the evaporation air stream. An alternative of he inventive apparatus, which is not shown, would eliminate the heat exchanger and utilize a small fan to pull an air stream from the motor and compressor to then force the hot air into the evaporation side of the wheel. Two of the benefits of the invention are: first, the increased efficiency of the compressor due to the ability of the compressor to produce greater compression when input air does not contain water vapor and; secondly, the compressor, air tank, air lines, hoses, drive motors and other devices utilizing the air do not have to cope with the condensation which often forms within the air system. Many compressed air systems today utilize various water filters or water separators which require constant maintenance efforts to prevent the build up of moisture in the compressed air system.

Figure 107:
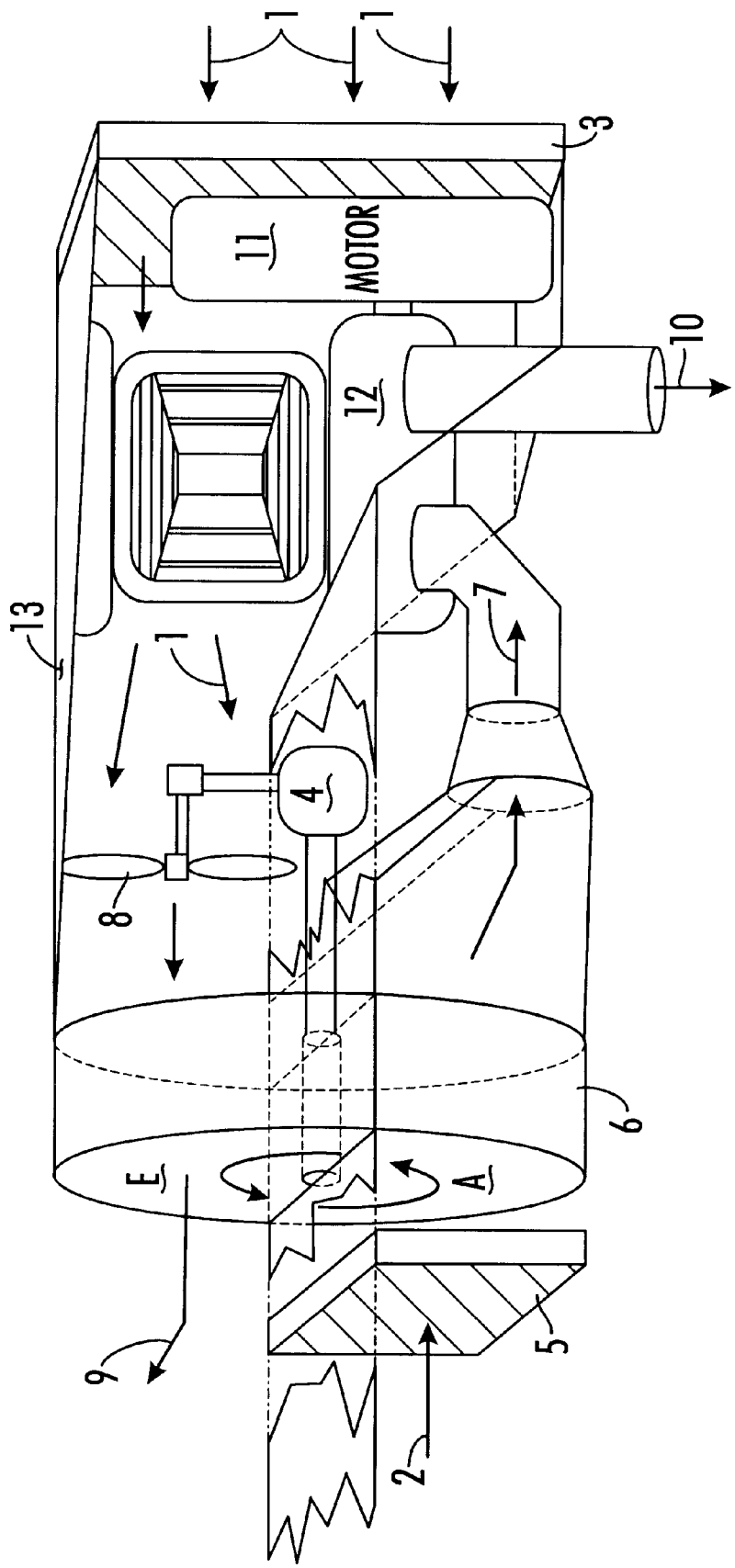
FIG. 107 is a drawing of a desiccant based air compressor dehumidification apparatus which is similar to the apparatus shown in FIG. 106, except that the heat exchanger is removed and the heat for evaporation is provided from the air stream which cools the compressor and air cooled motor.

FIG. 107 is a drawing of a desiccant based air compressor dehumidification apparatus which is similar to the apparatus shown in FIG. 106, except that the heat exchanger is removed and the heat for evaporation is provided from the air stream which cools the compressor and air cooled motor. Item 1 is the evaporation air stream which first passes through 3 the filter which removes any foreign particles after which the air is heated as it passes over the outside surface of 11 the motor and 12 the compressor. The air stream is then forced through "E" the evaporation portion of 6 the slowly rotating desiccant wheel by 8 the fan. Item 4 is the reduction gear box which may be powered by either 11 the motor or have another motor, which is not shown, provide the power to the reduction gear box. The output of 4 the reduction gear box is a slowly rotating shaft to 6 the desiccant wheel and high RPM to 8 the fan. Item 1 the evaporation air stream passes through 13 the air duct to the desiccant wheel at a high enough temperature to evaporate the moisture out of the desiccant material coated on the wheel. Item 2 the air stream which will go onto the compressor to be compressed, first passes through 5 the air filter to remove any foreign particles and then enters "A" the adsorption portion of 6 the desiccant wheel where the moisture in the air stream is adsorbed into the desiccant material. The dehumidified air stream passes through 14 the air duct to the air compressor. Item 7 the dehumidified air stream is shown enter the intake of the air compressor. Item 10 is the output of the air compressor which is high pressure dehumidified air. Not shown is another alternative of the inventive apparatus which utilizes a set of desiccant canisters with crossover valves which may replace the desiccant wheel.

What is claimed is:

1. A method of altering the humidity level of a passenger cabin of a motorized vehicle, comprising the steps of:

(a) providing a desiccant based moisture collection means for collecting moisture from air;

(b) positioning the moisture collection means in the path of an air stream;

(c) providing a heat source capable of emitting heat sufficient to evaporate moisture from the moisture collection means;

(d) positioning the moisture collection means in communication with the heat source to evaporate the moisture collected by the moisture collection means into an air stream;

(e) decreasing the humidity level of the passenger cabin of the motorized vehicle by directing a stream of air through the moisture collection means and into the passenger cabin, wherein a temperature of the stream of air is low enough that the moisture collection means collects moisture from the stream of air.

2. A method for controlling a humidity level of a passenger cabin of a motorized vehicle, comprising the steps of:

(a) providing a desiccant-based moisture collector; and (b) decreasing the humidity level in the passenger cabin of the motorized vehicle by:

(1) directing air into the moisture collector, the air having a temperature small enough that the moisture collector collects moisture from the air and dehumidified air exits the moisture collector, and (2) directing the dehumidified air from the moisture collector to the passenger cabin.

3. The method of claim 2, further comprising receiving air from the passenger cabin, wherein the air directed into the moisture collector when decreasing the humidity level comprises the air received from the passenger cabin.

4. The method of claim 2, further comprising:

regenerating the desiccant-based moisture collector by directing heated air into the moisture collector, the heated air having a temperature sufficient to evaporate moisture from the moisture collector and into the heated air.

5. The method of claim 4, further comprising:

directing the air and the heated air through the moisture collector in an alternating manner.

6. The method of claim 2, wherein the moisture collector comprises an enclosed canister.

7. The method of claim 2, further comprising:

monitoring environmental conditions in the passenger cabin; and decreasing the humidity level in the passenger cabin as recited in step (b) in response to the environmental conditions.

8. The method of claim 7, wherein the step of monitoring comprises monitoring the humidity level in the passenger cabin, and the step of decreasing the humidity level comprises decreasing the humidity level when the humidity level rises above an upper threshold level.

9. The method of claim 8, further comprising permitting an occupant of the passenger cabin to set the upper threshold level.

10. The method of claim 7, wherein the step of monitoring comprises monitoring the humidity level in the passenger cabin and an air temperature in the passenger cabin, and the step of decreasing the humidity level comprises decreasing the humidity level based on the monitored humidity level and air temperature.

11. The method of claim 7, wherein the step of monitoring comprises monitoring the humidity level in the passenger cabin and a temperature of a surface of the passenger cabin, and the step of decreasing the humidity level comprises decreasing the humidity level based on the monitored humidity level and surface temperature.

12. The method of claim 2, wherein the step of directing the dehumidified air comprises directing the dehumidified air to a windshield of the passenger cabin.

13. The method of claim 2, further comprising:

between steps (b)(1) and (b)(2), cooling the dehumidified air.

* * * * *